US012405823B2

(12) United States Patent
Ashwathnarayan et al.

(10) Patent No.: US 12,405,823 B2
(45) Date of Patent: Sep. 2, 2025

(54) RESOURCE SHARING BY TWO OR MORE HETEROGENEOUS PROCESSING CORES

(71) Applicant: NVIDIA Corporation, Santa Clara, CA (US)

(72) Inventors: Sharan Ashwathnarayan, Bangalore (IN); Debalina Bhattacharjee, Bangalore (IN); Ashok Kelur, Santa Clara, CA (US); Alok Parikh, Bangalore (IN); Yogesh Kini, Bangalore (IN); Amit Rao, Bangalore (IN); Aingarathasan Paramakuru, Pickering (CA); Kathleen E. Danielson, San Francisco, CA (US); Daniel Jonathan Hettena, Princeton, NJ (US); Vladislav Buzov, San Ramon, CA (US)

(73) Assignee: NVIDIA Corporation, Sunnyvale, CA (US)

( * ) Notice: Subject to any disclaimer, the term of this patent is extended or adjusted under 35 U.S.C. 154(b) by 252 days.

(21) Appl. No.: 16/679,082

(22) Filed: Nov. 8, 2019

(65) Prior Publication Data

US 2020/0364088 A1 Nov. 19, 2020

(30) Foreign Application Priority Data

May 16, 2019 (IN) ............................ 201911019475

(51) Int. Cl.
*G06F 9/50* (2006.01)
*G06F 9/48* (2006.01)
*G06F 9/52* (2006.01)

(52) U.S. Cl.
CPC .............. *G06F 9/5016* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS

2009/0165014 A1* 6/2009 Park ...................... G06F 9/5088 718/105
2009/0222654 A1* 9/2009 Hum ..................... G06F 1/3206 713/100

(Continued)

OTHER PUBLICATIONS

Damschen et al, "Co-Scheduling on Fused CPU-GPU Architectures With Shared Last Level Caches", IEEE Transactions on Computer-Aided Design of Integrated Circuits and Systems, vol. 37, No. 11, Nov. 2018, pp. 2337-2347 (Year: 2018).*

(Continued)

*Primary Examiner* — Charles M Swift
(74) *Attorney, Agent, or Firm* — Davis Wright Tremaine LLP

(57) ABSTRACT

Apparatus, systems, and techniques to share memory. In at least one embodiment, a processor comprises one or more circuits to allocate memory to at least two heterogeneous processing cores in response to performing one or more instructions associated with one or more application programming interfaces based, at least in part, on one or more attributes associated with the at least two heterogeneous processing cores.

65 Claims, 82 Drawing Sheets

(52) U.S. Cl.
CPC .......... *G06F 9/4843* (2013.01); *G06F 9/4881* (2013.01); *G06F 9/50* (2013.01); *G06F 9/5005* (2013.01); *G06F 9/5027* (2013.01); *G06F 9/5033* (2013.01); *G06F 9/5044* (2013.01); *G06F 9/505* (2013.01); *G06F 9/5088* (2013.01); *G06F 9/52* (2013.01); *G06F 9/522* (2013.01); *G06F 9/526* (2013.01)

(58) Field of Classification Search
CPC .... G06F 9/5027; G06F 9/5033; G06F 9/5044; G06F 9/505; G06F 9/5053; G06F 9/5088; G06F 9/52; G06F 9/522; G06F 9/526
See application file for complete search history.

(56) References Cited

U.S. PATENT DOCUMENTS

| | | | | |
|---|---|---|---|---|
| 2012/0291040 | A1* | 11/2012 | Breternitz ............. | G06F 9/5083<br>718/104 |
| 2014/0101411 | A1* | 4/2014 | Sakarda .................. | G06F 1/329<br>712/42 |
| 2014/0240327 | A1* | 8/2014 | Lustig ....................... | G06F 9/52<br>345/505 |
| 2017/0068571 | A1* | 3/2017 | Lu ......................... | G06F 9/5016 |
| 2018/0052709 | A1* | 2/2018 | Fong ..................... | G06F 9/5044 |
| 2018/0074727 | A1* | 3/2018 | Zhao ..................... | G06F 3/0656 |
| 2018/0143781 | A1* | 5/2018 | Greathouse ............. | G06F 9/451 |
| 2019/0312772 | A1* | 10/2019 | Zhao ........................ | G06N 3/08 |
| 2020/0250585 | A1* | 8/2020 | Liu ......................... | G06F 8/447 |
| 2020/0334084 | A1* | 10/2020 | Jacobson ............ | G06F 11/3037 |

OTHER PUBLICATIONS

Kim et al, "SnuCL: AN OpenCL Framework for Heterogeneous CPU/GPU clusters", ICS'12, Jun. 25-29, 2012, San Servolo Island, Venice, Italy, 2012, ACM, pp. 341-351 (Year: 2012).*

Dashti et al, "Analyzing Memory Management Methods on Integrated CPU-GPU Systems", ISMM'17, Jun. 18, 2017, Barcelona, Spain, ACM, pp. 59-69 (Year: 2017).*

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.

Society of Automotive Engineers On-Road Automated Vehicle Standards Committee, "Taxonomy and Definitions for Terms Related to Driving Automation Systems for On-Road Motor Vehicles," Standard No. J3016-201609, Sep. 30, 2016, 30 pages.

* cited by examiner

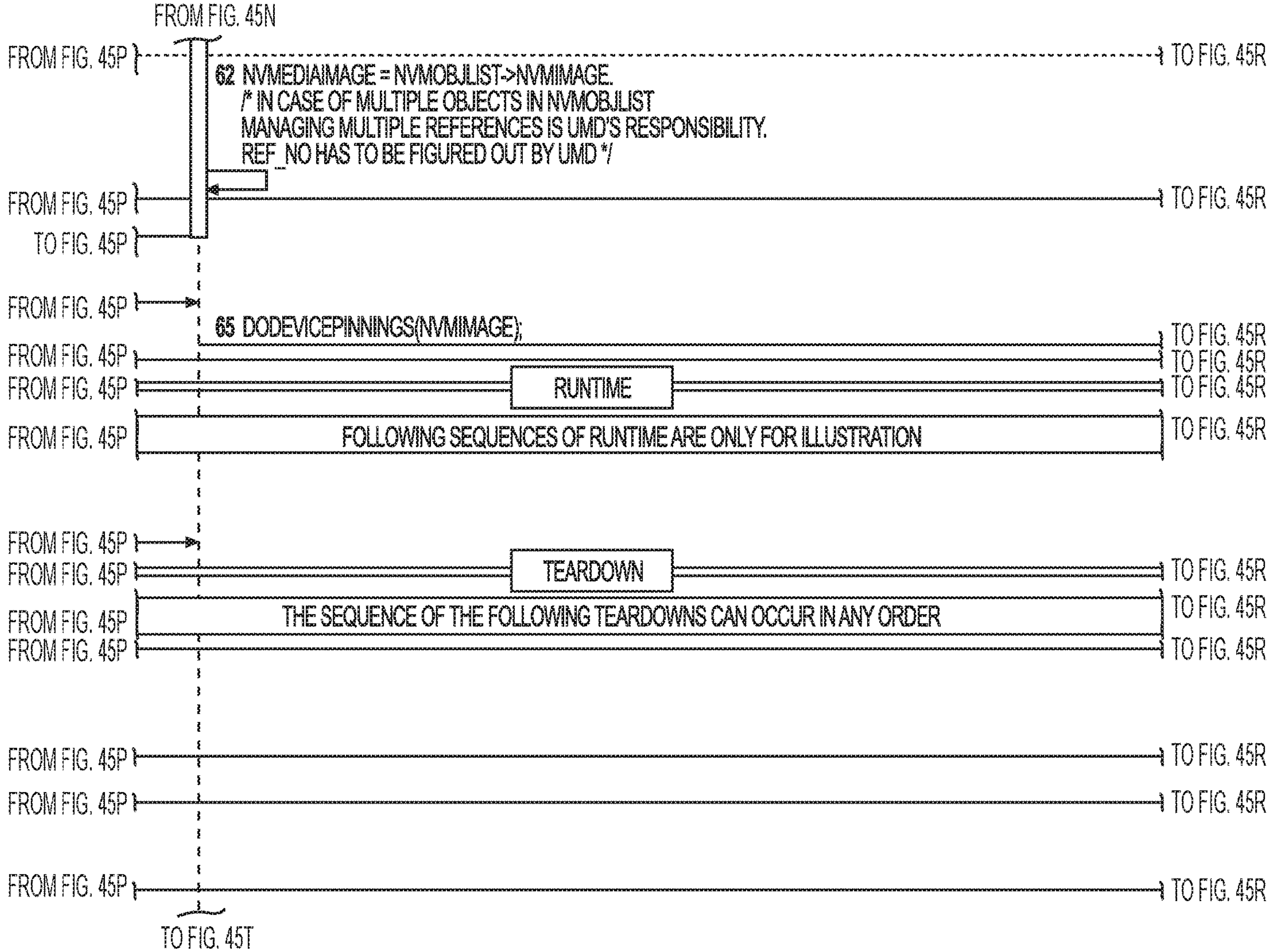
FIG. 45Q
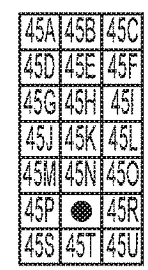

RESOURCE SHARING BY TWO OR MORE HETEROGENEOUS PROCESSING CORES

CROSS REFERENCE TO RELATED APPLICATIONS

This application claims priority to Indian Patent Application No. 201911019475, filed May 16, 2019, entitled "TECHNIQUES FOR STREAMLINED RESOURCE SHARING AND SYNCHRONIZATION ACROSS DISPARATE HARDWARE ENGINES FOR IMPROVED INTEROPERABILITY," the disclosure of which is incorporated by reference herein in its entirety.

TECHNICAL FIELD

At least one embodiment pertains to facilitating memory sharing between different processor architectures. For example, at least one embodiment, pertains to processors or computing systems used to share memory between different processor architectures according to various novel techniques described herein.

BACKGROUND

Interoperability of memory and other computing resources between different processor architectures and engines can be difficult. Amounts of memory, time, or computing resources used in a system with different processor architectures and engines can be improved.

DETAILED DESCRIPTION

Figure 1:
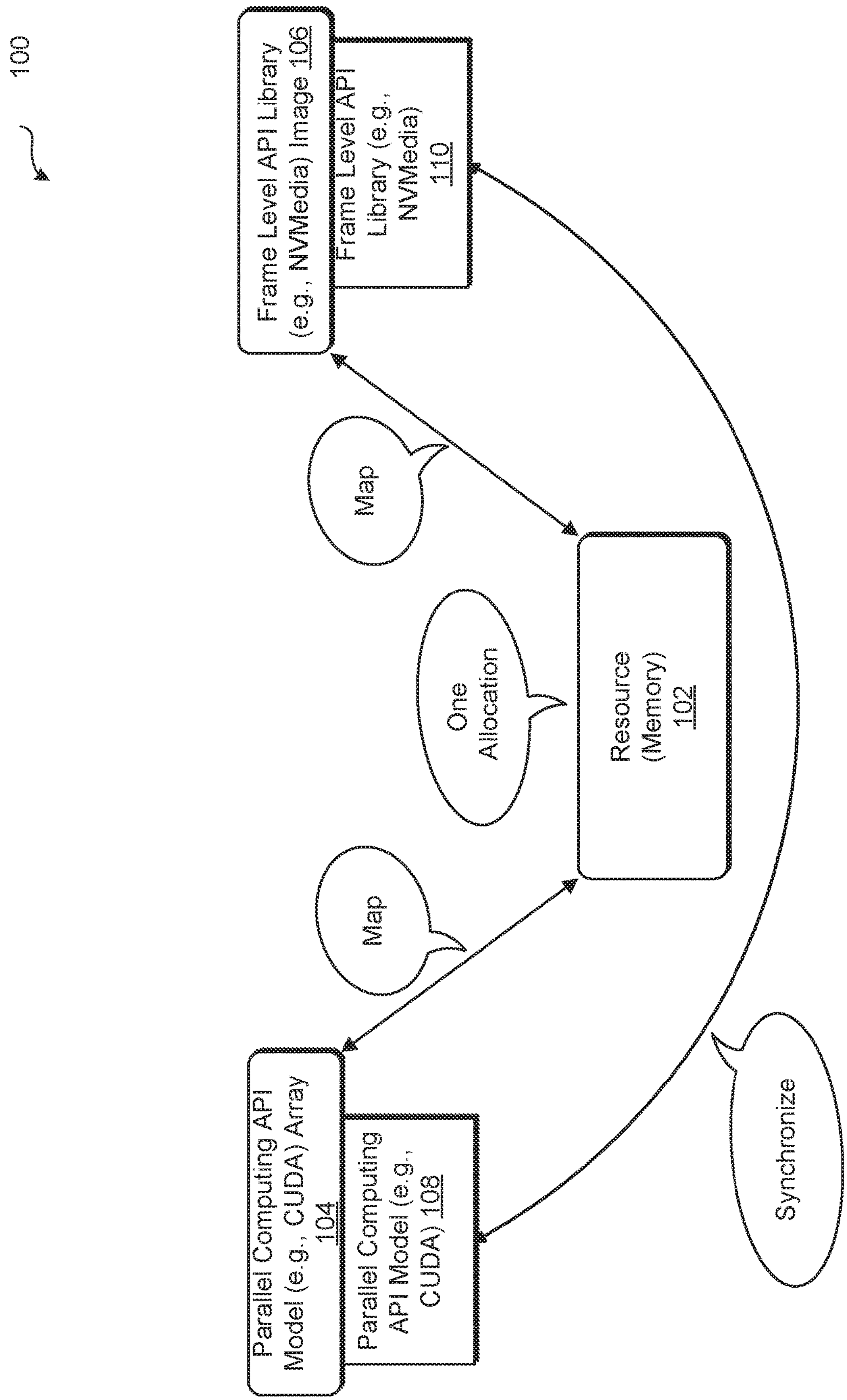
FIG. 1 illustrates a system that implemented resource allocation and synchronization, according to at least one embodiment.

In at least one embodiment, memory allocated for a buffer data object can be imported into a parallel computing platform and application programming interface (API) model (e.g., CUDA). In at least one embodiment, higher level constructs such as image/YUV/tensor can be imported as pointer or arrays according to a parallel computing platform and API model. In at least one embodiment, buffer data object is imported as GPU L2 cache. In at least one embodiment, buffer data object supports both SYSMEM and VIDMEM allocations, wherein SYSMEM may be for access from integrated and discrete GPU engines and VIDMEM is accessible from a discrete GPU (dGPU). In at least one embodiment, buffer data object supports importing memory over process, VM, and chip boundaries. In at least one embodiment, parallel computing platform and application programming interface model allocated memory can be exported as buffer data object. In at least one embodiment, buffer data object allocated memory is interoperable between Tegra platform and x86 platform. In at least one embodiment, buffer data object is a missing link in memory management APIs exposed by different User Mode Drivers (UMDs). In at least one embodiment, data may be shared between multiple engines and consequently multiple UMDs. In at least one embodiment, underlying memory used across engines remains same. In at least one embodiment, there are instances where a particular engine/mode may impose allocation restrictions. In at least one embodiment, one or more allocation restrictions can include one or more of following: for cross-partition mode, allocation should only happen out of Carve-out memory (memory shared between VMs); for display engines, displayable buffers should have specific "Pitch"; parallel computing platform and application programming interface model pointers if used as textures should meet texture alignment requirements; TensorRT should only support Tensor Allocation which is N-dimensional data where N could be between 0 to 8; DLA/PVA engines have constraints like pitch along a particular dimension must be multiple of a certain number "M."

In at least one embodiment, capabilities of parallel computing platform and application programming interface model external semaphores and parallel computing platform and application programming interface model streams are enhanced using techniques described herein. In at least one embodiment, a parallel computing platform and application programming interface model stream can wait and signal synchronization object by treating it as a type of external semaphore. In at least one embodiment, parallel computing platform and application programming interface model stream is able to wait for tasks running on a plurality of hardware engines. In at least one embodiment, source sync fence waited upon by a first UMD can be generated by another UMD running on a different engine across a software boundary of thread, process, or VM. In at least one embodiment, a parallel computing platform and application programming interface model stream returns a fence which tracks all tasks currently enqueued in it, which may be similar to EventRecord( ) except that returned fence represents tasks on stream at that point of time. In at least one embodiment, various types of devices can wait for GPU to finish submitted task (on a stream), completion of which unblocks any device (e.g., across hardware and/or software boundaries) which had enqueued a wait.

In at least one embodiment, synchronization interoperability includes interoperability between parallel computing platform and application programming interface model and synchronization object to allow traditional parallel computing platform and application programming interface model streams to wait for tasks that is outside parallel computing platform and application programming interface model's domain and for other UMDs to natively wait for any tasks enqueued in a parallel computing platform and application programming interface model stream. In at least one embodiment, synchronization interoperability allow applications to gain a finer grain control of efficiently to describe dependencies that spans across hardware and software boundaries. In at least one embodiment, hardware boundary includes one or more of following non-limiting examples: CPU, integrated or discrete GPU, DLA, PVA, ISP, encoder, decode, or an entire chip (e.g., Tegra A, Tegra B on DrivePX2 platforms). In at least one embodiment, software boundaries includes one or more of following non-limiting examples: thread, process, VM.

In at least one embodiment, synchronization object interop is supported as an extension to existing parallel computing platform and application programming interface model interop with external semaphore. In at least one embodiment, parallel computing platform and application programming interface model interops supports externally allocated semaphore, such as Vulkan semaphores. In at least one embodiment, techniques described herein are implemented to support synchronization object interop.

In at least one embodiment, users of synchronization interoperability are abstracted away from internal platform-specific details for portability. In at least one embodiment, sync-primitives are chosen based at last in part on performance to minimize CPU intervention for maintaining dependencies, queries, etc. In at least one embodiment, most performant sync-primitive is chosen. In at least one embodiment, once a synchronization interoperability object is allocated or reserved, it should be reusable across hardware and/or software boundaries. In at least one embodiment, expected functionality is similar to or based on how same event can be used to record task multiple times. In at least one embodiment, reusability of sync interop object reduces resource footprint, thereby reducing memory usage. In at least one embodiment, multiple UMDs are allowed to wait upon a single sync interop object. In at least one embodiment, supporting multi-casting/1:N signaler to waiter relationship is to reduce resource usage and avoid creation of multiple objects that are tracking same task as that of an original interop object, similar to how events can be waited upon in different streams, but different in sense that such waits can happen in different UMDs or processes. In at least one embodiment, synchronization object fits well into higher software abstractions and/or frameworks. In at least one embodiment, synchronization object is to integrate in context of replacement for EGLStream (e.g., NvStream), graph based execution frameworks, user-space scheduler, profiler, and more. In at least one embodiment, synchronization object avoids dynamic memory allocations in critical paths, owing to potential indeterminism of dynamic allocation and possibility of failure (e.g., failure to allocate memory due to system being out of available memory).

In at least one embodiment, an external entity reserves resources which are shared between signaler & waiter with read/write permissions set appropriately (e.g., reader-writer lock). In at least one embodiment, applications built on one platform with sync interop objects are portable to another platform with little or no change in such applications. In at least one embodiment, portability between x86 platform and Tegra platform with sync interop objects involves few or no changes. In at least one embodiment, synchronization object tracks state of tasks which can be queried. In at least one embodiment, an ability to query for state of task that synchronization object is tracking is supported. In at least one embodiment, task queries help applications and/or schedulers to track completion status, take necessary actions on timeout, and more. In at least one embodiment, CPU/OS backed primitives are supported by synchronization object. In at least one embodiment, device/target are allowed to natively wait upon sync-primitives native to a given OS/CPU (e.g., semaphore in system RAM). In at least one embodiment, for discrete GPUs, semaphores are accessible from video memory (e.g., VIDMEM), which may be opaque to applications (e.g., implementation decision hidden from applications).

FIG. 1 illustrates a system 100 that implemented resource allocation and synchronization, according to at least one embodiment. In at least one embodiment, diagram 100 illustrates resource (memory) 102; parallel computing platform and application programming interface model array 104; frame level API library (e.g., NVMedia) Image 106; parallel computing platform and application programming interface model 108; and frame level API library (e.g., NVMedia) 110.

In at least one embodiment, resource 102 is memory shared across two or more UMDs. In at least one embodiment, different UMDs have different attributes and allocation constraints. In at least one embodiment, resource 102 is memory that is allocated based on a set of attributes and list of engines which are collected from each of two or more UMDs. In at least one embodiment, input attributes are processed from all sides to identify a specified engine, constraints are applied to such specified engine, and a buffer is allocated.

In at least one embodiment, sets of attributes and lists of engines are obtained for each of 1 . . . N UMDs. In at least one embodiment, once attribute lists are created for each UMD, lists are to be merged to come up with a set of attributes with which allocation is to be made after applying engine constraints on merged-list. In at least one embodiment, both merging and validation are part of a memory allocation API and not exposed directly to UMDs.

In at least one embodiment, memory allocation is made as per validated attribute list and results in a buffer object handle as well as attribute list handle. In at least one embodiment, a buffer object handle as well as attribute list handle are exposed to applications. In at least one embodiment, buffer object handle is to be mapped to respective UMD VA to be used by application. In at least one embodiment, user can directly invoke query API on attribute list handle to derive final attributes with which allocation was made. In at least one embodiment, UMDs can use object handle to query internal attributes (e.g., RM handle, PageKind) for correct mapping. In at least one embodiment, object handles are passed to UMDs as part of UMD exposed Map API.

In at least one embodiment, resource 102 is memory shared between multiple UMDs wherein resource 102 can be mapped to a parallel computing platform and API model (e.g., CUDA) array 104 in parallel computing platform and application programming interface model 108 UMD and frame level API library (e.g., NVMedia) image 106 in frame level API library (e.g., NVMedia) 110 UMD. In at least one embodiment, access to shared resource 102 can be synchronized between UMDs using a synchronization object that is interoperable between two or more UMDs.

In at least one embodiment, a parallel computing platform and API model refers to an API model that can be used by software developers and software engineers to write code that uses a graphics processing unit (GPU) for general purpose processing. In at least one embodiment, a parallel computing platform and API model is a software layer that gives a programmer or developer direct access to a GPU's virtual instruction set and/or parallel computational elements. In at least one embodiment, a general-purpose processing unit (GPGPU) refers to an array of GPUs configured to compute highly-parallel operations according to instructions exposed via parallel computing platform and API model. In at least one embodiment, parallel computing platform and API model (e.g., CUDA) is a software platform that can be used for executing compute kernels, which may, based on context, also be referred to as filters. In at least one embodiment, parallel computing platform and API models can be implemented using CUDA, Open Computing Language (OpenCL), DirectCompute, C++ Accelerated Massive Parallelism (C++ AMP), and more. In at least one embodiment described herein, CUDA is used as a non-limiting illustrative example and other parallel computing platform and API models can be used in place of CUDA.

In at least one embodiment, users of synchronization interoperability are abstracted away from internal platform-specific details for portability. In at least one embodiment, sync-primitives are chosen based at last in part on performance to minimize CPU intervention for maintaining dependencies, queries, etc. In at least one embodiment, most performant sync-primitive is chosen. In at least one embodiment, once a synchronization interoperability object is allocated or reserved, it is reusable across hardware and/or software boundaries. In at least one embodiment, reusability of sync interop object reduces resource footprint, thereby reducing memory usage. In at least one embodiment, multiple UMDs are allowed to wait upon a single sync interop object. In at least one embodiment, synchronization object avoids dynamic memory allocations in critical paths, owing to potential indeterminism of dynamic allocation and possibility of failure (e.g., failure to allocate memory due to system being out of available memory).

Figure 2:
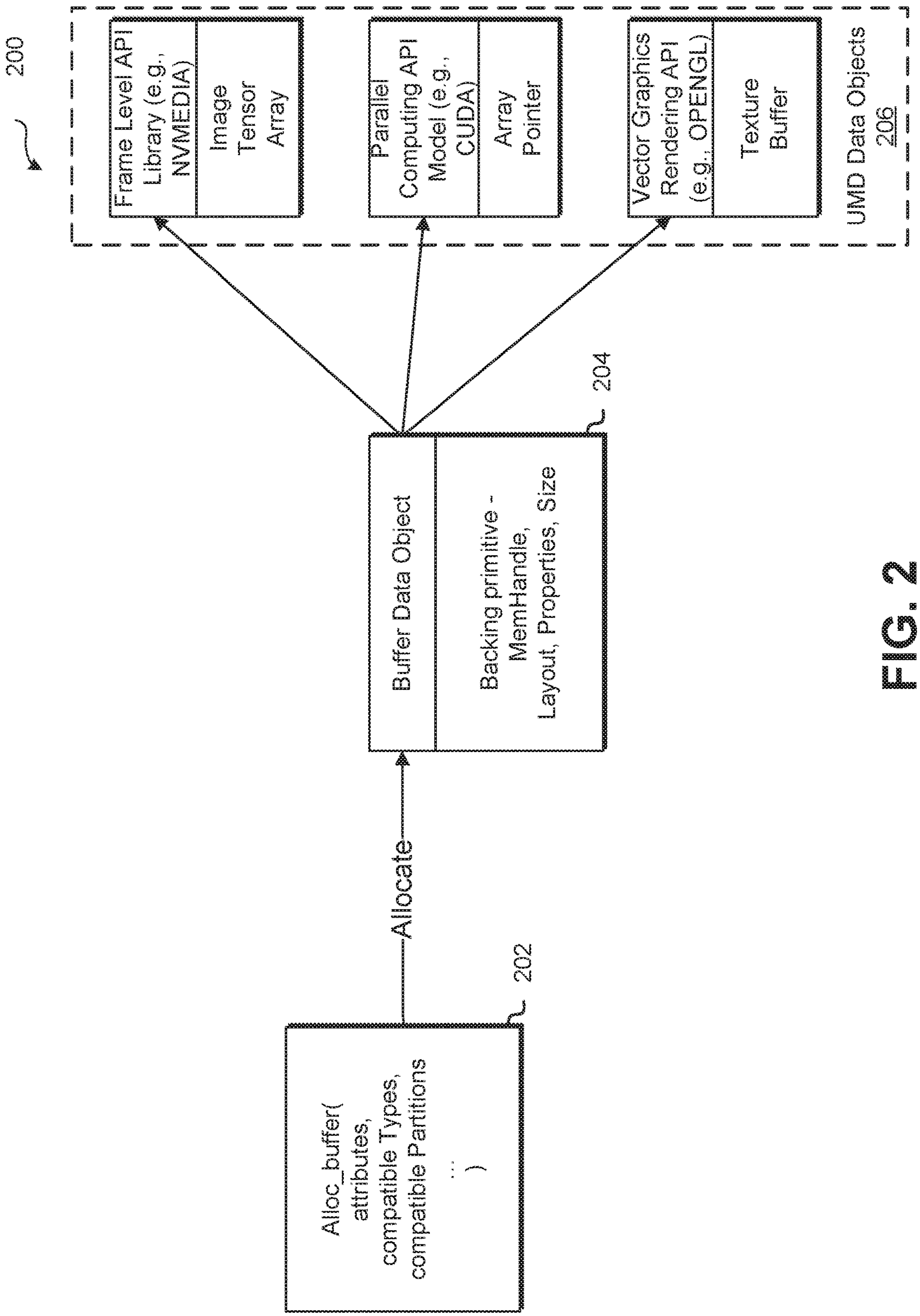
FIG. 2 illustrates a diagram that depicts mapping from buffer data object to driver-specific resources, according to at least one embodiment.

FIG. 2 illustrates a diagram 200 that depicts mapping from buffer data object to driver-specific resources, according to at least one embodiment. In at least one embodiment, diagram 200 includes allocation semantics 202, buffer data object 204, and UMD data objects 206.

In at least one embodiment, diagram 200 depicts allocation semantics 202. In at least one embodiment, allocation semantics 202 comprises attributes, compatible types, compatible partitions, and more. In at least one embodiment, attributes are collected from UMDs which are to share memory which is to be allocated in buffer data object 204. In at least one embodiment, attributes are used at least in part to determine constraints on valid allocations of memory for a buffer data object. In at least one embodiment, compatible types encodes different data types which buffer data object 204 may be interpreted as. In at least one embodiment, a type may be an array, pointer, buffer, texture, tensor, or more. In at least one embodiment, compatible partitions indicates types of partitions which are appropriate for allocation. In at least one embodiment, for cross-partition operation, allocation should be made using carve-out memory (e.g., memory shared between VMs).

In at least one embodiment, allocation semantics 202 are used to determine a manner in which to allocate buffer data object 204. In at least one embodiment, buffer data object 204 is exposed via a handle which can be interpreted by different UMDs as different UMD-specific data objects. In at least one embodiment, buffer data object 204 encodes additional properties about underlying primitive used for memory allocation including but not limited to memory handles, layouts, properties, sizes, and more. In at least one embodiment, allocation semantics and/or parameters are exposed by an attribute handle which can be queried by UMDs using a buffer API.

In at least one embodiment, a handle to a buffer data object 204 can be interpreted by UMDs to obtain UMD data objects 206. In at least one embodiment, a SciBuf buffer data object can be interpreted as a parallel computing platform and application programming interface model array or pointer by a first UMD and a frame level API library (e.g., NVMEDIA) image or tensor by a second UMD. In at least one embodiment, UMD data objects are to be used by at least two heterogeneous processing cores. In at least one embodiment, same underlying memory allocation of a buffer data object 204 is shared by at least two heterogeneous processing cores without requiring additional memory copies from one heterogeneous processing core to another.

Figure 3:
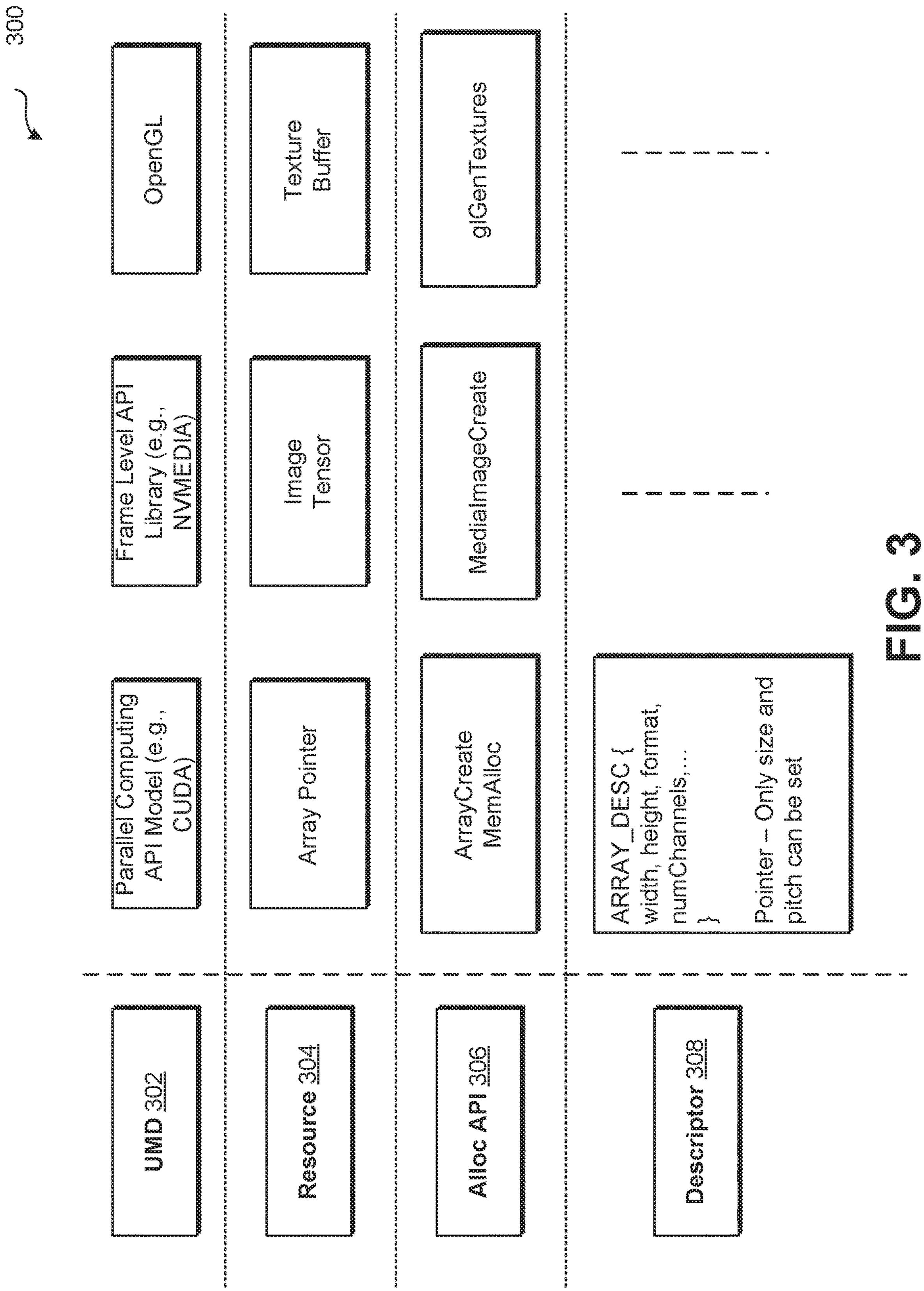
FIG. 3 illustrates a diagram depicting user mode drivers (UMDs) and their allocation semantics, according to at least one embodiment.

FIG. 3 illustrates a diagram 300 depicting UMDs and their allocation semantics, according to at least one embodiment. In at least one embodiment, a buffer supports an allocation of memory to support one or more UMDs illustrated in FIG. 3. In at least one embodiment, diagram 300 includes a set of UMDs 302. In at least one embodiment, memory allocated to a buffer data object is to be shared across multiple UMDs which may include one or more of parallel computing platform and application programming interface model, frame level API library (e.g., NVMEDIA), and OpenGL. In at least one embodiment, an allocated buffer data object can be mapped to different types of resources 304. In at least one embodiment, a parallel computing platform and application programming interface model array or parallel computing platform and application programming interface model point, a frame level API library (e.g., NVMEDIA) image or tensor, and an OpenGL texture or buffer are all supported by same underlying allocated buffer data object. In at least one embodiment, a buffer data object can map to a parallel computing platform and application programming interface model array or parallel computing platform and application programming interface model point, a frame level API library (e.g., NVMEDIA) image or tensor, and an cross-language, cross-platform application programming interface for rendering 2D and 3D vector graphics (e.g., OpenGL) texture or buffer. In at least one embodiment, UMDs may have different allocation APIs 306. In at least one embodiment, memory for a parallel computing platform and application programming interface model array can be allocated using a ArrayCreate( ) API. In at least one embodiment, memory for a frame level API library (e.g., NVMEDIA) image can be allocated using a frame level API library (e.g., NVMEDIA) ImageCreate( ) API. In at least one embodiment, memory for an OpenGL texture can be allocated using glGetTextures( ) API. In at least one embodiment, different UMDs use different memory allocation APIs that have different attributes and/or different constraints on how underlying memory can be allocated. In at least one embodiment, buffer data object memory is allocated in a manner that satisfies constraints of two or more UMDs. In at least one embodiment, attributes and engines from two or more UMDs are collected prior to allocation of buffer data object and merged to determine a manner in which to allocate memory. In at least one embodiment, different UMDs may have different descriptors 308. In at least one embodiment, SciBuf exposes query API to retrieve parameters with which final allocation was made. In at least one embodiment, descriptors are properties which can be retrieved via API calls. In at least one embodiment, attributes of a buffer data object can be queried. In at least one embodiment, parallel computing platform and application programming interface model array descriptors which can be queried include: width, height, format, number of channels, and any combination thereof.

Figure 4:
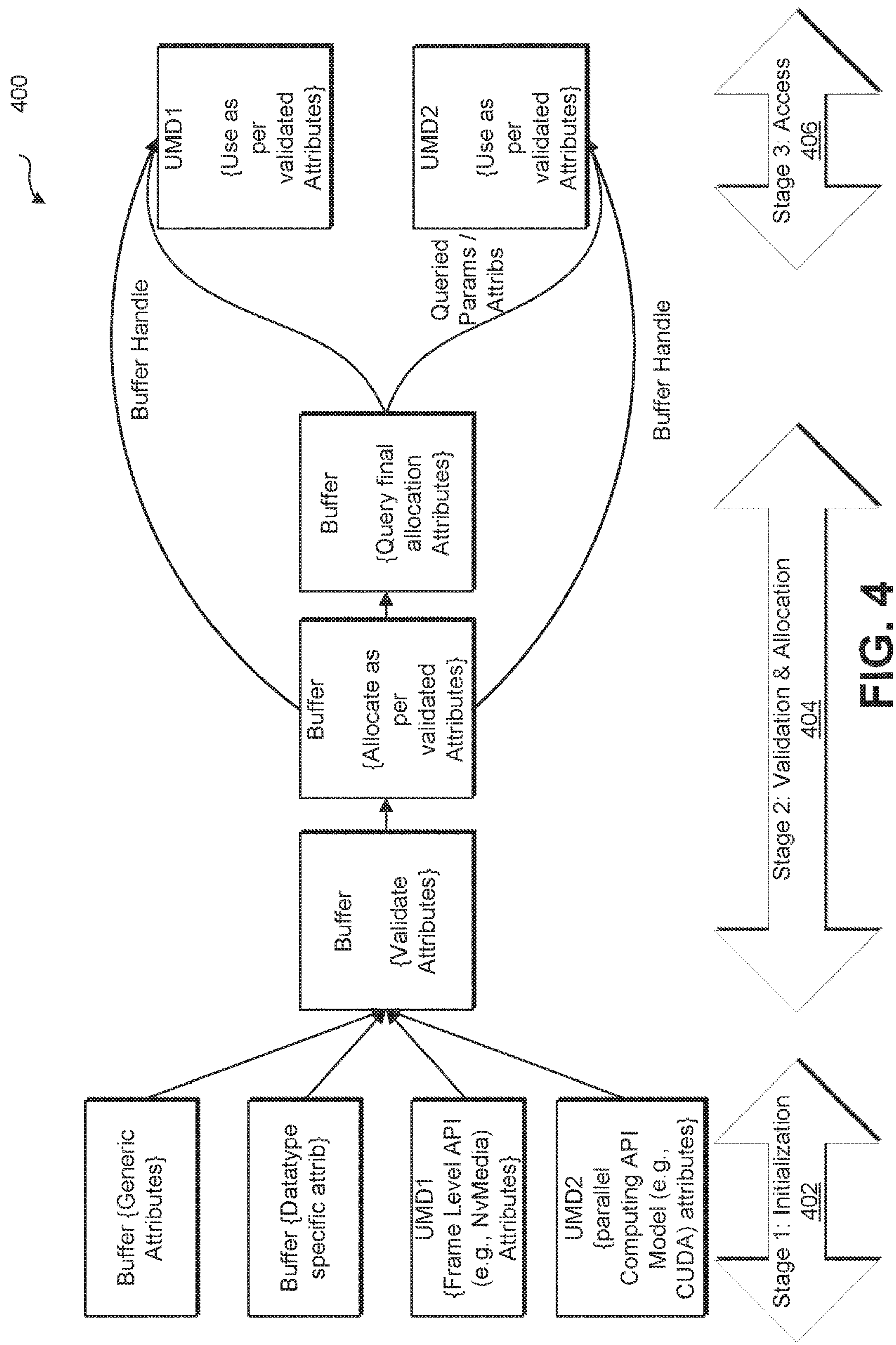
FIG. 4 illustrates a diagram depicting a buffer workflow, according to at least one embodiment.

FIG. 4 illustrates a diagram 400 depicting a buffer workflow, according to at least one embodiment. In at least one embodiment, diagram 400 includes: a first stage 402 for initialization; a second stage 404 for validating and allocating memory; and a third stage 406 for use by UMDs. In at least one embodiment, SciBuf is a type of buffer or memory data object to be shared across two or more UMDs.

In at least one embodiment, diagram 400 includes three stages—a first stage 402 to set attributes and parameters, a second stage to validate and allocate memory, and a third stage to map into UMD space. In at least one embodiment, at a first stage, applications provide inputs. In at least one embodiment, inputs include dimensions of allocations, UMD specific attributes, additional allocation properties (e.g., device, engines, VM), and combinations thereof. In at least one embodiment, corresponding APIs are either exposed directly by SciBuf module or individual UMDs. In at least one embodiment, for parallel computing platform and application programming interface model, applications pass all attributes directly to SciBuf and parallel computing platform and application programming interface model does not expose a public API for same.

In at least one embodiment, a second stage 404 lies entirely with SciBuf, which is responsible for validating if attributes set by different UMDs and generic attributes can result in a valid allocation. In at least one embodiment, if one UMD requests for an allocation on iGPU (Sysmem) and another on dGPU (Vidmem), it will result in a validation error. In at least one embodiment, on success, physical memory is allocated by SciBuf using RM (NvRM) internal interfaces like nvmap APIs and an opaque handle for same is directly exposed to applications. In at least one embodiment, memory domain is selected based on participating UMD specifications in respective attribute lists. In at least one embodiment, SciBuf exposes query API to retrieve parameters with which final allocation was made. In at least one embodiment, parameters which can be retrieved via API calls include: computed pitch; offset; size; and any combination thereof. In at least one embodiment, APIs to retrieve allocation parameters are used to map an allocated buffer into UMD specific objects (VA). Once allocated memory can be imported into VAs in Stage 3. In at least one embodiment, SciBuf exposes a Destroy API to free allocations. In at least one embodiment, for destroying VA mappings, applications can invoke corresponding UMD specific Destroy/Free APIs.

In at least one embodiment, a third stage 406 lies with UMDs. In at least one embodiment, a buffer on its own cannot be used directly by any application. In at least one embodiment, buffer can be imported into respective UMD address spaces. In at least one embodiment, for parallel computing platform and application programming interface model, buffer memory can be imported using parallel computing platform and application programming interface model external memory interface. A buffer may refer to a shared buffer or unified buffer.

In at least one embodiment, for teardown, VA mappings as well as actual allocation (SciBuf) may be freed. In at least one embodiment, for freeing UMD VA, UMD specific Destroy APIs can be called by applications. In at least one embodiment, SciBuf exposes API to free backing physical memory. In at least one embodiment, order of free APIs is irrelevant as they result in decrement of refcount and actual memory is freed when refcount becomes zero.

Figure 5:
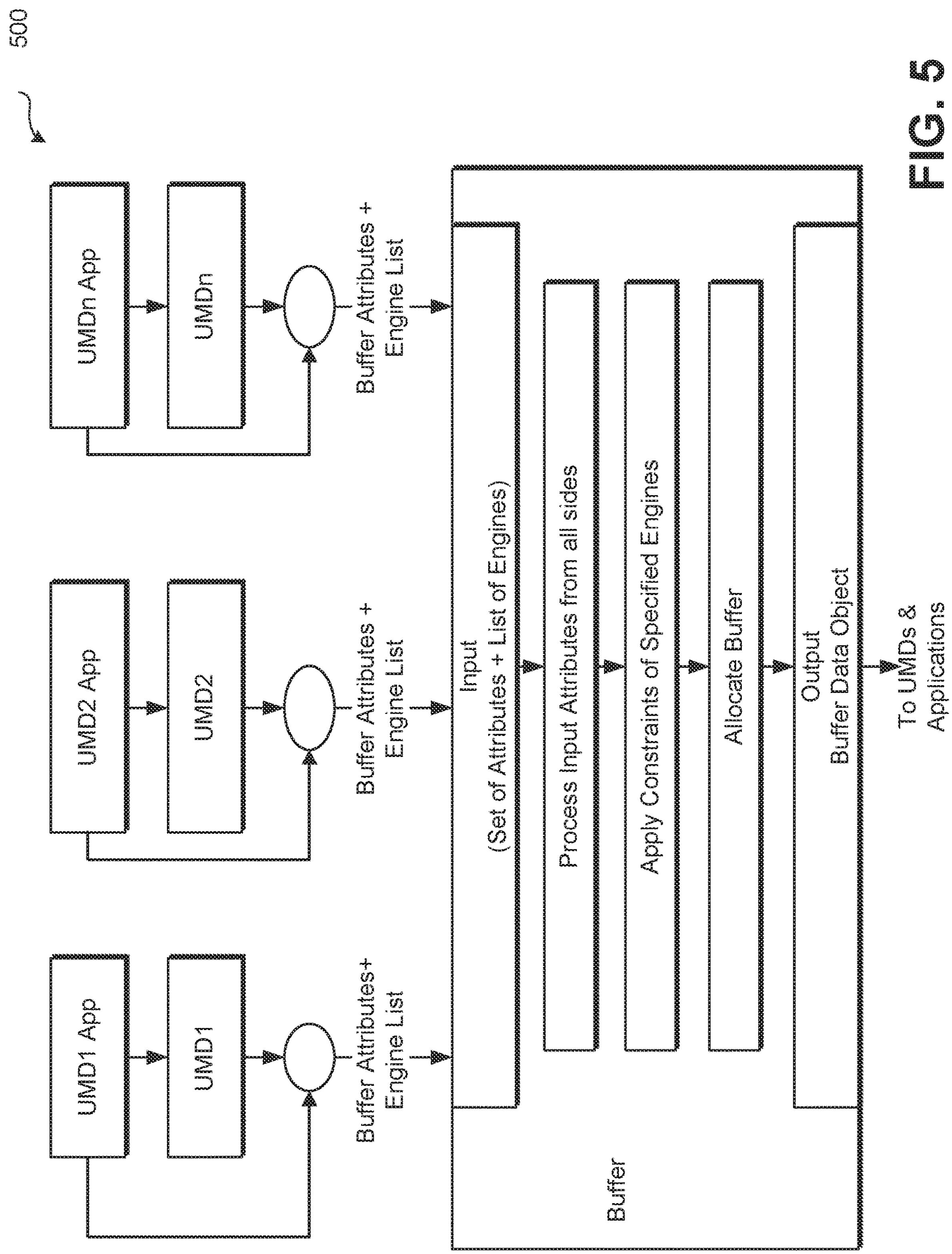
FIG. 5 illustrates a diagram depicting buffer attribute validation, according to at least one embodiment.

FIG. 5 illustrates a diagram 500 depicting buffer attribute validation, according to at least one embodiment. In at least one embodiment, SciBuf is be a central allocator, whose APIs are exposed to customer applications as well as User Mode Drivers (UMDs). In at least one embodiment, customer applications can specify constraints of all UMDs upfront (e.g., before actual allocation happens). In at least one embodiment, SciBuf ensures allocations can be successful if all constraints can be satisfied, otherwise allocation fails. In at least one embodiment, an allocated buffer can be later on shared with all UMDs whose constraints were specified beforehand. In at least one embodiment, SciBuf supports a single allocation with multiple sharers.

In at least one embodiment, SciBuf receives, as an input, sets of attributes and lists of engines. In at least one embodiment, for each of 1 . . . N UMDs, SciBuf receives SciBuf attributes and engine lists. In at least one embodiment, one step in SciBuf allocation is creation of attribute list. In at least one embodiment, AttributeList is an opaque handle externally, internally it is represented as a data structure including a group of attributes with (key, value) pairs. In at least one embodiment, a set of attributes to be set for an SciBuf objects gets decided by its datatype as specified by an application. In at least one embodiment, an application can either choose to use SciBuf public API to create an attribute list or use ones as exposed by UMDs. In at least one embodiment, parallel computing platform and application programming interface model exposes API to set device properties and cache-related information and for other properties like dimensions, application can use SciBuf API directly. In at least one embodiment, UMDs like frame level API library (e.g., NVMedia) expose APIs to set both device and datatype related attributes.

In at least one embodiment, frame level API library (e.g., NVMedia) and parallel computing platform and application programming interface model are APIs at different levels, former being a fixed function driven API recognizes higher level constructs like Image/Tensor, parallel computing platform and application programming interface model, on other hand, being a general purpose driver need not recognize these higher level constructs and accepts datatypes recognized directly by HW or GPU.

In at least one embodiment, once attribute lists are created for each UMD, lists are to be merged to come up with a set of attributes with which allocation is to be made after applying engine constraints on merged-list. In at least one embodiment, both merging and validation are part of Allocation API exposed and not exposed directly to application. In at least one embodiment, for a cross-process case, allocator process is to invoke Allocate API with attributeLists from all participating processes to come up with an allocation usable across all these processes. In at least one embodiment, medium of communication (IPC) for sharing attribute is left with application.

In at least one embodiment, allocation is made as per validated attribute list and results in a buffer object handle as well as attribute list handle. In at least one embodiment, a buffer object handle as well as attribute list handle are exposed to applications. In at least one embodiment, buffer object handle is to be mapped to respective UMD VA to be used by application. In at least one embodiment, user can directly invoke query API on attribute list handle to derive final attributes with which allocation was made. In at least one embodiment, UMDs can use object handle to query internal attributes (RM handle, PageKind, etc.) from SciBuf for correct mapping. In at least one embodiment, object handles are passed to UMDs as part of UMD exposed Map API. In at least one embodiment, for cross-process case, SciBuf allows handle duplication for calling process.

In at least one embodiment, deallocation for a multi-process case happens in multiple steps. In at least one embodiment, UMD references created by current process are to be removed. In at least one embodiment, application are to explicitly invoke SciBuf Free API to unmap object from current process. In at least one embodiment, SciBufFree call is to be invoked by all processes. In at least one embodiment, actual object is to be freed when all process have removed UMD references and local CPU mappings.

Figure 6:
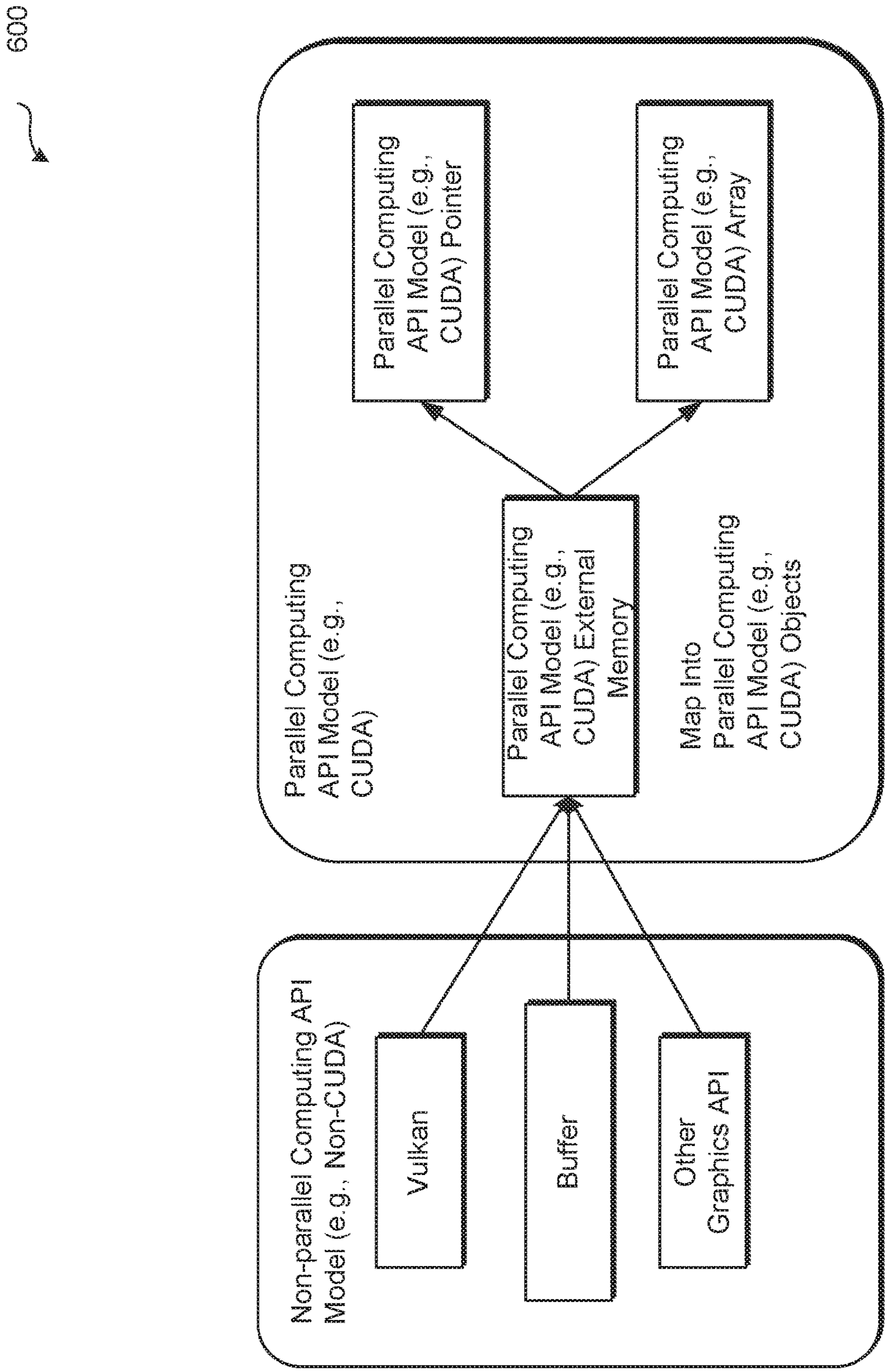
FIG. 6 illustrates a diagram depicting importing buffer in parallel computing platform and application programming interface (API) model (e.g., CUDA) external memory interface, according to at least one embodiment.

FIG. 6 illustrates a diagram 600 depicting importing buffer in parallel computing platform and application programming interface model external memory interface, according to at least one embodiment. In at least one embodiment, Vulkan (or other Graphics API like DX) allocated memory can be imported in parallel computing platform and application programming interface model using APIs provided with parallel computing platform and application programming interface model external memory interface. Once imported, this memory can be mapped in parallel computing platform and application programming interface model specific objects like parallel computing platform and application programming interface model Pointers or parallel computing platform and application programming interface model Arrays. In at least one embodiment, SciBuf allocated memory can be imported into parallel computing platform and application programming interface model using APIs provided with parallel computing platform and application programming interface model external memory interface. In at least one embodiment, import of SciBuf memory uses parallel computing platform and application programming interface model external memory interface with no/minimal changes to existing interfaces. In at least one embodiment, pitch linear and blocklinear memory import is supported. In at least one embodiment, import is allowed across process and VM boundaries. In at least one embodiment, SciBuf allocated in one process/VM can be imported by parallel computing platform and application programming interface model application residing in another process/VM. In at least one embodiment, at time of allocation, SciBuf is aware of its intended usage in parallel computing platform and application programming interface model and device of allocation to impose GPU specific engine restrictions. In at least one embodiment, if applications try to map an already allocated SciBuf into parallel computing platform and application programming interface model domain without setting parallel computing platform and application programming interface model specific attributes, mappings are not guaranteed to succeed. In at least one embodiment, parallel computing platform and application programming interface model Driver imposed constraints (if any) are to be applied before allocation is made. In at least one embodiment, behavior of various parallel computing platform and application programming interface model expose memory allocation APIs (e.g., MemAlloc, MemHostAlloc, ArrayCreate) are achievable with SciBuf_parallel computing platform and application programming interface model interfaces.

In at least one embodiment, SciBuf allows simultaneous access of shared memory from one or more UMDs and mutually exclusive access to shared buffer is not possible. In at least one embodiment, external semaphore wait/signal APIs can designate hand-off points for parallel computing platform and application programming interface model access to shared buffer and application can invoke external memory APIs to get consistent data.

In at least one embodiment, parallel computing platform and application programming interface model exposes APIs for following functionalities: import an already-allocated SciBuf into parallel computing platform and application programming interface model and delete an imported parallel computing platform and application programming interface model object. In at least one embodiment, externalMemory data type encapsulates memory allocations as a pointer to an opaque struct. In at least one embodiment, name is agnostic and can be extended for non-graphics interops such as SciBuf. In at least one embodiment, externally allocated memory can be imported into parallel computing platform and application programming interface model by providing an appropriate handle. In at least one embodiment, SciBuf handle is identified as _EXTERNAL_MEMORY_HANDLE_TYPE_SCIBUF.

In at least one embodiment, a SciBuf handle is associated with an opaque SciBuf object which is returned in a call to SciBufAllocate( ). In at least one embodiment, a SciBuf handle holds a reference to underlying SciBuf object which was allocated as per attributes set from one or more drivers—which can include parallel computing platform and application programming interface model. In at least one embodiment, allocation adheres to allocation constraints and dimension requirements of all drivers whose respective SetScibufAttrib( ) API was invoked. In at least one embodiment, SciBuf can directly accept parallel computing platform and application programming interface model specific parameter like GPU id. In at least one embodiment, External Memory HandleTypes and Descriptor support SciBuf in following manner:

| Driver Data Structure | Change Details |
|---|---|
| external Memory HandleType | Driver:<br>typedef enum externalMemoryHandleType__enum {<br>__EXTERNAL__MEMORY__HANDLE__TYPE__OPAQUE__FD = 1,<br>... .<br>__EXTERNAL__MEMORY__HANDLE__TYPE__SCIBUF = 8,<br>} externalMemoryHandleType; |
| __EXTERNAL__MEMORY__HANDLE__DESC | Driver:<br>typedef struct__EXTERNAL__MEMORY__HANDLE__DESC__st {<br>externalMemoryHandleType type;<br>union {<br>int fd;<br>struct { ...<br>} win32;<br>const void* SciBufObject;<br>} handle;<br>unsigned long long size;<br>unsigned int flags;<br>} __EXTERNAL__MEMORY__HANDLE__DESC; |

| Runtime Data Structure | Change Details |
|---|---|
| ExternalMemoryHandleType__enum | Runtime:<br>typedef enum ExternalMemoryHandleType__enum {<br>ExternalMemoryHandleTypeOpaqueFd = 1,<br>... .<br>ExternalMemoryHandleTypeSciBuf = 8,<br>} ExternalMemoryHandleType; |

-continued

| Runtime Data Structure | Change Details |
|---|---|
| ExternalMemoryHandleDesc | Runtime:<br>typedef struct ExternalMemoryHandleDesc_st {<br>ExternalMemoryHandleType type; union {<br>int fd;<br>struct { ... .<br>} win32;<br>const void* SciBufObject;<br>} handle; unsigned long long size;<br>unsigned int flags;<br>} ExternalMemoryHandleDesc; |

In at least one embodiment, an import API imports an externally-allocated memory object and returns a handle to it. In at least one embodiment, properties of a handle are defined in _EXTERNAL_MEMORY_HANDLE_DESC. In at least one embodiment, if handle type is _EXTERNAL_MEMORY_HANDLE_TYPE_SCIBUF, _EXTERNAL_MEMORY_HANDLE_DESC::handle::SciBuf-handle::resource is to be NON NULL and represent a valid SciBuf object. In at least one embodiment, ownership of a SciBuf object is not transferred to parallel computing platform and application programming interface model driver after import operation and remains shared with other drivers who import that SciBuf object in their own address space. In at least one embodiment, proper synchronization and cache operations may be performed by application to avoid overwrites, stale data and undefined behaviors.

In at least one embodiment, a device pointer or a parallel computing platform and application programming interface model array can be obtained from an external memory allocation by specifying offset and size within previously imported external memory handle. In at least one embodiment, offset and size are to be aligned appropriately and can be queried directly from SciBuf object using NvMem APIs. In at least one embodiment, specifying any other offset and size results in undefined behavior. In at least one embodiment, mapping two buffers whose ranges overlap in external allocation is undefined behavior as they may result in different virtual addresses. In at least one embodiment, for mapping to a parallel computing platform and application programming interface model array, parallel computing platform and application programming interface model Array format is to be specified—mipmapped arrays of level greater than 1 may not be supported with SciBuf handle. In at least one embodiment, once mapped as a parallel computing platform and application programming interface model object, applications can use pointers/arrays as regular ones and perform parallel computing platform and application programming interface model operations like memcpy or memset and pass to parallel computing platform and application programming interface model kernels.

In at least one embodiment, DestroyExternalMemory( ) API destroys a specified external memory object. In at least one embodiment, existing buffers and parallel computing platform and application programming interface model mipmapped arrays mapped onto a destroyed object are to no longer be used and are to be explicitly freed using MemFree and ArrayDestroy, respectively. In at least one embodiment, once external memory is destroyed, no more mappings should be possible. In at least one embodiment, an application may invoke SciBuf API to free SciBuf object once external memory object is destroyed.

Figure 7:
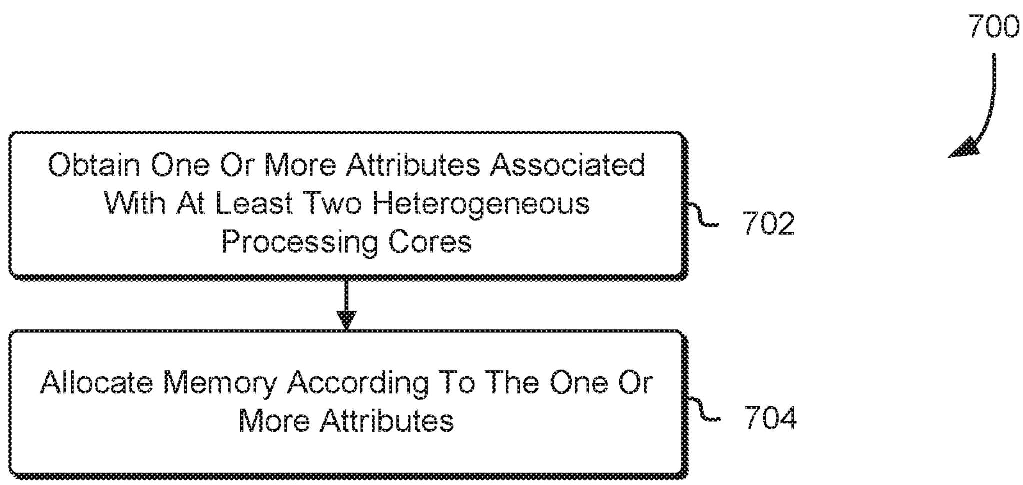
FIG. 7 shows an illustrative example of a process to allocate memory, according to at least one embodiment.
Figure 8:
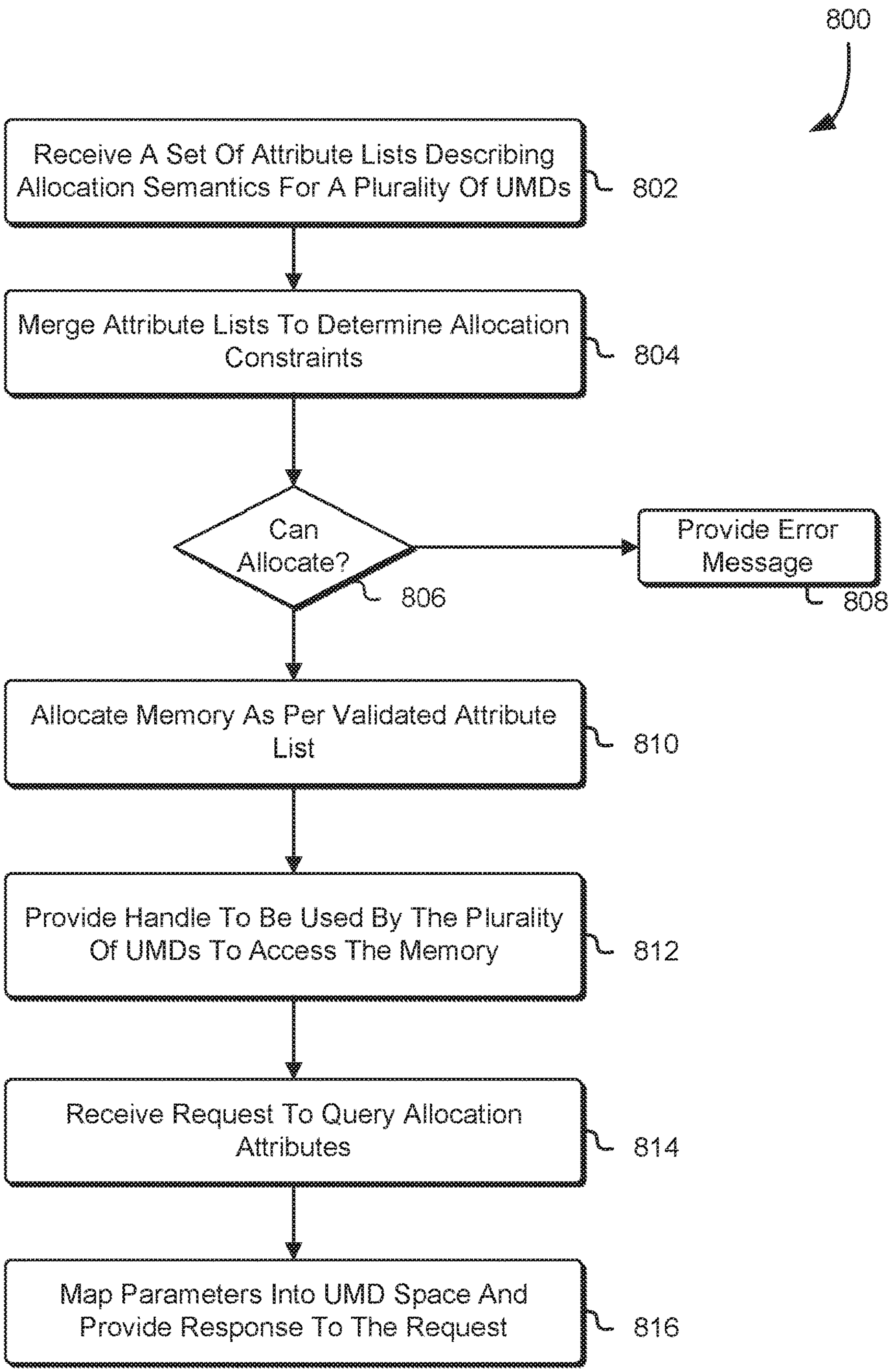
FIG. 8 shows an illustrative example of a process to allocate memory, according to at least one embodiment.

FIG. 7 shows an illustrative example of a process 700 to allocate memory to at least two heterogeneous processing cores in response to performing one or more instructions associated with one or more application programming interfaces (APIs) based, at least in part, on one or more attributes associated with said at least two heterogeneous processing cores, in accordance with at least one embodiment. In at least one embodiment, some or all of process 700 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 700 is performed at least in part on a computer system such as those described elsewhere in this disclosure. In at least one embodiment, techniques described in connection with FIG. 8 are utilized in connection with process 700.

In at least one embodiment, process 700 is implemented by a computer system storing executable instructions that, as a result of execution by one or more processors, obtain 702 one or more attributes associated with at least two heterogeneous processing cores. In at least one embodiment, a heterogeneous processing core described in connection with process 700 is in accordance with those discussed in FIG. 35. In at least one embodiment, processor cores are homogenous cores executing a common instruction set architecture. In at least one embodiment, processor cores are heterogeneous in terms of instruction set architecture (ISA), where one or more of processor cores execute a common instruction set, while one or more other cores of processor cores executes a subset of a common instruction set or a different instruction set. In at least one embodiment, processor cores are heterogeneous in terms of microarchitecture, where one or more cores having a relatively higher power consumption couple with one or more power cores having a lower power consumption. In at least one embodiment, processors to implement process 700 can be implemented on one or more chips or as an SoC integrated circuit.

In at least one embodiment, at least two heterogeneous processing cores include two or more UMDs. In at least one embodiment, at least two heterogeneous processing cores comprises a central processing unit (CPU) and a graphics processing unit (GPU). In at least one embodiment, at least two heterogeneous processing cores comprises a central processing unit (CPU) and a graphics processing unit (GPU). In at least one embodiment, at least two heterogeneous processing cores comprises different CPUs supporting different instruction set architectures (e.g., ARM and x86). In at least one embodiment, at least two heterogeneous processing cores comprises an accelerator (e.g., programmable vision accelerator). In at least one embodiment, a system obtains one or more attributes associated with at least two at least two heterogeneous processing cores as lists of attributes, wherein each list of attributes indicates a manner in which a respective UMD plans to utilize memory being allocated. In at least one embodiment, attributes indicate a manner in which a UMD will interpret allocated memory. In at least one embodiment, attributes indicate a type of memory to allocate, such as whether memory is to be allocated using system memory (e.g., DRAM) or video memory (e.g., of a discrete GPU). In at least one embodiment, UMDs specify how memory is to be interpreted according to an enumerated list of attribute types such as in following manner:

```
typedef enum attrkeyType{
    SciBufAttrKeyType_General,
    SciBufAttrKeyType_RawBuffer,
    SciBufAttrKeyType_Image,
    SciBufAttrKeyType_Tensor,
    SciBufAttrKeyType_ImagePyramid,
    SciBufAttrKeyType_Array,
    SciBufAttrKeyType_Max,
}SciBufAttrKeyType;
```

In at least one embodiment, process 700 is implemented by a computer system storing executable instructions that, as a result of execution by one or more processors, allocate 704 memory according to said one or more attributes. In at least one embodiment, one or more attributes of at least two heterogeneous processing cores determine a set of constraints on how memory to be shared is allocated. In at least one embodiment, contradicting sets of constraints result in an allocation failure. In at least one embodiment a first attribute indicates memory is to be allocated using SYSMEM and a second attribute indicates memory is to be allocated using VIDMEM, thereby resulting in contradictory constraints that result in an error. In at least one embodiment, memory is allocated in a manner that to be interpreted as a first data object by a first heterogeneous processing core and to be interpreted as a second object by a second data object by a second heterogeneous processing core. In at least one embodiment, memory is allocated and returned as a handle to an SciBuf data object which can be interpreted by a first UMD as a parallel computing platform and application programming interface model object (e.g., parallel computing platform and application programming interface model pointer or parallel computing platform and application programming interface model array) and by a second UMD as an OpenGL texture. In at least one embodiment, access to allocated memory by multiple UMDs can be coordinated using techniques described elsewhere in this disclosure, such as those discussed in connection with FIGS. 14 and 15. In at least one embodiment, a UMD calls a memory allocation API that returns access to shared memory via a handle which can be interpreted by different UMDs as different higher-level data objects.

FIG. 8 shows an illustrative example of a process 800 to allocate memory to at least two heterogeneous processing cores in response to performing one or more instructions associated with one or more application programming interfaces (APIs) based, at least in part, on one or more attributes associated with said at least two heterogeneous processing cores, in accordance with at least one embodiment. In at least one embodiment, some or all of process 800 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 800 is performed at least in part on a computer system such as those described elsewhere in this disclosure. In at least one embodiment, techniques described in connection with FIG. 7 are utilized in connection with process 800.

In at least one embodiment, process 800 is implemented by a computer system storing executable instructions that, as a result of execution by one or more processors, receive a set of attribute lists describing allocation semantics for a plurality of User Mode Drivers (UMDs). In at least one embodiment, a central allocator receives a set of attributes describing allocation semantics for a plurality of UMDs is received as one or more input parameters of an API. In at least one embodiment, applications running on different UMDs can specify a list of attributes prior to allocation of memory that encodes one or more constrains on memory allocation. In at least one embodiment, lists of attributes are merged and used to determine a set of constraints to be satisfied—if no allocation is able to satisfy all constraints on an allocation, such an allocation may fail. In at least one embodiment, an allocated buffer (e.g., memory) can shared with all UMDs whose constraints were specified beforehand. In at least one embodiment, memory allocation supports a single allocation with multiple sharers. In at least one embodiment, memory allocated (e.g., in process 800) is shared memory that can be utilized by multiple UMDs. In at least one embodiment, memory allocated (e.g., in process 800) is unified memory that can be utilized by multiple UMDs.

In at least one embodiment, a system allocating cross-UMD memory receives, as an input to an API, sets of attributes and lists of engines. In at least one embodiment, a system receives attributes and engine lists for each UMD that is to use shared memory. In at least one embodiment, one step in memory allocation is creation of attribute list. In at least one embodiment, AttributeList is an opaque handle externally, internally it is represented as a data structure including a group of attributes with (key, value) pairs. In at least one embodiment, a set of attributes to be set for a buffer gets decided by its datatype as specified by an application. In at least one embodiment, an application can either choose to use a buffer public API to create an attribute list or use ones as exposed by UMDs. In at least one embodiment, parallel computing platform and application programming interface model exposes API to set device properties and cache-related information and for other properties like dimensions, application can use buffer APIs directly. In at least one embodiment, UMDs like frame level API library (e.g., NVMedia) expose APIs to set both device and datatype related attributes.

In at least one embodiment, frame level API library (e.g., NVMedia) and parallel computing platform and application programming interface model are APIs at different levels, former being a fixed function driven API recognizing higher level constructs like Image/Tensor, parallel computing platform and application programming interface model, on other hand, being a general purpose driver which need not recognize higher level constructs and accepts datatypes recognized directly by hardware (e.g., GPU) In at least one embodiment, once attribute lists are created for each UMD, a system performing process 800 includes execution instructions to merge 804 attribute lists to determine allocation constraints. In at least one embodiment, lists are to be merged to determine a set of attributes with which allocation is to be made after applying engine constraints on merged-list. In at least one embodiment, both merging and validation are part of Allocation API exposed and not exposed directly to application. In at least one embodiment, for a cross-process case, allocator process is to invoke Allocate API with attributeLists from all participating processes to come up with an allocation usable across all these processes. In at least one embodiment, medium of communication (IPC) for sharing attribute is left with application.

In at least one embodiment, a system performing process 800 determines whether 806 it is possible to allocate memory according to allocation constraints determined from merged attribute lists. In at least one embodiment, a system will provide 808 an error message if constraints cannot be satisfied. In at least one embodiment, an allocation constraint that cannot be allocated may include contradictory requirements for: type of memory to use for memory allocation (e.g., SYSMEM vs. VIDMEM); size; memory alignment; and more. An error message, in at least one embodiment, is provided as an error code returned by an API.

In at least one embodiment, if memory can be allocated, a system is to allocate 810 memory as per validated attribute list and results in a buffer object handle as well as attribute list handle. In at least one embodiment, a system is to provide 812 a buffer object handle as well as attribute list handle as output parameters of an API. In at least one embodiment, buffer object handle is to be mapped to respective UMD VA to be used by application. In at least one embodiment, a system (e.g., UMD) is to receive 814 a request to query allocation attributes. In at least one embodiment, user can directly invoke query API on attribute list handle to derive final attributes with which allocation was made. In at least one embodiment, UMDs can use object handle to query internal attributes (e.g., RM handle, PageKind) from SciBuf for correct mapping. In at least one embodiment, system is to map 816 parameters into UMD space and provide response to request according to mappings. In at least one embodiment, object handles are passed to UMDs as part of UMD exposed Map API. In at least one embodiment, for cross-process case, buffer allows handle duplication for calling process.

In at least one embodiment, deallocation for a multi-process case happens in multiple steps. In at least one embodiment, UMD references created by a current process attempting deallocation are to be removed. In at least one embodiment, application are to explicitly invoke a buffer memory deallocation API to unmap object from current process. In at least one embodiment, SciBufFree call is to be invoked by all processes. In at least one embodiment, actual object is to be freed when all process have removed UMD references and local CPU mappings.

Figure 9:
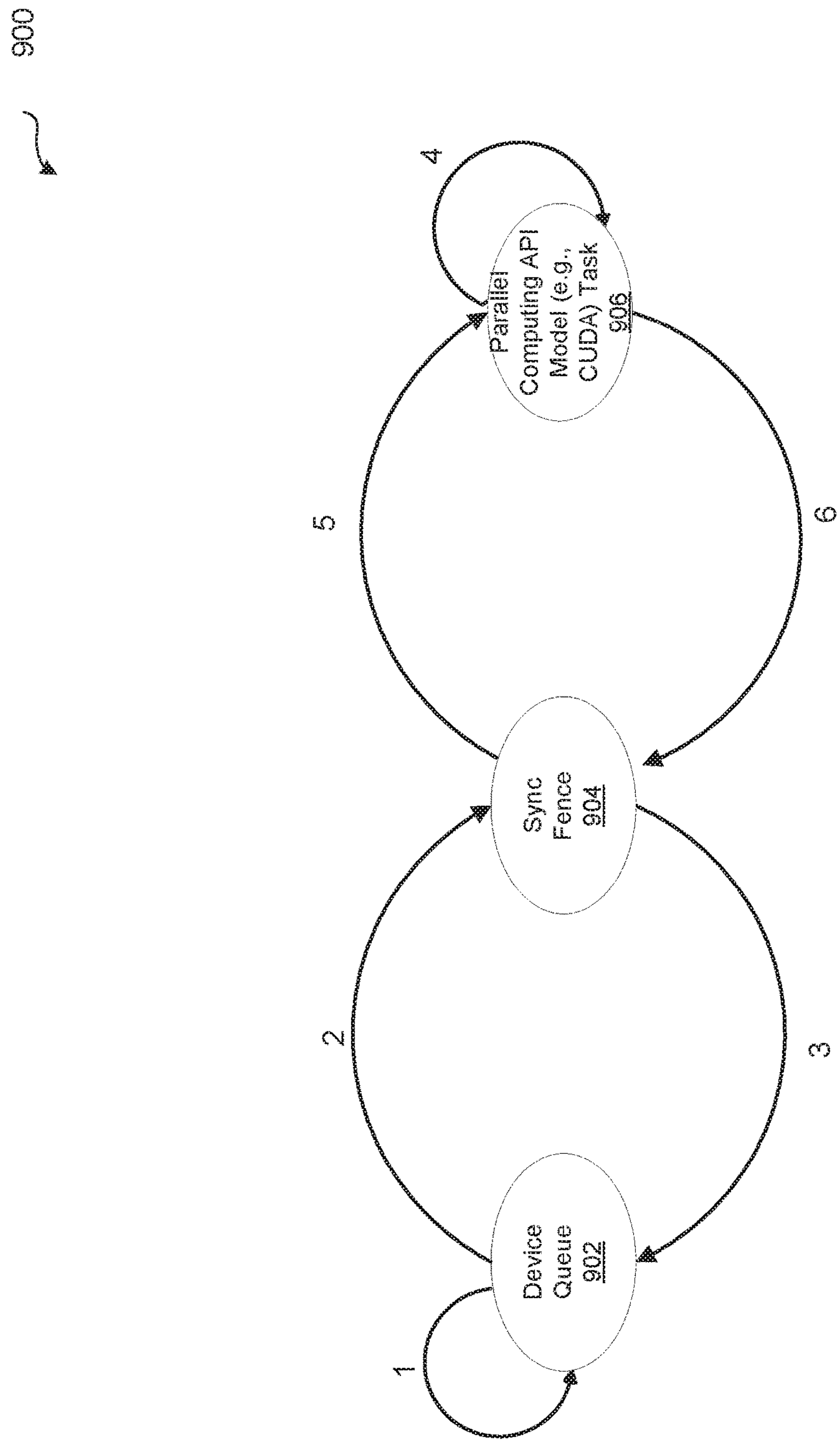
FIG. 9 illustrates a diagram describing interactions between various objects in an interoperability framework, in accordance with at least one embodiment.

FIG. 9 illustrates a diagram 900 describing interactions between various objects in an interoperability framework, in accordance with at least one embodiment. In at least one embodiment, diagram 900 summarizes interactions between various objects including but not limited to: device queue 902; SciSyncFence 904; and parallel computing platform and application programming interface model stream 906.

In at least one embodiment, work is submitted to device queue 902. In at least one embodiment, device queue 902 is a non-parallel computing platform and application programming interface model queue. In at least one embodiment, an async-signal is queued and SciSyncFence 904 is generated from device queue 902. In at least one embodiment, device queue 902 is made to wait for generated SciSyncFence 904. In at least one embodiment, a parallel computing platform and application programming interface model task is a kernel on a parallel computing platform and application programming interface model stream. In at least one embodiment, an already created SciSync is imported as an external semaphore into parallel computing platform and application programming interface model. In at least one embodiment, a signal is issued by parallel computing platform and application programming interface model API WaitExternalSemaphoresAsync. In at least one embodiment, SciSyncFence passed in step 5 illustrated in FIG. 9 was initialized from another UMD and parallel computing platform and application programming interface model will initialize it.

In at least one embodiment, a SciSync object is represented by SciSyncObj which is opaque to application. In order to import an already created SciSync as an external semaphore into parallel computing platform and application programming interface model, a semaphore descriptors has a reference to a SciSyncObj pointer. In at least one embodiment SciSyncObj pointer is implemented based at least in part on:

```
// Driver
typedef struct __EXTERNAL__SEMAPHORE__HANDLE__DESC__st {
    externalSemaphoreHandleType type;
    union {
        int fd;
        struct {
            void *handle;
            const void *name;
        } win32;
        /**
        * Valid SciSyncObj. Must be non NULL
        */
        const void* SciSyncObj;
    } handle;
    unsigned int flags;
    unsigned int reserved[16];
} __EXTERNAL__SEMAPHORE__HANDLE__DESC;
// Runtime
typedef struct ExternalSemaphoreHandleDesc__st {
    ExternalMemoryHandleType type;
```

-continued

```
    union {
        int fd;
        struct {
            void *handle;
            const void *name;
        } win32;
        const void* SciSyncObj;
    } handle;
    unsigned long long size;
    unsigned int flags;
    unsigned int reserved[16];
} ExternalSemaphoreHandleDesc;
```

In at least one embodiment, an implementation of ImportExternalSemaphore( ) maps resources into parallel computing platform and application programming interface model's address space and those resources can be accessed at time of signal and wait, it will be subsequently freed at time of DestroyExternalSemaphore( ). In at least one embodiment, a resource would be mapping of semaphores associated with SciSync into parallel computing platform and application programming interface model's VA so that acquire and release are done over these address range at time of wait and signal respectively.

In at least one embodiment, parallel computing platform and application programming interface model external semaphores supports importing Vulkan & D3D12 semaphores. In at least one embodiment, to differentiate between already supported types and SciSync, _EXTERNAL_SEMAPHORE_HANDLE_TYPE_SciSync can be implemented as a new type to externalSemaphoreHandleType. In at least one embodiment, this is set by application before importing SciSync via ImportExternalSemaphore( ). In at least one embodiment, a same or similar flag is introduced to runtime version of this structure. In at least one embodiment, externalSemaphoreHandleType is implemented in following manner:

```
typedef enum extemalSemaphoreHandleType__enum {
    __EXTERNAL__SEMAPHORE__HANDLE__TYPE__OPAQUE__FD
    __EXTERNAL__SEMAPHORE__HANDLE__TYPE__OPAQUE__WIN32   = 2,
    __EXTERNAL__SEMAPHORE__HANDLE__TYPE__OPAQUE__WIN32__KMT =   3,
    __EXTERNAL__SEMAPHORE__HANDLE__TYPE__D3D12__FENCE = 4,
    /**
    * An opaque handle to SciSync
    */
    __EXTERNAL__SEMAPHORE__HANDLE__TYPE__SCISYNC = 5
} extemalSemaphoreHandleType;
```

In at least on embodiment, ExternalSemaphoreHandleType is a corresponding runtime structure to externalSemaphoreHandleType. In at least one embodiment, a runtime structure is implemented in following manner:

```
typedef enum ExternalSemaphoreHandleType__enum {
    ExtemalSemaphoreHandleTypeOpaqueFd = 1,
    ExtemalSemaphoreHandleTypeOpaqueWin32 = 2,
    ExtemalSemaphoreHandleTypeOpaqueWin32Kmt = 3,
    ExtemalSemaphoreHandleTypeD3D12Fence = 4,
    ExtemalSemaphoreHandleTypeSciSync = 5
} ExternalSemaphoreHandleType;
```

In at least one embodiment, SciSync is designed so that UMD are to wait on an SciSyncFence sent to them by a signaler and return an SciSyncFence for potential waiters to wait. In at least one embodiment, WaitExternalSemaphores or SignalExternalSemaphores APIs accept SciSyncFence in which such APIs are to act. In at least one embodiment, Applications are free to choose their own allocators that backs n SciSyncFence. In at least one embodiment, a UMD simply accept a pointer. In at least one embodiment, a pointer to SciSyncFence is added as described below:

```
// Driver
typedef struct __EXTERNAL__SEMAPHORE__PARAMS__st {
    struct {
        struct {
        unsigned long long value;
        } fence;
        void *SciSyncFence;
        unsigned int reserved[16-sizeof(void*)];
        } params;
    unsigned int flags;
    unsigned int reserved[16];
} __EXTERNAL__SEMAPHORE__PARAMS;
// Runtime
typedef struct ExternalSemaphoreParams__st {
    struct {
        struct {
            unsigned long long value;
        } fence;
        unsigned int reserved[16-sizeof(void*)];
        void *SciSyncFence;
    } params;
    unsigned int flags;
    unsigned int reserved[16];
} ExternalSemaphoreParams;
```

In at least one embodiment, implementation of wait unpacks a fence and issues appropriate acquire methods into a stream. In at least one embodiment, implementation of signal issues appropriate release methods into a stream and fills SciSyncFence structure appropriately.

In at least one embodiment, wait and signal operations occur in pair for Vulkan semaphores. In at least some embodiments, restrictions such as those of Vulkan semaphores are not applicable to SciSync semaphores wherein it is valid for a single SciSyncFence to be waited upon concurrently or otherwise by multiple entities, wherein there is 1:N relationship between number of signals and number of waits. In at least one embodiment, SciSync ensures that a wait is enqueued after a signal is enqueued, which is supported by fact that API which performs a wait is to accept a SciSynceFence that is generated when a signal is enqueued. In at least one embodiment, it is undefined behavior for applications to enqueue wait on invalid SciSyncFences. In at least one embodiment, multiple waits on same SciSyncFence can be enqueued in different threads and process and on different hardware engines, which may be possible because SciSyncFence can be passed-by-value across software boundaries.

In at least one embodiment, WaitExternalSemaphoresAsync( ) is a supported API. In at least one embodiment, WaitExternalSemaphoresAsync( ) enqueues a wait operation on a set of externally allocated semaphore objects in a specified stream. In at least one embodiment, operations are executed when all prior operations in a stream are completed. In at least one embodiment, semantics of waiting on a semaphore depend on type of object.

In at least one embodiment, applications invoke WaitExternalSemaphoresAsync( ) by passing a pointer to SciSyncFence as a parameter via _EXTERNAL_SEMAPHORE_PARAMS. In at least one embodiment, implementation of this API extracts backing synchronization primitive from SciSyncFence, enqueues semaphore acquire or syncPoint acquire method into parallel computing platform and application programming interface model stream. In at least one embodiment, subsequent tasks submitted to this stream have a dependency to whichever tasks was being tracked by SciSyncFence. In at least one embodiment, API follows existing parallel computing platform and application programming interface model stream semantics.

In at least one embodiment, if SciSyncAttrList used to create SciSyncObj had flags in DeviceGetSciSyncAttrributes set to _SCISYNC_SIGNAL, API returns _ERROR_NOT_SUPPORTED, since application tried to enqueue a signal while it originally intended to only wait. In at least one embodiment, return value from SignalExternalSemaphoresAsync is made in this regard (similar changes can done to runtime API as well):

```
result API WaitExternalSemaphoresAsync(
    const externalSemaphore *extSemArray,
    const __EXTERNAL__SEMAPHORE__PARAMS *paramsArray,
    unsigned int numExtSems, stream stream);
```

In at least one embodiment, if a semaphore object is any one of following types: _EXTERNAL_SEMAPHORE_HANDLE_TYPE_OPAQUE_FD, _EXTERNAL_SEMAPHORE_HANDLE_TYPE_OPAQUE_WIN32, or _EXTERNAL_SEMAPHORE_HANDLE_TYPE_OPAQUE_WIN32_KMT, then waiting on semaphore waits until semaphore reaches a signaled state. In at least one embodiment, a semaphore reaches a singled state and is then reset to an unsigned state. In at least one embodiment, for every signal operation, there is exactly one corresponding wait operation.

In at least one embodiment, if a semaphore object is type _EXTERNAL_SEMAPHORE_HANDLE_TYPE_D3D12_FENCE, then waiting on a semaphore waits until value of semaphore is greater than or equal to _EXTERNAL_SEMAPHORE_PARAMS::params::fence::value.

In at least one embodiment, if a semaphore object is type _EXTERNAL_SEMAPHORE_HANDLE_TYPE_SCISYNC and if SciSyncAttrList used to create SciSyncObj had not set flags in::DeviceGetSciSyncAttrributes to _SCISYNC_WAIT, then API returns _ERROR_NOT_SUPPORTED.

In at least one embodiment, WaitExternalSemaphoresAsync( ) accepts one or more parameters as input parameters. In at least one embodiment a parameter extSemArray refers to external semaphores to be waited on. In at least one embodiment, a parameter paramsArray refers to array of semaphore parameters. In at least one embodiment, a parameter numExtSems refers to a number of semaphores to wait on. In at least one embodiment, a parameter stream refers to external semaphores to a stream to enqueue a wait operation in.

In at least one embodiment, WaitExternalSemaphoresAsync( ) returns a result value as an output. In at least one embodiment, an output may indicate success or failure states that may include, but are not limited by: not initialized, invalid handle, not supported. In at least one embodiment, result supports one or more of following values:

::_SUCCESS,
::_ERROR_NOT_INITIALIZED,
::_ERROR_INVALID_HANDLE,
::_ERROR_NOT_SUPPORTED

In at least one embodiment, SignalExternalSemaphoresAsync( ) is a supported API. In at least one embodiment, SignalExternalSemaphoresAsync( ) enqueues a signal operation on a set of externally allocated semaphore objects in a specified stream. In at least one embodiment, operations will be executed when all priori operations in a stream complete.

In at least one embodiment, applications invokes SignalExternalSemaphoresAsync( ) by passing a pointer to SciSyncFence as a parameter via _EXTERNAL_SEMAPHORE_PARAMS. In at least one embodiment, API enqueues a signal operation in a parallel computing platform and application programming interface model stream. In at least one embodiment, a signal operation is represented as semaphore release or syncPoint release. In at least one embodiment, operands on which sem_rel or syncPt_rel is issued gets written in a SciSyncFence. In at least one embodiment, SciSyncFence will includes either <SyncPoint-ID, thresholdValue> or <Sema-Offset, thresholdValue>; thresholdvalue being value that a particular syncpoint register or semaphore includes when GPU executes a previously enqueued signal operation.

In at least one embodiment, SciSyncFence tracks one or more same GPU tasks on a parallel computing platform and application programming interface model stream that would have been tracked had a EventRecord( ) been enqueued into that stream. In at least one embodiment, SciSyncFence returned from this API can be used by other UMDs to wait for completion of parallel computing platform and application programming interface model tasks (e.g., by issuing appropriate acquire methods in their device queue) or natively waiting on SciSyncFence from CPU (e.g., using SciSyncWait( )). In at least one embodiment, API follows existing parallel computing platform and application programming interface model stream semantics.

In at least one embodiment, if SciSyncAttrList used to create SciSyncObj had flags in DeviceGetSciSyncAttrributes set to _SCISYNC_WAIT, API returns _ERROR_NOT_SUPPORTED, since an application tried to enqueue a wait while it originally intended to only signal. In at least one embodiment, return value from SignalExternalSemaphoresAsync is made in this regard (similar changes can be done to runtime API as well):

```
result API SignalExternalSemaphoresAsync(
    const external Semaphore *extSemArray,
    const __EXTERNAL__SEMAPHORE__PARAMS *paramsArray,
    unsigned int
    numExtSems, stream stream);
```

In at least one embodiment, semantics of signaling a semaphore depend on type of object. In at least one embodiment, if semaphore object is any of following types: _EXTERNAL_SEMAPHORE_HANDLE_TYPE_OPAQUE_FD, _EXTERNAL_SEMAPHORE_HANDLE_TYPE_OPAQUE_WIN32, or _EXTERNAL_SEMAPHORE_HANDLE_TYPE_OPAQUE_WIN32_KMT, then signaling semaphore sets it to a signaled state.

In at least one embodiment, if semaphore object is of type _EXTERNAL_SEMAPHORE_HANDLE_TYPE_D3D12_FENCE, then semaphore is set to value specified in _EXTERNAL_SEMAPHORE_PARAMS::params::fence::value.

In at least one embodiment, if semaphore object is of type _EXTERNAL_SEMAPHORE_HANDLE_TYPE_SCI-SYNC, and if SciSyncAttrList used to create SciSyncObj had not set flags in::DeviceGetSciSyncAttrributes to _SCI-SYNC_SIGNAL, API returns::_ERROR_NOT_SUPPORTED.

In at least one embodiment, SignalExternalSemaphoresAsync( ) accepts one or more parameters as input parameters. In at least one embodiment a parameter extSemArray refers to external semaphores to be signaled. In at least one embodiment, a parameter paramsArray refers to array of semaphore parameters. In at least one embodiment, a parameter numExtSems refers to a number of semaphores to signal. In at least one embodiment, a parameter stream refers to stream to enqueue signal operations in.

In at least one embodiment, SignalExternalSemaphoresAsync( ) returns a result value as an output. In at least one embodiment, an output may indicate success or failure states that may include, but are not limited by: not initialized, invalid handle, not supported. In at least one embodiment, result supports one or more of following values:

::_SUCCESS,
::_ERROR_NOT_INITIALIZED,
::_ERROR_INVALID_HANDLE,
::_ERROR_NOT_SUPPORTED

In at least one embodiment, WaitExternalSemaphoresAsync( ) and SignalExternalSemaphoresAsync( ) have similar behavior as WaitExternalSemaphoresAsync( ) and SignalExternalSemaphoresAsync( ) and these APIs are not explicitly mentioned again for sake of brevity.

In at least one embodiment, Cuda-SciSync is used to ensure data consistency for Cuda-SciBuf. In at least one embodiment, Cuda-SciSync is used to ensure data consistency for Cuda-SciBuf because it is to ensure that APIs are functionally correct and performance optimization would require applications to choose opt-in behavior-elaborating further, when Cuda-SciBuf is used by an application and cache-ops are not performed by default, novice application might face bugs which are difficult to debug since user-visible data-consistency between GPU and other engines over shared buffer is dependent on timing, amount of current GPU workload, order of data access etc. Cache-ops enqueued by default, during Signal & Wait, ensures that such bugs don't arise in first place. However, unnecessary cache-ops performed has a significant performance impact (full iGPU cache invalidation takes ~4 μs on Xavier & ~60 μs on Orin) which is detrimental to auto-cases and unnecessary for use-case where SciSync is only needed to express control dependencies.

In at least one embodiment, in order to cater to both novice programmers with limited use-cases and expert programmers with perf-critical use-cases, a flag _NO_MEMSYNC can be passed as a parameter to wait & signal API and helps an application let a driver know that Cuda-SciSync being operated upon is only capturing control-dependency and there is no need to enqueue cache-ops. In at least some embodiments, a corresponding runtime flag to _NO_MEMSYNC is _NO_MEMSYNC.

In at least one embodiment, a CPU signals a GPU. In at least one embodiment, ability of this interop to allow CPU signaling GPU deserves a separate section because it provides an approach that is different from what parallel computing platform and application programming interface model supports today. In at least one embodiment, this could potentially be an alternative to StreamWritelWaitValue, StreamAddCallback.

In at least one embodiment, assume two tasks, C and G where C is a CPU bound task and G is a GPU bound task. Ways in which C G dependency can be built include:

Calling thread completes C's execution then submits G to GPU via a stream.

Calling thread submits C & G, in that order, in a stream. (e.g., using StreamAddCallback)

Using StreamWait or WriteValue APIs.

Option 1 is not performant, Option 2 requires applications to follow stream semantics. Option 3 was originally introduced to interop with PCIe devices which owned semaphores. As a side effect it can also be used to build CPU-GPU dependencies using CPU owned semaphores. Even though it is most flexible of 3 options, there is a potential of causing deadlocks. In real world applications on Tegra, task C could:

Be running in a separate process.

Be written by developers, who are not necessarily parallel computing platform and application programming interface model programmers.

Involve accessing non-CUDA SW.

In at least one embodiment, SciSync introduces a way for CPU to signal GPU that is more flexible than option 1 & 2 and while being safer (deadlock free) than option 3. In at least one embodiment, SciSync provides a separate API, SciSyncSignal( ), which allows CPU to signal a SciSyncFence. In at least one embodiment, a signaled SciSyncFence could be waited upon in a parallel computing platform and application programming interface model stream. In at least one embodiment, a SciSyncFence created from this category of SciSync could either contain an offset into a semaphore pool or a register_id of syncpoint along with value to wait upon. In at least one embodiment, applications own responsibility of calling SciSyncSignal( ) at appropriate times, failing which behavior is undefined. In at least one embodiment, if SciSyncSignal( ) arrives prematurely, a CUDA kernel could start accessing same buffer that is currently being accessed from CPU).

In at least one embodiment, Cuda-SciSync interop follows existing CUDA stream semantics so it is perfectly valid to record an enqueued signal (e.g., via SignalExtSemaAsync( )) using a CUDA event. In at least one embodiment, a recorded CUDA event can be used as any regular CUDA event (e.g., build dependencies with other CUDA streams, wait/query an event).

Figure 10:
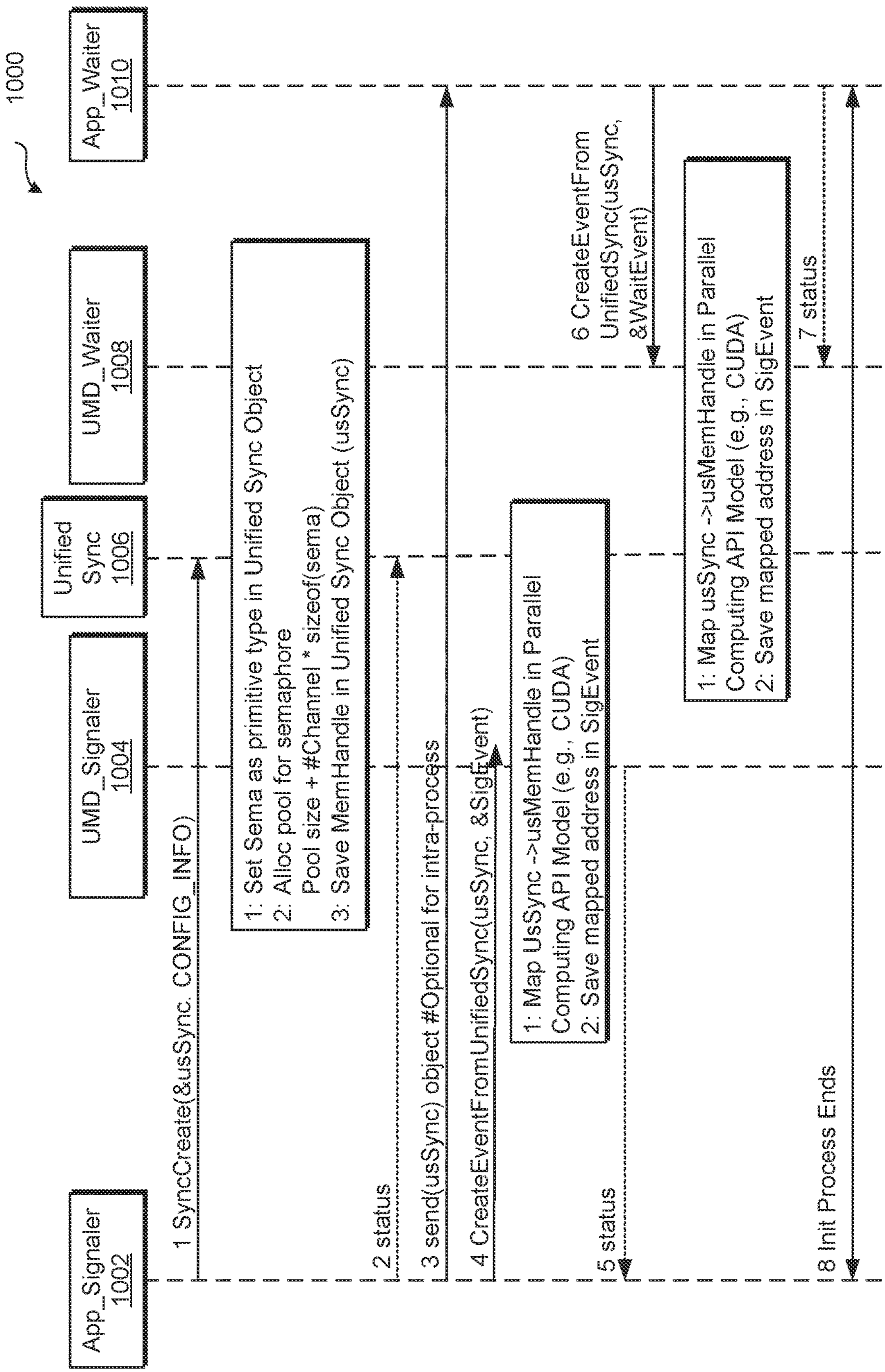
FIG. 10 illustrates a diagram of semaphore initialization phase, according to at least one embodiment.

FIG. 10 illustrates a diagram 1000 of semaphore initialization phase, according to at least one embodiment. In at least one embodiment, a signaler (e.g., signaling application on a first hardware engine) calls SyncCreate( ) with configuration information and a pointer to a handle usSync. In at least one embodiment, SyncCreate( ) is called by application signaler and fulfilled by Sync module 1006 which sets semaphore as primitive type in usSync, allocates pool for semaphore wherein pool size is equal to number of parallel computing platform and application programming interface model channels multiplied by size of each semaphore. In at least one embodiment, allocation return a handle. In at least one embodiment, MemHandle is saved in Sync in a manner that abstracts from application signalers which underlying synchronization primitive is being used. In at least one embodiment, usSync module returns a status code to a signaling application that indicates whether usSync object was successfully allocated.

In at least one embodiment, signaler 1002 sends usSync object to waiter 1006. In at least one embodiment, sending usSync object to waiter 1006 is optional, such as in case of intra-process waiting. In at least one embodiment, waiter and signaler span different hardware engines. In at least one embodiment, signaler calls a CreateEventFromSync( ) API where UMD_Signaler 1008 maps usSync object to MemHandle in parallel computing platform and application programming interface model and saves mapped address in a SigEvent. In at least one embodiment, a status code is returned to signaler. In at least one embodiment, waiter calls CreateEventFromSync( ) API where _UMD_Waiter 1010 maps usSync to MemHandle in parallel computing platform and application programming interface model and saves mapped address in WaitEvent. In at least one embodiment, a status code is returned to waiter. In at least one embodiment, initialization phase ends when both signaler and waiter have created CUDA events for signaling and waiting for events and received status codes, thereby indicating completion of initialization phase. In at least one embodiment, events initialized in FIG. 10 are signaled using techniques described in connection with FIG. 11.

Figure 11:
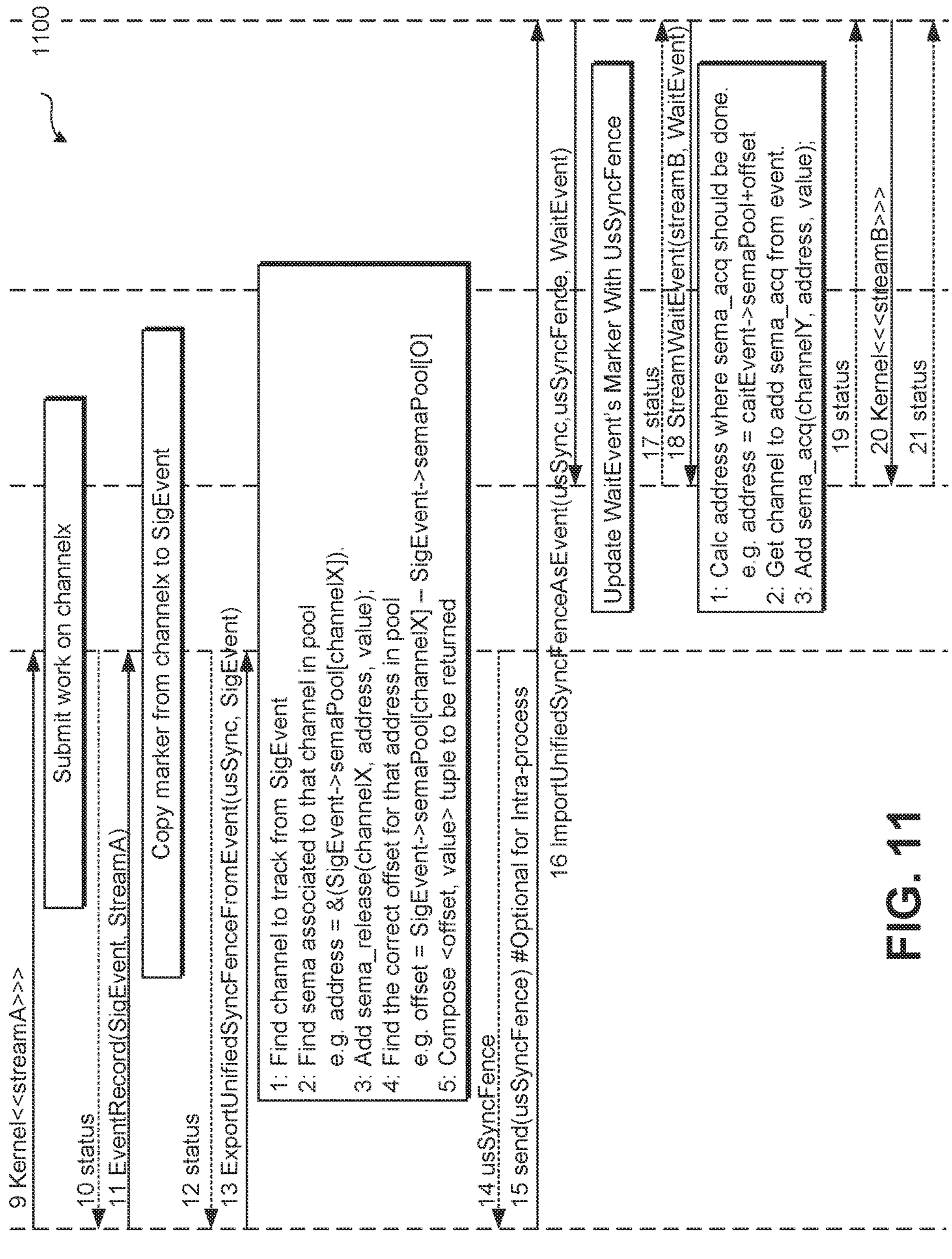
FIG. 11 illustrates a diagram of semaphore run phase, according to at least one embodiment.

FIG. 11 illustrates a diagram 1100 of semaphore run phase, according to at least one embodiment. In at least one embodiment, FIG. 11 is implemented in context of an initialization phase described in connection with FIG. 10. In at least one embodiment, signaler 1102 submits work on a parallel computing platform and application programming interface model channel. In at least one embodiment, work comprises a parallel computing platform and application programming interface model kernel accessing a stream. In at least one embodiment, a status ode is returned in response to submission of work on a parallel computing platform and application programming interface model channel. In at least one embodiment, signaler calls EventRecord( ) API and references stream on which work was submitted and SigEvent and provides API call to UMD_Signaler (e.g., same from FIG. 10). In at least one embodiment, signaler calls ExportSyncFenceFromCudaEvent API which is sent to UMD_Signaler 1104 (e.g., same as from FIG. 10) which encodes parameters for usSync and SigEvent. In at least one embodiment, UMD_Signaler finds parallel computing platform and application programming interface model channel to track from SigEvent, finds semaphores associated to that channel in pool, adds semaphore release based on channel, address, value information, finds correct offset for that address in poo, and composes offset and value tuple to be returned to signaler. In at least one embodiment, signaler receives a usSyncFence.

In at least one embodiment, usSyncFence is sent to waiter 1106. In at least one embodiment, sending of usSyncFence is optional, such as in case signaler and waiter are intra-process. In at least one embodiment, waiter calls Import-SyncFenceAsCudaEvent( ) API with usSync, usSyncFence, and WaitEvent to UMD_Waiter 1108. In at least one embodiment, UMD_Waiter updates WaitEvent's marker with usSyncFence and returns a status code to waiter. In at least one embodiment, waiter calls StreamWaitEvent( ) with a second stream and WaitEvent. In at least one embodiment, UMD_Waiter calculates address where sema_acq should be done. In at least one embodiment, address is calculated as WaitEvent reference to semaPool plus offset. In at least one embodiment, UMD_Waiter gets parallel computing platform and application programming interface model channel to add sema_acq from event. In at least one embodiment, UMD_Waiter adds sema_acq with channel, address, and value. In at least one embodiment, a status code is returned to UMD_Waiter. In at least one embodiment, waiter submits work to a second channel. In at least one embodiment, waiter receives a status code in response to work submission.

Figure 12:
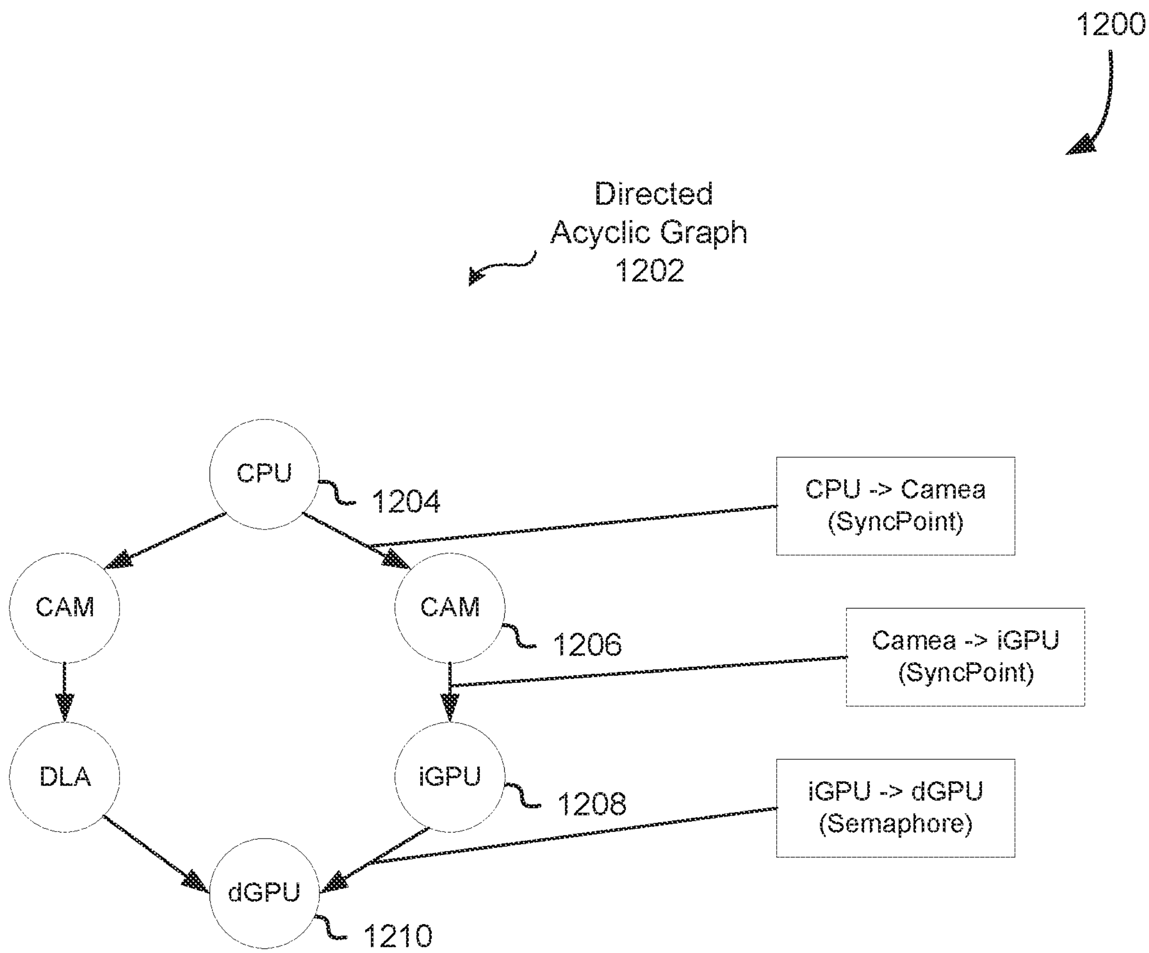
FIG. 12 illustrates a diagram depicting a graph-based application framework, according to at least one embodiment.

FIG. 12 illustrates a diagram 1200 depicting a graph-based application framework, according to at least one embodiment. In at least one embodiment, FIG. 12 illustrates a framework to describe an application workflow as a directed acyclic graph (DAG) 1202 with a CPU 1204, CAM 1206, iGPU 1208, and dGPU 1210. In at least one embodiment, DAG 1202 is similar to parallel computing platform and application programming interface model graphs, but is different in that CUDA graphs lie exclusively in parallel computing platform and application programming interface model domain whereas DAG 1202 allows applications to describe their workflows across different hardware engines, each of which could be governed and/or exposed by a different UMD. In at least one embodiment, a DAG, once described, can be submitted to execution multiple times. In at least one embodiment, DAG 1202 is used to describe a computing environment where images from a camera are to be processed on DLA, iGPU, and dGPU. In at least one embodiment, root node (e.g., CPU node) acts as a trigger to start a task or work.

In at least one embodiment, directed-edges of FIG. 12 represent a control dependencies that exist between node pairs. In at least one embodiment, each edge is backed with a SciSyncFence so that each source node of a directed-edge generates a SciSyncFence that can be waited upon by a corresponding destination node. In at least one embodiment, during grate creation, allocate one Sync per node. In at least on embodiment, each directed edge represents a SyncFence with a waiter and a signaler pair. In at least one embodiment, each run instance of a node updates a SyncFence. In at least one embodiment, dependent nodes can wait on one or more SyncFence. In at least one embodiment, Sync remains implicit to node. In at least one embodiment, graph frameworks choose right backing primitive.

In at least one embodiment, incoming edges of an edge are processed by extracting backing SyncFence, converting SyncFence to UMD specific type (e.g., CudaEvent) and enqueing dependency on that engine (e.g., StreamWait-Event). In at least one embodiment, SyncPoint is used to implement waiting and signaling between CPU and CAM. In at least one embodiment, SyncPoint is used to implement waiting and signaling between CAM and iGPU. In at least one embodiment, semaphore is used to implement waiting and signaling between iGPU and dGPU.

In at least one embodiment, a software application uses a camera (e.g., comprising a first heterogeneous processing core) to take or capture images and CUDA (e.g., running on a second heterogeneous processing core) to read or process those images. In at least one embodiment, a software application creates a first-in-first-out (FIFO) queue (e.g., using a buffer) for fences. In at least one embodiment, a camera checks that a FIFO queue is not full and then takes an image, gets a fence, and adds said image and said fence to said FIFO queue. In at least one embodiment, a CUDA application checks that a FIFO queue is not empty and gets, from said FIFO queue, an image and a fence, adds said fence dependency, and processes said image, for example, by launching a kernel on said image. In at least one embodiment, a fence is a type of synchronization primitive, and techniques described herein may utilize any suitable type of synchronization primitive in place of fences, based on context.

Figure 13:
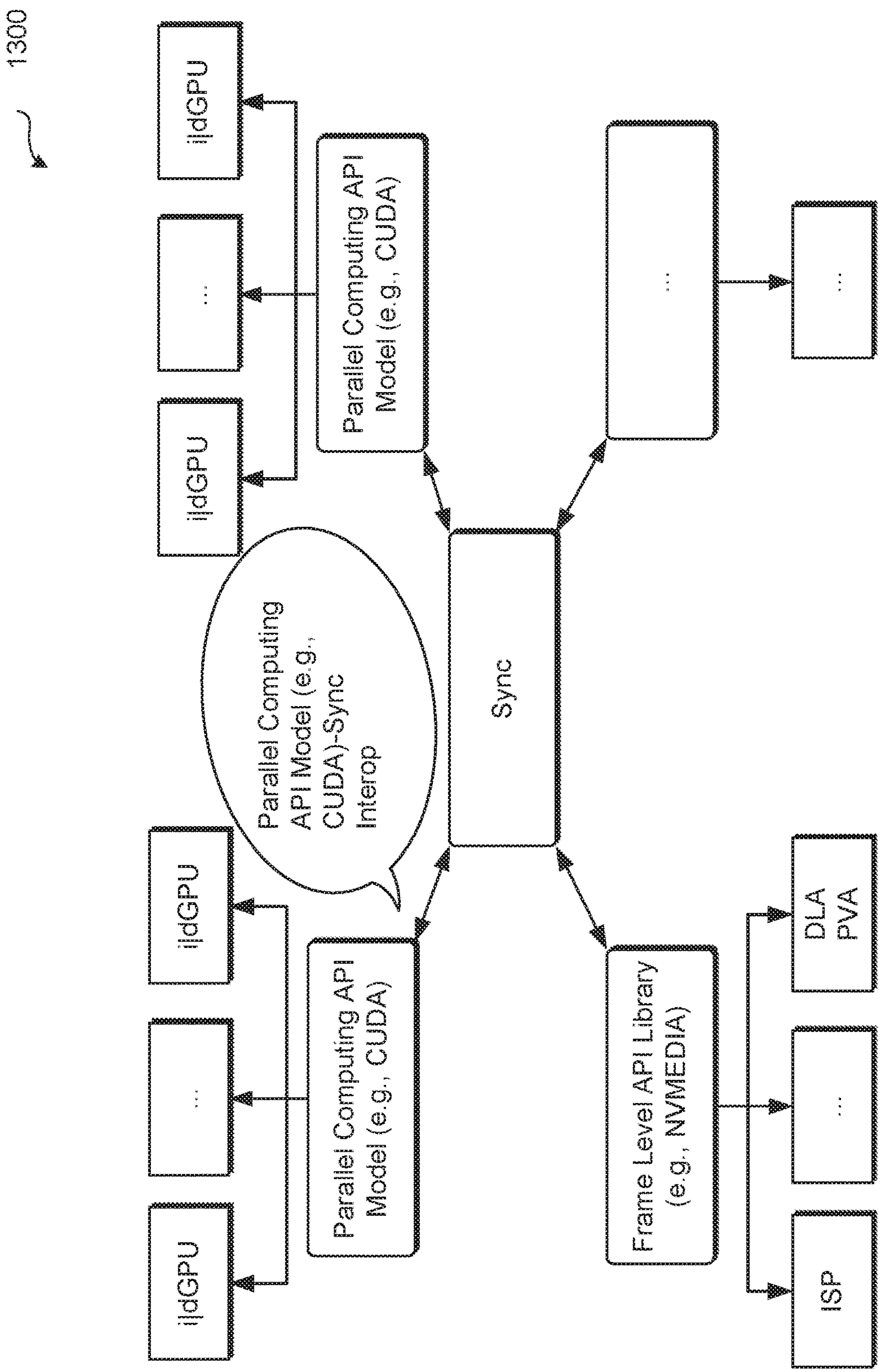
FIG. 13 illustrates a diagram representing an architecture of synchronization, according to at least one embodiment.

FIG. 13 illustrates a diagram 1300 representing an architecture of synchronization, according to at least one embodiment. In at least one embodiment, synchronization is implemented as SciSync to help different UMDs (e.g., running on same or different device) to signal/wait each other. In at least one embodiment, an OpenGL command queue is able to wait for completion of some CUDA kernel enqueued on a parallel computing platform and application programming interface model stream. In at least one embodiment, a synchronization object refers to a unified synchronization object that is used by two or more UMDs to coordinate execution of code and/or access to data. In at least one embodiment, a synchronization object (e.g., SciSync) is used to coordinate execution of a first set of executable instructions on a first UMD with execution of a second set of executable instructions on a second UMD. In at least one embodiment, a synchronization object is used to coordinate access to memory shared by two or more UMDs. In at least one embodiment, a synchronization object is used to cause a first UMD to wait on a second UMD to provide a signal, after which that first UMD accesses a buffer or memory.

In at least one embodiment, SciSync is used to describe complex dependencies across various engines and different platforms. In at least one embodiment, SciSync helps abstract backing sync-primitives understood by communicating UMDs and operating system specific details from applications. Similar to how parallel computing platform and application programming interface model events abstracts over syncpoints, semaphores (e.g., host or device), QMDs and over an array of operating systems. In at least one embodiment, SciSync, with help of communicating UMDs, reserves all resources to be used for its entire lifetime during initialization so as to avoid need for resource resizing during critical/performant paths. In at least one embodiment, SciSync is designed to stay agnostic to whether or not communicating UMDs are running in separate threads, process, or VMs. In at least one embodiment, depending on properties of communicating UMDs, SciSync helps choose right sync-primitive. In at least one embodiment, DLA only understand syncpoints, while iGPU are capable of understanding syncpoints, semaphores—in this case, SciSync helps CUDA choose syncpoint as right primitive since Syncpoints are a least common entity. In at least one embodiment, if two or more communicating UMDs don't have a least common primitive SciSync doesn't provide any alternate path and such a request for interoperability will fail at creation rather than during a critical/performant path.

In at least one embodiment, CudaEvent and SciSync can be correlated in following manner, with differences highlighted below:

| CudaEvent | SciSync |
|---|---|
| A mutable object which tracks tasks submitted to CUDA stream. Each record overwrites previously captured state. | An immutable object which can track tasks submitted to any device queue. |
| Each record overwrites previously captured state. | Since it is immutable, overwriting can never happen. |
| CudaEvent:ctxMarker. | SciSync: SciSyncFence. |
| Doesn't expose ctxMarker which has all captured states (QMDs, semaphores) | Each Signal will return a SciSyncFence, which will always represent state captured. (Syncpoint, semaphore, syncFD) |
| ctxMarker has 1-1 relation with CudaEvents. Each record updates state in this unique ctxMarker. | SciSyncFence has N-1 relation with SciSync. Each Signal will return a new SciSyncFence for that captured state. |
| ctxMarker holds reference to context-sensitive information like VAs. | SciSyncFence only includes context-insensitive information like SyncPoint register IDs, absolute offsets |
| Supports IPC by exposing events as handles. | Support IPCs by exposing SciSync and SciSyncFence as a handle and blob of information respectively. |
| (For inter thread) Applications own responsibility of handling race condition while updating and issuing waits upon an event. | Applications have similar responsibilities. |
| (For inter process) Applications should pass around handles using some mechanism, which could be pipes, mmap, etc. | Applications can pass around handles that represent SciSync and blobs of bytes that represent SciSyncFence. A preferred mechanism is NvMemBuffer, however applications are free to use other means. |

In at least one embodiment, SciSyncFence is implemented as a blob of data. In at least one embodiment, applications and parallel computing platform and application programming interface model driver views SciSyncFence as:

```
typedef struct {
      uint8_t payload[48];
} SciSyncFence;
```

In at least one embodiment, actual definition as seen by SciSync module is as follows:

```
typedef struct SciSyncFenceRec {
    // Backing synchronization primitive type
    SciSyncPrimitiveType primitiveType;
    // A given SciSyncFence will be backed by one of these union {
    NvU64 syncPointId; // Register ID of SyncPoints
    NvU64 semaOffset; // Offset into predetermined sema pool . . . ;
    };
    // Threshold value (value for waiters to wait upon)
    NvU64 value;
} SciSyncFence;
```

In at least one embodiment, applications are allowed to allocate as many SciSyncFences as they wish and pass them for parallel computing platform and application programming interface model specific APIs like wait or signal and managing those is entirely application's responsibility. In at least one embodiment, SciSync module provides getter and setter methods for relevant member. Using these internal interface (non-public) parallel computing platform and application programming interface model drivers can extract appropriate sync-primitives to build dependencies. In at least one embodiment, interfaces are provided by SciSync module to help transfer SciSyncFence across treads, processes, VMs. In at least one embodiment, a given SciSyncFence represents a single point in time and to represent a new point in time, applications can ask for a new SciSyncFence (e.g., by enqueuing a Signal operation).

In at least one embodiment, a SciSyncObj is created from a SciSyncAttrList which, similar to SciSyncFence, has a structure that is opaque to applications. In at least one embodiment, an internal definition is as follows:

```
typedef struct {
    SciSyncUmdType umd; //SciSync_UMD_[parallel computing
    platform and application programming interface model|GL|. . .]
    // An array of primitive types that this UMD can support
    SciSyncPrimitiveType primitiveType[128];
    . . . .
} SciSyncAttrList;
```

In at least one embodiment, primitiveType array of a SciSyncAttrList holds all base sync-primitives that a given device/engine can interpret/understand. In at least one embodiment, sync-primitives include combinations of syncpoints and semaphores.

In at least one embodiment, all UMDs involved in interop express their capabilities in respective SciSyncAttrList data structures and multiple SciSyncAttrList (e.g., from two or more UMDs) are reconciled to arrive at a combination of capabilities that is common to all involved UMDs. If there is no common capabilities across involved UMDs an error is returned during reconciliation, else reconciled capabilities are passed to SciSyncObjAlloc( ) In at least one embodiment, scope of SciSyncObj returned by SciSyncObjAlloc( ) is limited to calling process. In at least one embodiment, to support cross-process/VM interop, SciSync module provides mechanisms to create a blob of data representing a SciSyncObj which can be transferred across process/VM and/or create a new SciSyncObj from a blob of data representing a SciSyncObj.

In at least one embodiment, different techniques are used to abstract interop between In at least one embodiment, for a case where semaphore is a chosen sync-primitive, a parallel computing platform and application programming interface model API can internally query SciSync module for information regarding a semaphore pool which is returned in a data structure such as in following manner:

```
typedef struct {
    // Memory handle for pool. (similar to dma_buf)
    NvMemBuf semaPool;
    // cache properties
    NvBool gpuCached;
    NvBool cpuCached;
    . . . .
} SciSyncSemaphoreInfo;
```

In at least one embodiment, when SciSyncObjAlloc( ) is called, SciSync module allocates physical memory and stores a reference in semPool, as described above. In at least one embodiment, at time of UMD importing SciSync (e.g., parallel computing platform and application programming interface model), a driver creates a virtual mappings for semaPool. In at least one embodiment, SciSyncSemaphoreInfo is not an opaque data structure to applications. In at least one embodiment, size of pool is set as a part of UMDGetSciSyncAttributes( ) call. In at least one embodiment, in case of parallel computing platform and application programming interface model size is equal to number of active CUDA channels in current parallel computing platform and application programming interface model context.

In at least one embodiment, every SciSyncFence generated out of such SciSyncObj is backed by a semaphore in pool created earlier. In at least one embodiment, SciSyncFence includes an offset into a pool and a value to wait upon which can be queried by parallel computing platform and application programming interface model using getter methods. In at least one embodiment, information regarding expected cacheability is also sent by SciSync module to parallel computing platform and application programming interface model so that parallel computing platform and application programming interface model can take necessary measures while mapping a semaphore pool. In at least one embodiment, SciSync allocates uncached semaphore. In at least one embodiment, SciSync caches a semaphores on platform with improved 10 coherence support.

In at least one embodiment, syncpoints is chosen to be a backing primitive. In at least one embodiment, a SciSyncFence generated is backed by register_ID and a value in that register to wait upon. In at least one embodiment, for this category of SciSyncs no resource creation is needed at time of an UMD registering SciSync. In at least one embodiment, syncpoint registers are not globally readable (e.g., from different VMs), and necessary syncpoint register needed should be reserved at time of creation; in such scenarios, there would be pool of syncpoint registers that system manages solely to facilitate cross VM/chip communication.

Figure 14:
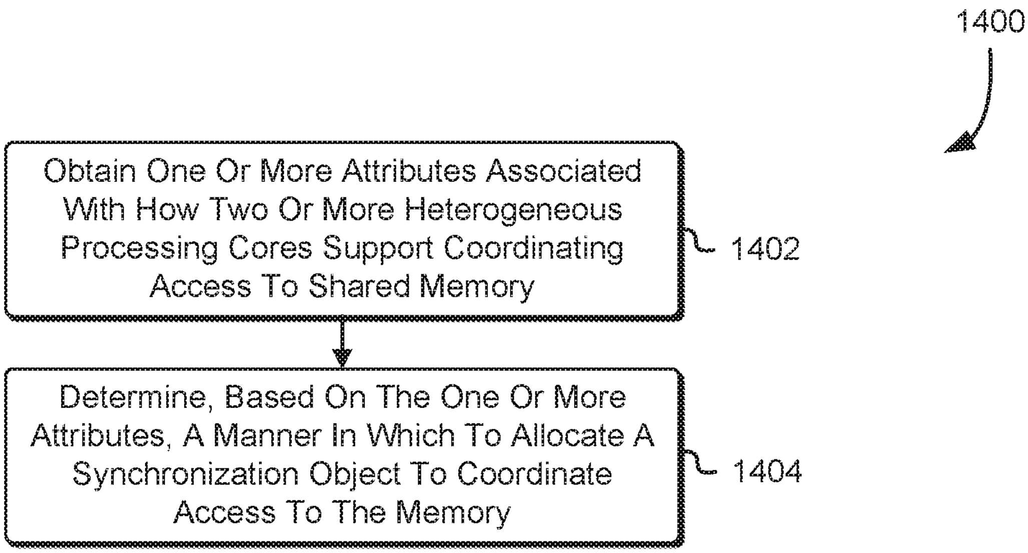
FIG. 14 shows an illustrative example of a process to create a synchronization object, according to at least one embodiment.

FIG. 14 shows an illustrative example of a process 1400 to allocate memory to at least two heterogeneous processing cores in response to performing one or more instructions associated with one or more application programming interfaces (APIs) based, at least in part, on one or more attributes associated with said at least two heterogeneous processing cores, in accordance with at least one embodiment. In at least one embodiment, some or all of process 1400 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium in form of a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 1400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, process 1400 is performed at least in part on a computer system such as those described elsewhere in this disclosure.

In at least one embodiment, a system is to obtain 1402 one or more attributes associated with how two or more heterogeneous processing cores support coordinating access to shared memory. In at least one embodiment, shared memory may refer to memory to be accessed (e.g., read and/or write) by two or more UMDs. In at least one embodiment, a heterogeneous processing core may refer to those described elsewhere in this disclosure, such as processor cores described in connection with FIG. 35. In at least one embodiment, a graph-based framework is used to determine a manner in which to coordinate access between heterogeneous processing cores. In at least one embodiment, a first UMD signals and a second UMD wait using a first underlying synchronization object and that second UMD may signal and a third UMD wait using a different synchronization object. In at least one embodiment, two or more UMDs provide attribute lists that include which synchronization objects they support.

In at least one embodiment, a system is to determine 1404, based on one or more attributes, a manner in which to allocate a synchronization object to coordinate access to memory. In at least one embodiment, a sync object is created from one or more attributes which has a structure that is opaque to applications. In at least one embodiment, one or more attributes includes lists of all base sync-primitives that UMDs are able to interpret/understand. In at least one embodiment, all UMDs involved in interop express their capabilities in respective SciSyncAttrList data structures and multiple SciSyncAttrList (e.g., from two or more UMDs) are reconciled to arrive at a combination of capabilities that is common to all involved UMDs. If there is no common capabilities across involved UMDs an error is returned during reconciliation, else reconciled capabilities are passed to SciSyncObjAlloc( ). In at least one embodiment, scope of SciSyncObj returned by SciSyncObjAlloc( ) is limited to calling process. In at least one embodiment, to support cross-process/VM interop, SciSync module provides mechanisms to create a blob of data representing a SciSyncObj which can be transferred across process/VM and/or create a new SciSyncObj from a blob of data representing a SciSyncObj.

Inference and Training Logic

Figure 15A:
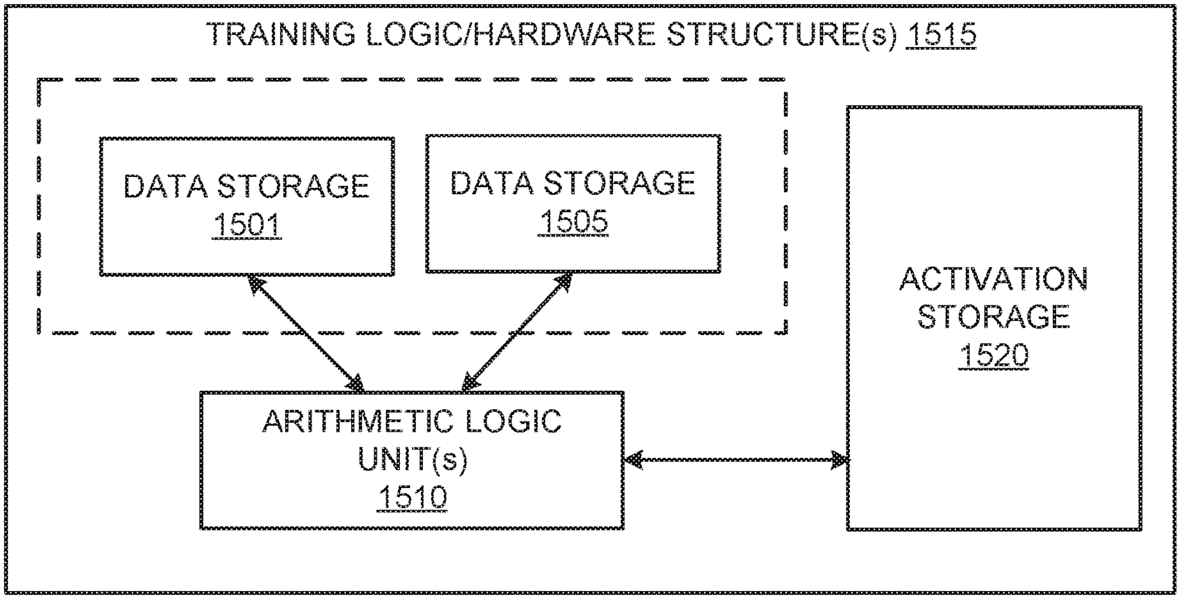
FIG. 15A illustrates inference and/or training logic, according to at least one embodiment.

FIG. 15A illustrates inference and/or training logic 1515 used to perform inferencing and/or training operations associated with one or more embodiments. Details regarding inference and/or training logic 1515 are provided below in conjunction with FIGS. 15A and/or 15B.

In at least one embodiment, inference and/or training logic 1515 may include, without limitation, code and/or data storage 1501 to store forward and/or output weight and/or input/output data, and/or other parameters to configure neurons or layers of a neural network trained and/or used for inferencing in aspects of one or more embodiments. In at least one embodiment, training logic 1515 may include, or be coupled to code and/or data storage 1501 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment code and/or data storage 1501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1501 may be included with other on-chip or off-chip data storage, including a processor's L1, L2, or L3 cache or system memory.

In at least one embodiment, any portion of code and/or data storage 1501 may be internal or external to one or more processors or other hardware logic devices or circuits. In at least one embodiment, code and/or code and/or data storage 1501 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1515 may include, without limitation, a code and/or data storage 1505 to store backward and/or output weight and/or input/output data corresponding to neurons or layers of a neural network trained and/or used for inferencing in aspects of one or more embodiments. In at least one embodiment, code and/or data storage 1505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1515 may include, or be coupled to code and/or data storage 1505 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1505 may be included with other on-chip or off-chip data storage, including a processor's L1, L2, or L3 cache or system memory. In at least one embodiment, any portion of code and/or data storage 1505 may be internal or external to on one or more processors or other hardware logic devices or circuits. In at least one embodiment, code and/or data storage 1505 may be cache memory, DRAM, SRAM, non-volatile memory (e.g., Flash memory), or other storage. In at least one embodiment, choice of whether code and/or data storage 1505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1501 and code and/or data storage 1505 may be separate storage structures. In at least one embodiment, code and/or data storage 1501 and code and/or data storage 1505 may be same storage structure. In at least one embodiment, code and/or data storage 1501 and code and/or data storage 1505 may be partially same storage structure and partially separate storage structures. In at least one embodiment, any portion of code and/or data storage 1501 and code and/or data storage 1505 may be included with other on-chip or off-chip data storage, including a processor's L1, L2, or L3 cache or system memory.

In at least one embodiment, inference and/or training logic 1515 may include, without limitation, one or more arithmetic logic unit(s) ("ALU(s)") 1510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1520 that are functions of input/output and/or weight parameter data stored in code and/or data storage 1501 and/or code and/or data storage 1505. In at least one embodiment, activations stored in activation storage 1520 are generated according to linear algebraic and or matrix-based mathematics performed by ALU(s) 1510 in response to performing instructions or other code, wherein weight values stored in code and/or data storage 1505 and/or data 1501 are used as operands along with other values, such as bias values, gradient information, momentum values, or other parameters or hyperparameters, any or all of which may be stored in code and/or data storage 1505 or code and/or data storage 1501 or another storage on or off-chip.

In at least one embodiment, ALU(s) 1510 are included within one or more processors or other hardware logic devices or circuits, whereas in another embodiment, ALU(s) 1510 may be external to a processor or other hardware logic device or circuit that uses them (e.g., a co-processor). In at least one embodiment, ALUs 1510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1501, code and/or data storage 1505, and activation storage 1520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1520 may be cache memory, DRAM, SRAM, non-volatile memory (e.g., Flash memory), or other storage. In at least one embodiment, activation storage 1520 may be completely or partially within or external to one or more processors or other logical circuits. In at least one embodiment, choice of whether activation storage 1520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1515 illustrated in FIG. 15A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1515 illustrated in FIG. 15A may be used in conjunction with central processing unit ("CPU") hardware, graphics processing unit ("GPU") hardware or other hardware, such as field programmable gate arrays ("FPGAs").

Figure 15B:
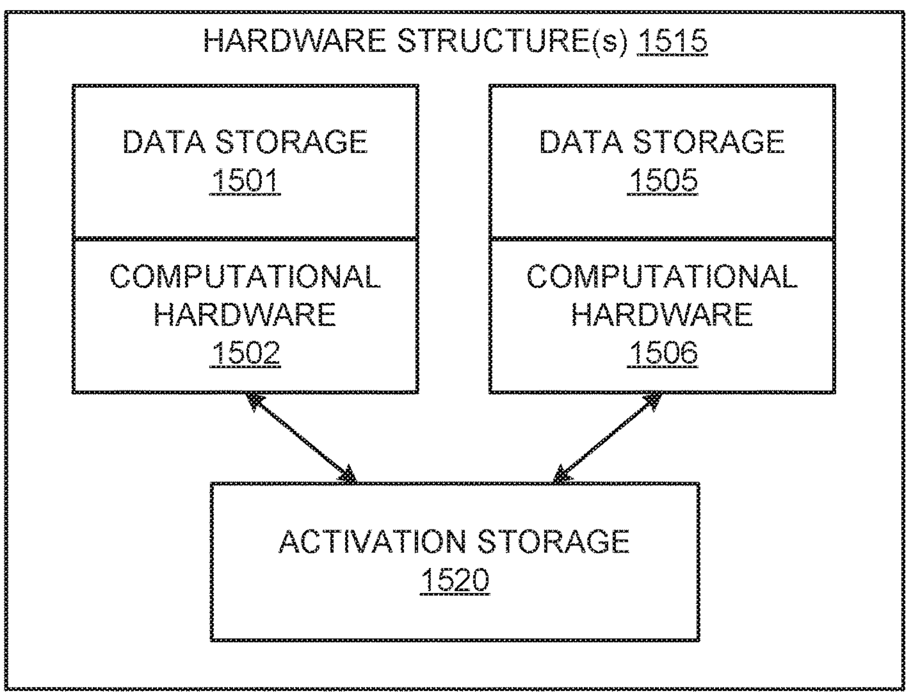
FIG. 15B illustrates inference and/or training logic, according to at least one embodiment.

FIG. 15B illustrates inference and/or training logic 1515, according to at least one embodiment various. In at least one embodiment, inference and/or training logic 1515 may include, without limitation, hardware logic in which computational resources are dedicated or otherwise exclusively used in conjunction with weight values or other information corresponding to one or more layers of neurons within a neural network. In at least one embodiment, inference and/or training logic 1515 illustrated in FIG. 15B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1515 illustrated in FIG. 15B may be used in conjunction with central processing unit (CPU) hardware, graphics processing unit (GPU) hardware or other hardware, such as field programmable gate arrays (FPGAs). In at least one embodiment, inference and/or training logic 1515 includes, without limitation, code and/or data storage 1501 and code and/or data storage 1505, which may be used to store code (e.g., graph code), weight values and/or other information, including bias values, gradient information, momentum values, and/or other parameter or hyperparameter information. In at least one embodiment illustrated in FIG. 15B, each of code and/or data storage 1501 and code and/or data storage 1505 is associated with a dedicated computational resource, such as computational hardware 1502 and computational hardware 1506, respectively. In at least one embodiment, each of computational hardware 1502 and computational hardware 1506 comprises one or more ALUs that perform mathematical functions, such as linear algebraic functions, only on information stored in code and/or data storage 1501 and code and/or data storage 1505, respectively, result of which is stored in activation storage 1520.

In at least one embodiment, each of code and/or data storage 1501 and 1505 and corresponding computational hardware 1502 and 1506, respectively, correspond to different layers of a neural network, such that resulting activation from one "storage/computational pair 1501/1502" of code and/or data storage 1501 and computational hardware 1502 is provided as an input to next "storage/computational pair 1505/1506" of code and/or data storage 1505 and computational hardware 1506, in order to mirror conceptual organization of a neural network. In at least one embodiment, each of storage/computational pairs 1501/1502 and 1505/1506 may correspond to more than one neural network layer. In at least one embodiment, additional storage/computation pairs (not shown) subsequent to or in parallel with storage computation pairs 1501/1502 and 1505/1506 may be included in inference and/or training logic 1515.

Neural Network Training and Deployment

Figure 16:
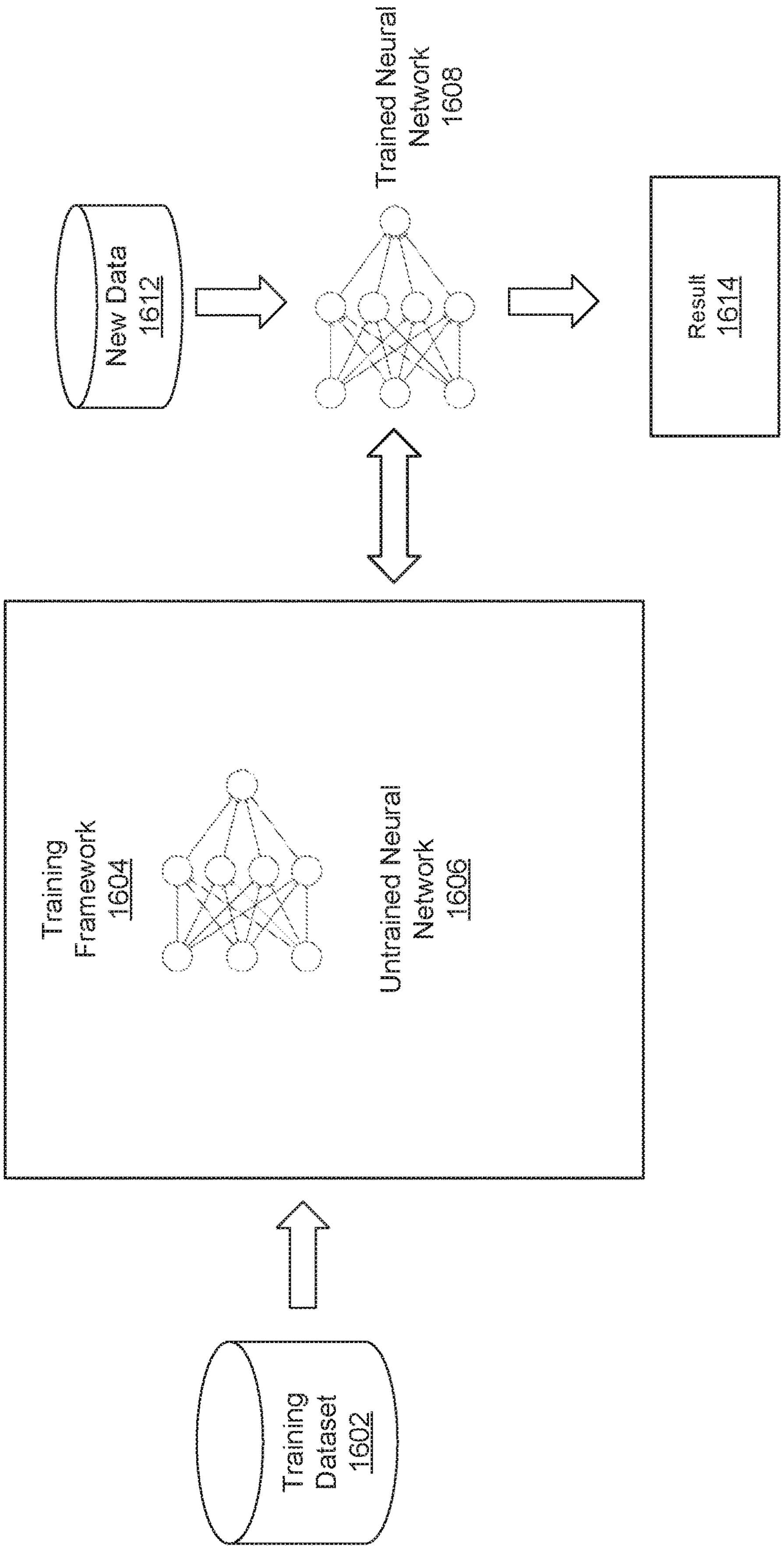
FIG. 16 illustrates training and deployment of a neural network, according to at least one embodiment.

FIG. 16 illustrates training and deployment of a deep neural network, according to at least one embodiment. In at least one embodiment, untrained neural network 91606 is trained using a training dataset 1602. In at least one embodiment, training framework 1604 is a PyTorch framework, whereas in other embodiments, training framework 1604 is a Tensorflow, Boost, Caffe, Microsoft Cognitive Toolkit/CNTK, MXNet, Chainer, Keras, Deeplearning4j, or other training framework. In at least one embodiment training framework 1604 trains an untrained neural network 1606 and enables it to be trained using processing resources described herein to generate a trained neural network 1608. In at least one embodiment, weights may be chosen randomly or by pre-training using a deep belief network. In at least one embodiment, training may be performed in either a supervised, partially supervised, or unsupervised manner.

In at least one embodiment, untrained neural network 1606 is trained using supervised learning, wherein training dataset 1602 includes an input paired with a desired output for an input, or where training dataset 1602 includes input having a known output and an output of neural network 1606 is manually graded. In at least one embodiment, untrained neural network 1606 is trained in a supervised manner processes inputs from training dataset 1602 and compares resulting outputs against a set of expected or desired outputs. In at least one embodiment, errors are then propagated back through untrained neural network 1606. In at least one embodiment, training framework 1604 adjusts weights that control untrained neural network 1606. In at least one embodiment, training framework 1604 includes tools to monitor how well untrained neural network 1606 is converging towards a model, such as trained neural network 1608, suitable to generating correct answers, such as in result 1614, based on known input data, such as new data 1612. In at least one embodiment, training framework 1604 trains untrained neural network 1606 repeatedly while adjust weights to refine an output of untrained neural network 1606 using a loss function and adjustment algorithm, such as stochastic gradient descent. In at least one embodiment, training framework 1604 trains untrained neural network 1606 until untrained neural network 1606 achieves a desired accuracy. In at least one embodiment, trained neural network 1608 can then be deployed to implement any number of machine learning operations.

In at least one embodiment, untrained neural network 1606 is trained using unsupervised learning, wherein untrained neural network 1606 attempts to train itself using unlabeled data. In at least one embodiment, unsupervised learning training dataset 1602 will include input data without any associated output data or "ground truth" data. In at least one embodiment, untrained neural network 1606 can learn groupings within training dataset 1602 and can determine how individual inputs are related to untrained dataset 1602. In at least one embodiment, unsupervised training can be used to generate a self-organizing map, which is a type of trained neural network 1608 capable of performing operations useful in reducing dimensionality of new data 1612. In at least one embodiment, unsupervised training can also be used to perform anomaly detection, which allows identification of data points in a new dataset 1612 that deviate from normal patterns of new dataset 1612.

In at least one embodiment, semi-supervised learning may be used, which is a technique in which in training dataset 1602 includes a mix of labeled and unlabeled data. In at least one embodiment, training framework 1604 may be used to perform incremental learning, such as through transferred learning techniques. In at least one embodiment, incremental learning enables trained neural network 1608 to adapt to new data 1612 without forgetting knowledge instilled within network during initial training.

Data Center

Figure 17:
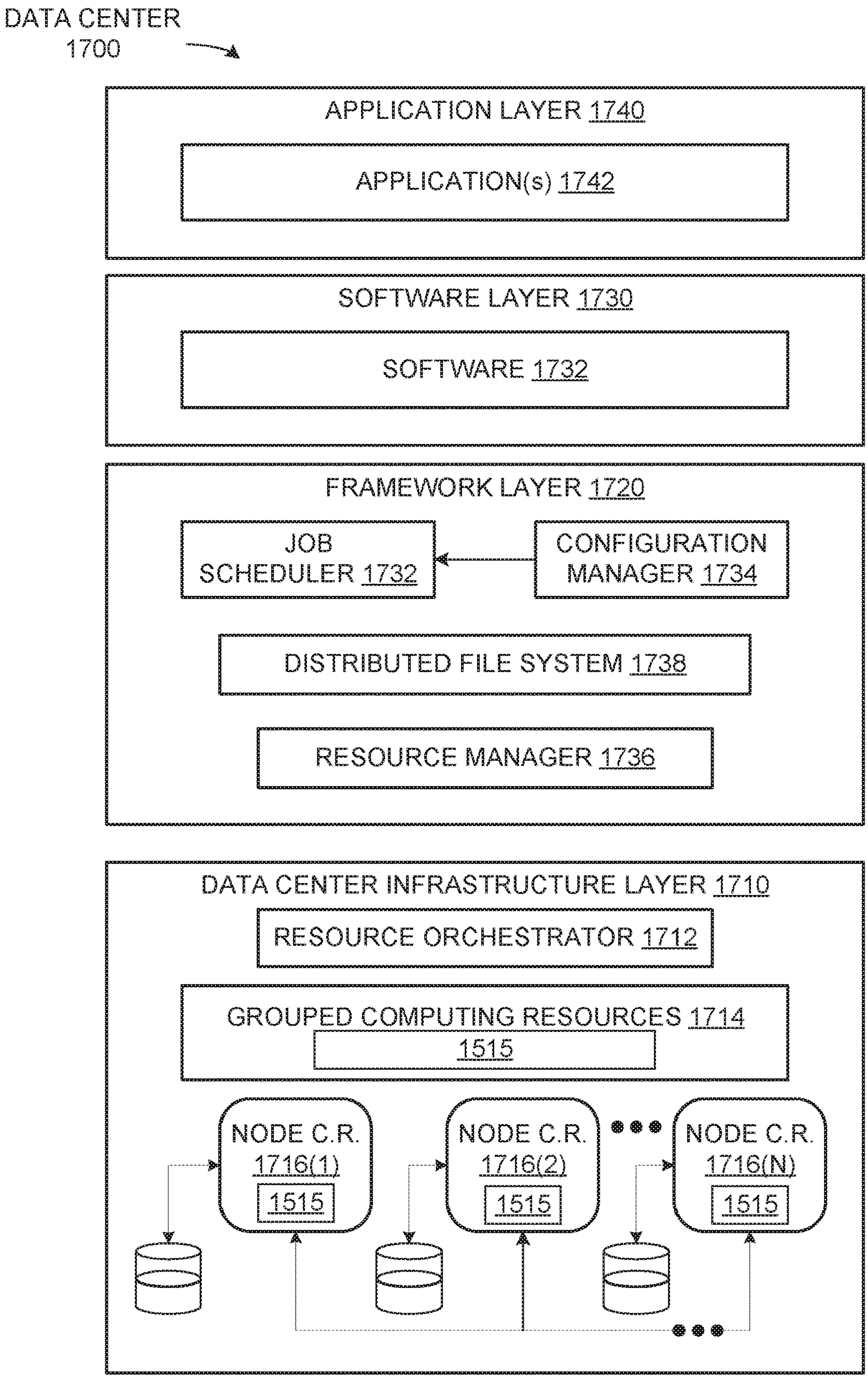
FIG. 17 illustrates an example data center system, according to at least one embodiment.

FIG. 17 illustrates an example data center 1700, in which at least one embodiment may be used. In at least one embodiment, data center 1700 includes a data center infrastructure layer 1710, a framework layer 1720, a software layer 1730 and an application layer 1740.

In at least one embodiment, as shown in FIG. 17, data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1716(1)-1716(N) may be a server having one or more of above-mentioned computing resources.

In at least one embodiment, grouped computing resources 1714 may include separate groupings of node C.R.s housed within one or more racks (not shown), or many racks housed in data centers at various geographical locations (also not shown). separate groupings of node C.R.s within grouped computing resources 1714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1712 may configure or otherwise control one or more node C.R.s 1716(1)-1716(N) and/or grouped computing resources 1714. In at least one embodiment, resource orchestrator 1712 may include a software design infrastructure ("SDI") management entity for data center 1700. In at least one embodiment, resource orchestrator may include hardware, software or some combination thereof.

In at least one embodiment, as shown in FIG. 17, framework layer 1720 includes a job scheduler 1732, a configuration manager 1734, a resource manager 1736 and a distributed file system 1738. In at least one embodiment, framework layer 1720 may include a framework to support software 1732 of software layer 1730 and/or one or more application(s) 1742 of application layer 1740. In at least one embodiment, software 1732 or application(s) 1742 may respectively include web-based service software or applications, such as those provided by Amazon Web Services, Google Cloud and Microsoft Azure. In at least one embodiment, framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1732 may include a Spark driver to facilitate scheduling of workloads supported by various layers of data center 1700. In at least one embodiment, configuration manager 1734 may be capable of configuring different layers such as software layer 1730 and framework layer 1720 including Spark and distributed file system 1738 for supporting large-scale data processing. In at least one embodiment, resource manager 1736 may be capable of managing clustered or grouped computing resources mapped to or allocated for support of distributed file system 1738 and job scheduler 1732. In at least one embodiment, clustered or grouped computing resources may include grouped computing resource 1714 at data center infrastructure layer 1710. In at least one embodiment, resource manager 1736 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. one or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716 (1)-1716(N), grouped computing resources 1714, and/or distributed file system 1738 of framework layer 1720. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. In at least one embodiment, self-modifying actions may relieve a data center operator of data center 1700 from making possibly bad configuration decisions and possibly avoiding underutilized and/or poor performing portions of a data center.

In at least one embodiment, data center 1700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1700. In at least one embodiment, trained machine learning models corresponding to one or more neural networks may be used to infer or predict information using resources described above with respect to data center 1700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 17 for inferencing or predicting operations based, at least in part, on weight parameters calculated using neural network training operations, neural network functions and/or architectures, or neural network use cases described herein.

In at least one embodiment, data center 1700 runs one or more applications using one or more computing resources which include memory storing computer-readable instructions that, as a result of execution, cause one or more processors to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, data center 1700 utilizes computing resources (e.g., CPUs, ASICS, GPUs, FPGAs) to implement inferencing and/or training logic 1515 to perform inferencing and/or training operations associated with one or more embodiments. Data center 1700 may be utilized to implement one or more embodiments described elsewhere in this disclosure, such as those described in connection with FIGS. 1-16 and 18-43.

Autonomous Vehicle

Figure 18A:
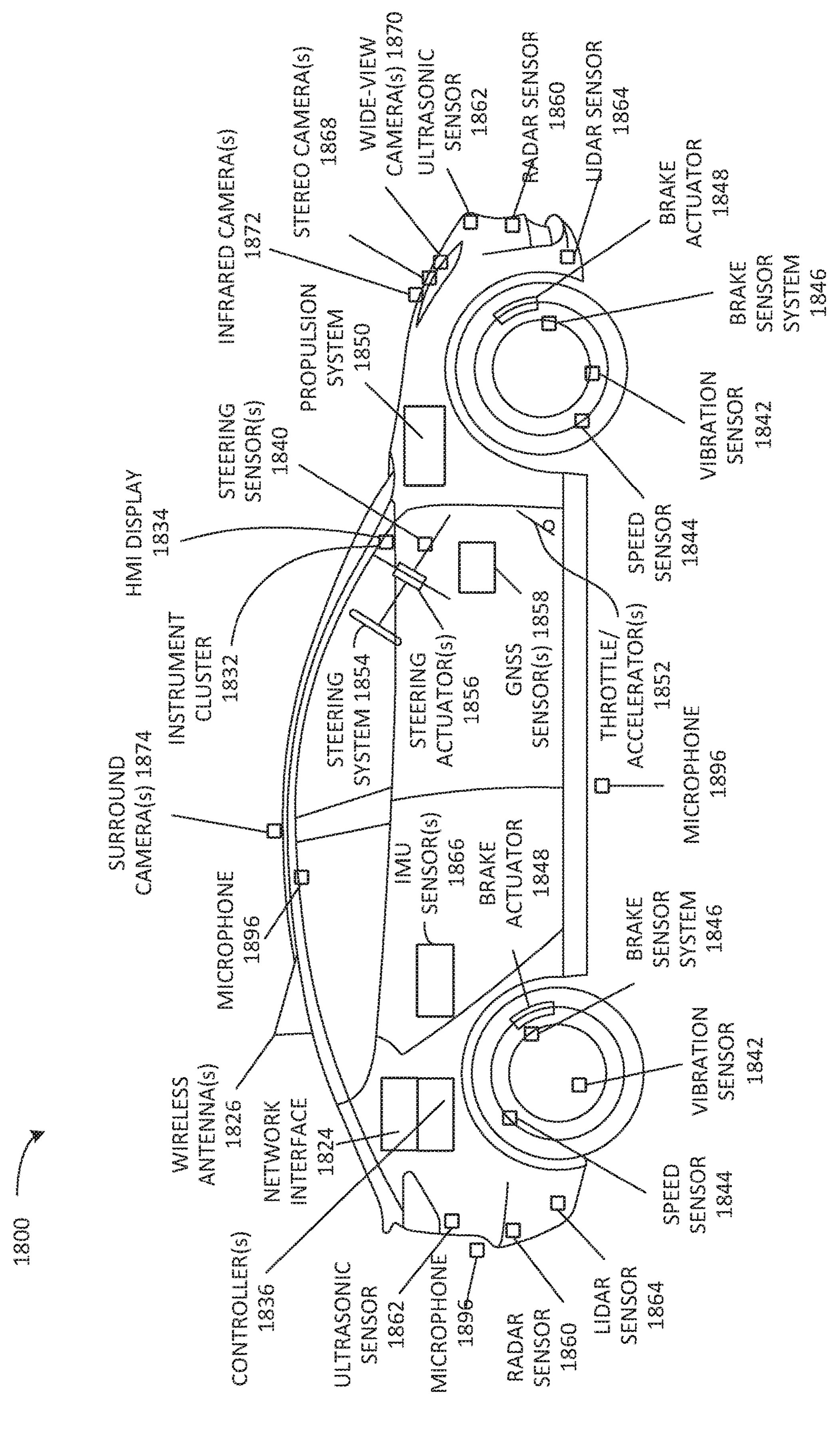
FIG. 18A illustrates an example of an autonomous vehicle, according to at least one embodiment.

FIG. 18A illustrates an example of an autonomous vehicle 1800, according to at least one embodiment. In at least one embodiment, autonomous vehicle 1800 (alternatively referred to herein as "vehicle 1800") may be, without limitation, a passenger vehicle, such as a car, a truck, a bus, and/or another type of vehicle that accommodates one or more passengers. In at least one embodiment, vehicle 1800 may be a semi-tractor-trailer truck used for hauling cargo. In at least one embodiment, vehicle 1800 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1800 may be capable of functionality in accordance with one or more of level 1-level 5 of autonomous driving levels. For example, in at least one embodiment, vehicle 1800 may be capable of conditional automation (Level 3), high automation (Level 4), and/or full automation (Level 5), depending on embodiment.

In at least one embodiment, vehicle 1800 may include, without limitation, components such as a chassis, a vehicle body, wheels (e.g., 2, 4, 6, 8, 18, etc.), tires, axles, and other components of a vehicle. In at least one embodiment, vehicle 1800 may include, without limitation, a propulsion system 1850, such as an internal combustion engine, hybrid electric power plant, an all-electric engine, and/or another propulsion system type. In at least one embodiment, propulsion system 1850 may be connected to a drive train of vehicle 1800, which may include, without limitation, a transmission, to enable propulsion of vehicle 1800. In at least one embodiment, propulsion system 1850 may be controlled in response to receiving signals from a throttle/accelerator(s) 1852.

In at least one embodiment, a steering system 1854, which may include, without limitation, a steering wheel, is used to steer a vehicle 1800 (e.g., along a desired path or route) when a propulsion system 1850 is operating (e.g., when vehicle is in motion). In at least one embodiment, a steering system 1854 may receive signals from steering actuator(s) 1856. steering wheel may be optional for full automation (Level 5) functionality. In at least one embodiment, a brake sensor system 1846 may be used to operate vehicle brakes in response to receiving signals from brake actuator(s) 1848 and/or brake sensors.

In at least one embodiment, controller(s) 1836, which may include, without limitation, one or more system on chips ("SoCs") (not shown in FIG. 18A) and/or graphics processing unit(s) ("GPU(s)"), provide signals (e.g., representative of commands) to one or more components and/or systems of vehicle 1800. For instance, in at least one embodiment, controller(s) 1836 may send signals to operate vehicle brakes via brake actuators 1848, to operate steering system 1854 via steering actuator(s) 1856, to operate propulsion system 1850 via throttle/accelerator(s) 1852. controller(s) 1836 may include one or more onboard (e.g., integrated) computing devices (e.g., supercomputers) that process sensor signals, and output operation commands (e.g., signals representing commands) to enable autonomous driving and/or to assist a human driver in driving vehicle 1800. In at least one embodiment, controller(s) 1836 may include a first controller 1836 for autonomous driving functions, a second controller 1836 for functional safety functions, a third controller 1836 for artificial intelligence functionality (e.g., computer vision), a fourth controller 1836 for infotainment functionality, a fifth controller 1836 for redundancy in emergency conditions, and/or other controllers. In at least one embodiment, a single controller 1836 may handle two or more of above functionalities, two or more controllers 1836 may handle a single functionality, and/or any combination thereof.

In at least one embodiment, controller(s) 1836 provide signals for controlling one or more components and/or systems of vehicle 1800 in response to sensor data received from one or more sensors (e.g., sensor inputs). In at least one embodiment, sensor data may be received from, for example and without limitation, global navigation satellite systems ("GNSS") sensor(s) 1858 (e.g., Global Positioning System sensor(s)), RADAR sensor(s) 1860, ultrasonic sensor(s) 1862, LIDAR sensor(s) 1864, inertial measurement unit ("IMU") sensor(s) 1866 (e.g., accelerometer(s), gyroscope(s), magnetic compass(es), magnetometer(s), etc.), microphone(s) 1896, stereo camera(s) 1868, wide-view camera(s) 1870 (e.g., fisheye cameras), infrared camera(s) 1872, surround camera(s) 1874 (e.g., 360 degree cameras), long-range cameras (not shown in FIG. 18A), mid-range camera(s) (not shown in FIG. 18A), speed sensor(s) 1844 (e.g., for measuring speed of vehicle 1800), vibration sensor(s) 1842, steering sensor(s) 1840, brake sensor(s) (e.g., as part of brake sensor system 1846), and/or other sensor types.

In at least one embodiment, one or more of controller(s) 1836 may receive inputs (e.g., represented by input data) from an instrument cluster 1832 of vehicle 1800 and provide outputs (e.g., represented by output data, display data, etc.) via a human-machine interface ("HMI") display 1834, an audible annunciator, a loudspeaker, and/or via other components of vehicle 1800. In at least one embodiment, outputs may include information such as vehicle velocity, speed, time, map data (e.g., a High Definition map (not shown in FIG. 18A), location data (e.g., vehicle's 1800 location, such as on a map), direction, location of other vehicles (e.g., an occupancy grid), information about objects and status of objects as perceived by controller(s) 1836, etc. For example, in at least one embodiment, HMI display 1834 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1800 further includes a network interface 1824 which may use wireless antenna(s) 1826 and/or modem(s) to communicate over one or more networks. For example, in at least one embodiment, network interface 1824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1826 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 18A for inferencing or predicting operations based, at least in part, on weight parameters calculated using neural network training operations, neural network functions and/or architectures, or neural network use cases described herein.

In at least one embodiment, vehicle 1800 of FIG. 18A includes memory storing computer-readable executable instruction that, as a result of execution, causes one or more processors of vehicle 1800 of FIG. 18A to allocate memory to at least two heterogeneous processing cores in response to performing one or more instructions associated with one or more application programming interfaces (APIs) based, at least in part, on one or more attributes associated with the at least two heterogeneous processing cores. One or more embodiments described elsewhere in this disclosure may be utilized in context of vehicle 1800 of FIG. 18A, such as techniques described in connection with FIGS. 1-17 and 19-43.

Figure 18B:
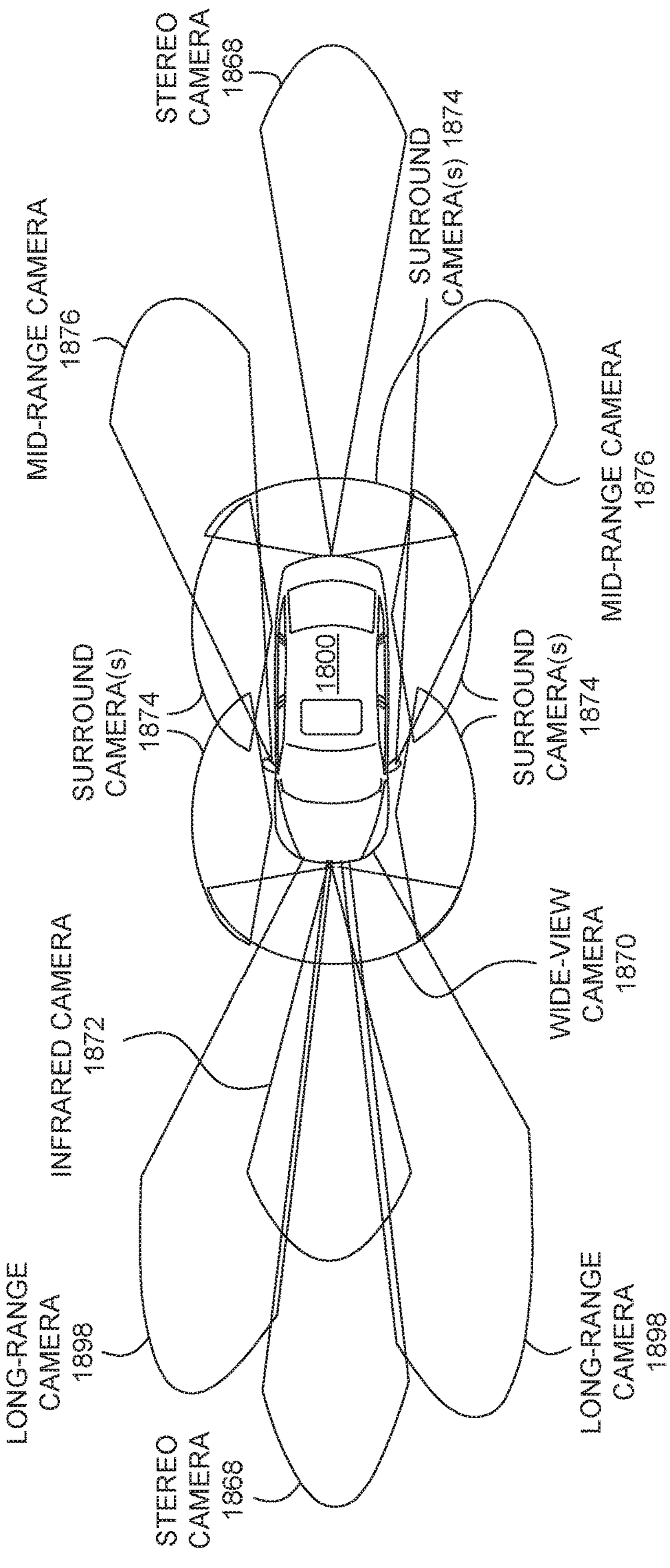
FIG. 18B illustrates an example of camera locations and fields of view for the autonomous vehicle of FIG. 18A, according to at least one embodiment.

FIG. 18B illustrates an example of camera locations and fields of view for autonomous vehicle 1800 of FIG. 18A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1800.

In at least one embodiment, camera types for cameras may include, but are not limited to, digital cameras that may be adapted for use with components and/or systems of vehicle 1800. camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab In at least one embodiment.

In at least one embodiment, cameras with a field of view that include portions of environment in front of vehicle 1800 (e.g., front-facing cameras) may be used for surround view, to help identify forward facing paths and obstacles, as well as aid in, with help of one or more of controllers 1836 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1870 may be used to perceive objects coming into view from periphery (e.g., pedestrians, crossing traffic or bicycles). Although only one wide-view camera 1870 is illustrated in FIG. 18B, in other embodiments, there may be any number (including zero) of wide-view camera(s) 1870 on vehicle 1800. In at least one embodiment, any number of long-range camera(s) 1898 (e.g., a long-view stereo camera pair) may be used for depth-based object detection, especially for objects for which a neural network has not yet been trained. In at least one embodiment, long-range camera(s) 1898 may also be used for object detection and classification, as well as basic object tracking.

In at least one embodiment, any number of stereo camera(s) 1868 may also be included in a front-facing configuration. In at least one embodiment, one or more of stereo camera(s) 1868 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1800, including a distance estimate for all points in image. In at least one embodiment, one or more of stereo camera(s) 1868 may include, without limitation, compact stereo vision sensor(s) that may include, without limitation, two camera lenses (one each on left and right) and an image processing chip that may measure distance from vehicle 1800 to target object and use generated information (e.g., metadata) to activate autonomous emergency braking and lane departure warning functions. In at least one embodiment, other types of stereo camera(s) 1868 may be used in addition to, or alternatively from, those described herein.

In at least one embodiment, cameras with a field of view that include portions of environment to side of vehicle 1800 (e.g., side-view cameras) may be used for surround view, providing information used to create and update occupancy grid, as well as to generate side impact collision warnings. For example, in at least one embodiment, surround camera(s) 1874 (e.g., four surround cameras 1874 as illustrated in FIG. 18B) could be positioned on vehicle 1800. surround camera(s) 1874 may include, without limitation, any number and combination of wide-view camera(s) 1870, fisheye camera(s), 360 degree camera(s), and/or like. For instance, in at least one embodiment, four fisheye cameras may be positioned on front, rear, and sides of vehicle 1800. In at least one embodiment, vehicle 1800 may use three surround camera(s) 1874 (e.g., left, right, and rear), and may leverage one or more other camera(s) (e.g., a forward-facing camera) as a fourth surround-view camera.

In at least one embodiment, cameras with a field of view that include portions of environment to rear of vehicle 1800 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1898 and/or mid-range camera(s) 1876, stereo camera(s) 1868), infrared camera(s) 1872, etc.), as described herein.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 18B for inferencing or predicting operations based, at least in part, on weight parameters calculated using neural network training operations, neural network functions and/or architectures, or neural network use cases described herein.

In at least one embodiment, vehicle 1800 of FIG. 18B includes memory storing computer-readable executable instruction that, as a result of execution, causes one or more processors of vehicle 1800 of FIG. 18B to allocate memory to at least two heterogeneous processing cores in response to performing one or more instructions associated with one or more application programming interfaces (APIs) based, at least in part, on one or more attributes associated with the at least two heterogeneous processing cores. One or more embodiments described elsewhere in this disclosure may be utilized in context of vehicle 1800 of FIG. 18B, such as techniques described in connection with FIGS. 1-17 and 19-43.

Figure 18C:
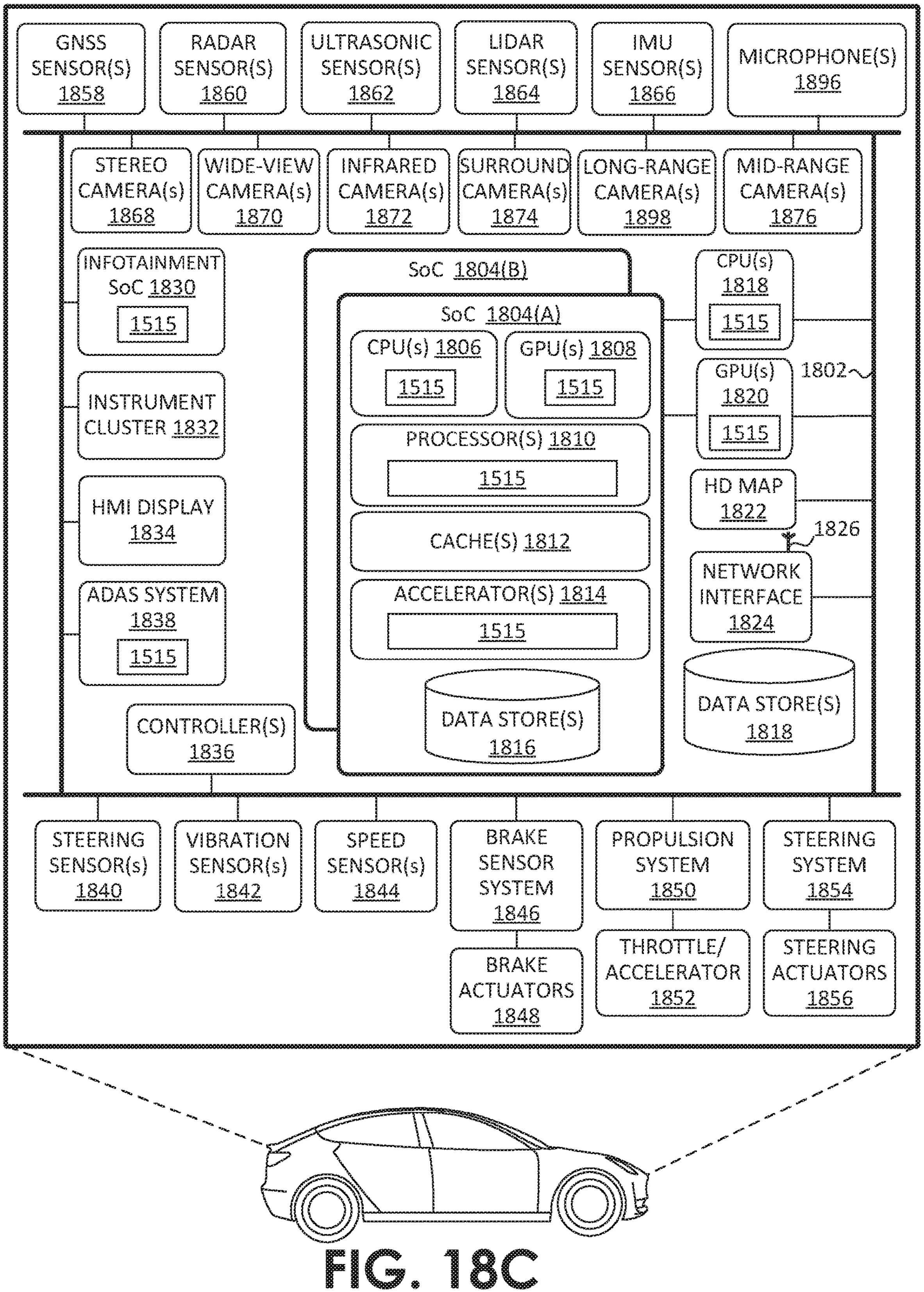
FIG. 18C is a block diagram illustrating an example system architecture for the autonomous vehicle of FIG. 18A, according to at least one embodiment.

FIG. 18C is a block diagram illustrating an example system architecture for autonomous vehicle 1800 of FIG. 18A, according to at least one embodiment. In at least one embodiment, each of components, features, and systems of vehicle 1800 in FIG. 18C are illustrated as being connected via a bus 1802. In at least one embodiment, bus 1802 may include, without limitation, a CAN data interface (alternatively referred to herein as a "CAN bus"). In at least one embodiment, a CAN may be a network inside vehicle 1800 used to aid in control of various features and functionality of vehicle 1800, such as actuation of brakes, acceleration, braking, steering, windshield wipers, etc. In at least one embodiment, bus 1802 may be configured to have dozens or even hundreds of nodes, each with its own unique identifier (e.g., a CAN ID). In at least one embodiment, bus 1802 may be read to find steering wheel angle, ground speed, engine revolutions per minute ("RPMs"), button positions, and/or other vehicle status indicators. In at least one embodiment, bus 1802 may be a CAN bus that is ASIL B compliant.

In at least one embodiment, in addition to, or alternatively from CAN, FlexRay and/or Ethernet may be used. In at least one embodiment, there may be any number of busses 1802, which may include, without limitation, zero or more CAN busses, zero or more FlexRay busses, zero or more Ethernet busses, and/or zero or more other types of busses using a different protocol. In at least one embodiment, two or more busses 1802 may be used to perform different functions, and/or may be used for redundancy. For example, a first bus 1802 may be used for collision avoidance functionality and a second bus 1802 may be used for actuation control. In at least one embodiment, each bus 1802 may communicate with any of components of vehicle 1800, and two or more busses 1802 may communicate with same components. In at least one embodiment, each of any number of system(s) on chip(s) ("SoC(s)") 1804, each of controller(s) 1836, and/or each computer within vehicle may have access to same input data (e.g., inputs from sensors of vehicle 1800), and may be connected to a common bus, such CAN bus.

In at least one embodiment, vehicle 1800 may include one or more controller(s) 1836, such as those described herein with respect to FIG. 18A. controller(s) 1836 may be used for a variety of functions. In at least one embodiment, controller(s) 1836 may be coupled to any of various other components and systems of vehicle 1800, and may be used for control of vehicle 1800, artificial intelligence of vehicle 1800, infotainment for vehicle 1800, and/or like.

In at least one embodiment, vehicle 1800 may include any number of SoCs 1804. Each of SoCs 1804 may include, without limitation, central processing units ("CPU(s)") 1806, graphics processing units ("GPU(s)") 1808, processor(s) 1810, cache(s) 1812, accelerator(s) 1814, data store(s) 1816, and/or other components and features not illustrated. In at least one embodiment, SoC(s) 1804 may be used to control vehicle 1800 in a variety of platforms and systems. For example, in at least one embodiment, SoC(s) 1804 may be combined in a system (e.g., system of vehicle 1800) with a High Definition ("HD") map 1822 which may obtain map refreshes and/or updates via network interface 1824 from one or more servers (not shown in FIG. 18C).

In at least one embodiment, CPU(s) 1806 may include a CPU cluster or CPU complex (alternatively referred to herein as a "CCPLEX"). In at least one embodiment, CPU(s) 1806 may include multiple cores and/or level two ("L2") caches. For instance, in at least one embodiment, CPU(s) 1806 may include eight cores in a coherent multi-processor configuration. In at least one embodiment, CPU(s) 1806 may include four dual-core clusters where each cluster has a dedicated L2 cache (e.g., a 2 MB L2 cache). In at least one embodiment, CPU(s) 1806 (e.g., CCPLEX) may be configured to support simultaneous cluster operation enabling any combination of clusters of CPU(s) 1806 to be active at any given time.

In at least one embodiment, one or more of CPU(s) 1806 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1806 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1808 may include an integrated GPU (alternatively referred to herein as an "iGPU"). In at least one embodiment, GPU(s) 1808 may be programmable and may be efficient for parallel workloads. In at least one embodiment, GPU(s) 1808, in at least one embodiment, may use an enhanced tensor instruction set. In on embodiment, GPU(s) 1808 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1808 may include at least eight streaming microprocessors. In at least one embodiment, GPU(s) 1808 may use compute application programming interface(s) (API(s)). In at least one embodiment, GPU(s) 1808 may use one or more parallel computing platforms and/or programming models (e.g., NVIDIA's parallel computing platform and application programming interface model).

In at least one embodiment, one or more of GPU(s) 1808 may be power-optimized for best performance in automotive and embedded use cases. For example, in on embodiment, GPU(s) 1808 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1808 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1808 may include unified memory technology. In at least one embodiment, address translation services ("ATS") support may be used to allow GPU(s) 1808 to access CPU(s) 1806 page tables directly. In at least one embodiment, embodiment, when GPU(s) 1808 memory management unit ("MMU") experiences a miss, an address translation request may be transmitted to CPU(s) 1806. In response, CPU(s) 1806 may look in its page tables for virtual-to-physical mapping for address and transmits translation back to GPU(s) 1808, in at least one embodiment. In at least one embodiment, unified memory technology may allow a single unified virtual address space for memory of both CPU(s) 1806 and GPU(s) 1808, thereby simplifying GPU(s) 1808 programming and porting of applications to GPU(s) 1808.

In at least one embodiment, GPU(s) 1808 may include any number of access counters that may keep track of frequency of access of GPU(s) 1808 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1804 may include any number of cache(s) 1812, including those described herein. For example, in at least one embodiment, cache(s) 1812 could include a level three ("L3") cache that is available to both CPU(s) 1806 and GPU(s) 1808 (e.g., that is connected both CPU(s) 1806 and GPU(s) 1808). In at least one embodiment, cache(s) 1812 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1804 may include one or more accelerator(s) 1814 (e.g., hardware accelerators, software accelerators, or a combination thereof). In at least one embodiment, SoC(s) 1804 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1808 and to off-load some of tasks of GPU(s) 1808 (e.g., to free up more cycles of GPU(s) 1808 for performing other tasks). In at least one embodiment, accelerator(s) 1814 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1814 (e.g., hardware acceleration cluster) may include a deep learning accelerator(s) ("DLA). DLA(s) may include, without limitation, one or more Tensor processing units ("TPUs) that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1896; a CNN for facial recognition and vehicle owner identification using data from camera sensors; and/or a CNN for security and/or safety related events.

In at least one embodiment, DLA(s) may perform any function of GPU(s) 1808, and by using an inference accelerator, for example, a designer may target either DLA(s) or GPU(s) 1808 for any function. For example, in at least one embodiment, designer may focus processing of CNNs and floating point operations on DLA(s) and leave other functions to GPU(s) 1808 and/or other accelerator(s) 1814.

In at least one embodiment, accelerator(s) 1814 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1838, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1806. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1814 (e.g., hardware acceleration cluster) may include a computer vision network on-chip and static random-access memory ("SRAM"), for providing a high-bandwidth, low latency SRAM for accelerator(s) 1814. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1804 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1814 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1800, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In at least one embodiment in which an automatic emergency braking ("AEB") system is used, false positive detections would cause vehicle to automatically perform emergency braking, which is obviously undesirable. In at least one embodiment, highly confident detections may be considered as triggers for AEB In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1866 that correlates with vehicle 1800 orientation, distance, 3D location estimates of object obtained from neural network and/or other sensors (e.g., LIDAR sensor(s) 1864 or RADAR sensor(s) 1860), among others.

In at least one embodiment, one or more of SoC(s) 1804 may include data store(s) 1816 (e.g., memory). In at least one embodiment, data store(s) 1816 may be on-chip memory of SoC(s) 1804, which may store neural networks to be executed on GPU(s) 1808 and/or DLA. In at least one embodiment, data store(s) 1816 may be large enough in capacity to store multiple instances of neural networks for redundancy and safety. In at least one embodiment, data store(s) 1812 may comprise L2 or L3 cache(s).

In at least one embodiment, one or more of SoC(s) 1804 may include any number of processor(s) 1810 (e.g., embedded processors). processor(s) 1810 may include a boot and power management processor that may be a dedicated processor and subsystem to handle boot power and management functions and related security enforcement. In at least one embodiment, boot and power management processor may be a part of SoC(s) 1804 boot sequence and may provide runtime power management services. In at least one embodiment, boot power and management processor may provide clock and voltage programming, assistance in system low power state transitions, management of SoC(s) 1804 thermals and temperature sensors, and/or management of SoC(s) 1804 power states. In at least one embodiment, each temperature sensor may be implemented as a ring-oscillator whose output frequency is proportional to temperature, and SoC(s) 1804 may use ring-oscillators to detect temperatures of CPU(s) 1806, GPU(s) 1808, and/or accelerator(s) 1814. In at least one embodiment, if temperatures are determined to exceed a threshold, then boot and power management processor may enter a temperature fault routine and put SoC(s) 1804 into a lower power state and/or put vehicle 1800 into a chauffeur to safe stop mode (e.g., bring vehicle 1800 to a safe stop).

In at least one embodiment, processor(s) 1810 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1810 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1810 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1810 may further include a real-time camera engine that may include, without limitation, a dedicated processor subsystem for handling real-time camera management. In at least one embodiment, processor(s) 1810 may further include a high-dynamic range signal processor that may include, without limitation, an image signal processor that is a hardware engine that is part of camera processing pipeline.

In at least one embodiment, processor(s) 1810 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1870, surround camera(s) 1874, and/or on in-cabin monitoring camera sensor(s). In at least one embodiment, in-cabin monitoring camera sensor(s) are preferably monitored by a neural network running on another instance of SoC 1804, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1808 are not required to continuously render new surfaces. In at least one embodiment, when GPU(s) 1808 are powered on and active doing 3D rendering, video image compositor may be used to offload GPU(s) 1808 to improve performance and responsiveness.

In at least one embodiment, one or more of SoC(s) 1804 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1804 may further include an input/output controller(s) that may be controlled by software and may be used for receiving I/O signals that are uncommitted to a specific role.

In at least one embodiment, one or more of SoC(s) 1804 may further include a broad range of peripheral interfaces to enable communication with peripherals, audio encoders/decoders ("codecs"), power management, and/or other devices. SoC(s) 1804 may be used to process data from cameras (e.g., connected over Gigabit Multimedia Serial Link and Ethernet), sensors (e.g., LIDAR sensor(s) 1864, RADAR sensor(s) 1860, etc. that may be connected over Ethernet), data from bus 1802 (e.g., speed of vehicle 1800, steering wheel position, etc.), data from GNSS sensor(s) 1858 (e.g., connected over Ethernet or CAN bus), etc. In at least one embodiment, one or more of SoC(s) 1804 may further include dedicated high-performance mass storage controllers that may include their own DMA engines, and that may be used to free CPU(s) 1806 from routine data management tasks.

In at least one embodiment, SoC(s) 1804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1804 may be faster, more reliable, and even more energy-efficient and space-efficient than conventional systems. For example, in at least one embodiment, accelerator(s) 1814, when combined with CPU(s) 1806, GPU(s) 1808, and data store(s) 1816, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1820) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1808.

In at least one embodiment, a CNN for facial recognition and vehicle owner identification may use data from camera sensors to identify presence of an authorized driver and/or owner of vehicle 1800. In at least one embodiment, an always on sensor processing engine may be used to unlock vehicle when owner approaches driver door and turn on lights, and, in security mode, to disable vehicle when owner leaves vehicle. In this way, SoC(s) 1804 provide for security against theft and/or carjacking.

In at least one embodiment, a CNN for emergency vehicle detection and identification may use data from microphones 1896 to detect and identify emergency vehicle sirens. In at least one embodiment, SoC(s) 1804 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1858. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1862, until emergency vehicle(s) passes.

In at least one embodiment, vehicle 1800 may include CPU(s) 1818 (e.g., discrete CPU(s), or dCPU(s)), that may be coupled to SoC(s) 1804 via a high-speed interconnect (e.g., PCIe). In at least one embodiment, CPU(s) 1818 may include an X86 processor, for example. CPU(s) 1818 may be used to perform any of a variety of functions, including arbitrating potentially inconsistent results between ADAS sensors and SoC(s) 1804, and/or monitoring status and health of controller(s) 1836 and/or an infotainment system on a chip ("infotainment SoC") 1830, for example.

In at least one embodiment, vehicle 1800 may include GPU(s) 1820 (e.g., discrete GPU(s), or dGPU(s)), that may be coupled to SoC(s) 1804 via a high-speed interconnect (e.g., NVIDIA's NVLINK). In at least one embodiment, GPU(s) 1820 may provide additional artificial intelligence functionality, such as by executing redundant and/or different neural networks, and may be used to train and/or update neural networks based at least in part on input (e.g., sensor data) from sensors of vehicle 1800.

In at least one embodiment, vehicle 1800 may further include network interface 1824 which may include, without limitation, wireless antenna(s) 1826 (e.g., one or more wireless antennas 1826 for different communication protocols, such as a cellular antenna, a Bluetooth antenna, etc.). In at least one embodiment, network interface 1824 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 180 and other vehicle and/or an indirect link may be established (e.g., across networks and over Internet). In at least one embodiment, direct links may be provided using a vehicle-to-vehicle communication link. vehicle-to-vehicle communication link may provide vehicle 1800 information about vehicles in proximity to vehicle 1800 (e.g., vehicles in front of, on side of, and/or behind vehicle 1800). In at least one embodiment, aforementioned functionality may be part of a cooperative adaptive cruise control functionality of vehicle 1800.

In at least one embodiment, network interface 1824 may include an SoC that provides modulation and demodulation functionality and enables controller(s) 1836 to communicate over wireless networks. In at least one embodiment, network interface 1824 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1800 may further include data store(s) 1828 which may include, without limitation, off-chip (e.g., off SoC(s) 1804) storage. In at least one embodiment, data store(s) 1828 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1800 may further include GNSS sensor(s) 1858 (e.g., GPS and/or assisted GPS sensors), to assist in mapping, perception, occupancy grid generation, and/or path planning functions. In at least one embodiment, any number of GNSS sensor(s) 1858 may be used, including, for example and without limitation, a GPS using a USB connector with an Ethernet to Serial (e.g., RS-232) bridge.

In at least one embodiment, vehicle 1800 may further include RADAR sensor(s) 1860. RADAR sensor(s) 1860 may be used by vehicle 1800 for long-range vehicle detection, even in darkness and/or severe weather conditions. In at least one embodiment, RADAR functional safety levels may be ASIL B. RADAR sensor(s) 1860 may use CAN and/or bus 1802 (e.g., to transmit data generated by RADAR sensor(s) 1860) for control and to access object tracking data, with access to Ethernet to access raw data in some examples. In at least one embodiment, wide variety of RADAR sensor types may be used. For example, and without limitation, RADAR sensor(s) 1860 may be suitable for front, rear, and side RADAR use. In at least one embodiment, one or more of RADAR sensors(s) 1860 are Pulse Doppler RADAR sensor(s).

In at least one embodiment, RADAR sensor(s) 1860 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1860 may help in distinguishing between static and moving objects, and may be used by ADAS system 1838 for emergency brake assist and forward collision warning. sensors 1860(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1800 surroundings at higher speeds with minimal interference from traffic in adjacent lanes. In at least one embodiment, other two antennae may expand field of view, making it possible to quickly detect vehicles entering or leaving vehicle's 1800 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1860 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1838 for blind spot detection and/or lane change assist.

In at least one embodiment, vehicle 1800 may further include ultrasonic sensor(s) 1862. ultrasonic sensor(s) 1862, which may be positioned at front, back, and/or sides of vehicle 1800, may be used for park assist and/or to create and update an occupancy grid. In at least one embodiment, a wide variety of ultrasonic sensor(s) 1862 may be used, and different ultrasonic sensor(s) 1862 may be used for different ranges of detection (e.g., 2.5*m*, 4*m*). In at least one embodiment, ultrasonic sensor(s) 1862 may operate at functional safety levels of ASIL B.

In at least one embodiment, vehicle 1800 may include LIDAR sensor(s) 1864. LIDAR sensor(s) 1864 may be used for object and pedestrian detection, emergency braking, collision avoidance, and/or other functions. In at least one embodiment, LIDAR sensor(s) 1864 may be functional safety level ASIL B. In at least one embodiment, vehicle 1800 may include multiple LIDAR sensors 1864 (e.g., two, four, six, etc.) that may use Ethernet (e.g., to provide data to a Gigabit Ethernet switch).

In at least one embodiment, LIDAR sensor(s) 1864 may be capable of providing a list of objects and their distances for a 360-degree field of view. In at least one embodiment, commercially available LIDAR sensor(s) 1864 may have an advertised range of approximately 100 m, with an accuracy of 2 cm-3 cm, and with support for a 100 Mbps Ethernet connection, for example. In at least one embodiment, one or more non-protruding LIDAR sensors 1864 may be used. In such an embodiment, LIDAR sensor(s) 1864 may be implemented as a small device that may be embedded into front, rear, sides, and/or corners of vehicle 1800. In at least one embodiment, LIDAR sensor(s) 1864, in such an embodiment, may provide up to a 120-degree horizontal and 35-degree vertical field-of-view, with a 200 m range even for low-reflectivity objects. In at least one embodiment, front-mounted LIDAR sensor(s) 1864 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1800 up to approximately 200 m. In at least one embodiment, a flash LIDAR unit includes, without limitation, a receptor, which records laser pulse transit time and reflected light on each pixel, which in turn corresponds to range from vehicle 1800 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1800. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1866. In at least one embodiment, IMU sensor(s) 1866 may be located at a center of rear axle of vehicle 1800, in at least one embodiment. In at least one embodiment, IMU sensor(s) 1866 may include, for example and without limitation, accelerometer(s), magnetometer(s), gyroscope(s), magnetic compass(es), and/or other sensor types. In at least one embodiment, such as in six-axis applications, IMU sensor(s) 1866 may include, without limitation, accelerometers and gyroscopes. In at least one embodiment, such as in nine-axis applications, IMU sensor (s) 1866 may include, without limitation, accelerometers, gyroscopes, and magnetometers.

In at least one embodiment, IMU sensor(s) 1866 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1866 may enable vehicle 1800 to estimate heading without requiring input from a magnetic sensor by directly observing and correlating changes in velocity from GPS to IMU sensor(s) 1866. In at least one embodiment, IMU sensor(s) 1866 and GNSS sensor(s) 1858 may be combined in a single integrated unit.

In at least one embodiment, vehicle 1800 may include microphone(s) 1896 placed in and/or around vehicle 1800. In at least one embodiment, microphone(s) 1896 may be used for emergency vehicle detection and identification, among other things.

In at least one embodiment, vehicle 1800 may further include any number of camera types, including stereo camera(s) 1868, wide-view camera(s) 1870, infrared camera(s) 1872, surround camera(s) 1874, long-range camera(s) 1898, mid-range camera(s) 1876, and/or other camera types. In at least one embodiment, cameras may be used to capture image data around an entire periphery of vehicle 1800. In at least one embodiment, types of cameras used depends vehicle 1800. In at least one embodiment, any combination of camera types may be used to provide necessary coverage around vehicle 1800. In at least one embodiment, number of cameras may differ depending on embodiment. For example, in at least one embodiment, vehicle 1800 could include six cameras, seven cameras, ten cameras, twelve cameras, or another number of cameras. cameras may support, as an example and without limitation, Gigabit Multimedia Serial Link ("GMSL") and/or Gigabit Ethernet. In at least one embodiment, each of camera(s) is described with more detail previously herein with respect to FIG. 18A and FIG. 18B.

In at least one embodiment, vehicle 1800 may further include vibration sensor(s) 1842. vibration sensor(s) 1842 may measure vibrations of components of vehicle 1800, such as axle(s). For example, in at least one embodiment, changes in vibrations may indicate a change in road surfaces. In at least one embodiment, when two or more vibration sensors 1842 are used, differences between vibrations may be used to determine friction or slippage of road surface (e.g., when difference in vibration is between a power-driven axle and a freely rotating axle).

In at least one embodiment, vehicle 1800 may include ADAS system 1838. ADAS system 1838 may include, without limitation, an SoC, in some examples. In at least one embodiment, ADAS system 1838 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1860, LIDAR sensor(s) 1864, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1800 and automatically adjust speed of vehicle 1800 to maintain a safe distance from vehicles ahead. In at least one embodiment, lateral ACC system performs distance keeping, and advises vehicle 1800 to change lanes when necessary. In at least one embodiment, lateral ACC is related to other ADAS applications such as LC and CW.

In at least one embodiment, CACC system uses information from other vehicles that may be received via network interface 1824 and/or wireless antenna(s) 1826 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1800), while I2V communication concept provides information about traffic further ahead. In at least one embodiment, CACC system may include either or both I2V and V2V information sources. In at least one embodiment, given information of vehicles ahead of vehicle 1800, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1860, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1860, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1800 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1800 if vehicle 1800 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1860, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1800 is backing up. In at least one embodiment, RCTW system includes AEB system to ensure that vehicle brakes are applied to avoid a crash. In at least one embodiment, RCTW system may use one or more rear-facing RADAR sensor(s) 1860, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1800 itself decides, in case of conflicting results, whether to heed result from a primary computer or a secondary computer (e.g., first controller 1836 or second controller 1836). For example, in at least one embodiment, ADAS system 1838 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1838 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1804.

In at least one embodiment, ADAS system 1838 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1838 may be fed into primary computer's perception block and/or primary computer's dynamic driving task block. For example, in at least one embodiment, if ADAS system 1838 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1800 may further include infotainment SoC 1830 (e.g., an in-vehicle infotainment system (IVI)). Although illustrated and described as an SoC, infotainment system 1830, in at least one embodiment, may not be an SoC, and may include, without limitation, two or more discrete components. In at least one embodiment, infotainment SoC 1830 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1800. For example, infotainment SoC 1830 could include radios, disk players, navigation systems, video players, USB and Bluetooth connectivity, carputers, in-car entertainment, WiFi, steering wheel audio controls, hands free voice control, a heads-up display ("HUD"), HMI display 1834, a telematics device, a control panel (e.g., for controlling and/or interacting with various components, features, and/or systems), and/or other components. In at least one embodiment, infotainment SoC 1830 may further be used to provide information (e.g., visual and/or audible) to user(s) of vehicle, such as information from ADAS system 1838, autonomous driving information such as planned vehicle maneuvers, trajectories, surrounding environment information (e.g., intersection information, vehicle information, road information, etc.), and/or other information.

In at least one embodiment, infotainment SoC 1830 may include any amount and type of GPU functionality. In at least one embodiment, infotainment SoC 1830 may communicate over bus 1802 (e.g., CAN bus, Ethernet, etc.) with other devices, systems, and/or components of vehicle 1800. In at least one embodiment, infotainment SoC 1830 may be coupled to a supervisory MCU such that GPU of infotainment system may perform some self-driving functions in event that primary controller(s) 1836 (e.g., primary and/or backup computers of vehicle 1800) fail. In at least one embodiment, infotainment SoC 1830 may put vehicle 1800 into a chauffeur to safe stop mode, as described herein.

In at least one embodiment, vehicle 1800 may further include instrument cluster 1832 (e.g., a digital dash, an electronic instrument cluster, a digital instrument panel, etc.). instrument cluster 1832 may include, without limitation, a controller and/or supercomputer (e.g., a discrete controller or supercomputer). In at least one embodiment, instrument cluster 1832 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1830 and instrument cluster 1832. In at least one embodiment, instrument cluster 1832 may be included as part of infotainment SoC 1830, or vice versa.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 18C for inferencing or predicting operations based, at least in part, on weight parameters calculated using neural network training operations, neural network functions and/or architectures, or neural network use cases described herein.

In at least one embodiment, components, features, and systems of vehicle 1800 in FIG. 18C include memory storing computer-readable instructions that, if executed, cause one or more processors of components, features, and systems of vehicle 1800 in FIG. 18C to allocate memory to at least two heterogeneous processing cores in response to performing one or more instructions associated with one or more application programming interfaces (APIs) based, at least in part, on one or more attributes associated with the at least two heterogeneous processing cores. One or more embodiments described elsewhere in this disclosure may be utilized in context of vehicle 1800 of FIG. 18C, such as techniques described in connection with FIGS. 1-17 and 19-43.

Figure 18D:
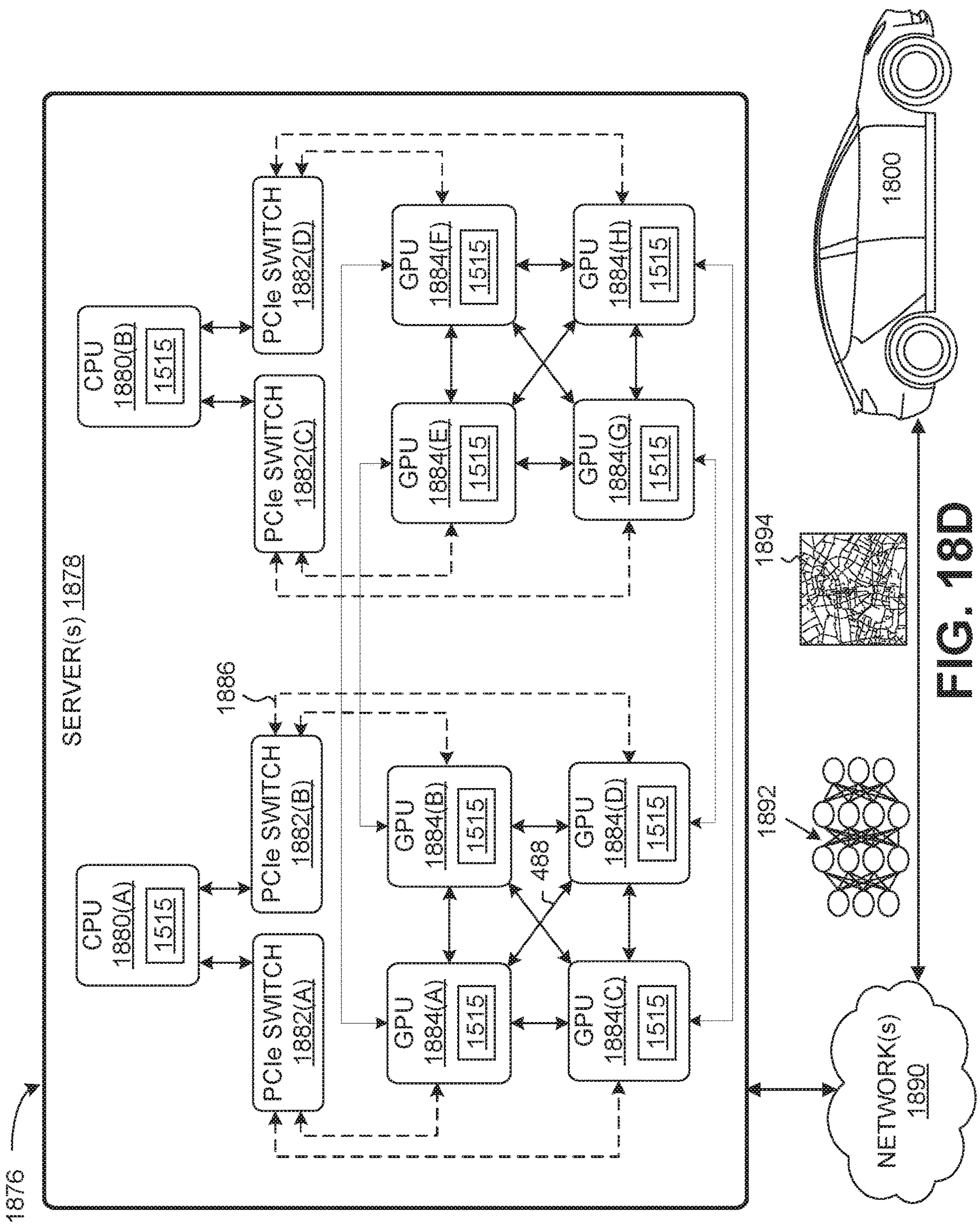
FIG. 18D is a diagram illustrating a system for communication between cloud-based server(s) and the autonomous vehicle of FIG. 18A, according to at least one embodiment.

FIG. 18D is a diagram of a system 1876 for communication between cloud-based server(s) and autonomous vehicle 1800 of FIG. 18A, according to at least one embodiment. In at least one embodiment, system 1876 may include, without limitation, server(s) 1878, network(s) 1890, and any number and type of vehicles, including vehicle 1800. server(s) 1878 may include, without limitation, a plurality of GPUs 1884(A)-1884(H) (collectively referred to herein as GPUs 1884), PCIe switches 1882(A)-1882(H) (collectively referred to herein as PCIe switches 1882), and/or CPUs 1880(A)-1880(B) (collectively referred to herein as CPUs 1880). GPUs 1884, CPUs 1880, and PCIe switches 1882 may be interconnected with high-speed interconnects such as, for example and without limitation, NVLink interfaces 1888 developed by NVIDIA and/or PCIe connections 1886. In at least one embodiment, GPUs 1884 are connected via an NVLink and/or NVSwitch SoC and GPUs 1884 and PCIe switches 1882 are connected via PCIe interconnects. In at least one embodiment, although eight GPUs 1884, two CPUs 1880, and four PCIe switches 1882 are illustrated, this is not intended to be limiting. In at least one embodiment, each of server(s) 1878 may include, without limitation, any number of GPUs 1884, CPUs 1880, and/or PCIe switches 1882, in any combination. For example, in at least one embodiment, server(s) 1878 could each include eight, sixteen, thirty-two, and/or more GPUs 1884.

In at least one embodiment, server(s) 1878 may receive, over network(s) 1890 and from vehicles, image data representative of images showing unexpected or changed road conditions, such as recently commenced road-work. In at least one embodiment, server(s) 1878 may transmit, over network(s) 1890 and to vehicles, neural networks 1892, updated neural networks 1892, and/or map information 1894, including, without limitation, information regarding traffic and road conditions. In at least one embodiment, updates to map information 1894 may include, without limitation, updates for HD map 1822, such as information regarding construction sites, potholes, detours, flooding, and/or other obstructions. In at least one embodiment, neural networks 1892, updated neural networks 1892, and/or map information 1894 may have resulted from new training and/or experiences represented in data received from any number of vehicles in environment, and/or based at least in part on training performed at a data center (e.g., using server(s) 1878 and/or other servers).

In at least one embodiment, server(s) 1878 may be used to train machine learning models (e.g., neural networks) based at least in part on training data. training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1890, and/or machine learning models may be used by server(s) 1878 to remotely monitor vehicles.

In at least one embodiment, server(s) 1878 may receive data from vehicles and apply data to up-to-date real-time neural networks for real-time intelligent inferencing. In at least one embodiment, server(s) 1878 may include deep-learning supercomputers and/or dedicated AI computers powered by GPU(s) 1884, such as a DGX and DGX Station machines developed by NVIDIA. However, in at least one embodiment, server(s) 1878 may include deep learning infrastructure that use CPU-powered data centers.

In at least one embodiment, deep-learning infrastructure of server(s) 1878 may be capable of fast, real-time inferencing, and may use that capability to evaluate and verify health of processors, software, and/or associated hardware in vehicle 1800. For example, in at least one embodiment, deep-learning infrastructure may receive periodic updates from vehicle 1800, such as a sequence of images and/or objects that vehicle 1800 has located in that sequence of images (e.g., via computer vision and/or other machine learning object classification techniques). In at least one embodiment, deep-learning infrastructure may run its own neural network to identify objects and compare them with objects identified by vehicle 1800 and, if results do not match and deep-learning infrastructure concludes that AI in vehicle 1800 is malfunctioning, then server(s) 1878 may transmit a signal to vehicle 1800 instructing a fail-safe computer of vehicle 1800 to assume control, notify passengers, and complete a safe parking maneuver.

In at least one embodiment, server(s) 1878 may include GPU(s) 1884 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1515 are used to perform one or more embodiments. Details regarding hardware structure(x) 1515 are provided herein in conjunction with FIGS. 15A and/or 15B.

Computer Systems

Figure 19:
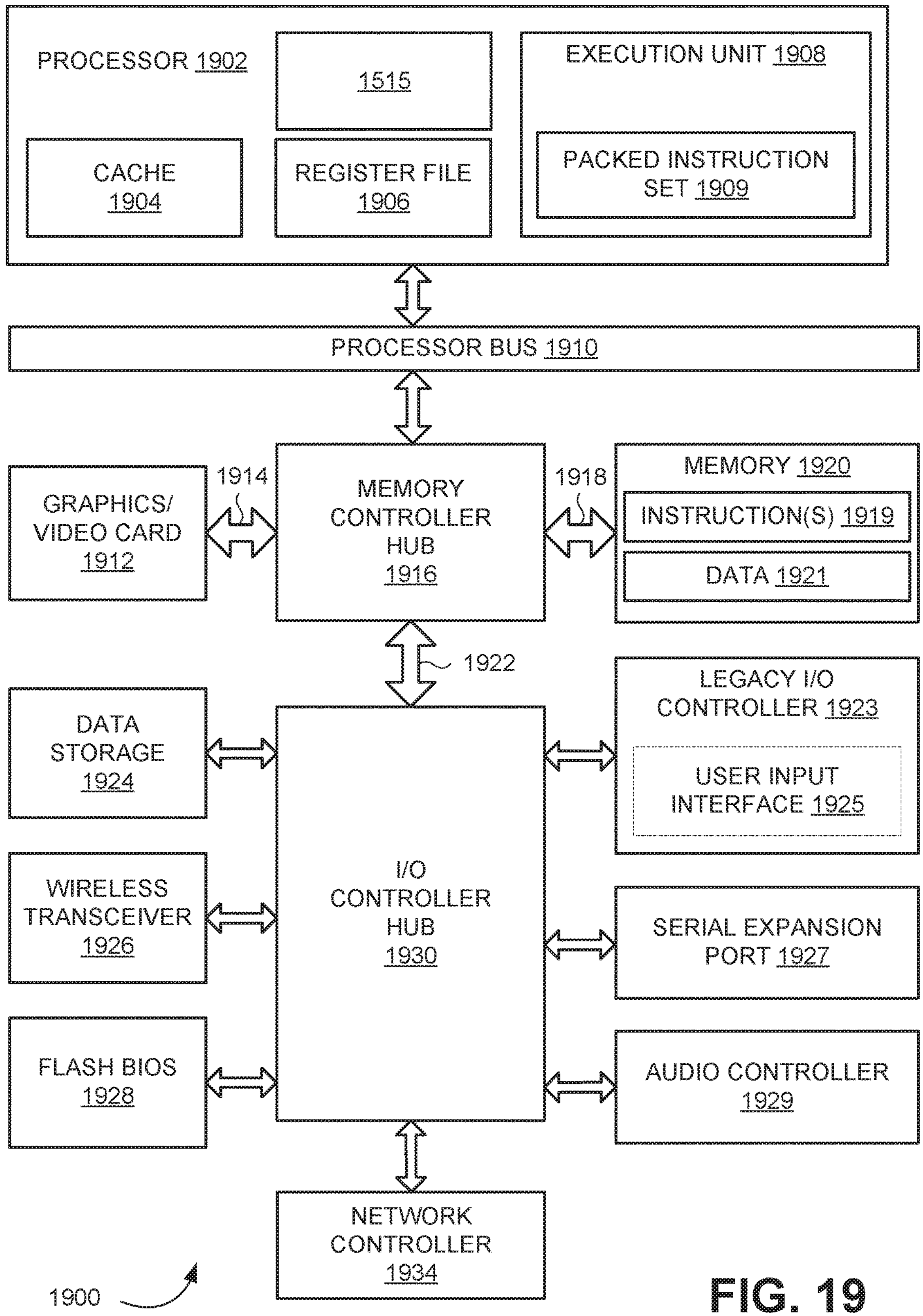
FIG. 19 is a block diagram illustrating a computer system, according to at least one embodiment.

FIG. 19 is a block diagram illustrating an exemplary computer system, which may be a system with interconnected devices and components, a system-on-a-chip (SOC) or some combination thereof 1900 formed with a processor that may include execution units to execute an instruction, according to at least one embodiment. In at least one embodiment, computer system 1900 may include, without limitation, a component, such as a processor 1902 to employ execution units including logic to perform algorithms for process data, in accordance with present disclosure, such as in embodiment described herein. In at least one embodiment, computer system 1900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1900 may include, without limitation, processor 1902 that may include, without limitation, one or more execution units 1908 to perform machine learning model training and/or inferencing according to techniques described herein. In at least one embodiment, system 19 is a single processor desktop or server system, but in another embodiment system 19 may be a multiprocessor system. In at least one embodiment, processor 1902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1902 may be coupled to a processor bus 1910 that may transmit data signals between processor 1902 and other components in computer system 1900.

In at least one embodiment, processor 1902 may include, without limitation, a Level 1 ("L1") internal cache memory ("cache") 1904. In at least one embodiment, processor 1902 may have a single internal cache or multiple levels of internal cache. In at least one embodiment, cache memory may reside external to processor 1902. Other embodiments may also include a combination of both internal and external caches depending on particular implementation and needs. In at least one embodiment, register file 1906 may store different types of data in various registers including, without limitation, integer registers, floating point registers, status registers, and instruction pointer register.

In at least one embodiment, execution unit 1908, including, without limitation, logic to perform integer and floating point operations, also resides in processor 1902. processor 1902 may also include a microcode ("ucode") read only memory ("ROM") that stores microcode for certain macro instructions. In at least one embodiment, execution unit 1908 may include logic to handle a packed instruction set 1909. In at least one embodiment, by including packed instruction set 1909 in instruction set of a general-purpose processor 1902, along with associated circuitry to execute instructions, operations used by many multimedia applications may be performed using packed data in a general-purpose processor 1902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1908 may also be used in microcontrollers, embedded processors, graphics devices, DSPs, and other types of logic circuits. In at least one embodiment, computer system 1900 may include, without limitation, a memory 1920. In at least one embodiment, memory 1920 may be implemented as a Dynamic Random Access Memory ("DRAM") device, a Static Random Access Memory ("SRAM") device, flash memory device, or other memory device. memory 1920 may store instruction(s) 1919 and/or data 1921 represented by data signals that may be executed by processor 1902.

In at least one embodiment, system logic chip may be coupled to processor bus 1910 and memory 1920. In at least one embodiment, system logic chip may include, without limitation, a memory controller hub ("MCH") 1916, and processor 1902 may communicate with MCH 1916 via processor bus 1910. In at least one embodiment, MCH 1916 may provide a high bandwidth memory path 1918 to memory 1920 for instruction and data storage and for storage of graphics commands, data and textures. In at least one embodiment, MCH 1916 may direct data signals between processor 1902, memory 1920, and other components in computer system 1900 and to bridge data signals between processor bus 1910, memory 1920, and a system I/O 1922. In at least one embodiment, system logic chip may provide a graphics port for coupling to a graphics controller. In at least one embodiment, MCH 1916 may be coupled to memory 1920 through a high bandwidth memory path 1918 and graphics/video card 1912 may be coupled to MCH 1916 through an Accelerated Graphics Port ("AGP") interconnect 1914.

In at least one embodiment, computer system 1900 may use system I/O 1922 that is a proprietary hub interface bus to couple MCH 1916 to I/O controller hub ("ICH") 1930. In at least one embodiment, ICH 1930 may provide direct connections to some I/O devices via a local I/O bus. In at least one embodiment, local I/O bus may include, without limitation, a high-speed I/O bus for connecting peripherals to memory 1920, chipset, and processor 1902. Examples may include, without limitation, an audio controller 1929, a firmware hub ("flash BIOS") 1928, a wireless transceiver 1926, a data storage 1924, a legacy I/O controller 1923 containing user input and keyboard interfaces, a serial expansion port 1927, such as Universal Serial Bus ("USB"), and a network controller 1934. data storage 1924 may comprise a hard disk drive, a floppy disk drive, a CD-ROM device, a flash memory device, or other mass storage device.

In at least one embodiment, FIG. 19 illustrates a system, which includes interconnected hardware devices or "chips", whereas in other embodiments, FIG. 19 may illustrate an exemplary System on a Chip ("SoC"). In at least one embodiment, devices illustrated in FIG. 19 may be interconnected with proprietary interconnects, standardized interconnects (e.g., PCIe) or some combination thereof. In at least one embodiment, one or more components of system 1900 are interconnected using compute express link (CXL) interconnects.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 19 for inferencing or predicting operations based, at least in part, on weight parameters calculated using neural network training operations, neural network functions and/or architectures, or neural network use cases described herein.

In at least one embodiment, computer system 1900 includes memory storing computer-readable executable instruction that, as a result of execution, causes one or more processors to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, computer system 1900 utilizes computing resources (e.g., CPUs, ASICs, GPUs, FPGAs) to implement inferencing and/or training logic 1515 to perform inferencing and/or training operations associated with one or more embodiments. Computer system 1900 may be utilized to implement one or more embodiments described elsewhere in this disclosure, such as those described in connection with FIGS. 1-18 and 20-43.

Figure 20:
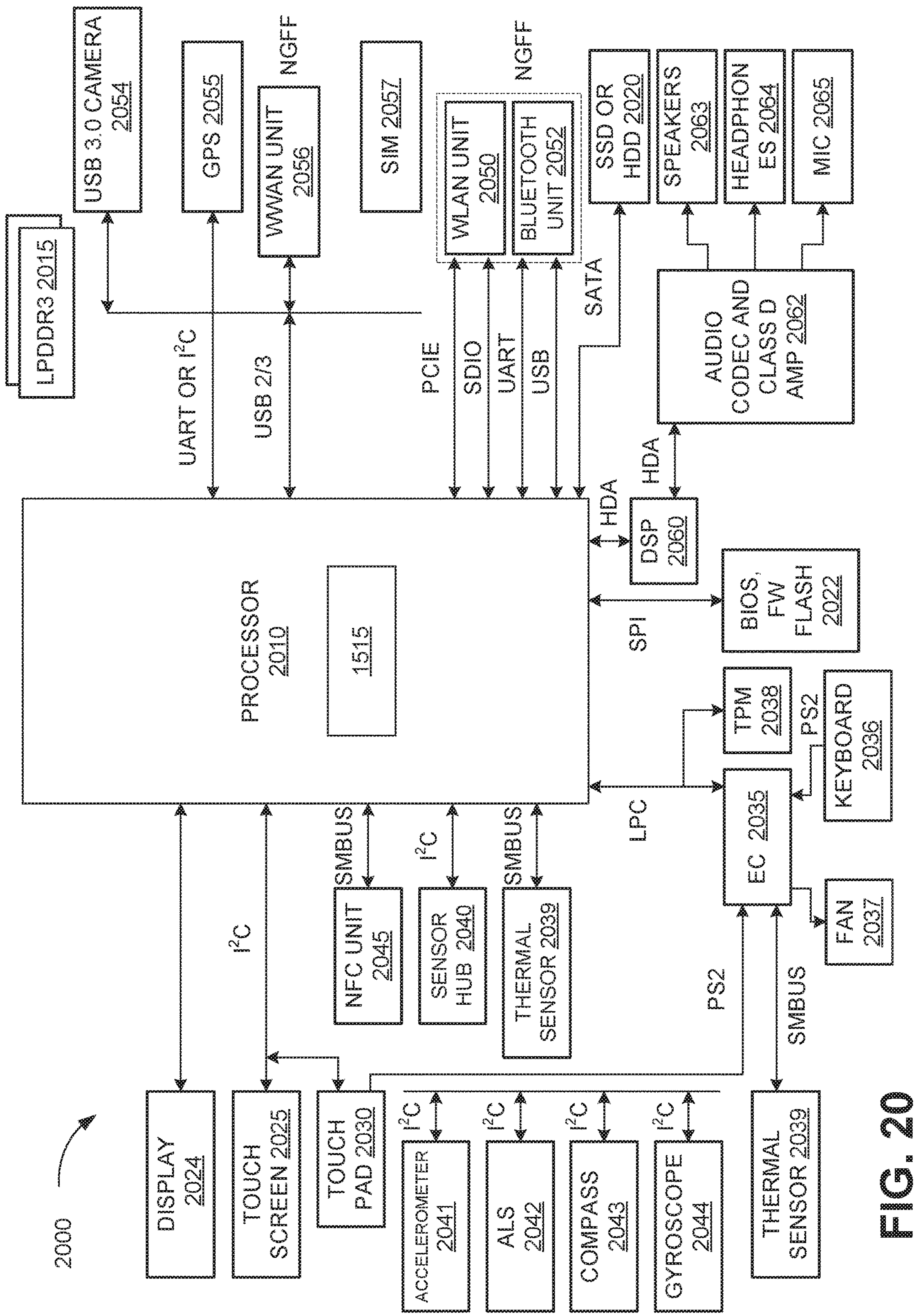
FIG. 20 is a block diagram illustrating computer system, according to at least one embodiment.

FIG. 20 is a block diagram illustrating an electronic device 2000 for utilizing a processor 2010, according to at least one embodiment. In at least one embodiment, electronic device 2000 may be, for example and without limitation, a notebook, a tower server, a rack server, a blade server, a laptop, a desktop, a tablet, a mobile device, a phone, an embedded computer, or any other suitable electronic device.

In at least one embodiment, system 2000 may include, without limitation, processor 2010 communicatively coupled to any suitable number or kind of components, peripherals, modules, or devices. In at least one embodiment, processor 2010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 20 illustrates a system, which includes interconnected hardware devices or "chips", whereas in other embodiments, FIG. 20 may illustrate an exemplary System on a Chip ("SoC"). In at least one embodiment, devices illustrated in FIG. 20 may be interconnected with proprietary interconnects, standardized interconnects (e.g., PCIe) or some combination thereof. In at least one embodiment, one or more components of FIG. 20 are interconnected using compute express link (CXL) interconnects.

In at least one embodiment, FIG. 20 may include a display 2024, a touch screen 2025, a touch pad 2030, a Near Field Communications unit ("NFC") 2045, a sensor hub 2040, a thermal sensor 2046, an Express Chipset ("EC") 2035, a Trusted Platform Module ("TPM") 2038, BIOS/firmware/flash memory ("BIOS, FW Flash") 2022, a DSP 2060, a drive "SSD or HDD") 2020 such as a Solid State Disk ("SSD") or a Hard Disk Drive ("HDD"), a wireless local area network unit ("WLAN") 2050, a Bluetooth unit 2052, a Wireless Wide Area Network unit ("WWAN") 2056, a Global Positioning System (GPS) 2055, a camera ("USB 3.0 camera") 2054 such as a USB 3.0 camera, or a Low Power Double Data Rate ("LPDDR") memory unit ("LPDDR3") 2015 implemented in, for example, LPDDR3 standard. These components may each be implemented in any suitable manner.

In at least one embodiment, other components may be communicatively coupled to processor 2010 through components discussed above. In at least one embodiment, an accelerometer 2041, Ambient Light Sensor ("ALS") 2042, compass 2043, and a gyroscope 2044 may be communicatively coupled to sensor hub 2040. In at least one embodiment, thermal sensor 2039, a fan 2037, a keyboard 2046, and a touch pad 2030 may be communicatively coupled to EC 2035. In at least one embodiment, speaker 2063, a headphones 2064, and a microphone ("mic") 2065 may be communicatively coupled to an audio unit ("audio codec and class d amp") 2064, which may in turn be communicatively coupled to DSP 2060. In at least one embodiment, audio unit 2064 may include, for example and without limitation, an audio coder/decoder ("codec") and a class D amplifier. In at least one embodiment, SIM card ("SIM") 2057 may be communicatively coupled to WWAN unit 2056. In at least one embodiment, components such as WLAN unit 2050 and Bluetooth unit 2052, as well as WWAN unit 2056 may be implemented in a Next Generation Form Factor ("NGFF").

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 20 for inferencing or predicting operations based, at least in part, on weight parameters calculated using neural network training operations, neural network functions and/or architectures, or neural network use cases described herein.

In at least one embodiment, electronic device 2000 includes memory storing computer-readable executable instruction that, as a result of execution, causes one or more processors to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, electronic device 2000 utilizes computing resources (e.g., CPUs, ASICs, GPUs, FPGAs) to implement inferencing and/or training logic 1515 to perform inferencing and/or training operations associated with one or more embodiments. Electronic device 2000 may be utilized to implement one or more embodiments described elsewhere in this disclosure, such as those described in connection with FIGS. 1-19 and 21-43.

Figure 21:
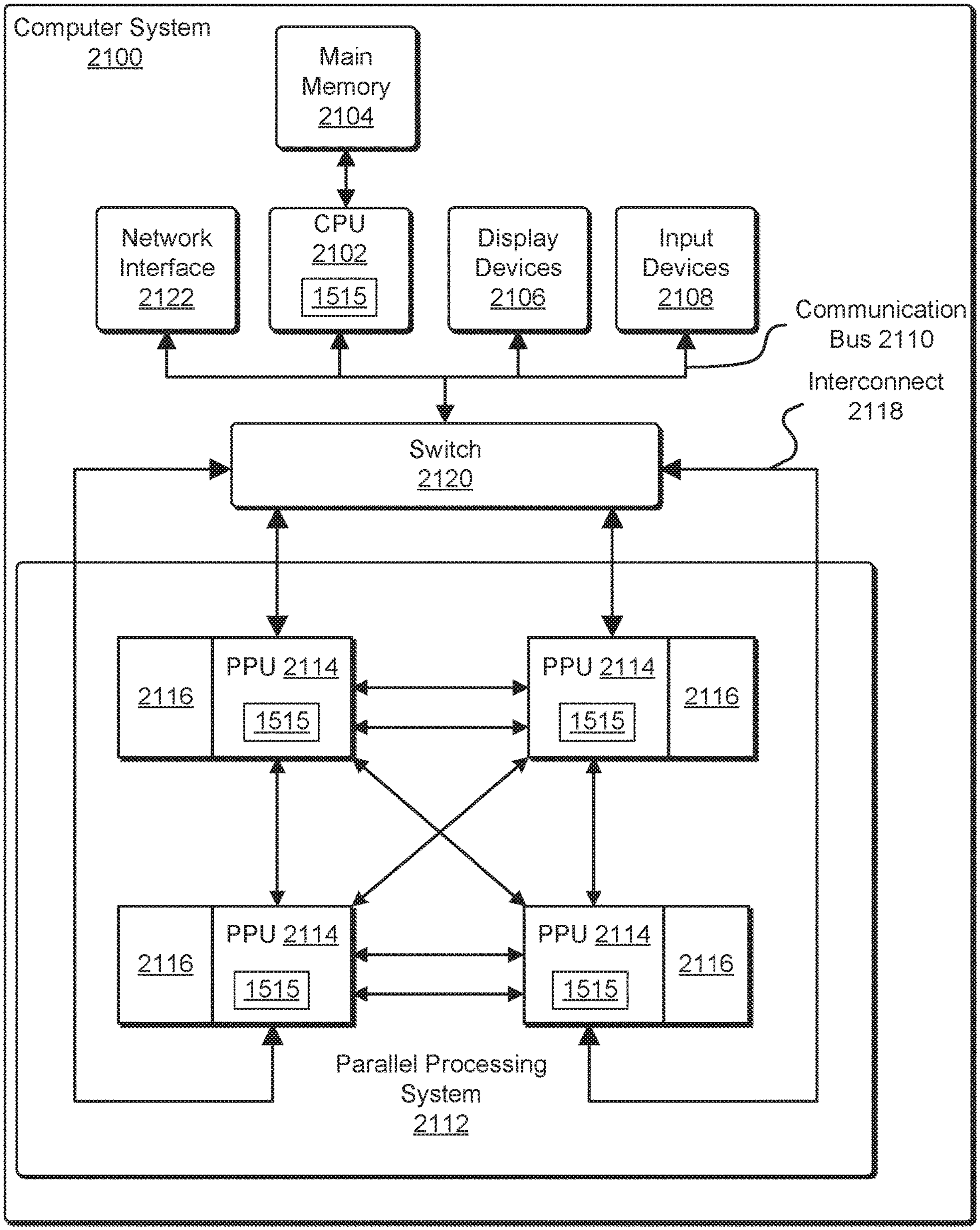
FIG. 21 illustrates a computer system, according to at least one embodiment.

FIG. 21 illustrates a computer system 2100, according to at least one embodiment. In at least one embodiment, computer system 2100 is configured to implement various processes and methods described throughout this disclosure.

In at least one embodiment, computer system 2100 comprises, without limitation, at least one central processing unit ("CPU") 2102 that is connected to a communication bus 2110 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2100 includes, without limitation, a main memory 2104 and control logic (e.g., implemented as hardware, software, or a combination thereof) and data are stored in main memory 2104 which may take form of random access memory ("RAM"). In at least one embodiment, a network interface subsystem ("network interface") 2122 provides an interface to other computing devices and networks for receiving data from and transmitting data to other systems from computer system 2100.

In at least one embodiment, computer system 2100, in at least one embodiment, includes, without limitation, input devices 2108, parallel processing system 2112, and display devices 2106 which can be implemented using a conventional cathode ray tube ("CRT"), liquid crystal display ("LCD"), light emitting diode ("LED"), plasma display, or other suitable display technologies. In at least one embodiment, user input is received from input devices 2108 such as keyboard, mouse, touchpad, microphone, and more. In at least one embodiment, each of foregoing modules can be situated on a single semiconductor platform to form a processing system.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 21 for inferencing or predicting operations based, at least in part, on weight parameters calculated using neural network training operations, neural network functions and/or architectures, or neural network use cases described herein.

In at least one embodiment, computer system 2100 includes memory storing computer-readable executable instruction that, as a result of execution, causes one or more processors to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, computer system 2100 utilizes computing resources (e.g., CPUs, ASICs, GPUs, FPGAs) to implement inferencing and/or training logic 1515 to perform inferencing and/or training operations associated with one or more embodiments. Computer system 2100 may be utilized to implement one or more embodiments described elsewhere in this disclosure, such as those described in connection with FIGS. 1-20 and 22-43.

Figure 22:
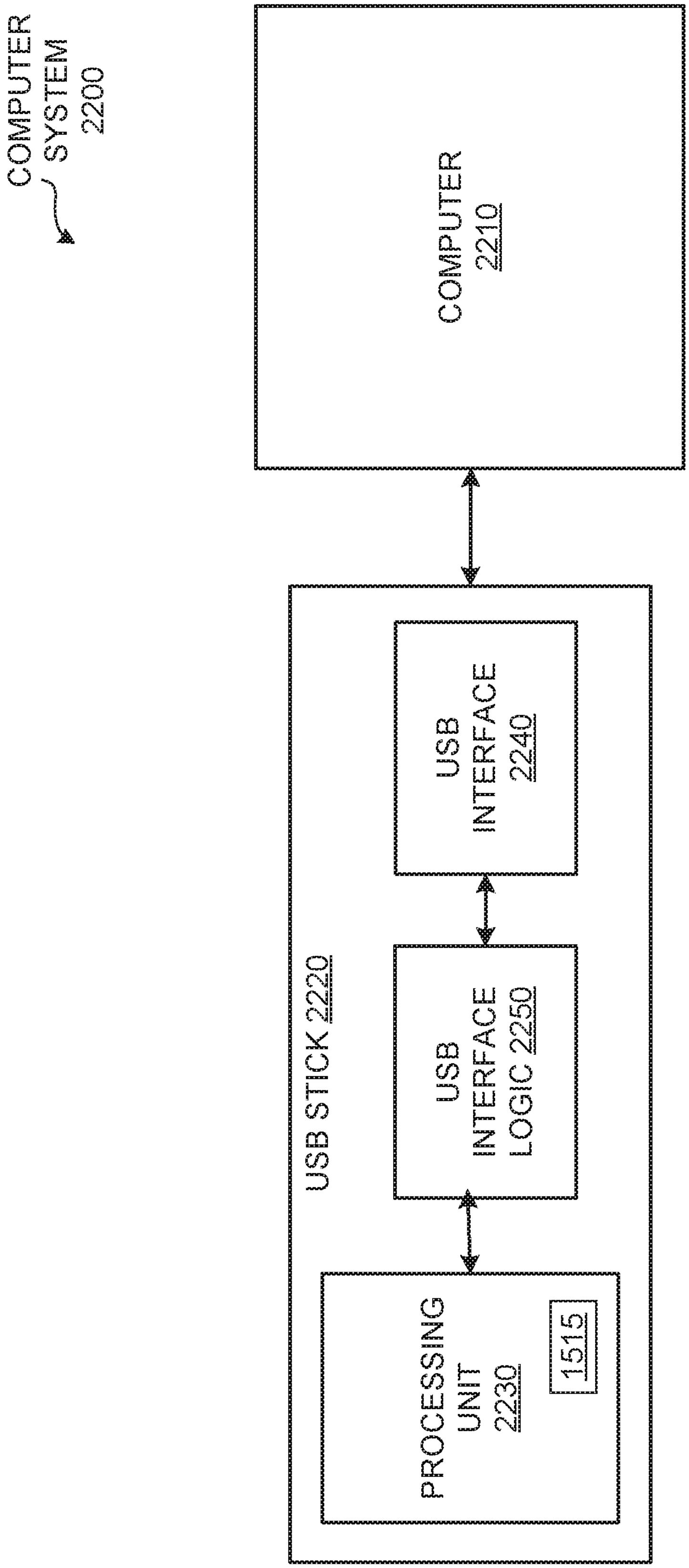
FIG. 22 illustrates a computer system, according at least one embodiment.

FIG. 22 illustrates a computer system 2200, according to at least one embodiment. In at least one embodiment, computer system 2200 includes, without limitation, a computer 2210 and a USB stick 2220. In at least one embodiment, computer 2210 may include, without limitation, any number and type of processor(s) (not shown) and a memory (not shown). In at least one embodiment, computer 2210 includes, without limitation, a server, a cloud instance, a laptop, and a desktop computer.

In at least one embodiment, USB stick 2220 includes, without limitation, a processing unit 2230, a USB interface 2240, and USB interface logic 2250. In at least one embodiment, processing unit 2230 may be any instruction execution system, apparatus, or device capable of executing instructions. In at least one embodiment, processing unit 2230 may include, without limitation, any number and type of processing cores (not shown). In at least one embodiment, processing core 2230 comprises an application specific integrated circuit ("ASIC") that is optimized to perform any amount and type of operations associated with machine learning. For instance, in at least one embodiment, processing core 2230 is a tensor processing unit ("TPC") that is optimized to perform machine learning inference operations. In at least one embodiment, processing core 2230 is a vision processing unit ("VPU") that is optimized to perform machine vision and machine learning inference operations.

In at least one embodiment, USB interface 2240 may be any type of USB connector or USB socket. For instance, in at least one embodiment, USB interface 2240 is a USB 3.0 Type-C socket for data and power. In at least one embodiment, USB interface 2240 is a USB 3.0 Type-A connector. In at least one embodiment, USB interface logic 2250 may include any amount and type of logic that enables processing unit 2230 to interface with or devices (e.g., computer 2210) via USB connector 2240.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG.

22 for inferencing or predicting operations based, at least in part, on weight parameters calculated using neural network training operations, neural network functions and/or architectures, or neural network use cases described herein.

In at least one embodiment, computer system 2200 includes memory storing computer-readable executable instruction that, as a result of execution, causes one or more processors to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, computer system 2200 utilizes computing resources (e.g., CPUs, ASICs, GPUs, FPGAs) to implement inferencing and/or training logic 1515 to perform inferencing and/or training operations associated with one or more embodiments. Computer system 2200 may be utilized to implement one or more embodiments described elsewhere in this disclosure, such as those described in connection with FIGS. 1-21 and 23-43.

Figure 23A:
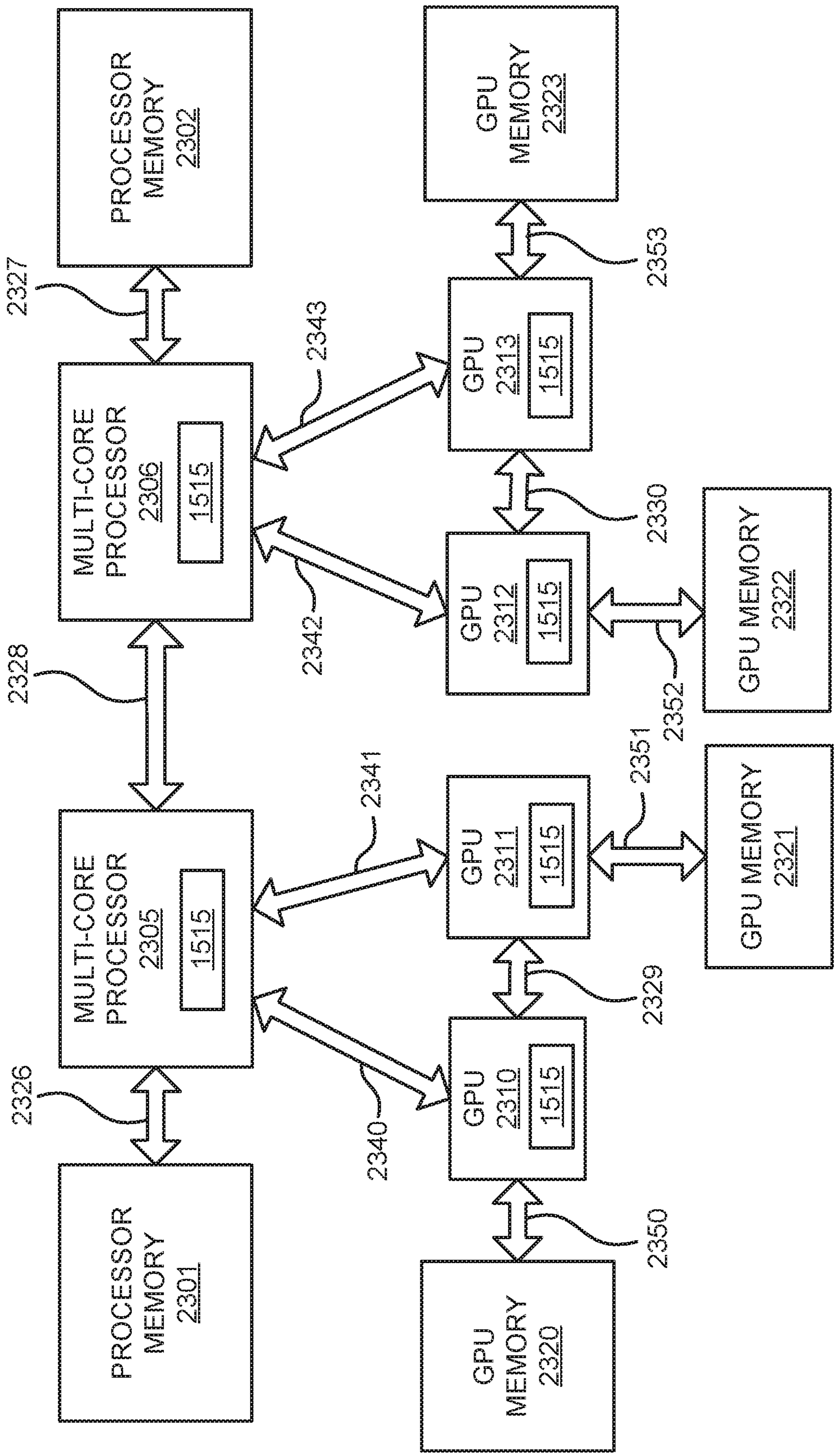
FIG. 23A illustrates a computer system, according to at least one embodiment.

FIG. 23A illustrates an exemplary architecture in which a plurality of GPUs 2310-2313 is communicatively coupled to a plurality of multi-core processors 2305-2306 over high-speed links 2340-2343 (e.g., buses, point-to-point interconnects, etc.). In one embodiment, high-speed links 2340-2343 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2310-2313 are interconnected over high-speed links 2329-2330, which may be implemented using same or different protocols/links than those used for high-speed links 2340-2343. Similarly, two or more of multi-core processors 2305-2306 may be connected over high speed link 2328 which may be symmetric multi-processor (SMP) buses operating at 20 GB/s, 30 GB/s, 120 GB/s or higher. Alternatively, all communication between various system components shown in FIG. 23A may be accomplished using same protocols/links (e.g., over a common interconnection fabric).

In one embodiment, each multi-core processor 2305-2306 is communicatively coupled to a processor memory 2301-2302, via memory interconnects 2326-2327, respectively, and each GPU 2310-2313 is communicatively coupled to GPU memory 2320-2323 over GPU memory interconnects 2350-2353, respectively. Memory interconnects 2326-2327 and 2350-2353 may utilize same or different memory access technologies. By way of example, and not limitation, processor memories 2301-2302 and GPU memories 2320-2323 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2301-2302 may be volatile memory and another portion may be non-volatile memory (e.g., using a two-level memory (2LM) hierarchy).

As described herein, although various processors 2305-2306 and GPUs 2310-2313 may be physically coupled to a particular memory 2301-2302, 2320-2323, respectively, a unified memory architecture may be implemented in which a same virtual system address space (also referred to as "effective address" space) is distributed among various physical memories. For example, processor memories 2301-2302 may each comprise 64 GB of system memory address space and GPU memories 2320-2323 may each comprise 32 GB of system memory address space (resulting in a total of 256 GB addressable memory in this example).

Figure 23B:
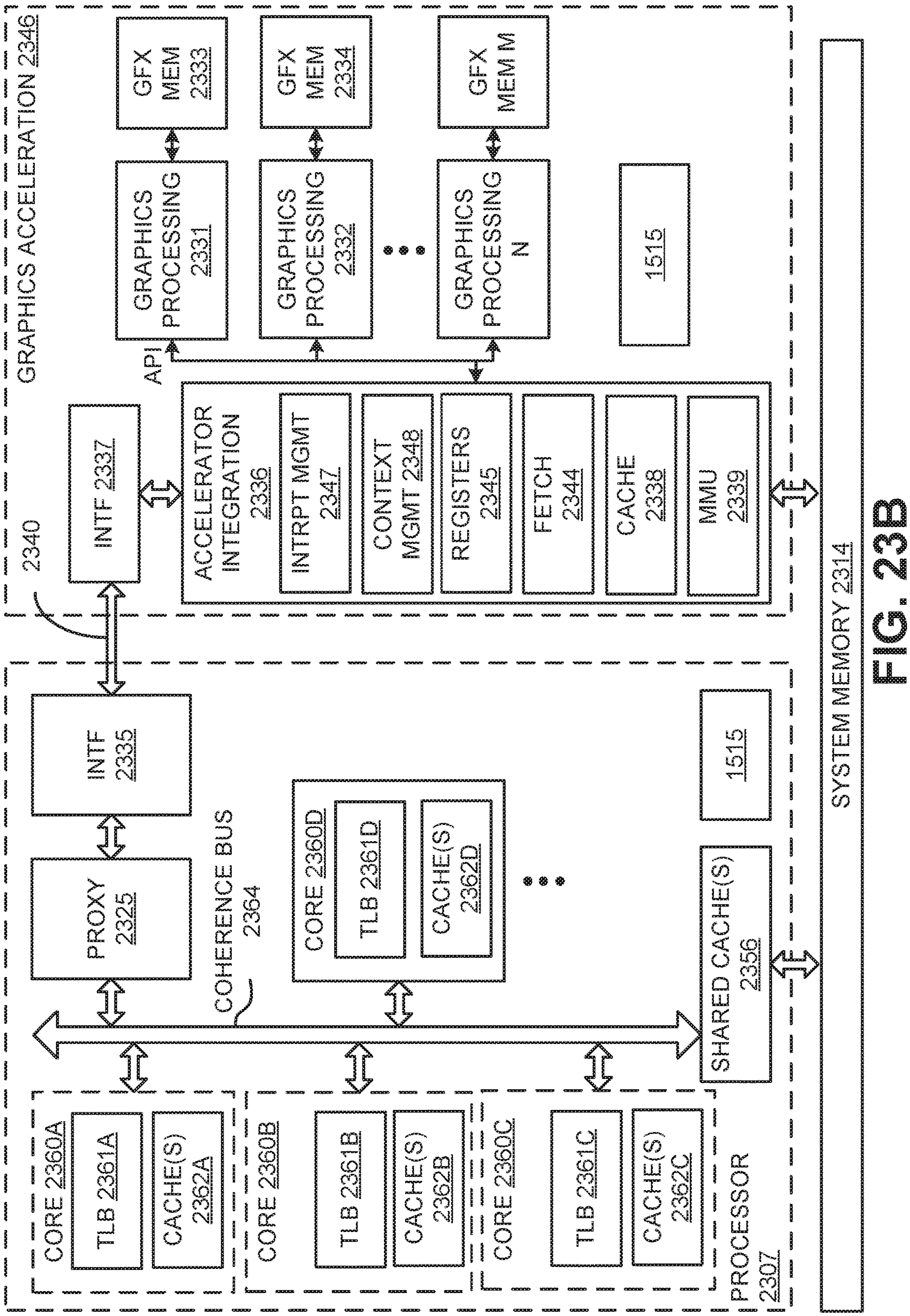
FIG. 23B illustrates a computer system, according to at least one embodiment.

FIG. 23B illustrates additional details for an interconnection between a multi-core processor 2307 and a graphics acceleration module 2346 in accordance with one exemplary embodiment. Graphics acceleration module 2346 may include one or more GPU chips integrated on a line card which is coupled to processor 2307 via high-speed link 2340. Alternatively, graphics acceleration module 2346 may be integrated on a same package or chip as processor 2307.

In at least one embodiment, illustrated processor 2307 includes a plurality of cores 2360A-2360D, each with a translation lookaside buffer 2361A-2361D and one or more caches 2362A-2362D. In at least one embodiment, cores 2360A-2360D may include various other components for executing instructions and processing data which are not illustrated. Caches 2362A-2362D may comprise level 1 (L1) and level 2 (L2) caches. In addition, one or more shared caches 2356 may be included in caches 2362A-2362D and shared by sets of cores 2360A-2360D. For example, one embodiment of processor 2307 includes 24 cores, each with its own L1 cache, twelve shared L2 caches, and twelve shared L3 caches. In this embodiment, one or more L2 and L3 caches are shared by two adjacent cores. Processor 2307 and graphics acceleration module 2346 connect with system memory 2314, which may include processor memories 2301-2302 of FIG. 23A.

Coherency is maintained for data and instructions stored in various caches 2362A-2362D, 2356 and system memory 2314 via inter-core communication over a coherence bus 2364. For example, each cache may have cache coherency logic/circuitry associated therewith to communicate to over coherence bus 2364 in response to detected reads or writes to particular cache lines. In one implementation, a cache snooping protocol is implemented over coherence bus 2364 to snoop cache accesses.

In one embodiment, a proxy circuit 2325 communicatively couples graphics acceleration module 2346 to coherence bus 2364, allowing graphics acceleration module 2346 to participate in a cache coherence protocol as a peer of cores 2360A-2360D. In particular, an interface 2335 provides connectivity to proxy circuit 2325 over high-speed link 2340 (e.g., a PCIe bus, NVLink, etc.) and an interface 2337 connects graphics acceleration module 2346 to link 2340.

In one implementation, an accelerator integration circuit 2336 provides cache management, memory access, context management, and interrupt management services on behalf of a plurality of graphics processing engines 2331, 2332, N of graphics acceleration module 2346. Graphics processing engines 2331, 2332, N may each comprise a separate graphics processing unit (GPU). Alternatively, graphics processing engines 2331, 2332, N may comprise different types of graphics processing engines within a GPU such as graphics execution units, media processing engines (e.g., video encoders/decoders), samplers, and blit engines. In at least one embodiment, graphics acceleration module 2346 may be a GPU with a plurality of graphics processing engines 2331-2332, N or graphics processing engines 2331-2332, N may be individual GPUs integrated on a common package, line card, or chip.

In one embodiment, accelerator integration circuit 2336 includes a memory management unit (MMU) 2339 for performing various memory management functions such as virtual-to-physical memory translations (also referred to as effective-to-real memory translations) and memory access protocols for accessing system memory 2314. MMU 2339 may also include a translation lookaside buffer (TLB) (not shown) for caching virtual/effective to physical/real address translations. In one implementation, a cache 2338 stores commands and data for efficient access by graphics processing engines 2331-2332, N. In one embodiment, data stored in cache 2338 and graphics memories 2333-2334, M is kept coherent with core caches 2362A-2362D, 2356 and system memory 2314. As mentioned, this may be accomplished via proxy circuit 2325 on behalf of cache 2338 and memories 2333-2334, M (e.g., sending updates to cache 2338 related to modifications/accesses of cache lines on processor caches 2362A-2362D, 2356 and receiving updates from cache 2338).

A set of registers 2345 store context data for threads executed by graphics processing engines 2331-2332, N and a context management circuit 2348 manages thread contexts. For example, context management circuit 2348 may perform save and restore operations to save and restore contexts of various threads during contexts switches (e.g., where a first thread is saved and a second thread is stored so that a second thread can be execute by a graphics processing engine). For example, on a context switch, context management circuit 2348 may store current register values to a designated region in memory (e.g., identified by a context pointer). It may then restore register values when returning to a context. In one embodiment, an interrupt management circuit 2347 receives and processes interrupts received from system devices.

In one implementation, virtual/effective addresses from a graphics processing engine 2331 are translated to real/physical addresses in system memory 2314 by MMU 2339. One embodiment of accelerator integration circuit 2336 supports multiple (e.g., 4, 8, 16) graphics accelerator modules 2346 and/or other accelerator devices. Graphics accelerator module 2346 may be dedicated to a single application executed on processor 2307 or may be shared between multiple applications. In one embodiment, a virtualized graphics execution environment is presented in which resources of graphics processing engines 2331-2332, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2336 performs as a bridge to a system for graphics acceleration module 2346 and provides address translation and system memory cache services. In addition, accelerator integration circuit 2336 may provide virtualization facilities for a host processor to manage virtualization of graphics processing engines 2331-2332, interrupts, and memory management.

Because hardware resources of graphics processing engines 2331-2332, N are mapped explicitly to a real address space seen by host processor 2307, any host processor can address these resources directly using an effective address value. One function of accelerator integration circuit 2336, in one embodiment, is physical separation of graphics processing engines 2331-2332, N so that they appear to a system as independent units.

In at least one embodiment, one or more graphics memories 2333-2334, M are coupled to each of graphics processing engines 2331-2332, N, respectively. Graphics memories 2333-2334, M store instructions and data being processed by each of graphics processing engines 2331-2332, N. Graphics memories 2333-2334, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2340, biasing techniques are used to ensure that data stored in graphics memories 2333-2334, M is data which will be used most frequently by graphics processing engines 2331-2332, N and preferably not used by cores 2360A-2360D (at least not frequently). Similarly, a biasing mechanism attempts to keep data needed by cores (and preferably not graphics processing engines 2331-2332, N) within caches 2362A-2362D, 2356 of cores and system memory 2314.

Figure 23C:
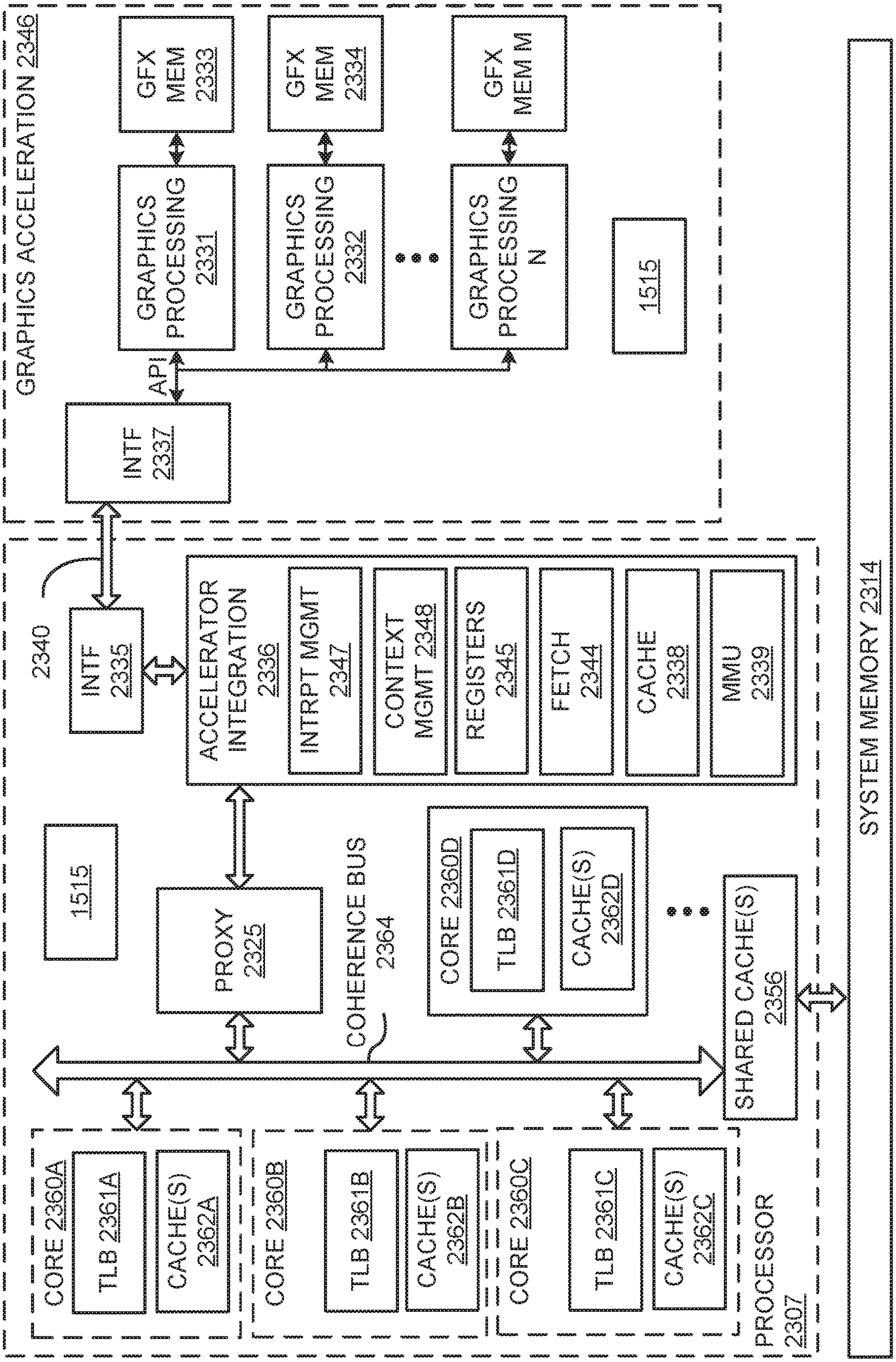
FIG. 23C illustrates a computer system, according to at least one embodiment.

FIG. 23C illustrates another exemplary embodiment in which accelerator integration circuit 2336 is integrated within processor 2307. In this embodiment, graphics processing engines 2331-2332, N communicate directly over high-speed link 2340 to accelerator integration circuit 2336 via interface 2337 and interface 2335 (which, again, may be utilize any form of bus or interface protocol). Accelerator integration circuit 2336 may perform same operations as those described with respect to FIG. 23B, but potentially at a higher throughput given its close proximity to coherence bus 2364 and caches 2362A-2362D, 2356. One embodiment supports different programming models including a dedicated-process programming model (no graphics acceleration module virtualization) and shared programming models (with virtualization), which may include programming models which are controlled by accelerator integration circuit 2336 and programming models which are controlled by graphics acceleration module 2346.

In at least one embodiment, graphics processing engines 2331-2332, N are dedicated to a single application or process under a single operating system. In at least one embodiment, a single application can funnel other application requests to graphics processing engines 2331-2332, N, providing virtualization within a VM/partition.

In at least one embodiment, graphics processing engines 2331-2332, N, may be shared by multiple VM/application partitions. In at least one embodiment, shared models may use a system hypervisor to virtualize graphics processing engines 2331-2332, N to allow access by each operating system. For single-partition systems without a hypervisor, graphics processing engines 2331-2332, N are owned by an operating system. In at least one embodiment, an operating system can virtualize graphics processing engines 2331-2332, N to provide access to each process or application.

In at least one embodiment, graphics acceleration module 2346 or an individual graphics processing engine 2331-2332, N selects a process element using a process handle. In one embodiment, process elements are stored in system memory 2314 and are addressable using an effective address to real address translation techniques described herein. In at least one embodiment, a process handle may be an implementation-specific value provided to a host process when registering its context with graphics processing engine 2331-2332, N (that is, calling system software to add a process element to a process element linked list). In at least one embodiment, a lower 16-bits of a process handle may be an offset of the process element within a process element linked list.

Figure 23D:
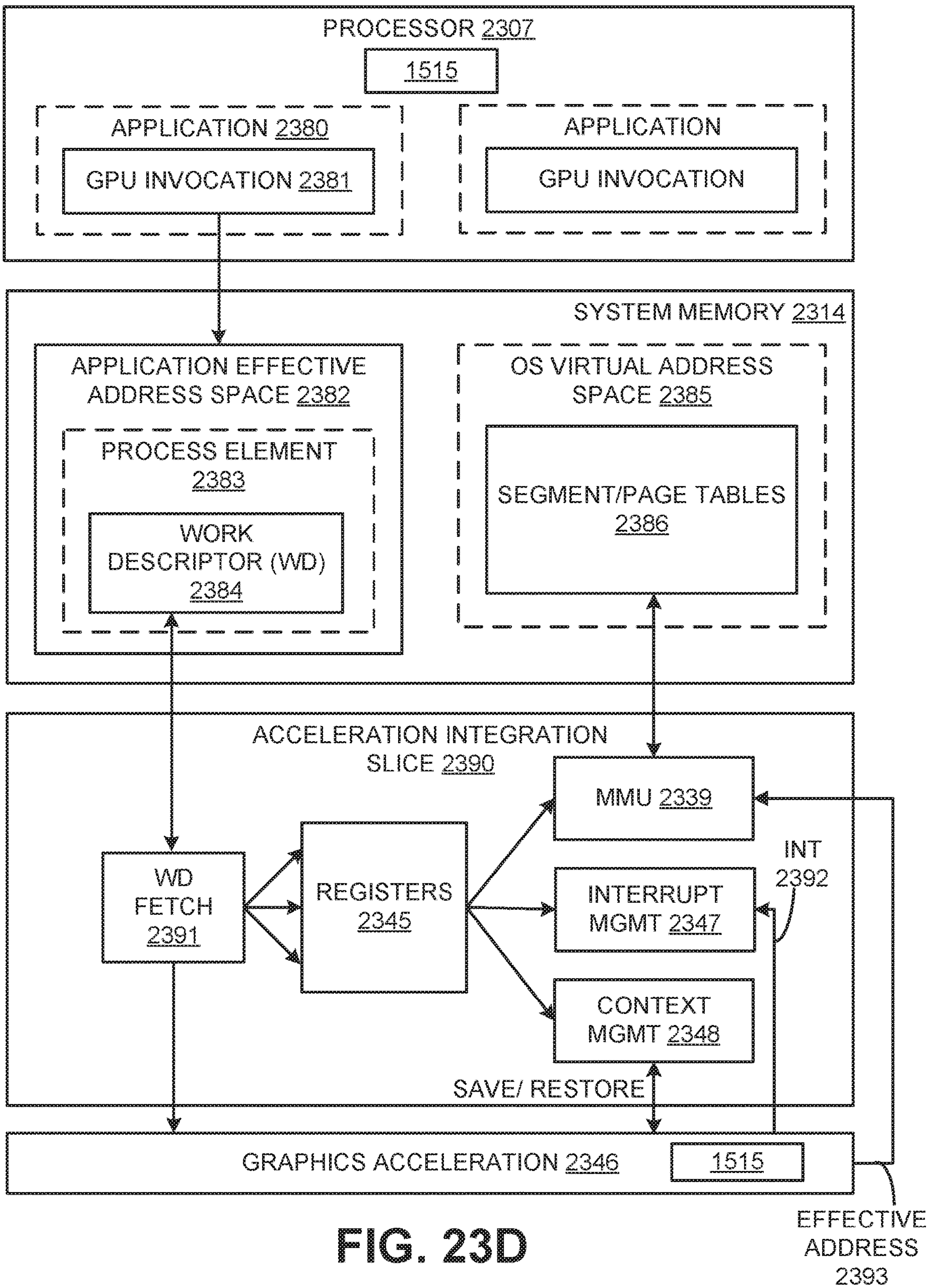
FIG. 23D illustrates a computer system, according to at least one embodiment.

FIG. 23D illustrates an exemplary accelerator integration slice 2390. As used herein, a "slice" comprises a specified portion of processing resources of accelerator integration circuit 2336. Application effective address space 2382 within system memory 2314 stores process elements 2383. In one embodiment, process elements 2383 are stored in response to GPU invocations 2381 from applications 2380 executed on processor 2307. A process element 2383 contains process state for corresponding application 2380. A work descriptor (WD) 2384 contained in process element 2383 can be a single job requested by an application or may contain a pointer to a queue of jobs. In at least one embodiment, WD 2384 is a pointer to a job request queue in an application's address space 2382.

Graphics acceleration module 2346 and/or individual graphics processing engines 2331-2332, N can be shared by all or a subset of processes in a system. In at least one embodiment, an infrastructure for setting up process state and sending a WD 2384 to a graphics acceleration module 2346 to start a job in a virtualized environment may be included.

In at least one embodiment, a dedicated-process programming model is implementation-specific. In this model, a single process owns graphics acceleration module 2346 or an individual graphics processing engine 2331. Because graphics acceleration module 2346 is owned by a single process, a hypervisor initializes accelerator integration circuit 2336 for an owning partition and an operating system initializes accelerator integration circuit 2336 for an owning process when graphics acceleration module 2346 is assigned.

In operation, a WD fetch unit 2391 in accelerator integration slice 2390 fetches next WD 2384 which includes an indication of work to be done by one or more graphics processing engines of graphics acceleration module 2346. Data from WD 2384 may be stored in registers 2345 and used by MMU 2339, interrupt management circuit 2347 and/or context management circuit 2348 as illustrated. For example, one embodiment of MMU 2339 includes segment/page walk circuitry for accessing segment/page tables 2386 within OS virtual address space 2385. Interrupt management circuit 2347 may process interrupt events 2392 received from graphics acceleration module 2346. When performing graphics operations, an effective address 2393 generated by a graphics processing engine 2331-2332, N is translated to a real address by MMU 2339.

In one embodiment, a same set of registers 2345 are duplicated for each graphics processing engine 2331-2332, N and/or graphics acceleration module 2346 and may be initialized by a hypervisor or operating system. Each of these duplicated registers may be included in an accelerator integration slice 2390. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2384 is specific to a particular graphics acceleration module 2346 and/or graphics processing engines 2331-2332, N. It contains all information required by a graphics processing engine 2331-2332, N to do work or it can be a pointer to a memory location where an application has set up a command queue of work to be completed.

Figure 23E:
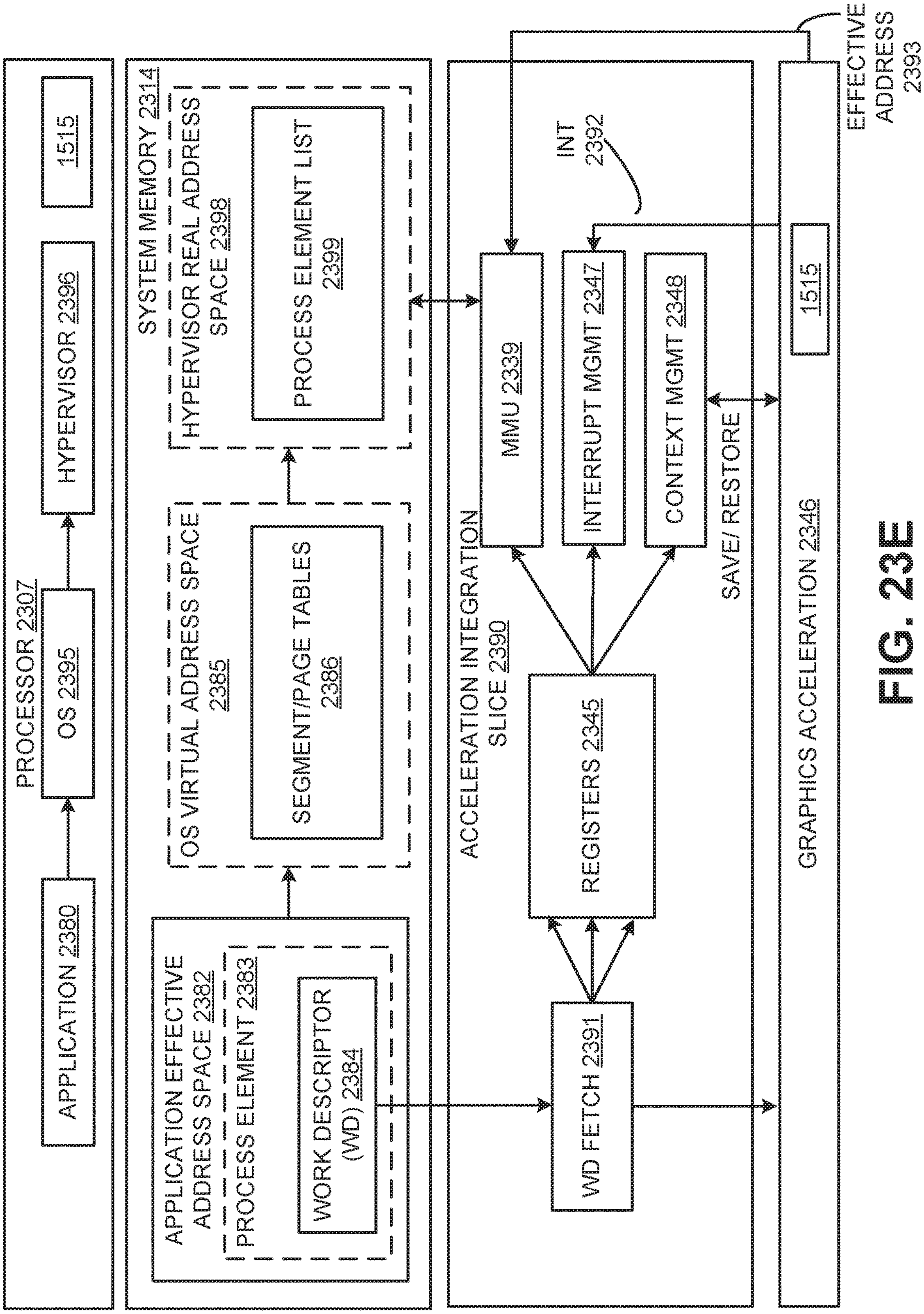
FIGS. 23E and 23F illustrate a shared programming model, according to at least one embodiment.

FIG. 23E illustrates additional details for one exemplary embodiment of a shared model. This embodiment includes a hypervisor real address space 2398 in which a process element list 2399 is stored. Hypervisor real address space 2398 is accessible via a hypervisor 2396 which virtualizes graphics acceleration module engines for operating system 2395.

In at least one embodiment, shared programming models allow for all or a subset of processes from all or a subset of partitions in a system to use a graphics acceleration module 2346. There are two programming models where graphics acceleration module 2346 is shared by multiple processes and partitions: time-sliced shared and graphics directed shared.

In this model, system hypervisor 2396 owns graphics acceleration module 2346 and makes its function available to all operating systems 2395. For a graphics acceleration module 2346 to support virtualization by system hypervisor 2396, graphics acceleration module 2346 may adhere to the following: 1) An application's job request must be autonomous (that is, state does not need to be maintained between jobs), or graphics acceleration module 2346 must provide a context save and restore mechanism. 2) An application's job request is guaranteed by graphics acceleration module 2346 to complete in a specified amount of time, including any translation faults, or graphics acceleration module 2346 provides an ability to preempt processing of a job. 3) Graphics acceleration module 2346 must be guaranteed fairness between processes when operating in a directed shared programming model.

In at least one embodiment, application 2380 is required to make an operating system 2395 system call with a graphics acceleration module 2346 type, a work descriptor (WD), an authority mask register (AMR) value, and a context save/restore area pointer (CSRP). In at least one embodiment, graphics acceleration module 2346 type describes a targeted acceleration function for a system call. In at least one embodiment, graphics acceleration module 2346 type may be a system-specific value. In at least one embodiment, WD is formatted specifically for graphics acceleration module 2346 and can be in a form of a graphics acceleration module 2346 command, an effective address pointer to a user-defined structure, an effective address pointer to a queue of commands, or any other data structure to describe work to be done by graphics acceleration module 2346. In one embodiment, an AMR value is an AMR state to use for a current process. In at least one embodiment, a value passed to an operating system is similar to an application setting an AMR. If accelerator integration circuit 2336 and graphics acceleration module 2346 implementations do not support a User Authority Mask Override Register (UAMOR), an operating system may apply a current UAMOR value to an AMR value before passing an AMR in a hypervisor call. Hypervisor 2396 may optionally apply a current Authority Mask Override Register (AMOR) value before placing an AMR into process element 2383. In at least one embodiment, CSRP is one of registers 2345 containing an effective address of an area in an application's address space 2382 for graphics acceleration module 2346 to save and restore context state. This pointer is optional if no state is required to be saved between jobs or when a job is preempted. In at least one embodiment, context save/restore area may be pinned system memory.

Upon receiving a system call, operating system 2395 may verify that application 2380 has registered and been given authority to use graphics acceleration module 2346. Operating system 2395 then calls hypervisor 2396 with information shown in Table 3.

TABLE 3

| OS to Hypervisor Call Parameters |
|---|
| 1 A work descriptor (WD) |
| 2 An Authority Mask Register (AMR) value (potentially masked) |
| 3 An effective address (EA) Context Save/Restore Area Pointer (CSRP) |
| 4 A process ID (PID) and optional thread ID (TID) |
| 5 A virtual address (VA) accelerator utilization record pointer (AURP) |
| 6 Virtual address of storage segment table pointer (SSTP) |
| 7 A logical interrupt service number (LISN) |

Upon receiving a hypervisor call, hypervisor 2396 verifies that operating system 2395 has registered and been given authority to use graphics acceleration module 2346. Hypervisor 2396 then puts process element 2383 into a process element linked list for a corresponding graphics acceleration module 2346 type. A process element may include information shown in Table 4.

TABLE 4

| Process Element Information |
|---|
| 1 A work descriptor (WD) |
| 2 An Authority Mask Register (AMR) value (potentially masked). |
| 3 An effective address (EA) Context Save/Restore Area Pointer (CSRP) |
| 4 A process ID (PID) and optional thread ID (TID) |
| 5 A virtual address (VA) accelerator utilization record pointer (AURP) |
| 6 Virtual address of storage segment table pointer (SSTP) |
| 7 A logical interrupt service number (LISN) |
| 8 Interrupt vector table, derived from hypervisor call parameters |
| 9 A state register (SR) value |
| 10 A logical partition ID (LPID) |
| 11 A real address (RA) hypervisor accelerator utilization record pointer |
| 12 Storage Descriptor Register (SDR) |

In at least one embodiment, hypervisor initializes a plurality of accelerator integration slice 2390 registers 2345.

Figure 23F:
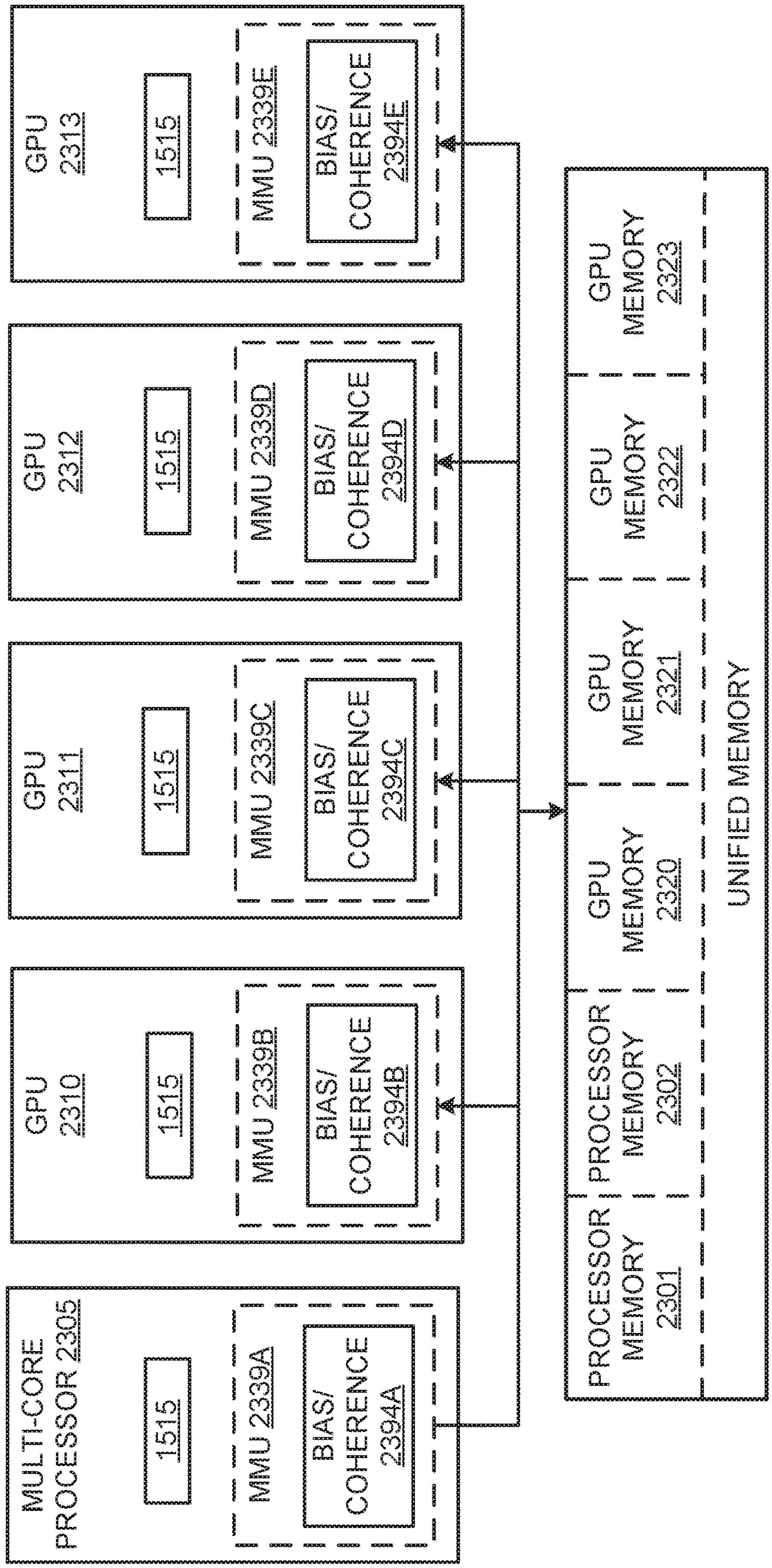

As illustrated in FIG. 23F, in at least one embodiment, a unified memory is used, addressable via a common virtual memory address space used to access physical processor memories 2301-2302 and GPU memories 2320-2323. In this implementation, operations executed on GPUs 2310-2313 utilize a same virtual/effective memory address space to access processor memories 2301-2302 and vice versa, thereby simplifying programmability. In one embodiment, a first portion of a virtual/effective address space is allocated to processor memory 2301, a second portion to second processor memory 2302, a third portion to GPU memory 2320, and so on. In at least one embodiment, an entire virtual/effective memory space (sometimes referred to as an effective address space) is thereby distributed across each of processor memories 2301-2302 and GPU memories 2320-2323, allowing any processor or GPU to access any physical memory with a virtual address mapped to that memory.

In one embodiment, bias/coherence management circuitry 2394A-2394E within one or more of MMUs 2339A-2339E ensures cache coherence between caches of one or more host processors (e.g., 2305) and GPUs 2310-2313 and implements biasing techniques indicating physical memories in which certain types of data should be stored. While multiple instances of bias/coherence management circuitry 2394A-2394E are illustrated in FIG. 23F, bias/coherence circuitry may be implemented within an MMU of one or more host processors 2305 and/or within accelerator integration circuit 2336.

One embodiment allows GPU-attached memory 2320-2323 to be mapped as part of system memory, and accessed using shared virtual memory (SVM) technology, but without suffering performance drawbacks associated with full system cache coherence. In at least one embodiment, an ability for GPU-attached memory 2320-2323 to be accessed as system memory without onerous cache coherence overhead provides a beneficial operating environment for GPU offload. This arrangement allows host processor 2305 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2320-2323 without cache coherence overheads can be critical to execution time of an offloaded computation. In cases with substantial streaming write memory traffic, for example, cache coherence overhead can significantly reduce an effective write bandwidth seen by a GPU 2310-2313. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2320-2323, with or without a bias cache in GPU 2310-2313 (e.g., to cache frequently/recently used entries of a bias table). Alternatively, an entire bias table may be maintained within a GPU.

In at least one embodiment, a bias table entry associated with each access to GPU-attached memory 2320-2323 is accessed prior to actual access to a GPU memory, causing the following operations. First, local requests from GPU 2310-2313 that find their page in GPU bias are forwarded directly to a corresponding GPU memory 2320-2323. Local requests from a GPU that find their page in host bias are forwarded to processor 2305 (e.g., over a high-speed link as discussed above). In one embodiment, requests from processor 2305 that find a requested page in host processor bias complete a request like a normal memory read. Alternatively, requests directed to a GPU-biased page may be forwarded to GPU 2310-2313. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2305 bias to GPU bias, but is not for an opposite transition.

In one embodiment, cache coherency is maintained by temporarily rendering GPU-biased pages uncacheable by host processor 2305. To access these pages, processor 2305 may request access from GPU 2310 which may or may not grant access right away. Thus, to reduce communication between processor 2305 and GPU 2310 it is beneficial to ensure that GPU-biased pages are those which are required by a GPU but not host processor 2305 and vice versa.

Hardware structure(s) 1515 are used to perform one or more embodiments. Details regarding the hardware structure (x) 1515 are provided herein in conjunction with FIGS. 15A and/or 15B.

Figure 24:
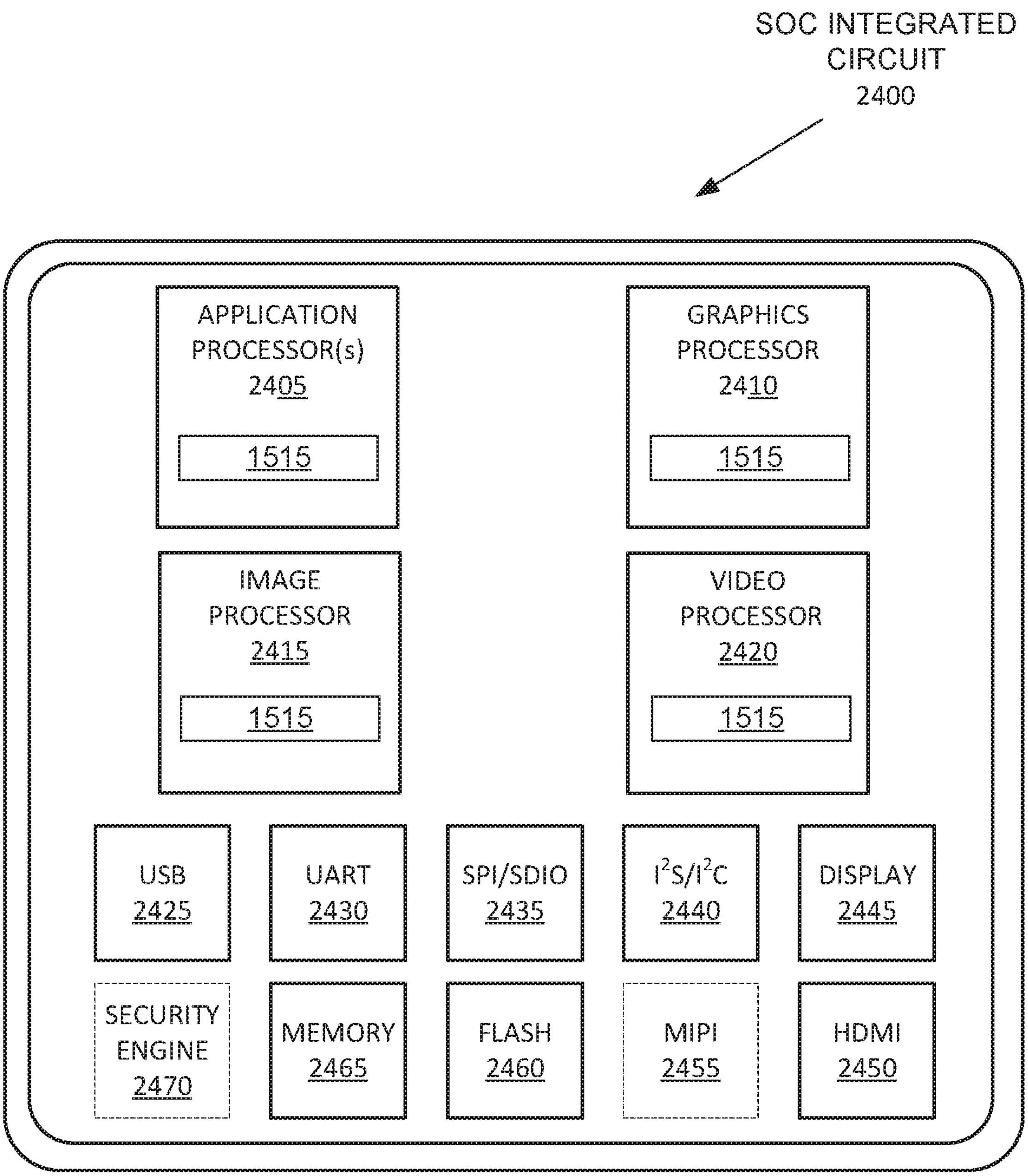
FIG. 24 illustrates exemplary integrated circuits and associated graphics processors, according to at least one embodiment.

FIG. 24 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 24 is a block diagram illustrating an exemplary system on a chip integrated circuit 2400 that may be fabricated using one or more IP cores, according to at least one embodiment. In at least one embodiment, integrated circuit 2400 includes one or more application processor(s) 2405 (e.g., CPUs), at least one graphics processor 2410, and may additionally include an image processor 2415 and/or a video processor 2420, any of which may be a modular IP core. In at least one embodiment, integrated circuit 2400 includes peripheral or bus logic including a USB controller 2425, UART controller 2430, an SPI/SDIO controller 2435, and an I.sup.2S/I.sup.2C controller 2440. In at least one embodiment, integrated circuit 2400 can include a display device 2445 coupled to one or more of a high-definition multimedia interface (HDMI) controller 2450 and a mobile industry processor interface (MIPI) display interface 2455. In at least one embodiment, storage may be provided by a flash memory subsystem 2460 including flash memory and a flash memory controller. In at least one embodiment, memory interface may be provided via a memory controller 2465 for access to SDRAM or SRAM memory devices. In at least one embodiment, some integrated circuits additionally include an embedded security engine 2470.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in integrated circuit 2400 for inferencing or predicting operations based, at least in part, on weight parameters calculated using neural network training operations, neural network functions and/or architectures, or neural network use cases described herein.

In at least one embodiment, integrated circuit 2400 includes memory storing computer-readable executable instruction that, as a result of execution, causes one or more processors to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, integrated circuit 2400 utilizes computing resources (e.g., CPUs, ASICs, GPUs, FPGAs) to implement inferencing and/or training logic 1515 to perform inferencing and/or training operations associated with one or more embodiments. Integrated circuit 2400 may be utilized to implement one or more embodiments described elsewhere in this disclosure, such as those described in connection with FIGS. 1-23 and 25-43.

Figure 25A:
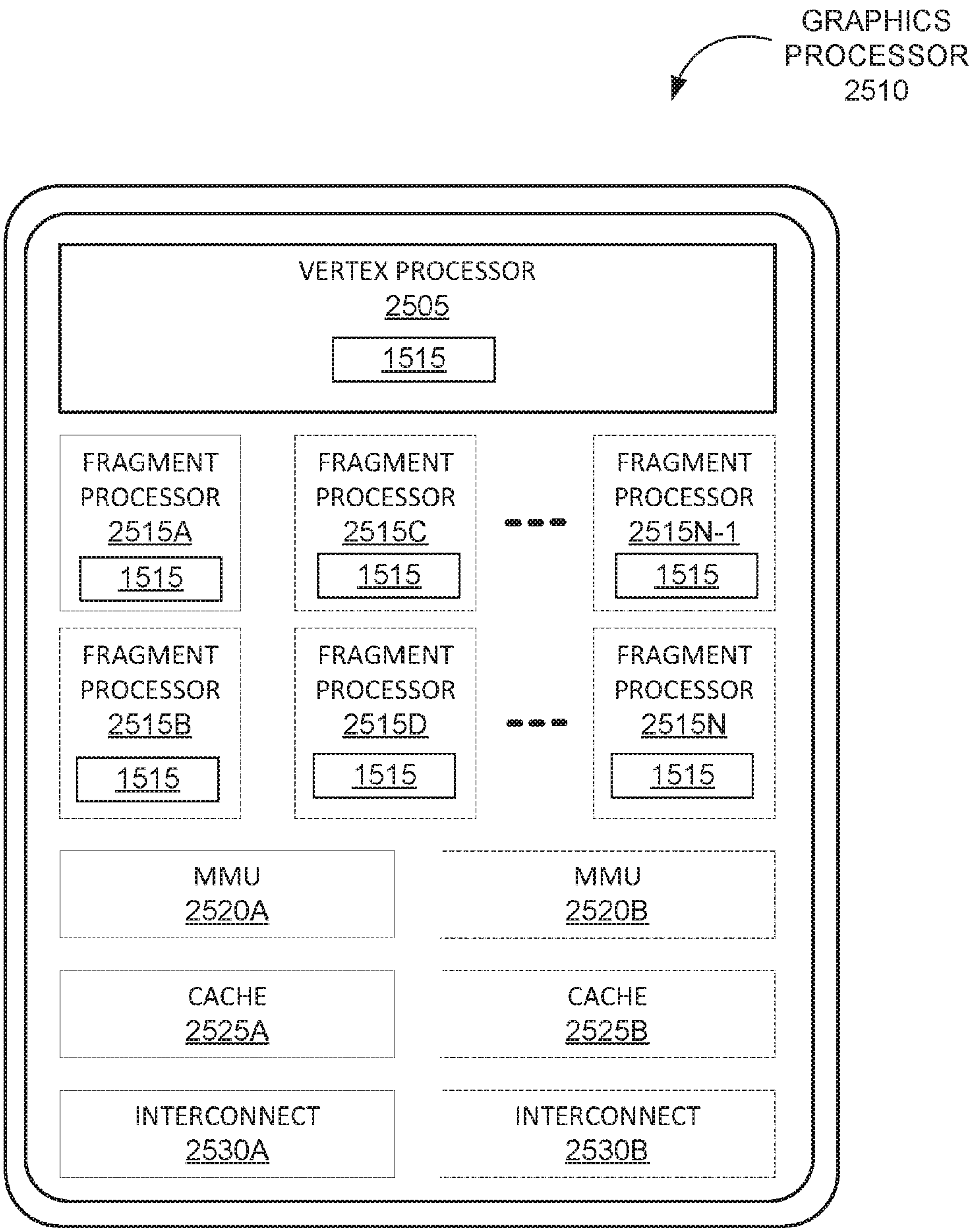
FIGS. 25A-25B illustrate exemplary integrated circuits and associated graphics processors, according to at least one embodiment.
Figure 25B:
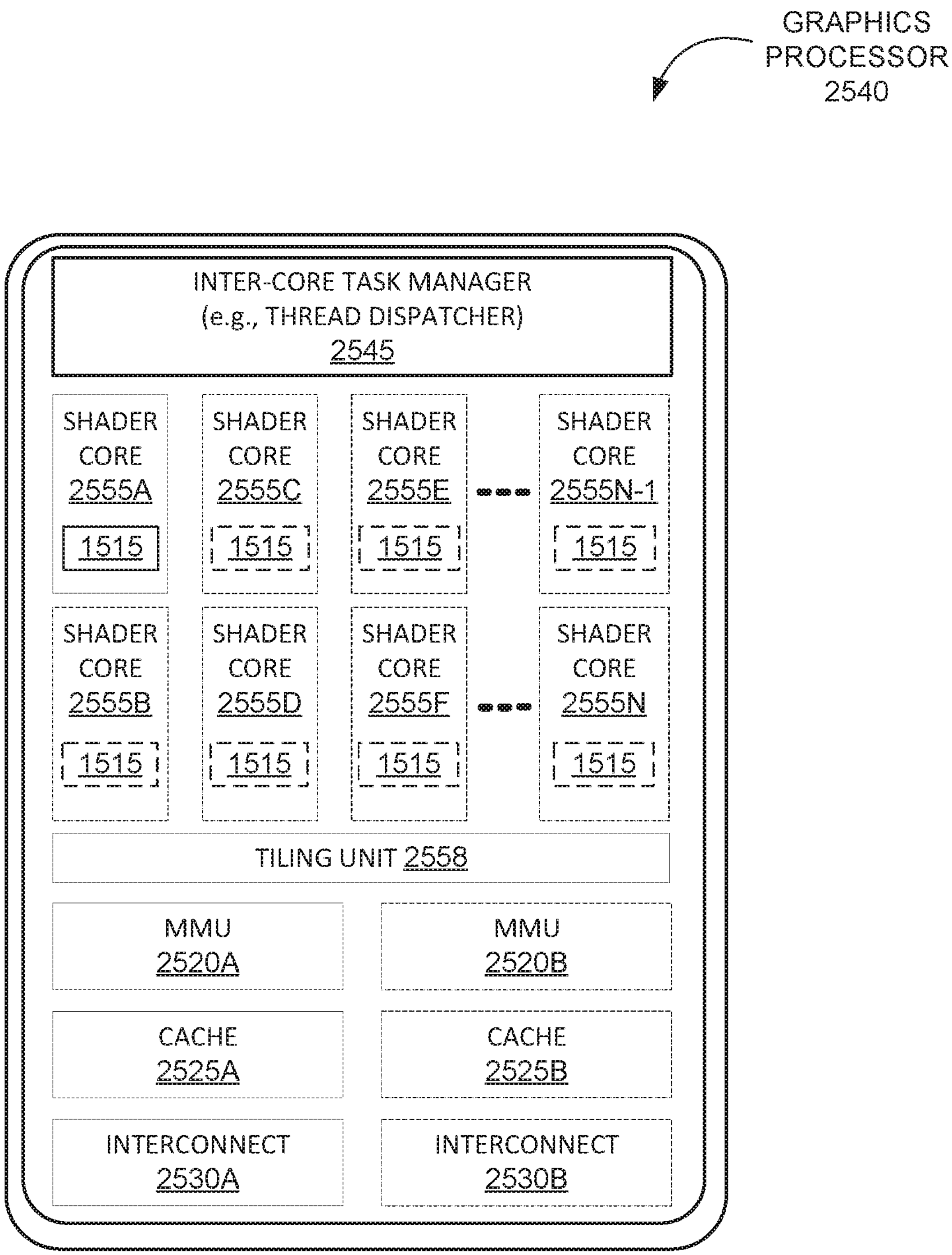

FIGS. 25A-25B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 25A-25B are block diagrams illustrating exemplary graphics processors for use within an SoC, according to embodiments described herein. FIG. 25A illustrates an exemplary graphics processor 2510 of a system on a chip integrated circuit that may be fabricated using one or more IP cores, according to at least one embodiment. FIG. 25B illustrates an additional exemplary graphics processor 2540 of a system on a chip integrated circuit that may be fabricated using one or more IP cores, according to at least one embodiment. In at least one embodiment, graphics processor 2510 of FIG. 25A is a low power graphics processor core. In at least one embodiment, graphics processor 2540 of FIG. 25B is a higher performance graphics processor core. In at least one embodiment, each of graphics processors 2510, 2540 can be variants of graphics processor 2410 of FIG. 24.

In at least one embodiment, graphics processor 2510 includes a vertex processor 2505 and one or more fragment processor(s) 2515A-2515N (e.g., 2515A, 2515B, 2515C, 2515D, through 2515N-1, and 2515N). In at least one embodiment, graphics processor 2510 can execute different shader programs via separate logic, such that vertex processor 2505 is optimized to execute operations for vertex shader programs, while one or more fragment processor(s) 2515A-2515N execute fragment (e.g., pixel) shading operations for fragment or pixel shader programs. In at least one embodiment, vertex processor 2505 performs a vertex processing stage of a 3D graphics pipeline and generates primitives and vertex data. In at least one embodiment, fragment processor(s) 2515A-2515N use primitive and vertex data generated by vertex processor 2505 to produce a framebuffer that is displayed on a display device. In at least one embodiment, fragment processor(s) 2515A-2515N are optimized to execute fragment shader programs as provided for in an OpenGL API, which may be used to perform similar operations as a pixel shader program as provided for in a Direct 3D API.

In at least one embodiment, graphics processor 2510 additionally includes one or more memory management units (MMUs) 2520A-2520B, cache(s) 2525A-2525B, and circuit interconnect(s) 2530A-2530B. In at least one embodiment, one or more MMU(s) 2520A-2520B provide for virtual to physical address mapping for graphics processor 2510, including for vertex processor 2505 and/or fragment processor(s) 2515A-2515N, which may reference vertex or image/texture data stored in memory, in addition to vertex or image/texture data stored in one or more cache(s)

2525A-2525B. In at least one embodiment, one or more MMU(s) 2520A-2520B may be synchronized with other MMUs within system, including one or more MMUs associated with one or more application processor(s) 2405, image processors 2415, and/or video processors 2420 of FIG. 24, such that each processor 2405-2420 can participate in a shared or unified virtual memory system. In at least one embodiment, one or more circuit interconnect(s) 2530A-2530B enable graphics processor 2510 to interface with other IP cores within SoC, either via an internal bus of SoC or via a direct connection.

In at least one embodiment, graphics processor 2540 includes one or more MMU(s) 2520A-2520B, caches 2525A-2525B, and circuit interconnects 2530A-2530B of graphics processor 2510 of FIG. 25A. In at least one embodiment, graphics processor 2540 includes one or more shader core(s) 2555A-2555N (e.g., 2555A, 2555B, 2555C, 2555D, 2555E, 2555F, through 2555N-1, and 2555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2540 includes an inter-core task manager 2545, which acts as a thread dispatcher to dispatch execution threads to one or more shader cores 2555A-2555N and a tiling unit 2558 to accelerate tiling operations for tile-based rendering, in which rendering operations for a scene are subdivided in image space, for example to exploit local spatial coherence within a scene or to optimize use of internal caches.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in integrated circuit 25A and/or 25B for inferencing or predicting operations based, at least in part, on weight parameters calculated using neural network training operations, neural network functions and/or architectures, or neural network use cases described herein.

In at least one embodiment, graphics processor 2540 may execute computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics processor 2540 utilizes computing resources (e.g., CPUs, ASICs, GPUs, FPGAs) to implement inferencing and/or training logic 1515 to perform inferencing and/or training operations associated with one or more embodiments. Graphics processor 2540 may be utilized to implement one or more embodiments described elsewhere in this disclosure, such as those described in connection with FIGS. 1-23 and 25-43.

Figure 26A:
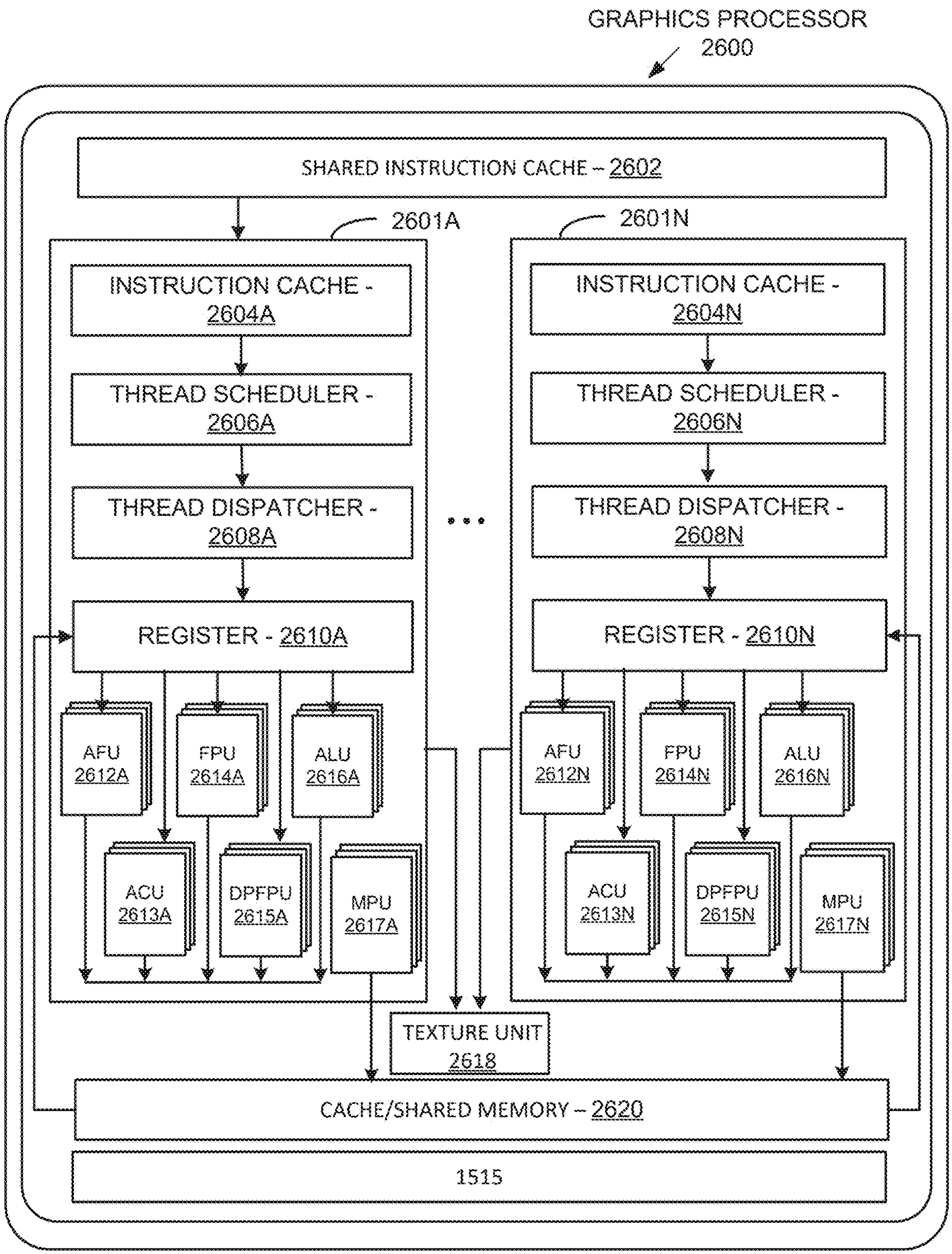
FIGS. 26A-26B illustrate additional exemplary graphics processor logic according to at least one embodiment.
Figure 26B:
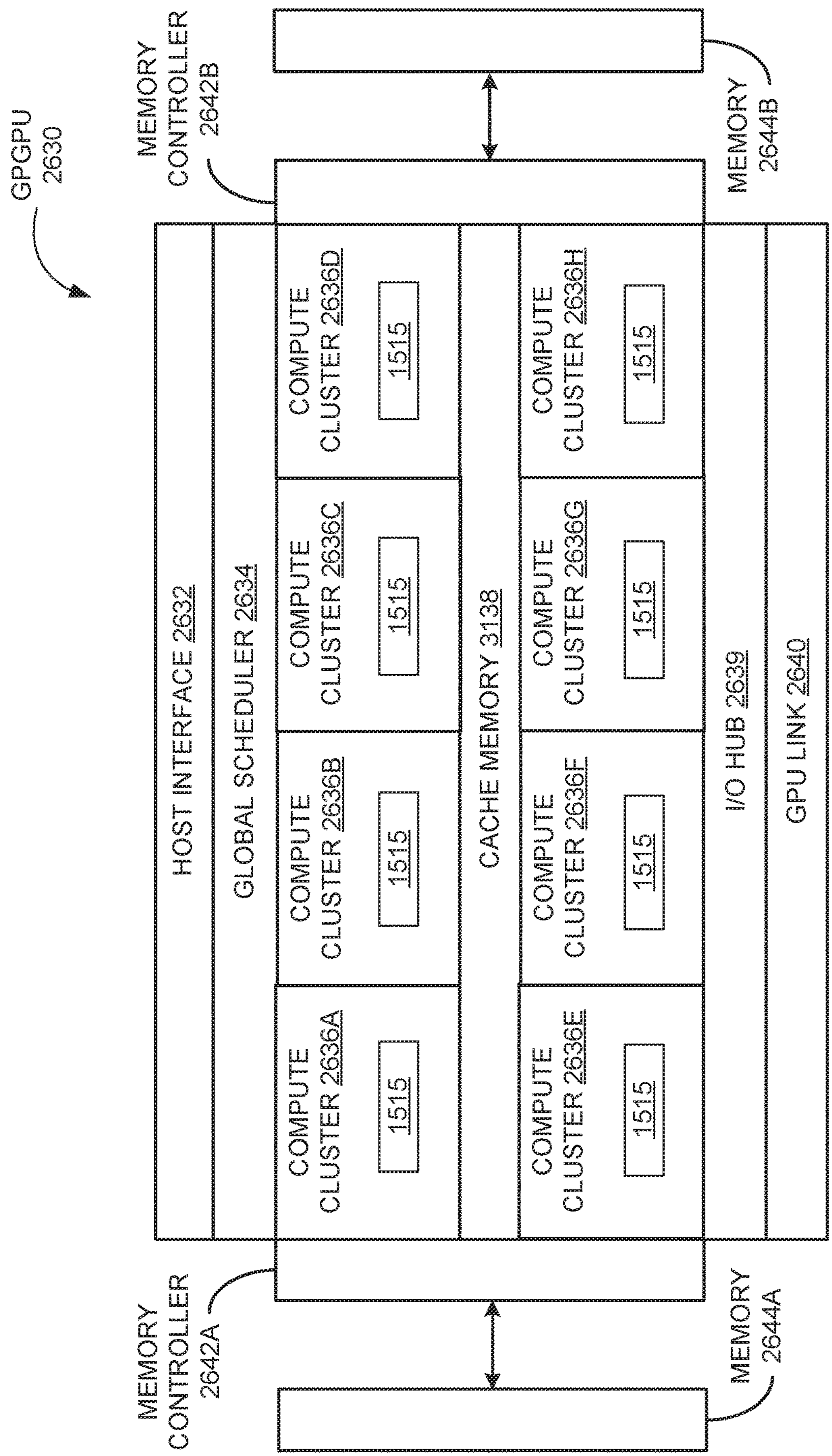

FIGS. 26A-26B illustrate additional exemplary graphics processor logic according to embodiments described herein. FIG. 26A illustrates a graphics core 2600 that may be included within graphics processor 2410 of FIG. 24, in at least one embodiment, and may be a unified shader core 2555A-2555N as in FIG. 25B in at least one embodiment. FIG. 26B illustrates a highly-parallel general-purpose graphics processing unit 2630 suitable for deployment on a multi-chip module in at least one embodiment.

In at least one embodiment, graphics core 2600 includes a shared instruction cache 2602, a texture unit 2618, and a cache/shared memory 2620 that are common to execution resources within graphics core 2600. In at least one embodiment, graphics core 2600 can include multiple slices 2601A-2601N or partition for each core, and a graphics processor can include multiple instances of graphics core 2600. Slices 2601A-2601N can include support logic including a local instruction cache 2604A-2604N, a thread scheduler 2606A-2606N, a thread dispatcher 2608A-2608N, and a set of registers 2610A-2610N. In at least one embodiment, slices 2601A-2601N can include a set of additional function units (AFUs 2612A-2612N), floating-point units (FPU 2614A-2614N), integer arithmetic logic units (ALUs 2616-2616N), address computational units (ACU 2613A-2613N), double-precision floating-point units (DPFPU 2615A-2615N), and matrix processing units (MPU 2617A-2617N).

In at least one embodiment, FPUs 2614A-2614N can perform single-precision (32-bit) and half-precision (16-bit) floating point operations, while DPFPUs 2615A-2615N perform double precision (64-bit) floating point operations. In at least one embodiment, ALUs 2616A-2616N can perform variable precision integer operations at 8-bit, 16-bit, and 32-bit precision, and can be configured for mixed precision operations. In at least one embodiment, MPUs 2617A-2617N can also be configured for mixed precision matrix operations, including half-precision floating point and 8-bit integer operations. In at least one embodiment, MPUs 2617-2617N can perform a variety of matrix operations to accelerate machine learning application frameworks, including enabling support for accelerated general matrix to matrix multiplication (GEMM). In at least one embodiment, AFUs 2612A-2612N can perform additional logic operations not supported by floating-point or integer units, including trigonometric operations (e.g., Sine, Cosine, etc.).

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics core 2600 for inferencing or predicting operations based, at least in part, on weight parameters calculated using neural network training operations, neural network functions and/or architectures, or neural network use cases described herein.

In at least one embodiment, graphics core 2600 executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics core 2600 utilizes computing resources (e.g., CPUs, ASICs, GPUs, FPGAs) to implement inferencing and/or training logic 1515 to perform inferencing and/or training operations associated with one or more embodiments. Graphics core 2600 may be utilized to implement one or more embodiments described elsewhere in this disclosure, such as those described in connection with FIGS. 1-25 and 27-43.

FIG. 26B illustrates a general-purpose processing unit (GPGPU) 2630 that can be configured to enable highly-parallel compute operations to be performed by an array of graphics processing units, in at least one embodiment. In at least one embodiment, GPGPU 2630 can be linked directly to other instances of GPGPU 2630 to create a multi-GPU cluster to improve training speed for deep neural networks. In at least one embodiment, GPGPU 2630 includes a host interface 2632 to enable a connection with a host processor. In at least one embodiment, host interface 2632 is a PCI Express interface. In at least one embodiment, host interface 2632 can be a vendor specific communications interface or communications fabric. In at least one embodiment, GPGPU 2630 receives commands from a host processor and uses a global scheduler 2634 to distribute execution threads associated with those commands to a set of compute clusters 2636A-2636H. In at least one embodiment, compute clusters 2636A-2636H share a cache memory 2638. In at least one embodiment, cache memory 2638 can serve as a higher-level cache for cache memories within compute clusters 2636A-2636H.

In at least one embodiment, GPGPU 2630 includes memory 2644A-2644B coupled with compute clusters 2636A-2636H via a set of memory controllers 2642A-2642B. In at least one embodiment, memory 2644A-2644B can include various types of memory devices including dynamic random access memory (DRAM) or graphics random access memory, such as synchronous graphics random access memory (SGRAM), including graphics double data rate (GDDR) memory.

In at least one embodiment, compute clusters 2636A-2636H each include a set of graphics cores, such as graphics core 2600 of FIG. 26A, which can include multiple types of integer and floating point logic units that can perform computational operations at a range of precisions including suited for machine learning computations. For example, in at least one embodiment, at least a subset of floating point units in each of compute clusters 2636A-2636H can be configured to perform 16-bit or 32-bit floating point operations, while a different subset of floating point units can be configured to perform 64-bit floating point operations.

In at least one embodiment, multiple instances of GPGPU 2630 can be configured to operate as a compute cluster. In at least one embodiment, communication used by compute clusters 2636A-2636H for synchronization and data exchange varies across embodiments. In at least one embodiment, multiple instances of GPGPU 2630 communicate over host interface 2632. In at least one embodiment, GPGPU 2630 includes an I/O hub 2639 that couples GPGPU 2630 with a GPU link 2640 that enables a direct connection to other instances of GPGPU 2630. In at least one embodiment, GPU link 2640 is coupled to a dedicated GPU-to-GPU bridge that enables communication and synchronization between multiple instances of GPGPU 2630. In at least one embodiment GPU link 2640 couples with a high speed interconnect to transmit and receive data to other GPGPUs or parallel processors. In at least one embodiment, multiple instances of GPGPU 2630 are located in separate data processing systems and communicate via a network device that is accessible via host interface 2632. In at least one embodiment GPU link 2640 can be configured to enable a connection to a host processor in addition to or as an alternative to host interface 2632.

In at least one embodiment, GPGPU 2630 can be configured to train neural networks. In at least one embodiment, GPGPU 2630 can be used within a inferencing platform. In at least one embodiment, in which GPGPU 2630 is used for inferencing, GPGPU may include fewer compute clusters 2636A-2636H relative to when GPGPU is used for training a neural network. In at least one embodiment, memory technology associated with memory 2644A-2644B may differ between inferencing and training configurations, with higher bandwidth memory technologies devoted to training configurations. In at least one embodiment, inferencing configuration of GPGPU 2630 can support inferencing specific instructions. For example, in at least one embodiment, an inferencing configuration can provide support for one or more 8-bit integer dot product instructions, which may be used during inferencing operations for deployed neural networks.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in GPGPU 2630 for inferencing or predicting operations based, at least in part, on weight parameters calculated using neural network training operations, neural network functions and/or architectures, or neural network use cases described herein.

In at least one embodiment, GPGPU 2630 executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, GPGPU 2630 utilizes computing resources (e.g., CPUs, ASICs, GPUs, FPGAs) to implement inferencing and/or training logic 1515 to perform inferencing and/or training operations associated with one or more embodiments. Graphics core 2600 may be utilized to implement one or more embodiments described elsewhere in this disclosure, such as those described in connection with FIGS. 1-25 and 27-43.

Figure 27:
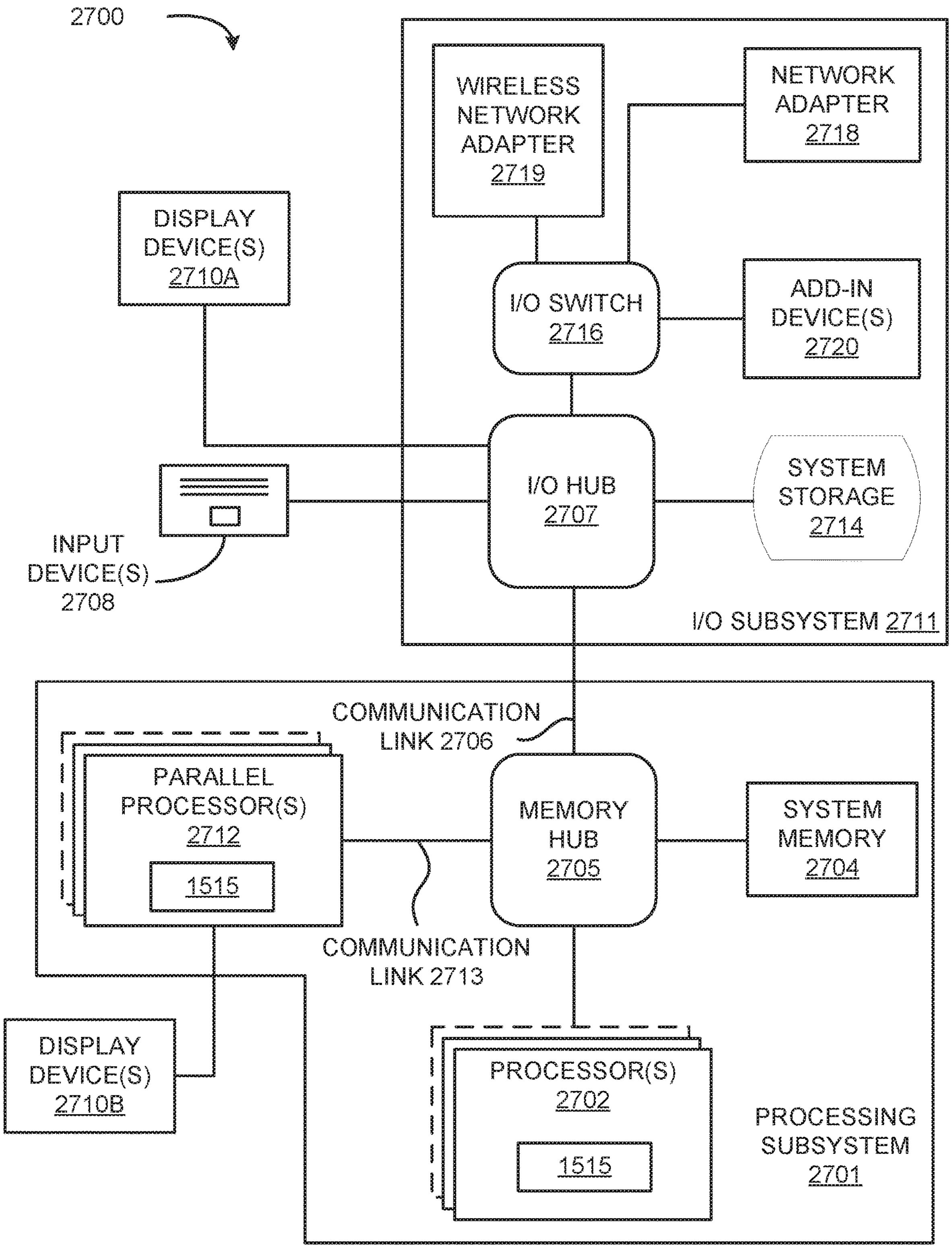
FIG. 27 illustrates a computer system, according to at least one embodiment.

FIG. 27 is a block diagram illustrating a computing system 2700 according to at least one embodiment. In at least one embodiment, computing system 2700 includes a processing subsystem 2701 having one or more processor(s) 2702 and a system memory 2704 communicating via an interconnection path that may include a memory hub 2705. In at least one embodiment, memory hub 2705 may be a separate component within a chipset component or may be integrated within one or more processor(s) 2702. In at least one embodiment, memory hub 2705 couples with an I/O subsystem 2711 via a communication link 2706. In at least one embodiment, I/O subsystem 2711 includes an I/O hub 2707 that can enable computing system 2700 to receive input from one or more input device(s) 2708. In at least one embodiment, I/O hub 2707 can enable a display controller, which may be included in one or more processor(s) 2702, to provide outputs to one or more display device(s) 2710A. In at least one embodiment, one or more display device(s) 2710A coupled with I/O hub 2707 can include a local, internal, or embedded display device.

In at least one embodiment, processing subsystem 2701 includes one or more parallel processor(s) 2712 coupled to memory hub 2705 via a bus or other communication link 2713. In at least one embodiment, communication link 2713 may be one of any number of standards based communication link technologies or protocols, such as, but not limited to PCI Express, or may be a vendor specific communications interface or communications fabric. In at least one embodiment, one or more parallel processor(s) 2712 form a computationally focused parallel or vector processing system that can include a large number of processing cores and/or processing clusters, such as a many integrated core (MIC) processor. In at least one embodiment, one or more parallel processor(s) 2712 form a graphics processing subsystem that can output pixels to one of one or more display device(s)

2710A coupled via I/O Hub 2707. In at least one embodiment, one or more parallel processor(s) 2712 can also include a display controller and display interface (not shown) to enable a direct connection to one or more display device(s) 2710B.

In at least one embodiment, a system storage unit 2714 can connect to I/O hub 2707 to provide a storage mechanism for computing system 2700. In at least one embodiment, an I/O switch 2716 can be used to provide an interface mechanism to enable connections between I/O hub 2707 and other components, such as a network adapter 2718 and/or wireless network adapter 2719 that may be integrated into platform, and various other devices that can be added via one or more add-in device(s) 2720. In at least one embodiment, network adapter 2718 can be an Ethernet adapter or another wired network adapter. In at least one embodiment, wireless network adapter 2719 can include one or more of a Wi-Fi, Bluetooth, near field communication (NFC), or other network device that includes one or more wireless radios.

In at least one embodiment, computing system 2700 can include other components not explicitly shown, including USB or other port connections, optical storage drives, video capture devices, and like, may also be connected to I/O hub 2707. In at least one embodiment, communication paths interconnecting various components in FIG. 27 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2712 incorporate circuitry optimized for graphics and video processing, including, for example, video output circuitry, and constitutes a graphics processing unit (GPU). In at least one embodiment, one or more parallel processor(s) 2712 incorporate circuitry optimized for general purpose processing. In at least embodiment, components of computing system 2700 may be integrated with one or more other system elements on a single integrated circuit. For example, in at least one embodiment, one or more parallel processor(s) 2712, memory hub 2705, processor(s) 2702, and I/O hub 2707 can be integrated into a system on chip (SoC) integrated circuit. In at least one embodiment, components of computing system 2700 can be integrated into a single package to form a system in package (SIP) configuration. In at least one embodiment, at least a portion of components of computing system 2700 can be integrated into a multi-chip module (MCM), which can be interconnected with other multi-chip modules into a modular computing system.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 2700 for inferencing or predicting operations based, at least in part, on weight parameters calculated using neural network training operations, neural network functions and/or architectures, or neural network use cases described herein.

In at least one embodiment, computing system 2700 or a component thereof (e.g., one or more parallel processor(s) 2712) executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, computing system 2700 utilizes computing resources (e.g., CPUs, ASICs, GPUs, FPGAs) to implement inferencing and/or training logic 1515 to perform inferencing and/or training operations associated with one or more embodiments. Computing system 2700 may be utilized to implement one or more embodiments described elsewhere in this disclosure, such as those described in connection with FIGS. 1-26 and 28-43.

Processors

Figure 28A:
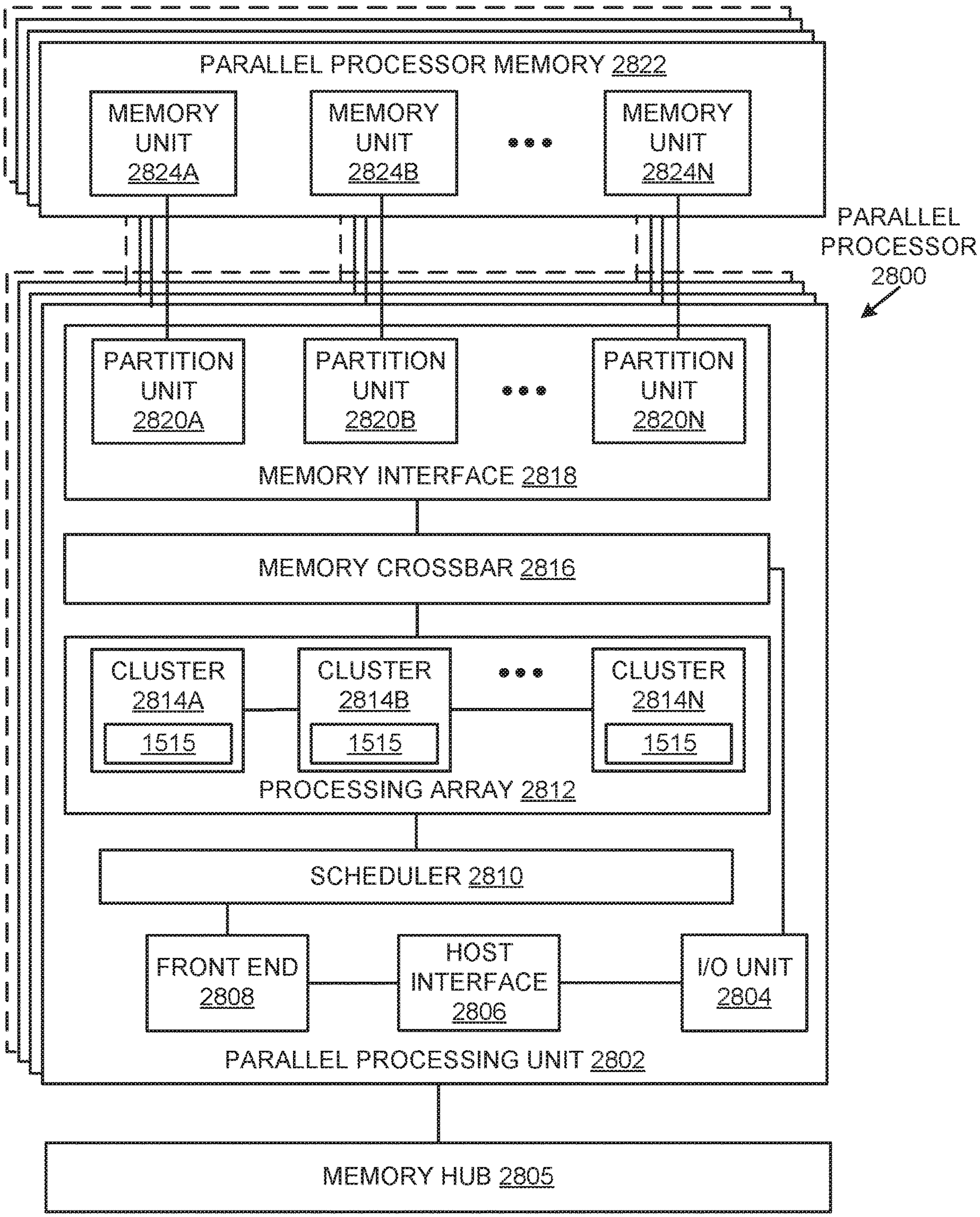
FIG. 28A illustrates a parallel processor, according to at least one embodiment.

FIG. 28A illustrates a parallel processor 2800 according to at least on embodiment. In at least one embodiment, various components of parallel processor 2800 may be implemented using one or more integrated circuit devices, such as programmable processors, application specific integrated circuits (ASICs), or field programmable gate arrays (FPGA). In at least one embodiment, illustrated parallel processor 2800 is a variant of one or more parallel processor(s) 2712 shown in FIG. 27 according to an exemplary embodiment.

In at least one embodiment, parallel processor 2800 includes a parallel processing unit 2802. In at least one embodiment, parallel processing unit 2802 includes an I/O unit 2804 that enables communication with other devices, including other instances of parallel processing unit 2802. In at least one embodiment, I/O unit 2804 may be directly connected to other devices. In at least one embodiment, I/O unit 2804 connects with other devices via use of a hub or switch interface, such as memory hub 2705. In at least one embodiment, connections between memory hub 2705 and I/O unit 2804 form a communication link 2713. In at least one embodiment, I/O unit 2804 connects with a host interface 2806 and a memory crossbar 2816, where host interface 2806 receives commands directed to performing processing operations and memory crossbar 2816 receives commands directed to performing memory operations.

In at least one embodiment, when host interface 2806 receives a command buffer via I/O unit 2804, host interface 2806 can direct work operations to perform those commands to a front end 2808. In at least one embodiment, front end 2808 couples with a scheduler 2810, which is configured to distribute commands or other work items to a processing cluster array 2812. In at least one embodiment, scheduler 2810 ensures that processing cluster array 2812 is properly configured and in a valid state before tasks are distributed to processing cluster array 2812 of processing cluster array 2812. In at least one embodiment, scheduler 2810 is implemented via firmware logic executing on a microcontroller. In at least one embodiment, microcontroller implemented scheduler 2810 is configurable to perform complex scheduling and work distribution operations at coarse and fine granularity, enabling rapid preemption and context switching of threads executing on processing array 2812. In at least one embodiment, host software can prove workloads for scheduling on processing array 2812 via one of multiple graphics processing doorbells. In at least one embodiment, workloads can then be automatically distributed across processing array 2812 by scheduler 2810 logic within a microcontroller including scheduler 2810.

In at least one embodiment, processing cluster array 2812 can include up to "N" processing clusters (e.g., cluster 2814A, cluster 2814B, through cluster 2814N). In at least one embodiment, each cluster 2814A-2814N of processing cluster array 2812 can execute a large number of concurrent threads. In at least one embodiment, scheduler 2810 can allocate work to clusters 2814A-2814N of processing cluster array 2812 using various scheduling and/or work distribution algorithms, which may vary depending on workload arising for each type of program or computation. In at least one embodiment, scheduling can be handled dynamically by scheduler 2810, or can be assisted in part by compiler logic during compilation of program logic configured for execution by processing cluster array 2812. In at least one embodiment, different clusters 2814A-2814N of processing cluster array 2812 can be allocated for processing different types of programs or for performing different types of computations.

In at least one embodiment, processing cluster array 2812 can be configured to perform various types of parallel processing operations. In at least one embodiment, processing cluster array 2812 is configured to perform general-purpose parallel compute operations. For example, in at least one embodiment, processing cluster array 2812 can include logic to execute processing tasks including filtering of video and/or audio data, performing modeling operations, including physics operations, and performing data transformations.

In at least one embodiment, processing cluster array 2812 is configured to perform parallel graphics processing operations. In at least one embodiment, processing cluster array 2812 can include additional logic to support execution of such graphics processing operations, including, but not limited to texture sampling logic to perform texture operations, as well as tessellation logic and other vertex processing logic. In at least one embodiment, processing cluster array 2812 can be configured to execute graphics processing related shader programs such as, but not limited to vertex shaders, tessellation shaders, geometry shaders, and pixel shaders. In at least one embodiment, parallel processing unit 2802 can transfer data from system memory via I/O unit 2804 for processing. In at least one embodiment, during processing, transferred data can be stored to on-chip memory (e.g., parallel processor memory 2822) during processing, then written back to system memory.

In at least one embodiment, when parallel processing unit 2802 is used to perform graphics processing, scheduler 2810 can be configured to divide a processing workload into approximately equal sized tasks, to better enable distribution of graphics processing operations to multiple clusters 2814A-2814N of processing cluster array 2812. In at least one embodiment, portions of processing cluster array 2812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2814A-2814N may be stored in buffers to allow intermediate data to be transmitted between clusters 2814A-2814N for further processing.

In at least one embodiment, processing cluster array 2812 can receive processing tasks to be executed via scheduler 2810, which receives commands defining processing tasks from front end 2808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2810 may be configured to fetch indices corresponding to tasks or may receive indices from front end 2808. In at least one embodiment, front end 2808 can be configured to ensure processing cluster array 2812 is configured to a valid state before a workload specified by incoming command buffers (e.g., batch-buffers, push buffers, etc.) is initiated.

In at least one embodiment, each of one or more instances of parallel processing unit 2802 can couple with parallel processor memory 2822. In at least one embodiment, parallel processor memory 2822 can be accessed via memory crossbar 2816, which can receive memory requests from processing cluster array 2812 as well as I/O unit 2804. In at least one embodiment, memory crossbar 2816 can access parallel processor memory 2822 via a memory interface 2818. In at least one embodiment, memory interface 2818 can include multiple partition units (e.g., partition unit 2820A, partition unit 2820B, through partition unit 2820N) that can each couple to a portion (e.g., memory unit) of parallel processor memory 2822. In at least one embodiment, a number of partition units 2820A-2820N is configured to be equal to a number of memory units, such that a first partition unit 2820A has a corresponding first memory unit 2824A, a second partition unit 2820B has a corresponding memory unit 2824B, and an Nth partition unit 2820N has a corresponding Nth memory unit 2824N. In at least one embodiment, a number of partition units 2820A-2820N may not be equal to a number of memory devices.

In at least one embodiment, memory units 2824A-2824N can include various types of memory devices, including dynamic random access memory (DRAM) or graphics random access memory, such as synchronous graphics random access memory (SGRAM), including graphics double data rate (GDDR) memory. In at least one embodiment, memory units 2824A-2824N may also include 3D stacked memory, including but not limited to high bandwidth memory (HBM). In at least one embodiment, render targets, such as frame buffers or texture maps may be stored across memory units 2824A-2824N, allowing partition units 2820A-2820N to write portions of each render target in parallel to efficiently use available bandwidth of parallel processor memory 2822. In at least one embodiment, a local instance of parallel processor memory 2822 may be excluded in favor of a unified memory design that utilizes system memory in conjunction with local cache memory.

In at least one embodiment, any one of clusters 2814A-2814N of processing cluster array 2812 can process data that will be written to any of memory units 2824A-2824N within parallel processor memory 2822. In at least one embodiment, memory crossbar 2816 can be configured to transfer an output of each cluster 2814A-2814N to any partition unit 2820A-2820N or to another cluster 2814A-2814N, which can perform additional processing operations on an output. In at least one embodiment, each cluster 2814A-2814N can communicate with memory interface 2818 through memory crossbar 2816 to read from or write to various external memory devices. In at least one embodiment, memory crossbar 2816 has a connection to memory interface 2818 to communicate with I/O unit 2804, as well as a connection to a local instance of parallel processor memory 2822, enabling processing units within different processing clusters 2814A-2814N to communicate with system memory or other memory that is not local to parallel processing unit 2802. In at least one embodiment, memory crossbar 2816 can use virtual channels to separate traffic streams between clusters 2814A-2814N and partition units 2820A-2820N.

In at least one embodiment, multiple instances of parallel processing unit 2802 can be provided on a single add-in card, or multiple add-in cards can be interconnected. In at least one embodiment, different instances of parallel processing unit 2802 can be configured to inter-operate even if different instances have different numbers of processing cores, different amounts of local parallel processor memory, and/or other configuration differences. For example, in at least one embodiment, some instances of parallel processing unit 2802 can include higher precision floating point units relative to other instances. In at least one embodiment, systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

Figure 28B:
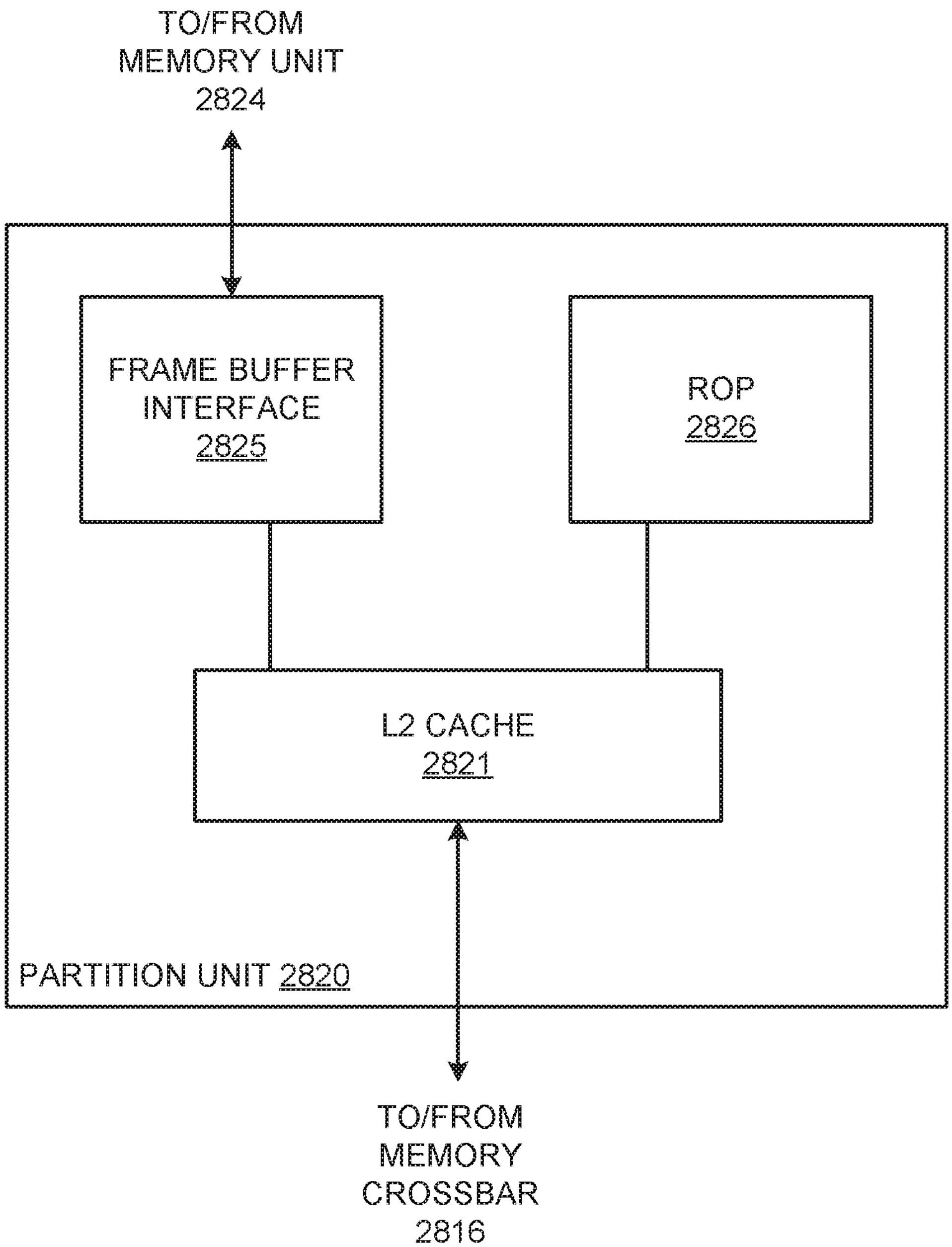
FIG. 28B illustrates a partition unit, according to at least one embodiment.

FIG. 28B is a block diagram of a partition unit 2820 according to at least one embodiment. In at least one embodiment, partition unit 2820 is an instance of one of partition units 2820A-2820N of FIG. 28A. In at least one embodiment, partition unit 2820 includes an L2 cache 2821, a frame buffer interface 2825, and a ROP 2826 (raster operations unit). L2 cache 2821 is a read/write cache that is configured to perform load and store operations received from memory crossbar 2816 and ROP 2826. In at least one embodiment, read misses and urgent write-back requests are output by L2 cache 2821 to frame buffer interface 2825 for processing. In at least one embodiment, updates can also be sent to a frame buffer via frame buffer interface 2825 for processing. In at least one embodiment, frame buffer interface 2825 interfaces with one of memory units in parallel processor memory, such as memory units 2824A-2824N of FIG. 28 (e.g., within parallel processor memory 2822).

In at least one embodiment, ROP 2826 is a processing unit that performs raster operations such as stencil, z test, blending, and like. In at least one embodiment, ROP 2826 then outputs processed graphics data that is stored in graphics memory. In at least one embodiment, ROP 2826 includes compression logic to compress depth or color data that is written to memory and decompress depth or color data that is read from memory. In at least one embodiment, compression logic can be lossless compression logic that makes use of one or more of multiple compression algorithms. type of compression that is performed by ROP 2826 can vary based on statistical characteristics of data to be compressed. For example, in at least one embodiment, delta color compression is performed on depth and color data on a per-tile basis.

In In at least one embodiment, ROP 2826 is included within each processing cluster (e.g., cluster 2814A-2814N of FIG. 28) instead of within partition unit 2820. In at least one embodiment, read and write requests for pixel data are transmitted over memory crossbar 2816 instead of pixel fragment data. In at least one embodiment, processed graphics data may be displayed on a display device, such as one of one or more display device(s) 2710 of FIG. 27, routed for further processing by processor(s) 2702, or routed for further processing by one of processing entities within parallel processor 2800 of FIG. 28A.

Figure 28C:
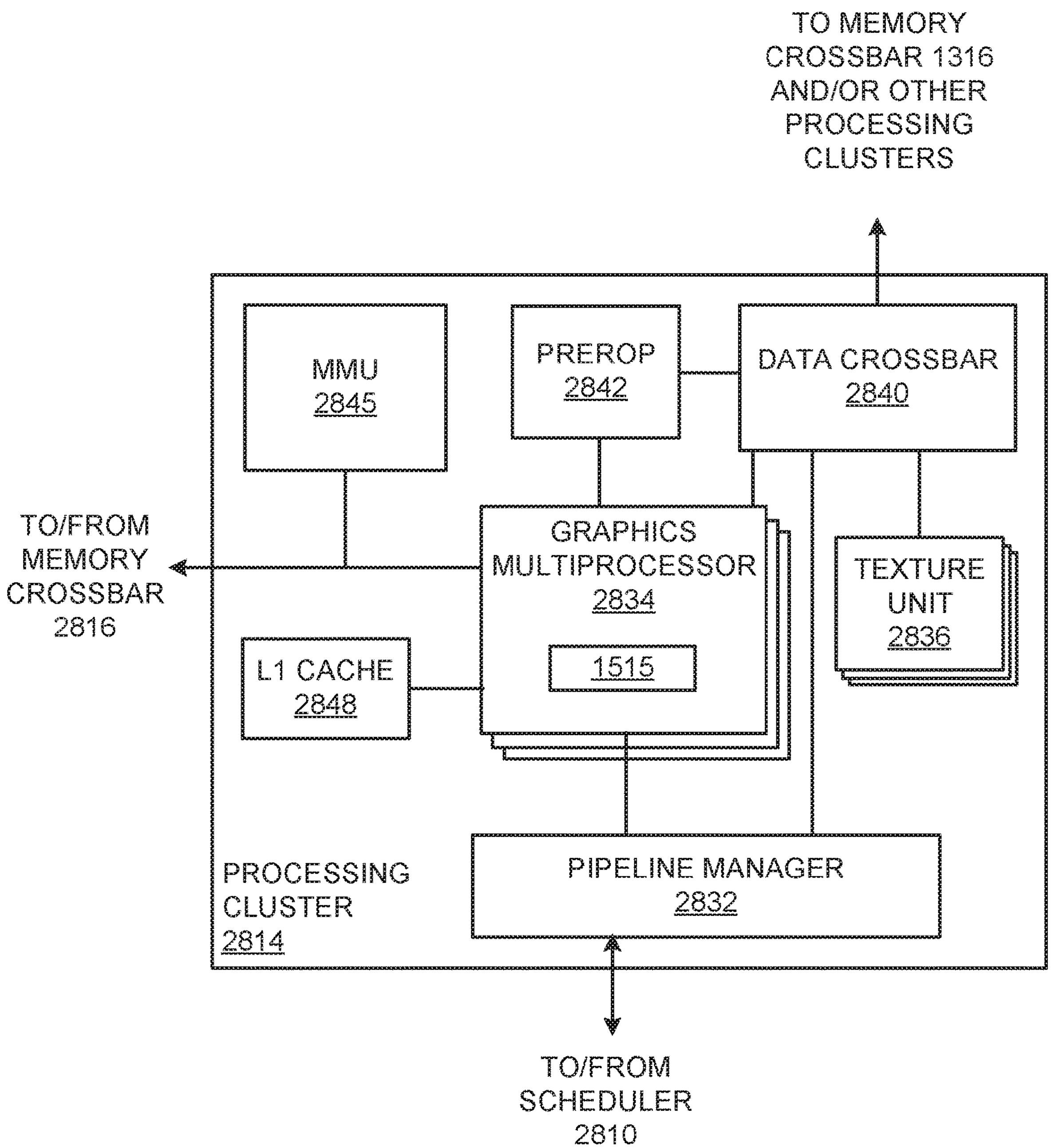
FIG. 28C illustrates a processing cluster, according to at least one embodiment.

FIG. 28C is a block diagram of a processing cluster 2814 within a parallel processing unit according to at least one embodiment. In at least one embodiment, a processing cluster is an instance of one of processing clusters 2814A-2814N of FIG. 28. In at least one embodiment, processing cluster 2814 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2814 can be controlled via a pipeline manager 2832 that distributes processing tasks to SIMT parallel processors. In at least one embodiment, pipeline manager 2832 receives instructions from scheduler 2810 of FIG. 28 and manages execution of those instructions via a graphics multiprocessor 2834 and/or a texture unit 2836. In at least one embodiment, graphics multiprocessor 2834 is an exemplary instance of a SIMT parallel processor. However, in at least one embodiment, various types of SIMT parallel processors of differing architectures may be included within processing cluster 2814. In at least one embodiment, one or more instances of graphics multiprocessor 2834 can be included within a processing cluster 2814. In at least one embodiment, graphics multiprocessor 2834 can process data and a data crossbar 2840 can be used to distribute processed data to one of multiple possible destinations, including other shader units. In at least one embodiment, pipeline manager 2832 can facilitate distribution of processed data by specifying destinations for processed data to be distributed vis data crossbar 2840.

In at least one embodiment, each graphics multiprocessor 2834 within processing cluster 2814 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2814 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2834. In at least one embodiment, a thread group may include fewer threads than a number of processing engines within graphics multiprocessor 2834. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2834. In at least one embodiment, when a thread group includes more threads than number of processing engines within graphics multiprocessor 2834, processing can be performed over consecutive clock cycles. In at least one embodiment, multiple thread groups can be executed concurrently on a graphics multiprocessor 2834.

In at least one embodiment, graphics multiprocessor 2834 includes an internal cache memory to perform load and store operations. In at least one embodiment, graphics multiprocessor 2834 can forego an internal cache and use a cache memory (e.g., L1 cache 2848) within processing cluster 2814. In at least one embodiment, each graphics multiprocessor 2834 also has access to L2 caches within partition units (e.g., partition units 2820A-2820N of FIG. 28) that are shared among all processing clusters 2814 and may be used to transfer data between threads. In at least one embodiment, graphics multiprocessor 2834 may also access off-chip global memory, which can include one or more of local parallel processor memory and/or system memory. In at least one embodiment, any memory external to parallel processing unit 2802 may be used as global memory. In at least one embodiment, processing cluster 2814 includes multiple instances of graphics multiprocessor 2834 can share common instructions and data, which may be stored in L1 cache 2848.

In at least one embodiment, each processing cluster 2814 may include an MMU 2845 (memory management unit) that is configured to map virtual addresses into physical addresses. In at least one embodiment, one or more instances of MMU 2845 may reside within memory interface 2818 of FIG. 28. In at least one embodiment, MMU 2845 includes a set of page table entries (PTEs) used to map a virtual address to a physical address of a tile (talk more about tiling) and optionally a cache line index. In at least one embodiment, MMU 2845 may include address translation lookaside buffers (TLB) or caches that may reside within graphics multiprocessor 2834 or L1 cache or processing cluster 2814. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2814 may be configured such that each graphics multiprocessor 2834 is coupled to a texture unit 2836 for performing texture mapping operations, e.g., determining texture sample positions, reading texture data, and filtering texture data. In at least one embodiment, texture data is read from an internal texture L1 cache (not shown) or from an L1 cache within graphics multiprocessor 2834 and is fetched from an L2 cache, local parallel processor memory, or system memory, as needed. In at least one embodiment, each graphics multiprocessor 2834 outputs processed tasks to data crossbar 2840 to provide processed task to another processing cluster 2814 for further processing or to store processed task in an L2 cache, local parallel processor memory, or system memory via memory crossbar 2816. In at least one embodiment, preROP 2842 (pre-raster operations unit) is configured to receive data from graphics multiprocessor 2834, direct data to ROP units, which may be located with partition units as described herein (e.g., partition units 2820A-2820N of FIG. 28). In at least one embodiment, PreROP 2842 unit can perform optimizations for color blending, organize pixel color data, and perform address translations.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics processing cluster 2814 for inferencing or predicting operations based, at least in part, on weight parameters calculated using neural network training operations, neural network functions and/or architectures, or neural network use cases described herein.

In at least one embodiment, parallel processor 2800 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, parallel processor 2800 utilizes computing resources (e.g., CPUs, ASICs, GPUs, FPGAs) to implement inferencing and/or training logic 1515 to perform inferencing and/or training operations associated with one or more embodiments. Parallel processor 2800 may be utilized to implement one or more embodiments described elsewhere in this disclosure, such as those described in connection with FIGS. 1-27 and 29-43.

Figure 28D:
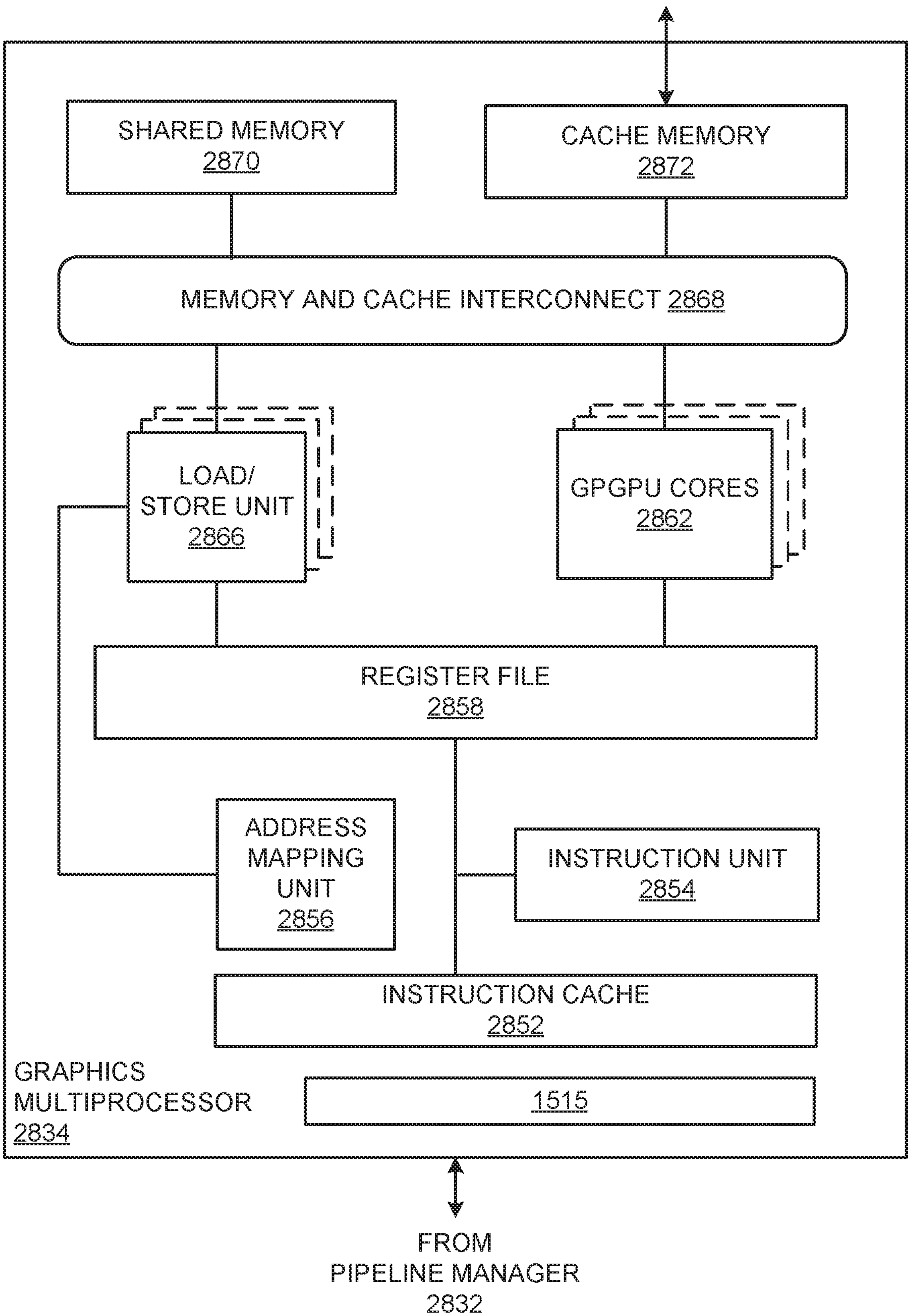
FIG. 28D illustrates a graphics multiprocessor, according to at least one embodiment.

FIG. 28D shows a graphics multiprocessor 2834 according to at least one embodiment. In at least one embodiment, graphics multiprocessor 2834 couples with pipeline manager 2832 of processing cluster 2814. In at least one embodiment, graphics multiprocessor 2834 has an execution pipeline including but not limited to an instruction cache 2852, an instruction unit 2854, an address mapping unit 2856, a register file 2858, one or more general purpose graphics processing unit (GPGPU) cores 2862, and one or more load/store units 2866. GPGPU cores 2862 and load/store units 2866 are coupled with cache memory 2872 and shared memory 2870 via a memory and cache interconnect 2868.

In at least one embodiment, instruction cache 2852 receives a stream of instructions to execute from pipeline manager 2832. In at least one embodiment, instructions are cached in instruction cache 2852 and dispatched for execution by instruction unit 2854. In at least one embodiment, instruction unit 2854 can dispatch instructions as thread groups (e.g., warps), with each thread of thread group assigned to a different execution unit within GPGPU core 2862. In at least one embodiment, an instruction can access any of a local, shared, or global address space by specifying an address within a unified address space. In at least one embodiment, address mapping unit 2856 can be used to translate addresses in a unified address space into a distinct memory address that can be accessed by load/store units 2866.

In at least one embodiment, register file 2858 provides a set of registers for functional units of graphics multiprocessor 2834. In at least one embodiment, register file 2858 provides temporary storage for operands connected to data paths of functional units (e.g., GPGPU cores 2862, load/store units 2866) of graphics multiprocessor 2834. In at least one embodiment, register file 2858 is divided between each of functional units such that each functional unit is allocated a dedicated portion of register file 2858. In at least one embodiment, register file 2858 is divided between different warps being executed by graphics multiprocessor 2834.

In at least one embodiment, GPGPU cores 2862 can each include floating point units (FPUs) and/or integer arithmetic logic units (ALUs) that are used to execute instructions of graphics multiprocessor 2834. GPGPU cores 2862 can be similar in architecture or can differ in architecture. In at least one embodiment, a first portion of GPGPU cores 2862 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2834 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2862 include SIMD logic capable of performing a single instruction on multiple sets of data. In at least one embodiment GPGPU cores 2862 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2868 is an interconnect network that connects each functional unit of graphics multiprocessor 2834 to register file 2858 and to shared memory 2870. In at least one embodiment, memory and cache interconnect 2868 is a crossbar interconnect that allows load/store unit 2866 to implement load and store operations between shared memory 2870 and register file 2858. In at least one embodiment, register file 2858 can operate at a same frequency as GPGPU cores 2862, thus data transfer between GPGPU cores 2862 and register file 2858 is very low latency. In at least one embodiment, shared memory 2870 can be used to enable communication between threads that execute on functional units within graphics multiprocessor 2834. In at least one embodiment, cache memory 2872 can be used as a data cache for example, to cache texture data communicated between functional units and texture unit 2836. In at least one embodiment, shared memory 2870 can also be used as a program managed cached. In at least one embodiment, threads executing on GPGPU cores 2862 can programmatically store data within shared memory in addition to automatically cached data that is stored within cache memory 2872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics multiprocessor 2834 for inferencing or predicting operations based, at least in part, on weight parameters calculated using neural network training operations, neural network functions and/or architectures, or neural network use cases described herein.

In at least one embodiment, graphics multiprocessor 2834 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics multiprocessor 2834 utilizes computing resources (e.g., CPUs, ASICs, GPUs, FPGAs) to implement inferencing and/or training logic 1515 to perform inferencing and/or training operations associated with one or more embodiments. Graphics multiprocessor 2834 may be utilized to implement one or more embodiments described elsewhere in this disclosure, such as those described in connection with FIGS. 1-27 and 29-43.

Figure 29:
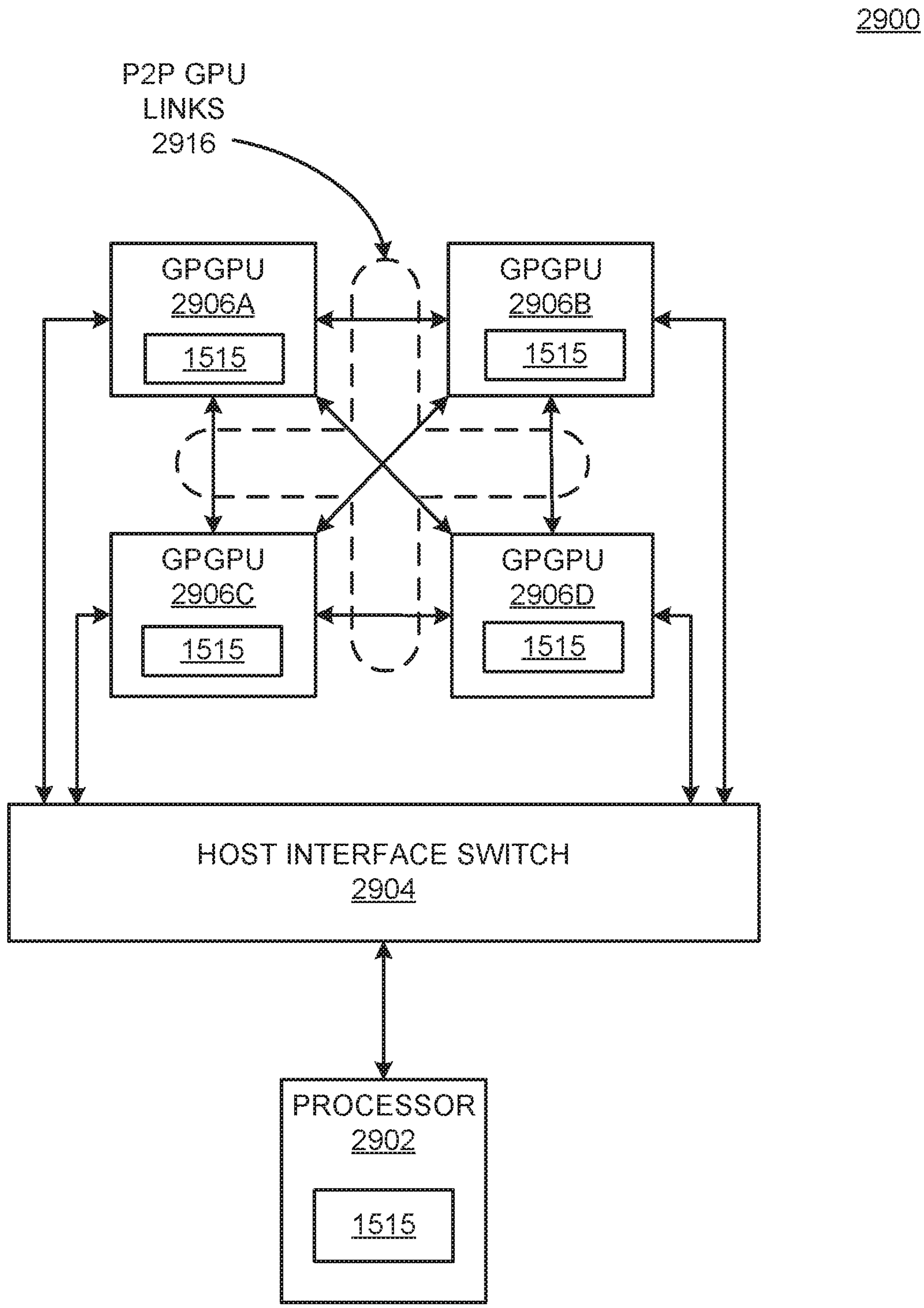
FIG. 29 illustrates a multi-graphics processing unit (GPU) system, according to at least one embodiment.

FIG. 29 illustrates a multi-GPU computing system 2900, according to at least one embodiment. In at least one embodiment, multi-GPU computing system 2900 can include a processor 2902 coupled to multiple general purpose graphics processing units (GPGPUs) 2906A-D via a host interface switch 2904. In at least one embodiment, host interface switch 2904 is a PCI express switch device that couples processor 2902 to a PCI express bus over which processor 2902 can communicate with GPGPUs 2906A-D. GPGPUs 2906A-D can interconnect via a set of high-speed point to point GPU to GPU links 2916. In at least one embodiment, GPU to GPU links 2916 connect to each of GPGPUs 2906A-D via a dedicated GPU link. In at least one embodiment, P2P GPU links 2916 enable direct communication between each of GPGPUs 2906A-D without requiring communication over host interface bus 2904 to which processor 2902 is connected. In at least one embodiment, with GPU-to-GPU traffic directed to P2P GPU links 2916, host interface bus 2904 remains available for system memory access or to communicate with other instances of multi-GPU computing system 2900, for example, via one or more network devices. While in at least one embodiment GPGPUs 2906A-D connect to processor 2902 via host interface switch 2904, in at least one embodiment processor 2902 includes direct support for P2P GPU links 2916 and can connect directly to GPGPUs 2906A-D.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in multi-GPU computing system 2900 for inferencing or predicting operations based, at least in part, on weight parameters calculated using neural network training operations, neural network functions and/or architectures, or neural network use cases described herein.

In at least one embodiment, multi-GPU computing system 2900 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, multi-GPU computing system 2900 utilizes computing resources (e.g., CPUs, ASICs, GPUs, FPGAs) to implement inferencing and/or training logic 1515 to perform inferencing and/or training operations associated with one or more embodiments. Multi-GPU computing system 2900 may be utilized to implement one or more embodiments described elsewhere in this disclosure, such as those described in connection with FIGS. 1-28 and 30-43.

Figure 30:
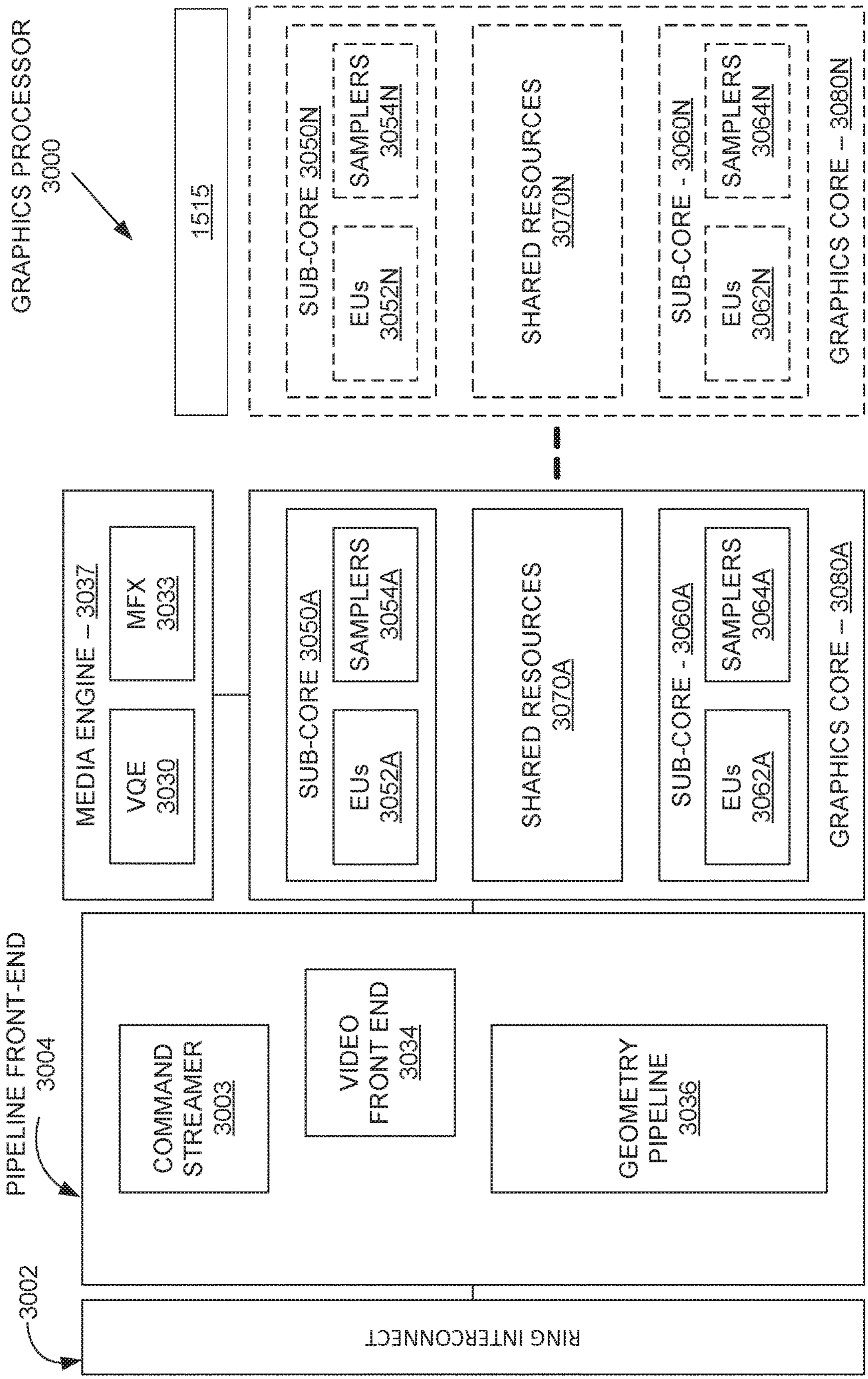
FIG. 30 illustrates a graphics processor, according to at least one embodiment.

FIG. 30 is a block diagram of a graphics processor 3000, according to at least one embodiment. In at least one embodiment, graphics processor 3000 includes a ring interconnect 3002, a pipeline front-end 3004, a media engine 3037, and graphics cores 3080A-3080N. In at least one embodiment, ring interconnect 3002 couples graphics processor 3000 to other processing units, including other graphics processors or one or more general-purpose processor cores. In at least one embodiment, graphics processor 3000 is one of many processors integrated within a multi-core processing system.

In at least one embodiment, graphics processor 3000 receives batches of commands via ring interconnect 3002. In at least one embodiment, incoming commands are interpreted by a command streamer 3003 in pipeline front-end 3004. In at least one embodiment, graphics processor 3000 includes scalable execution logic to perform 3D geometry processing and media processing via graphics core(s) 3080A-3080N. In at least one embodiment, for 3D geometry processing commands, command streamer 3003 supplies commands to geometry pipeline 3036. In at least one embodiment, for at least some media processing commands, command streamer 3003 supplies commands to a video front end 3034, which couples with a media engine 3037. In at least one embodiment, media engine 3037 includes a Video Quality Engine (VQE) 3030 for video and image post-processing and a multi-format encode/decode (MFX) 3033 engine to provide hardware-accelerated media data encode and decode. In at least one embodiment, geometry pipeline 3036 and media engine 3037 each generate execution threads for thread execution resources provided by at least one graphics core 3080A.

In at least one embodiment, graphics processor 3000 includes scalable thread execution resources featuring modular cores 3080A-3080N (sometimes referred to as core slices), each having multiple sub-cores 3050A-550N, 3060A-3060N (sometimes referred to as core sub-slices). In at least one embodiment, graphics processor 3000 can have any number of graphics cores 3080A through 3080N. In at least one embodiment, graphics processor 3000 includes a graphics core 3080A having at least a first sub-core 3050A and a second sub-core 3060A. In at least one embodiment, graphics processor 3000 is a low power processor with a single sub-core (e.g., 3050A). In at least one embodiment, graphics processor 3000 includes multiple graphics cores 3080A-3080N, each including a set of first sub-cores 3050A-3050N and a set of second sub-cores 3060A-3060N. In at least one embodiment, each sub-core in first sub-cores 3050A-3050N includes at least a first set of execution units 3052A-3052N and media/texture samplers 3054A-3054N. In at least one embodiment, each sub-core in second sub-cores 3060A-3060N includes at least a second set of execution units 3062A-3062N and samplers 3064A-3064N. In at least one embodiment, each sub-core 3050A-3050N, 3060A-3060N shares a set of shared resources 3070A-3070N. In at least one embodiment, shared resources include shared cache memory and pixel operation logic.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics processor 3000 for inferencing or predicting operations based, at least in part, on weight parameters calculated using neural network training operations, neural network functions and/or architectures, or neural network use cases described herein.

In at least one embodiment, graphics processor 3000 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics processor 3000 utilizes computing resources (e.g., CPUs, ASICs, GPUs, FPGAs) to implement inferencing and/or training logic 1515 to perform inferencing and/or training operations associated with one or more embodiments. Graphics processor 3000 may be utilized to implement one or more embodiments described elsewhere in this disclosure, such as those described in connection with FIGS. 1-29 and 31-43.

Figure 31:
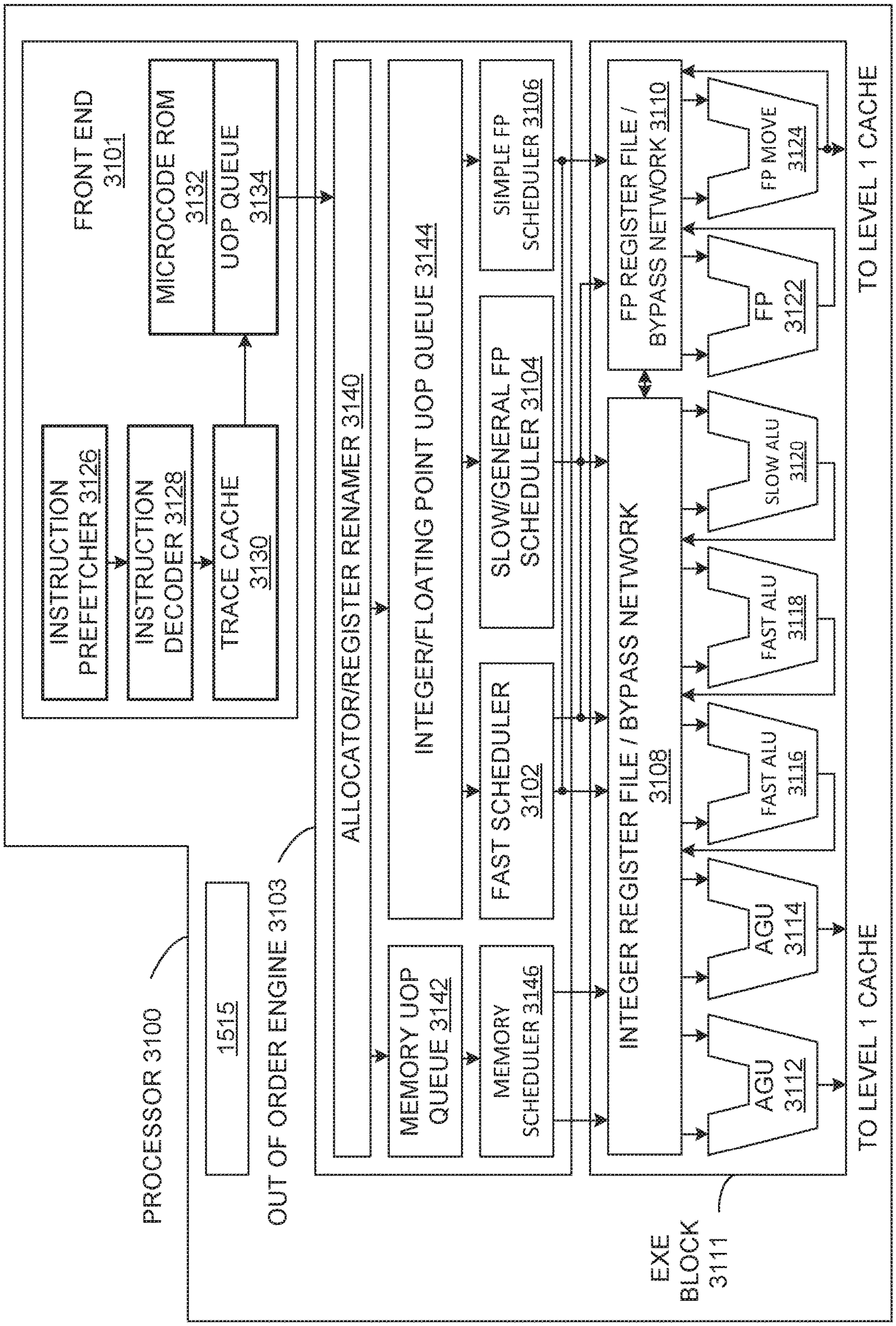
FIG. 31 is a block diagram illustrating a processor micro-architecture for a processor, according to at least one embodiment.

FIG. 31 is a block diagram illustrating micro-architecture for a processor 3100 that may include logic circuits to perform instructions, according to at least one embodiment. In at least one embodiment, processor 3100 may perform instructions, including x86 instructions, ARM instructions, specialized instructions for application-specific integrated circuits (ASICs), etc. In at least one embodiment, processor 3110 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3110 may perform instructions to accelerate machine learning or deep learning algorithms, training, or inferencing.

In at least one embodiment, processor 3100 includes an in-order front end ("front end") 3101 to fetch instructions to be executed and prepare instructions to be used later in processor pipeline. In at least one embodiment, front end 3101 may include several units. In at least one embodiment, an instruction prefetcher 3126 fetches instructions from memory and feeds instructions to an instruction decoder 3128 which in turn decodes or interprets instructions. For example, in at least one embodiment, instruction decoder 3128 decodes a received instruction into one or more operations called "micro-instructions" or "micro-operations" (also called "micro ops" or "uops") that machine may execute. In at least one embodiment, instruction decoder 3128 parses instruction into an opcode and corresponding data and control fields that may be used by micro-architecture to perform operations in accordance with at least one embodiment. In at least one embodiment, a trace cache 3130 may assemble decoded uops into program ordered sequences or traces in a uop queue 3134 for execution. In at least one embodiment, when trace cache 3130 encounters a complex instruction, a microcode ROM 3132 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3128 may access microcode ROM 3132 to perform instruction. In at least one embodiment, an instruction may be decoded into a small number of micro-ops for processing at instruction decoder 3128. In at least one embodiment, an instruction may be stored within microcode ROM 3132 should a number of micro-ops be needed to accomplish operation. In at least one embodiment, trace cache 3130 refers to an entry point programmable logic array ("PLA") to determine a correct micro-instruction pointer for reading microcode sequences to complete one or more instructions from micro-code ROM 3132 in accordance with at least one embodiment. In at least one embodiment, after microcode ROM 3132 finishes sequencing micro-ops for an instruction, front end 3101 of machine may resume fetching micro-ops from trace cache 3130.

In at least one embodiment, out-of-order execution engine ("out of order engine") 3103 may prepare instructions for execution. In at least one embodiment, out-of-order execution logic has a number of buffers to smooth out and re-order flow of instructions to optimize performance as they go down pipeline and get scheduled for execution. out-of-order execution engine 3103 includes, without limitation, an allocator/register renamer 3140, a memory uop queue 3142, an integer/floating point uop queue 3144, a memory scheduler 3146, a fast scheduler 3102, a slow/general floating point scheduler ("slow/general FP scheduler") 3104, and a simple floating point scheduler ("simple FP scheduler") 3106. In at least one embodiment, fast schedule 3102, slow/general floating point scheduler 3104, and simple floating point scheduler 3106 are also collectively referred to herein as "uop schedulers 3102, 3104, 3106." allocator/register renamer 3140 allocates machine buffers and resources that each uop needs in order to execute. In at least one embodiment, allocator/register renamer 3140 renames logic registers onto entries in a register file. In at least one embodiment, allocator/register renamer 3140 also allocates an entry for each uop in one of two uop queues, memory uop queue 3142 for memory operations and integer/floating point uop queue 3144 for non-memory operations, in front of memory scheduler 3146 and uop schedulers 3102, 3104, 3106. In at least one embodiment, uop schedulers 3102, 3104, 3106, determine when a uop is ready to execute based on readiness of their dependent input register operand sources and availability of execution resources uops need to complete their operation. In at least one embodiment, fast scheduler 3102 of at least one embodiment may schedule on each half of main clock cycle while slow/general floating point scheduler 3104 and simple floating point scheduler 3106 may schedule once per main processor clock cycle. In at least one embodiment, uop schedulers 3102, 3104, 3106 arbitrate for dispatch ports to schedule uops for execution.

In at least one embodiment, execution block b11 includes, without limitation, an integer register file/bypass network 3108, a floating point register file/bypass network ("FP register file/bypass network") 3110, address generation units ("AGUs") 3112 and 3114, fast Arithmetic Logic Units (ALUs) ("fast ALUs") 3116 and 3118, a slow Arithmetic Logic Unit ("slow ALU") 3120, a floating point ALU ("FP") 3122, and a floating point move unit ("FP move") 3124. In at least one embodiment, integer register file/bypass network 3108 and floating point register file/bypass network 3110 are also referred to herein as "register files 3108, 3110." In at least one embodiment, AGUSs 3112 and 3114, fast ALUs 3116 and 3118, slow ALU 3120, floating point ALU 3122, and floating point move unit 3124 are also referred to herein as "execution units 3112, 3114, 3116, 3118, 3120, 3122, and 3124." In at least one embodiment, execution block b11 may include, without limitation, any number (including zero) and type of register files, bypass networks, address generation units, and execution units, in any combination.

In at least one embodiment, register files 3108, 3110 may be arranged between uop schedulers 3102, 3104, 3106, and execution units 3112, 3114, 3116, 3118, 3120, 3122, and 3124. In at least one embodiment, integer register file/bypass network 3108 performs integer operations. In at least one embodiment, floating point register file/bypass network 3110 performs floating point operations. In at least one embodiment, each of register files 3108, 3110 may include, without limitation, a bypass network that may bypass or forward just completed results that have not yet been written into register file to new dependent uops. In at least one embodiment, register files 3108, 3110 may communicate data with each other. In at least one embodiment, integer register file/bypass network 3108 may include, without limitation, two separate register files, one register file for low-order thirty-two bits of data and a second register file for high order thirty-two bits of data. In at least one embodiment, floating point register file/bypass network 3110 may include, without limitation, 128-bit wide entries because floating point instructions typically have operands from 64 to 128 bits in width.

In at least one embodiment, execution units 3112, 3114, 3116, 3118, 3120, 3122, 3124 may execute instructions. In at least one embodiment, register files 3108, 3110 store integer and floating point data operand values that micro-instructions need to execute. In at least one embodiment, processor 3100 may include, without limitation, any number and combination of execution units 3112, 3114, 3116, 3118, 3120, 3122, 3124. In at least one embodiment, floating point ALU 3122 and floating point move unit 3124, may execute floating point, MMX, SIMD, AVX and SSE, or other operations, including specialized machine learning instructions. In at least one embodiment, floating point ALU 3122 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3116, 3118. In at least one embodiment, fast ALUS 3116, 3118 may execute fast operations with an effective latency of half a clock cycle. In at least one embodiment, most complex integer operations go to slow ALU 3120 as slow ALU 3120 may include, without limitation, integer execution hardware for long-latency type of operations, such as a multiplier, shifts, flag logic, and branch processing. In at least one embodiment, memory load/store operations may be executed by AGUS 3112, 3114. In at least one embodiment, fast ALU 3116, fast ALU 3118, and slow ALU 3120 may perform integer operations on 64-bit data operands. In at least one embodiment, fast ALU 3116, fast ALU 3118, and slow ALU 3120 may be implemented to support a variety of data bit sizes including sixteen, thirty-two, 128, 256, etc. In at least one embodiment, floating point ALU 3122 and floating point move unit 3124 may be implemented to support a range of operands having bits of various widths. In at least one embodiment, floating point ALU 3122 and floating point move unit 3124 may operate on 128-bit wide packed data operands in conjunction with SIMD and multimedia instructions.

In at least one embodiment, uop schedulers 3102, 3104, 3106, dispatch dependent operations before parent load has finished executing. In at least one embodiment, as uops may be speculatively scheduled and executed in processor 3100, processor 3100 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment—registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into EXE Block 3111 and other memory or registers shown or not shown. For example, in at least one embodiment, training and/or inferencing techniques described herein may use one or more of ALUs illustrated in EXE Block 3111. Moreover, weight parameters may be stored in on-chip or off-chip memory and/or registers (shown or not shown) that configure ALUs of EXE Block 3111 to perform one or more machine learning algorithms, neural network architectures, use cases, or training techniques described herein.

In at least one embodiment, processor 3100 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, processor 3100 utilizes computing resources (e.g., CPUs, ASICs, GPUs, FPGAs) to implement inferencing and/or training logic 1515 to perform inferencing and/or training operations associated with one or more embodiments. Processor 3100 may be utilized to implement one or more embodiments described elsewhere in this disclosure, such as those described in connection with FIGS. 1-30 and 32-43.

Figure 32:
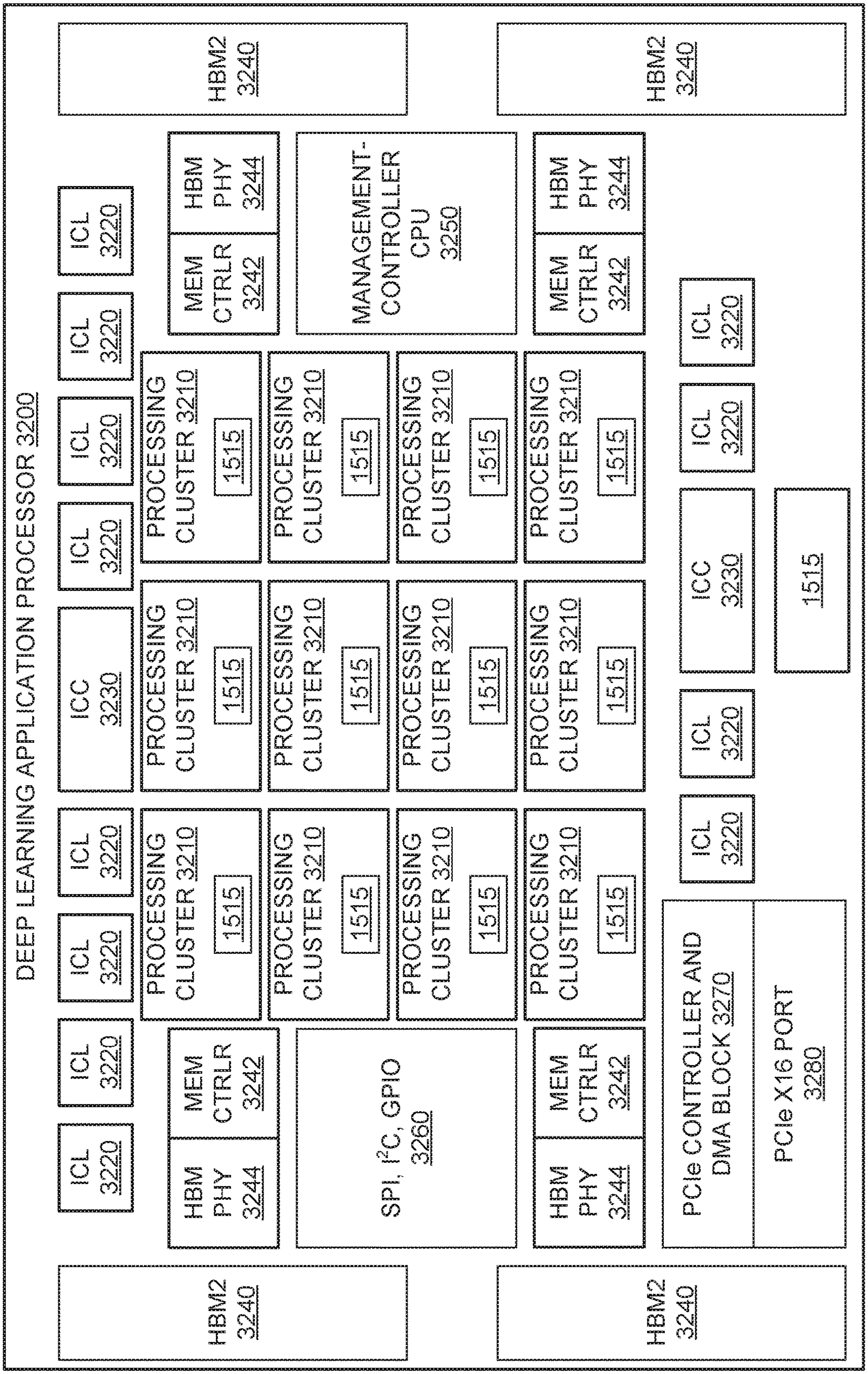
FIG. 32 illustrates a deep learning application processor, according to at least one embodiment.

FIG. 32 illustrates a deep learning application processor 3200, according to at least one embodiment. In at least one embodiment, deep learning application processor 3200 uses instructions that, if executed by deep learning application processor 3200, cause deep learning application processor 3200 to perform some or all of processes and techniques described throughout this disclosure. In at least one embodiment, deep learning application processor 3200 is an application-specific integrated circuit (ASIC). In at least one embodiment, application processor 3200 performs matrix multiply operations either "hard-wired" into hardware as a result of performing one or more instructions or both. In at least one embodiment, deep learning application processor 3200 includes, without limitation, processing clusters 3210(1)-3210(12), Inter-Chip Links ("ICLs") 3220(1)-3220(12), Inter-Chip Controllers ("ICCs") 3230(1)-3230(2), high bandwidth memory second generation ("HBM2") 3240(1)-3240(4), memory controllers ("Mem Ctrlrs") 3242(1)-3242(4), high bandwidth memory physical layer ("HBM PHY") 3244(1)-3244(4), a management-controller central processing unit ("management-controller CPU") 3250, a Serial Peripheral Interface, Inter-Integrated Circuit, and General Purpose Input/Output block ("SPI, I2C, GPIO") 3260, a peripheral component interconnect express controller and direct memory access block ("PCIe Controller and DMA") 3270, and a sixteen-lane peripheral component interconnect express port ("PCI Express×16") 3280.

In at least one embodiment, processing clusters 3210 may perform deep learning operations, including inference or prediction operations based on weight parameters calculated one or more training techniques, including those described herein. In at least one embodiment, each processing cluster 3210 may include, without limitation, any number and type of processors. In at least one embodiment, deep learning application processor 3200 may include any number and type of processing clusters 3200. In at least one embodiment, Inter-Chip Links 3220 are bi-directional. In at least one embodiment, Inter-Chip Links 3220 and Inter-Chip Controllers 3230 enable multiple deep learning application processors 3200 to exchange information, including activation information resulting from performing one or more machine learning algorithms embodied in one or more neural networks. In at least one embodiment, deep learning application processor 3200 may include any number (including zero) and type of ICLs 3220 and ICCs 3230.

In at least one embodiment, HBM2s 3240 provide a total of 32 Gigabytes (GB) of memory. HBM2 3240(*i*) is associated with both memory controller 3242(*i*) and HBM PHY 3244(*i*). In at least one embodiment, any number of HBM2s 3240 may provide any type and total amount of high bandwidth memory and may be associated with any number (including zero) and type of memory controllers 3242 and HBM PHYs 3244. In at least one embodiment, SPI, I2C, GPIO 3260, PCIe Controller and DMA 3270, and/or PCIe 3280 may be replaced with any number and type of blocks that enable any number and type of communication standards in any technically feasible fashion.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to deep learning application processor 3200. In at least one embodiment, deep learning application processor 3200 is used to infer or predict information based on a trained machine learning model (e.g., neural network) that has been trained by another processor or system or by deep learning application processor 3200. In at least one embodiment, processor 3200 may be used to perform one or more neural network use cases described herein.

In at least one embodiment, deep learning application processor 3200 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, deep learning application processor 3200 utilizes computing resources (e.g., CPUs, ASICs, GPUs, FPGAs) to implement inferencing and/or training logic 1515 to perform inferencing and/or training operations associated with one or more embodiments. Deep learning application processor 3200 may be utilized to implement one or more embodiments described elsewhere in this disclosure, such as those described in connection with FIGS. 1-31 and 33-43.

Figure 33:
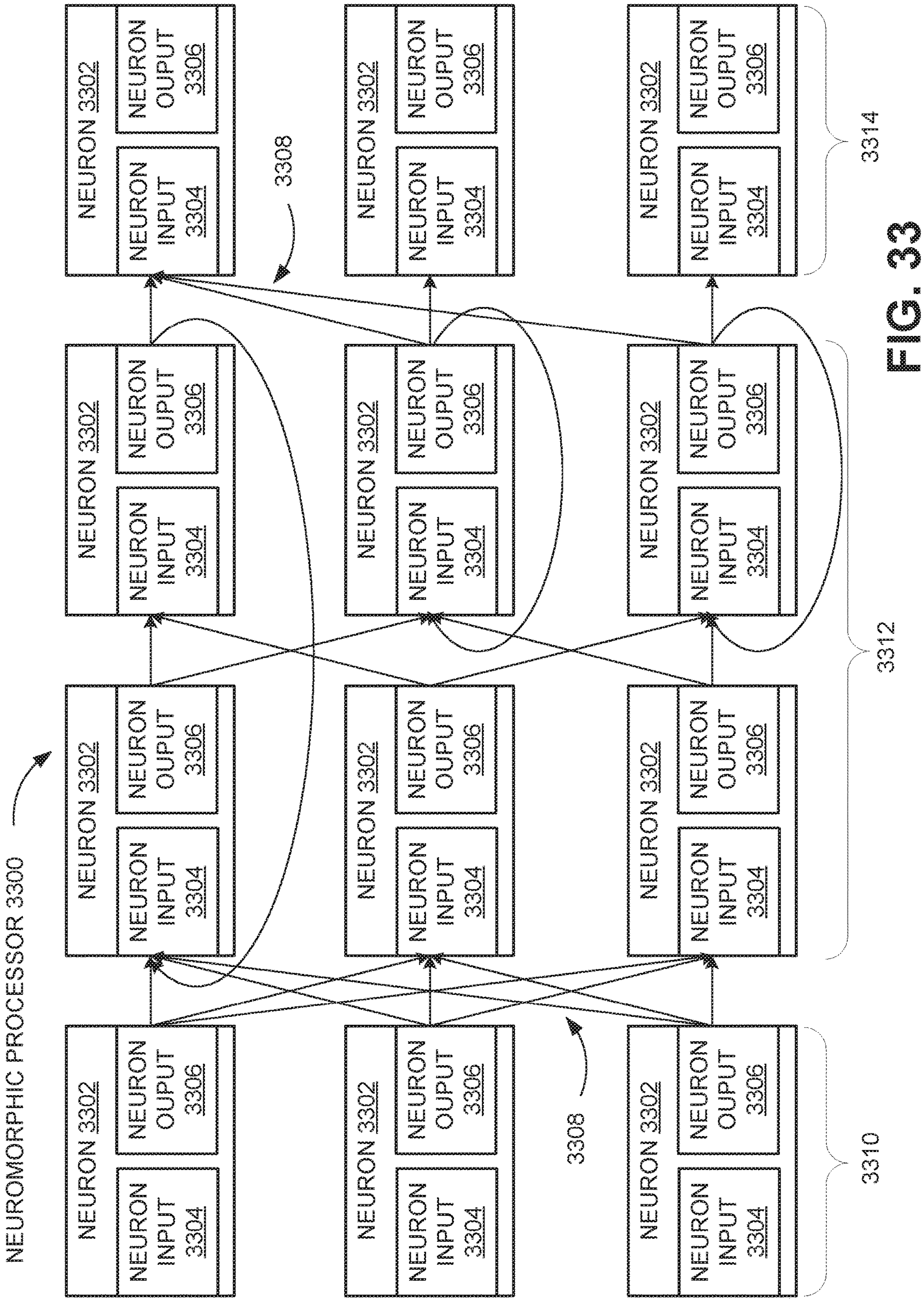
FIG. 33 is a block diagram illustrating an example neuromorphic processor, according to at least one embodiment.

FIG. 33 is a block diagram of a neuromorphic processor 3300, according to at least one embodiment. In at least one embodiment, neuromorphic processor 3300 may receive one or more inputs from sources external to neuromorphic processor 3300. In at least one embodiment, these inputs may be transmitted to one or more neurons 3302 within neuromorphic processor 3300. In at least one embodiment, neurons 3302 and components thereof may be implemented using circuitry or logic, including one or more arithmetic logic units (ALUs). In at least one embodiment, neuromorphic processor 3300 may include, without limitation, thousands or millions of instances of neurons 3302, but any suitable number of neurons 3302 may be used. In at least one embodiment, each instance of neuron 3302 may include a neuron input 3304 and a neuron output 3306. In at least one embodiment, neurons 3302 may generate outputs that may be transmitted to inputs of other instances of neurons 3302. For example, in at least one embodiment, neuron inputs 3304 and neuron outputs 3306 may be interconnected via synapses 3308.

In at least one embodiment, neurons 3302 and synapses 3308 may be interconnected such that neuromorphic processor 3300 operates to process or analyze information received by neuromorphic processor 3300. In at least one embodiment, neurons 3302 may transmit an output pulse (or "fire" or "spike") when inputs received through neuron input 3304 exceed a threshold. In at least one embodiment, neurons 3302 may sum or integrate signals received at neuron inputs 3304. For example, in at least one embodiment, neurons 3302 may be implemented as leaky integrate-and-fire neurons, wherein if a sum (referred to as a "membrane potential") exceeds a threshold value, neuron 3302 may generate an output (or "fire") using a transfer function such as a sigmoid or threshold function. In at least one embodiment, a leaky integrate-and-fire neuron may sum signals received at neuron inputs 3304 into a membrane potential and may also apply a decay factor (or leak) to reduce a membrane potential. In at least one embodiment, a leaky integrate-and-fire neuron may fire if multiple input signals are received at neuron inputs 3304 rapidly enough to exceed a threshold value (i.e., before a membrane potential decays too low to fire). In at least one embodiment, neurons 3302 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3302 may include, without limitation, comparator circuits or logic that generate an output spike at neuron output 3306 when result of applying a transfer function to neuron input 3304 exceeds a threshold. In at least one embodiment, once neuron 3302 fires, it may disregard previously received input information by, for example, resetting a membrane potential to 0 or another suitable default value. In at least one embodiment, once membrane potential is reset to 0, neuron 3302 may resume normal operation after a suitable period of time (or refractory period).

In at least one embodiment, neurons 3302 may be interconnected through synapses 3308. In at least one embodiment, synapses 3308 may operate to transmit signals from an output of a first neuron 3302 to an input of a second neuron 3302. In at least one embodiment, neurons 3302 may transmit information over more than one instance of synapse 3308. In at least one embodiment, one or more instances of neuron output 3306 may be connected, via an instance of synapse 3308, to an instance of neuron input 3304 in same neuron 3302. In at least one embodiment, an instance of neuron 3302 generating an output to be transmitted over an instance of synapse 3308 may be referred to as a "pre-synaptic neuron" with respect to that instance of synapse 3308. In at least one embodiment, an instance of neuron 3302 receiving an input transmitted over an instance of synapse 3308 may be referred to as a "post-synaptic neuron" with respect to that instance of synapse 3308. Because an instance of neuron 3302 may receive inputs from one or more instances of synapse 3308, and may also transmit outputs over one or more instances of synapse 3308, a single instance of neuron 3302 may therefore be both a "pre-synaptic neuron" and "post-synaptic neuron," with respect to various instances of synapses 3308, in at least one embodiment.

In at least one embodiment, neurons 3302 may be organized into one or more layers. Each instance of neuron 3302 may have one neuron output 3306 that may fan out through one or more synapses 3308 to one or more neuron inputs 3304. In at least one embodiment, neuron outputs 3306 of neurons 3302 in a first layer 3310 may be connected to neuron inputs 3304 of neurons 3302 in a second layer 3312. In at least one embodiment, layer 3310 may be referred to as a "feed-forward layer." In at least one embodiment, each instance of neuron 3302 in an instance of first layer 3310 may fan out to each instance of neuron 3302 in second layer 3312. In at least one embodiment, first layer 3310 may be referred to as a "fully connected feed-forward layer." In at least one embodiment, each instance of neuron 3302 in an instance of second layer 3312 may fan out to fewer than all instances of neuron 3302 in a third layer 3314. In at least one embodiment, second layer 3312 may be referred to as a "sparsely connected feed-forward layer." In at least one embodiment, neurons 3302 in second layer 3312 may fan out to neurons 3302 in multiple other layers, including to neurons 3302 in (same) second layer 3312. In at least one embodiment, second layer 3312 may be referred to as a "recurrent layer." neuromorphic processor 3300 may include, without limitation, any suitable combination of recurrent layers and feed-forward layers, including, without limitation, both sparsely connected feed-forward layers and fully connected feed-forward layers.

In at least one embodiment, neuromorphic processor 3300 may include, without limitation, a reconfigurable interconnect architecture or dedicated hard wired interconnects to connect synapse 3308 to neurons 3302. In at least one embodiment, neuromorphic processor 3300 may include, without limitation, circuitry or logic that allows synapses to be allocated to different neurons 3302 as needed based on neural network topology and neuron fan-in/out. For example, in at least one embodiment, synapses 3308 may be connected to neurons 3302 using an interconnect fabric, such as network-on-chip, or with dedicated connections. In at least one embodiment, synapse interconnections and components thereof may be implemented using circuitry or logic.

In at least one embodiment, neuromorphic processor 3300 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, neuromorphic processor 3300 utilizes computing resources (e.g., CPUs, ASICs, GPUs, FPGAs) to implement inferencing and/or training logic 1515 to perform inferencing and/or training operations associated with one or more embodiments. Neuromorphic processor 3300 may be utilized to implement one or more embodiments described elsewhere in this disclosure, such as those described in connection with FIGS. 1-32 and 34-43.

Figure 34:
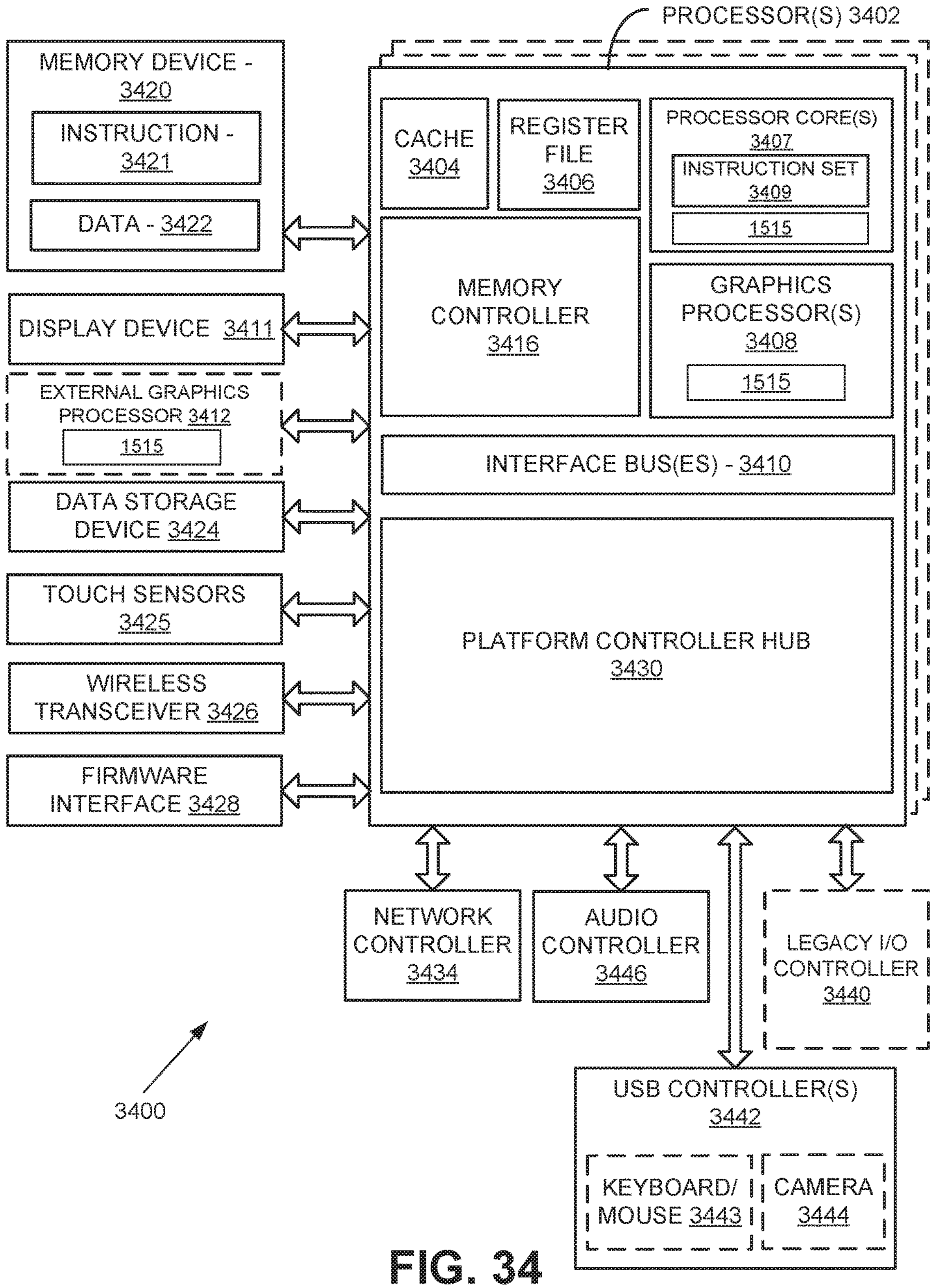
FIG. 34 illustrates at least portions of a graphics processor, according to one or more embodiments.

FIG. 34 is a block diagram of a processing system, according to at least one embodiment. In at least one embodiment, system 3400 includes one or more processors 3402 and one or more graphics processors 3408, and may be a single processor desktop system, a multiprocessor workstation system, or a server system having a large number of processors 3402 or processor cores 3407. In at least one embodiment, system 3400 is a processing platform incorporated within a system-on-a-chip (SoC) integrated circuit for use in mobile, handheld, or embedded devices.

In at least one embodiment, system 3400 can include, or be incorporated within a server-based gaming platform, a game console, including a game and media console, a mobile gaming console, a handheld game console, or an online game console. In at least one embodiment, system 3400 is a mobile phone, smart phone, tablet computing device or mobile Internet device. In at least one embodiment, processing system 3400 can also include, couple with, or be integrated within a wearable device, such as a smart watch wearable device, smart eyewear device, augmented reality device, or virtual reality device. In at least one embodiment, processing system 3400 is a television or set top box device having one or more processors 3402 and a graphical interface generated by one or more graphics processors 3408.

In at least one embodiment, one or more processors 3402 each include one or more processor cores 3407 to process instructions which, when executed, perform operations for system and user software. In at least one embodiment, each of one or more processor cores 3407 is configured to process a specific instruction set 3409. In at least one embodiment, instruction set 3409 may facilitate Complex Instruction Set Computing (CISC), Reduced Instruction Set Computing (RISC), or computing via a Very Long Instruction Word (VLIW). In at least one embodiment, processor cores 3407 may each process a different instruction set 3409, which may include instructions to facilitate emulation of other instruction sets. In at least one embodiment, processor core 3407 may also include other processing devices, such a Digital Signal Processor (DSP).

In at least one embodiment, processor 3402 includes cache memory 3404. In at least one embodiment, processor 3402 can have a single internal cache or multiple levels of internal cache. In at least one embodiment, cache memory is shared among various components of processor 3402. In at least one embodiment, processor 3402 also uses an external cache (e.g., a Level-3 (L3) cache or Last Level Cache (LLC)) (not shown), which may be shared among processor cores 3407 using known cache coherency techniques. In at least one embodiment, register file 3406 is additionally included in processor 3402 which may include different types of registers for storing different types of data (e.g., integer registers, floating point registers, status registers, and an instruction pointer register). In at least one embodiment, register file 3406 may include general-purpose registers or other registers.

In at least one embodiment, one or more processor(s) 3402 are coupled with one or more interface bus(es) 3410 to transmit communication signals such as address, data, or control signals between processor 3402 and other components in system 3400. In at least one embodiment interface bus 3410, in one embodiment, can be a processor bus, such as a version of a Direct Media Interface (DMI) bus. In at least one embodiment, interface 3410 is not limited to a DMI bus, and may include one or more Peripheral Component Interconnect buses (e.g., PCI, PCI Express), memory busses, or other types of interface busses. In at least one embodiment processor(s) 3402 include an integrated memory controller 3416 and a platform controller hub 3430. In at least one embodiment, memory controller 3416 facilitates communication between a memory device and other components of system 3400, while platform controller hub (PCH) 3430 provides connections to I/O devices via a local I/O bus.

In at least one embodiment, memory device 3420 can be a dynamic random access memory (DRAM) device, a static random access memory (SRAM) device, flash memory device, phase-change memory device, or some other memory device having suitable performance to serve as process memory. In at least one embodiment memory device 3420 can operate as system memory for system 3400, to store data 3422 and instructions 3421 for use when one or more processors 3402 executes an application or process. In at least one embodiment, memory controller 3416 also couples with an optional external graphics processor 3412, which may communicate with one or more graphics processors 3408 in processors 3402 to perform graphics and media operations. In at least one embodiment, a display device 3411 can connect to processor(s) 3402. In at least one embodiment display device 3411 can include one or more of an internal display device, as in a mobile electronic device or a laptop device or an external display device attached via a display interface (e.g., DisplayPort, etc.). In at least one embodiment, display device 3411 can include a head mounted display (HMD) such as a stereoscopic display device for use in virtual reality (VR) applications or augmented reality (AR) applications.

In at least one embodiment, platform controller hub 3430 enables peripherals to connect to memory device 3420 and processor 3402 via a high-speed I/O bus. In at least one embodiment, I/O peripherals include, but are not limited to, an audio controller 3446, a network controller 3434, a firmware interface 3428, a wireless transceiver 3426, touch sensors 3425, a data storage device 3424 (e.g., hard disk drive, flash memory, etc.). In at least one embodiment, data storage device 3424 can connect via a storage interface (e.g., SATA) or via a peripheral bus, such as a Peripheral Component Interconnect bus (e.g., PCI, PCI Express). In at least one embodiment, touch sensors 3425 can include touch screen sensors, pressure sensors, or fingerprint sensors. In at least one embodiment, wireless transceiver 3426 can be a Wi-Fi transceiver, a Bluetooth transceiver, or a mobile network transceiver such as a 3G, 4G, or Long Term Evolution (LTE) transceiver. In at least one embodiment, firmware interface 3428 enables communication with system firmware, and can be, for example, a unified extensible firmware interface (UEFI). In at least one embodiment, network controller 3434 can enable a network connection to a wired network. In at least one embodiment, a high-performance network controller (not shown) couples with interface bus 3410. In at least one embodiment, audio controller 3446 is a multi-channel high definition audio controller. In at least one embodiment, system 3400 includes an optional legacy I/O controller 3440 for coupling legacy (e.g., Personal System 2 (PS/2)) devices to system. In at least one embodiment, platform controller hub 3430 can also connect to one or more Universal Serial Bus (USB) controllers 3442 connect input devices, such as keyboard and mouse 3443 combinations, a camera 3444, or other USB input devices.

In at least one embodiment, an instance of memory controller 3416 and platform controller hub 3430 may be integrated into a discreet external graphics processor, such as external graphics processor 3412. In at least one embodiment, platform controller hub 3430 and/or memory controller 3416 may be external to one or more processor(s) 3402. For example, in at least one embodiment, system 3400 can include an external memory controller 3416 and platform controller hub 3430, which may be configured as a memory controller hub and peripheral controller hub within a system chipset that is in communication with processor(s) 3402.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3400. For example, in at least one embodiment, training and/or inferencing techniques described herein may use one or more of ALUs embodied in 3D pipeline 3412. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3400 to perform one or more machine learning algorithms, neural network architectures, use cases, or training techniques described herein.

In at least one embodiment, graphics processor 3400 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics processor 3400 utilizes computing resources (e.g., CPUs, ASICs, GPUs, FPGAs) to implement inferencing and/or training logic 1515 to perform inferencing and/or training operations associated with one or more embodiments. Graphics processor 3400 may be utilized to implement one or more embodiments described elsewhere in this disclosure, such as those described in connection with FIGS. 1-33 and 35-43.

Figure 35:
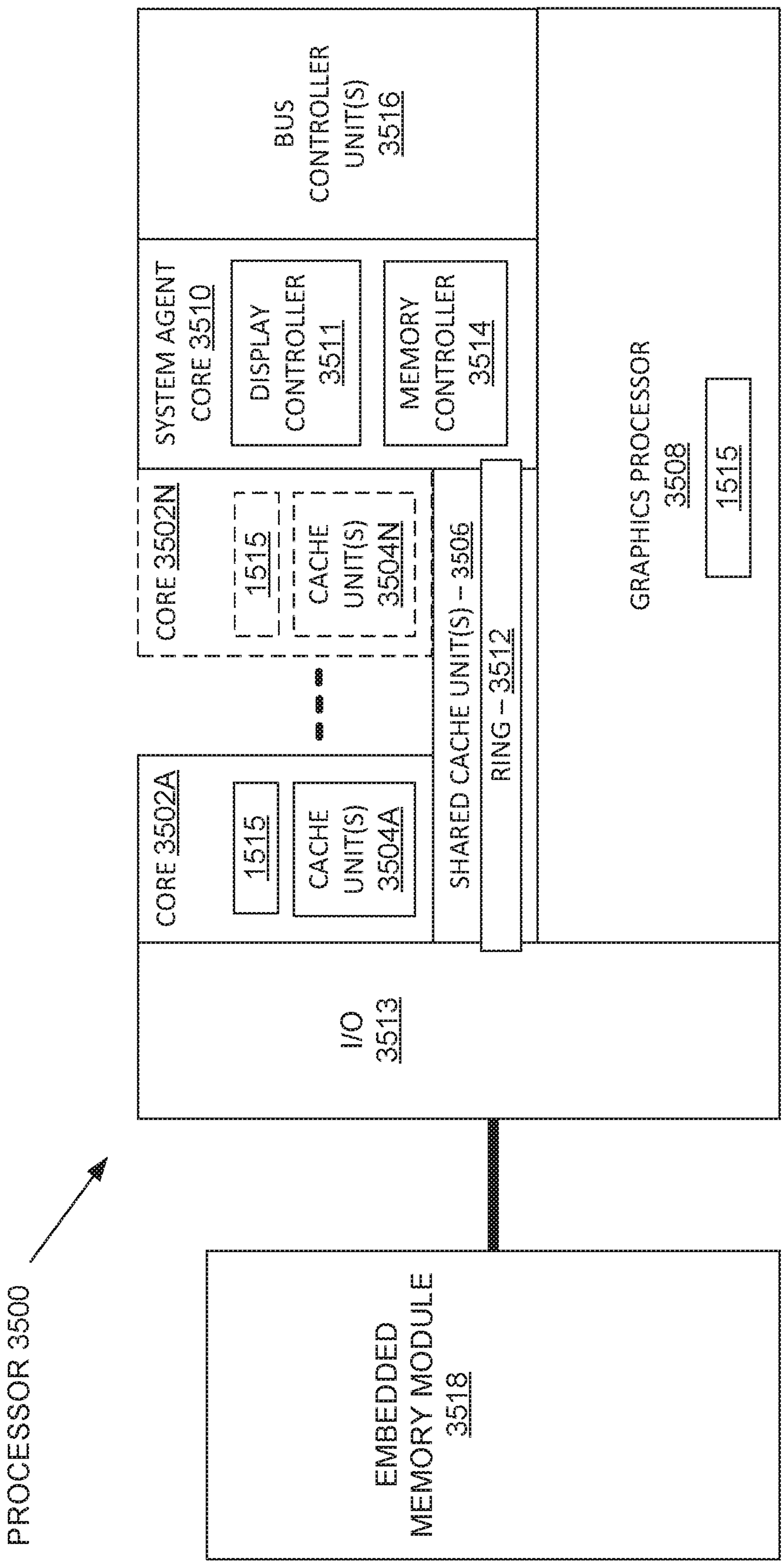
FIG. 35 illustrates at least portions of a graphics processor, according to one or more embodiments.

FIG. 35 is a block diagram of a processor 3500 having one or more processor cores 3502A-3502N, an integrated memory controller 3514, and an integrated graphics processor 3508, according to at least one embodiment. In at least one embodiment, processor 3500 can include additional cores up to and including additional core 3502N represented by dashed lined boxes. In at least one embodiment, each of processor cores 3502A-3502N includes one or more internal cache units 3504A-3504N. In at least one embodiment, each processor core also has access to one or more shared cached units 3506.

In at least one embodiment, internal cache units 3504A-3504N and shared cache units 3506 represent a cache memory hierarchy within processor 3500. In at least one embodiment, cache memory units 3504A-3504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3506 and 3504A-3504N.

In at least one embodiment, processor 3500 may also include a set of one or more bus controller units 3516 and a system agent core 3510. In at least one embodiment, one or more bus controller units 3516 manage a set of peripheral buses, such as one or more PCI or PCI express busses. In at least one embodiment, system agent core 3510 provides management functionality for various processor components. In at least one embodiment, system agent core 3510 includes one or more integrated memory controllers 3514 to manage access to various external memory devices (not shown).

In at least one embodiment, one or more of processor cores 3502A-3502N include support for simultaneous multi-threading. In at least one embodiment, system agent core 3510 includes components for coordinating and operating cores 3502A-3502N during multi-threaded processing. In at least one embodiment, system agent core 3510 may additionally include a power control unit (PCU), which includes logic and components to regulate one or more power states of processor cores 3502A-3502N and graphics processor 3508.

In at least one embodiment, processor 3500 additionally includes graphics processor 3508 to execute graphics processing operations. In at least one embodiment, graphics processor 3508 couples with shared cache units 3506, and system agent core 3510, including one or more integrated memory controllers 3514. In at least one embodiment, system agent core 3510 also includes a display controller 3511 to drive graphics processor output to one or more coupled displays. In at least one embodiment, display controller 3511 may also be a separate module coupled with graphics processor 3508 via at least one interconnect, or may be integrated within graphics processor 3508.

In at least one embodiment, a ring based interconnect unit 3512 is used to couple internal components of processor 3500. In at least one embodiment, an alternative interconnect unit may be used, such as a point-to-point interconnect, a switched interconnect, or other techniques. In at least one embodiment, graphics processor 3508 couples with ring interconnect 3512 via an I/O link 3513.

In at least one embodiment, I/O link 3513 represents at least one of multiple varieties of I/O interconnects, including an on package I/O interconnect which facilitates communication between various processor components and a high-performance embedded memory module 3518, such as an eDRAM module. In at least one embodiment, each of processor cores 3502A-3502N and graphics processor 3508 use embedded memory modules 3518 as a shared Last Level Cache.

In at least one embodiment, processor cores 3502A-3502N are homogenous cores executing a common instruction set architecture. In at least one embodiment, processor cores 3502A-3502N are heterogeneous in terms of instruction set architecture (ISA), where one or more of processor cores 3502A-3502N execute a common instruction set, while one or more other cores of processor cores 3502A-35-02N executes a subset of a common instruction set or a different instruction set. In at least one embodiment, processor cores 3502A-3502N are heterogeneous in terms of microarchitecture, where one or more cores having a relatively higher power consumption couple with one or more power cores having a lower power consumption. In at least one embodiment, processor 3500 can be implemented on one or more chips or as an SoC integrated circuit.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3510. For example, in at least one embodiment, training and/or inferencing techniques described herein may use one or more of ALUs embodied in 3D pipeline 3412, graphics core(s) 3515A, shared function logic 3516, graphics core(s) 3515B, shared function logic 3520, or other logic in FIG. 35. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3510 to perform one or more machine learning algorithms, neural network architectures, use cases, or training techniques described herein.

In at least one embodiment, processor 3500 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, processor 3500 utilizes computing resources (e.g., CPUs, ASICs, GPUs, FPGAs) to implement inferencing and/or training logic 1515 to perform inferencing and/or training operations associated with one or more embodiments. Processor 3500 may be utilized to implement one or more embodiments described elsewhere in this disclosure, such as those described in connection with FIGS. 1-34 and 36-43.

Figure 36:
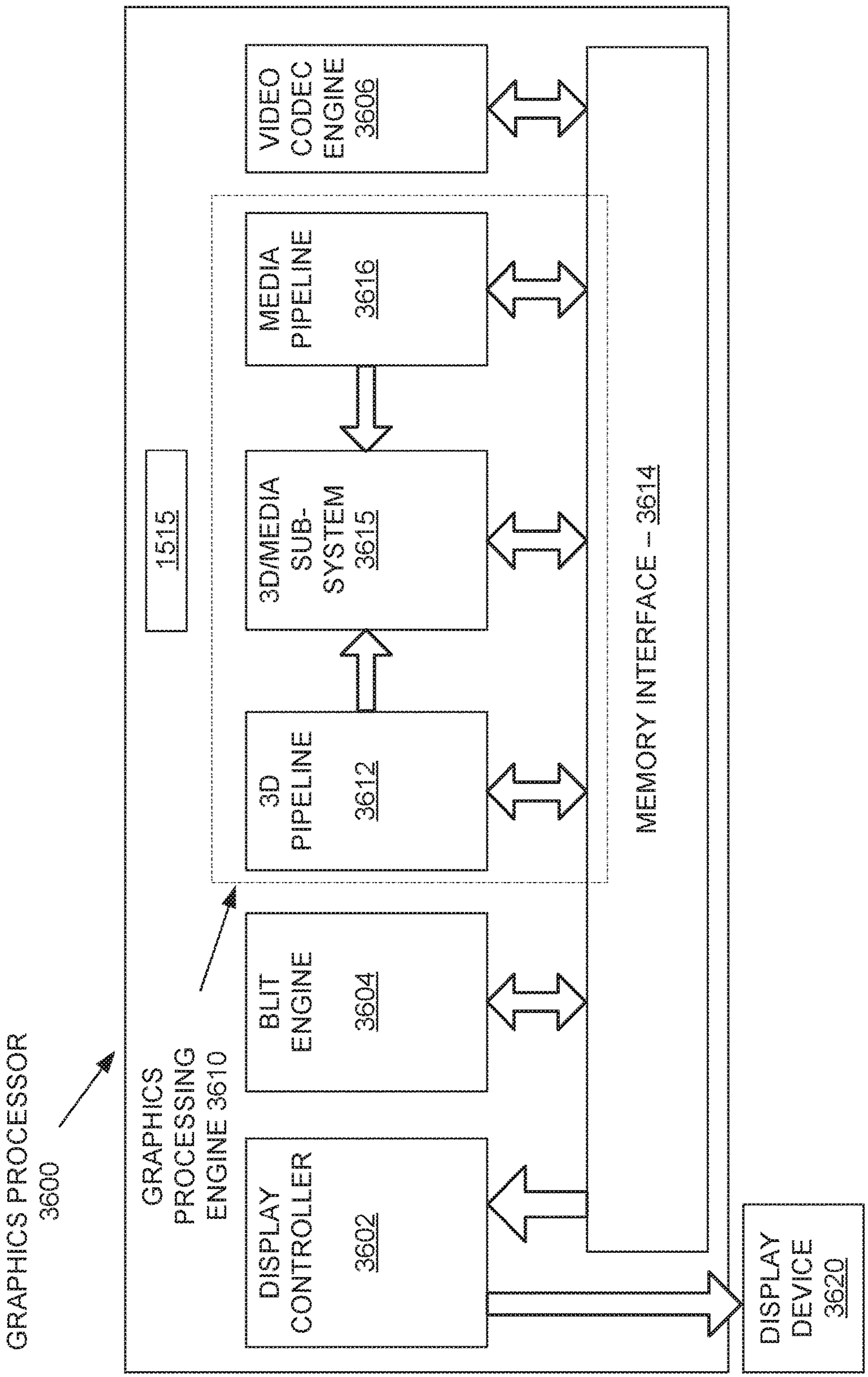
FIG. 36 illustrates at least portions of a graphics processor, according to one or more embodiments.

FIG. 36 is a block diagram of a graphics processor 3600, which may be a discrete graphics processing unit, or may be a graphics processor integrated with a plurality of processing cores. In at least one embodiment, graphics processor 3600 communicates via a memory mapped I/O interface to registers on graphics processor 3600 and with commands placed into memory. In at least one embodiment, graphics processor 3600 includes a memory interface 3614 to access memory. In at least one embodiment, memory interface 3614 is an interface to local memory, one or more internal caches, one or more shared external caches, and/or to system memory.

In at least one embodiment, graphics processor 3600 also includes a display controller 3602 to drive display output data to a display device 3620. In at least one embodiment, display controller 3602 includes hardware for one or more overlay planes for display device 3620 and composition of multiple layers of video or user interface elements. In at least one embodiment, display device 3620 can be an internal or external display device. In at least one embodiment, display device 3620 is a head mounted display device, such as a virtual reality (VR) display device or an augmented reality (AR) display device. In at least one embodiment, graphics processor 3600 includes a video codec engine 3606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3600 includes a block image transfer (BLIT) engine 3604 to perform two-dimensional (2D) rasterizer operations including, for example, bit-boundary block transfers. However, in at least one embodiment, 2D graphics operations are performed using one or more components of graphics processing engine (GPE) 3610. In at least one embodiment, GPE 3610 is a compute engine for performing graphics operations, including three-dimensional (3D) graphics operations and media operations.

In at least one embodiment, GPE 3610 includes a 3D pipeline 3612 for performing 3D operations, such as rendering three-dimensional images and scenes using processing functions that act upon 3D primitive shapes (e.g., rectangle, triangle, etc.). 3D pipeline 3612 includes programmable and fixed function elements that perform various tasks and/or spawn execution threads to a 3D/Media sub-system 3615. While 3D pipeline 3612 can be used to perform media operations, in at least one embodiment, GPE 3610 also includes a media pipeline 3616 that is used to perform media operations, such as video post-processing and image enhancement.

In at least one embodiment, media pipeline 3616 includes fixed function or programmable logic units to perform one or more specialized media operations, such as video decode acceleration, video de-interlacing, and video encode acceleration in place of, or on behalf of video codec engine 3606. In at least one embodiment, media pipeline 3616 additionally includes a thread spawning unit to spawn threads for execution on 3D/Media sub-system 3615. In at least one embodiment, spawned threads perform computations for media operations on one or more graphics execution units included in 3D/Media sub-system 3615.

In at least one embodiment, 3D/Media subsystem 3615 includes logic for executing threads spawned by 3D pipeline 3612 and media pipeline 3616. In at least one embodiment, 3D pipeline 3612 and media pipeline 3616 send thread execution requests to 3D/Media subsystem 3615, which includes thread dispatch logic for arbitrating and dispatching various requests to available thread execution resources. In at least one embodiment, execution resources include an array of graphics execution units to process 3D and media threads. In at least one embodiment, 3D/Media subsystem 3615 includes one or more internal caches for thread instructions and data. In at least one embodiment, subsystem 3615 also includes shared memory, including registers and addressable memory, to share data between threads and to store output data.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3600. For example, in at least one embodiment, training and/or inferencing techniques described herein may use one or more of ALUs embodied in 3D pipeline 3612. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3600 to perform one or more machine learning algorithms, neural network architectures, use cases, or training techniques described herein.

In at least one embodiment, graphics processor 3600 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics processor 3600 utilizes computing resources (e.g., CPUs, ASICs, GPUs, FPGAs) to implement inferencing and/or training logic 1515 to perform inferencing and/or training operations associated with one or more embodiments. Graphics processor 3600 may be utilized to implement one or more embodiments described elsewhere in this disclosure, such as those described in connection with FIGS. 1-35 and 37-43.

Figure 37:
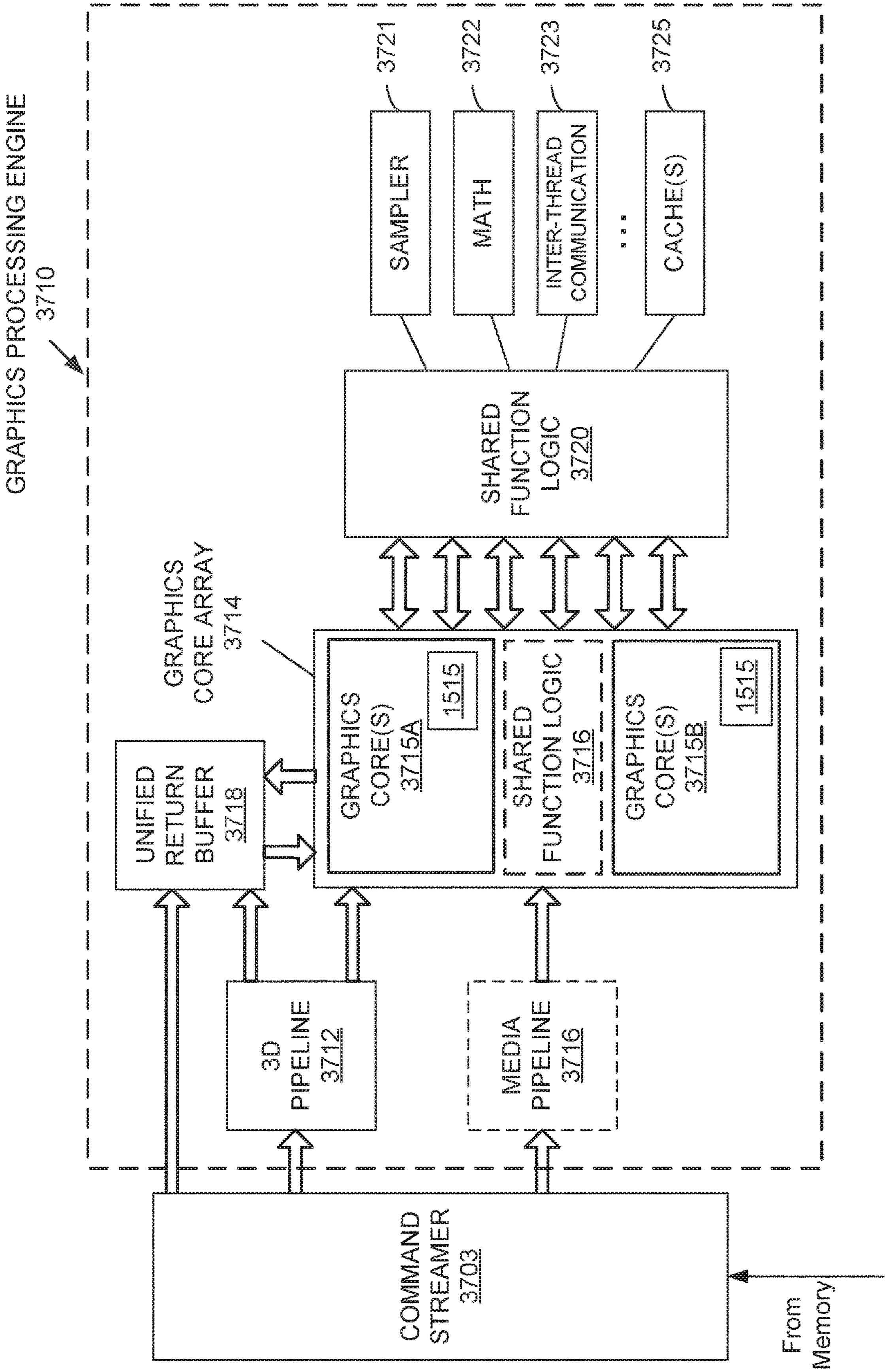
FIG. 37 is a block diagram of a graphics processing engine 3710 of a graphics processor in accordance with at least one embodiment.

FIG. 37 is a block diagram of a graphics processing engine 3710 of a graphics processor in accordance with at least one embodiment. In at least one embodiment, graphics processing engine (GPE) 3710 is a version of GPE 3610 shown in FIG. 36. In at least one embodiment, media pipeline 3616 is optional and may not be explicitly included within GPE 3710. In at least one embodiment, a separate media and/or image processor is coupled to GPE 3710.

In at least one embodiment, GPE 3710 is coupled to or includes a command streamer 3703, which provides a command stream to 3D pipeline 3612 and/or media pipelines 3616. In at least one embodiment, command streamer 3703 is coupled to memory, which can be system memory, or one or more of internal cache memory and shared cache memory. In at least one embodiment, command streamer 3703 receives commands from memory and sends commands to 3D pipeline 3612 and/or media pipeline 3616. In at least one embodiment, commands are instructions, primitives, or micro-operations fetched from a ring buffer, which stores commands for 3D pipeline 3612 and media pipeline 3616. In at least one embodiment, a ring buffer can additionally include batch command buffers storing batches of multiple commands. In at least one embodiment, commands for 3D pipeline 3612 can also include references to data stored in memory, such as but not limited to vertex and geometry data for 3D pipeline 3612 and/or image data and memory objects for media pipeline 3616. In at least one embodiment, 3D pipeline 3612 and media pipeline 3616 process commands and data by performing operations or by dispatching one or more execution threads to a graphics core array 3714. In at least one embodiment graphics core array 3714 includes one or more blocks of graphics cores (e.g., graphics core(s) 3715A, graphics core(s) 3715B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1515 in FIG. 15A and FIG. 15B.

In at least one embodiment, 3D pipeline 3612 includes fixed function and programmable logic to process one or more shader programs, such as vertex shaders, geometry shaders, pixel shaders, fragment shaders, compute shaders, or other shader programs, by processing instructions and dispatching execution threads to graphics core array 3714. In at least one embodiment, graphics core array 3714 provides a unified block of execution resources for use in processing shader programs. In at least one embodiment, multi-purpose execution logic (e.g., execution units) within graphics core(s) 3715A-3715B of graphic core array 3714 includes support for various 3D API shader languages and can execute multiple simultaneous execution threads associated with multiple shaders.

In at least one embodiment, graphics core array 3714 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3714 can output data to memory in a unified return buffer (URB) 3718. URB 3718 can store data for multiple threads. In at least one embodiment, URB 3718 may be used to send data between different threads executing on graphics core array 3714. In at least one embodiment, URB 3718 may additionally be used for synchronization between threads on graphics core array 3714 and fixed function logic within shared function logic 3720.

In at least one embodiment, graphics core array 3714 is scalable, such that graphics core array 3714 includes a variable number of graphics cores, each having a variable number of execution units based on a target power and performance level of GPE 3710. In at least one embodiment, execution resources are dynamically scalable, such that execution resources may be enabled or disabled as needed.

In at least one embodiment, graphics core array 3714 is coupled to shared function logic 3720 that includes multiple resources that are shared between graphics cores in graphics core array 3714. In at least one embodiment, shared functions performed by shared function logic 3720 are embodied in hardware logic units that provide specialized supplemental functionality to graphics core array 3714. In at least one embodiment, shared function logic 3720 includes but is not limited to sampler 3721, math 3722, and inter-thread communication (ITC) 3723 logic. In at least one embodiment, one or more cache(s) 3725 are in included in or couple to shared function logic 3720.

In at least one embodiment, a shared function is used if demand for a specialized function is insufficient for inclusion within graphics core array 3714. In at least one embodiment, a single instantiation of a specialized function is used in shared function logic 3720 and shared among other execution resources within graphics core array 3714. In at least one embodiment, specific shared functions within shared function logic 3720 that are used extensively by graphics core array 3714 may be included within shared function logic 3716 within graphics core array 3714. In at least one embodiment, shared function logic 3716 within graphics core array 3714 can include some or all logic within shared function logic 3720. In at least one embodiment, all logic elements within shared function logic 3720 may be duplicated within shared function logic 3716 of graphics core array 3714. In at least one embodiment, shared function logic 3720 is excluded in favor of shared function logic 3716 within graphics core array 3714.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3710. For example, in at least one embodiment, training and/or inferencing techniques described herein may use one or more of ALUs embodied in 3D pipeline 3612, graphics core(s) 3715A, shared function logic 3716, graphics core(s) 3715B, shared function logic 3720, or other logic in FIG. 37. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3710 to perform one or more machine learning algorithms, neural network architectures, use cases, or training techniques described herein.

In at least one embodiment, graphics processing engine 3710 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics processing engine 3710 utilizes computing resources (e.g., CPUs, ASICs, GPUs, FPGAs) to implement inferencing and/or training logic 1515 to perform inferencing and/or training operations associated with one or more embodiments. Graphics processing engine 3710 may be utilized to implement one or more embodiments described elsewhere in this disclosure, such as those described in connection with FIGS. 1-36 and 38-43.

Figure 38:
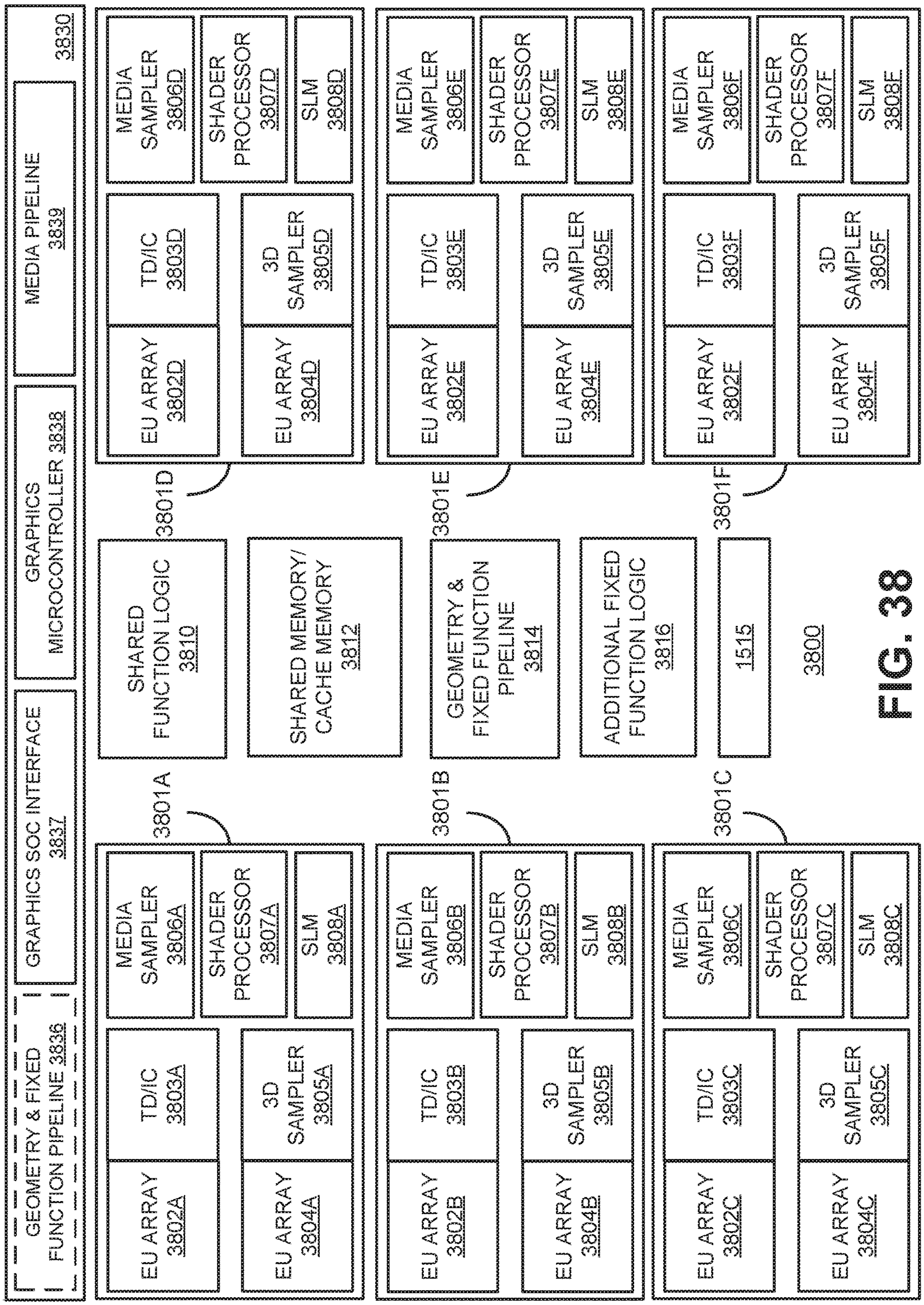
FIG. 38 is a block diagram of at least portions of a graphics processor core, according to at least one embodiment.

FIG. 38 is a block diagram of hardware logic of a graphics processor core 3800, according to at least one embodiment described herein. In at least one embodiment, graphics processor core 3800 is included within a graphics core array. In at least one embodiment, graphics processor core 3800, sometimes referred to as a core slice, can be one or multiple graphics cores within a modular graphics processor. In at least one embodiment, graphics processor core 3800 is exemplary of one graphics core slice, and a graphics processor as described herein may include multiple graphics core slices based on target power and performance envelopes. In at least one embodiment, each graphics core 3800 can include a fixed function block 3830 coupled with multiple sub-cores 3801A-3801F, also referred to as sub-slices, that include modular blocks of general-purpose and fixed function logic.

In at least one embodiment, fixed function block 3830 includes a geometry/fixed function pipeline 3836 that can be shared by all sub-cores in graphics processor 3800, for example, in lower performance and/or lower power graphics processor implementations. In at least one embodiment, geometry/fixed function pipeline 3836 includes a 3D fixed function pipeline, a video front-end unit, a thread spawner and thread dispatcher, and a unified return buffer manager, which manages unified return buffers.

In at least one embodiment fixed function block 3830 also includes a graphics SoC interface 3837, a graphics microcontroller 3838, and a media pipeline 3839. Graphics SoC interface 3837 provides an interface between graphics core 3800 and other processor cores within a system on a chip integrated circuit. In at least one embodiment, graphics microcontroller 3838 is a programmable sub-processor that is configurable to manage various functions of graphics processor 3800, including thread dispatch, scheduling, and pre-emption. In at least one embodiment, media pipeline 3839 includes logic to facilitate decoding, encoding, preprocessing, and/or post-processing of multimedia data, including image and video data. In at least one embodiment, media pipeline 3839 implement media operations via requests to compute or sampling logic within sub-cores 3801-3801F.

In at least one embodiment, SoC interface 3837 enables graphics core 3800 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3837 can also enable communication with fixed function devices within an SoC, such as camera imaging pipelines, and enables use of and/or implements global memory atomics that may be shared between graphics core 3800 and CPUs within an SoC. In at least one embodiment, SoC interface 3837 can also implement power management controls for graphics core 3800 and enable an interface between a clock domain of graphic core 3800 and other clock domains within an SoC. In at least one embodiment, SoC interface 3837 enables receipt of command buffers from a command streamer and global thread dispatcher that are configured to provide commands and instructions to each of one or more graphics cores within a graphics processor. In at least one embodiment, commands and instructions can be dispatched to media pipeline 3839, when media operations are to be performed, or a geometry and fixed function pipeline (e.g., geometry and fixed function pipeline 3836, geometry and fixed function pipeline 3814) when graphics processing operations are to be performed.

In at least one embodiment, graphics microcontroller 3838 can be configured to perform various scheduling and management tasks for graphics core 3800. In at least one embodiment, graphics microcontroller 3838 can perform graphics and/or compute workload scheduling on various graphics parallel engines within execution unit (EU) arrays 3802A-3802F, 3804A-3804F within sub-cores 3801A-3801F. In at least one embodiment, host software executing on a CPU core of an SoC including graphics core 3800 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3838 can also facilitate low-power or idle states for graphics core 3800, providing graphics core 3800 with an ability to save and restore registers within graphics core 3800 across low-power state transitions independently from an operating system and/or graphics driver software on a system.

In at least one embodiment, graphics core 3800 may have greater than or fewer than illustrated sub-cores 3801A-3801F, up to N modular sub-cores. For each set of N sub-cores, in at least one embodiment, graphics core 3800 can also include shared function logic 3810, shared and/or cache memory 3812, a geometry/fixed function pipeline

3814, as well as additional fixed function logic 3816 to accelerate various graphics and compute processing operations. In at least one embodiment, shared function logic 3810 can include logic units (e.g., sampler, math, and/or inter-thread communication logic) that can be shared by each N sub-cores within graphics core 3800. Shared and/or cache memory 3812 can be a last-level cache for N sub-cores 3801A-3801F within graphics core 3800 and can also serve as shared memory that is accessible by multiple sub-cores. In at least one embodiment, geometry/fixed function pipeline 3814 can be included instead of geometry/fixed function pipeline 3836 within fixed function block 3830 and can include same or similar logic units.

In at least one embodiment, graphics core 3800 includes additional fixed function logic 3816 that can include various fixed function acceleration logic for use by graphics core 3800. In at least one embodiment, additional fixed function logic 3816 includes an additional geometry pipeline for use in position only shading. In position-only shading, at least two geometry pipelines exist, whereas in a full geometry pipeline within geometry/fixed function pipeline 3816, 3836, and a cull pipeline, which is an additional geometry pipeline which may be included within additional fixed function logic 3816. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3816 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3816 can also include machine-learning acceleration logic, such as fixed function matrix multiplication logic, for implementations including optimizations for machine learning training or inferencing.

In at least one embodiment, within each graphics sub-core 3801A-3801F includes a set of execution resources that may be used to perform graphics, media, and compute operations in response to requests by graphics pipeline, media pipeline, or shader programs. In at least one embodiment, graphics sub-cores 3801A-3801F include multiple EU arrays 3802A-3802F, 3804A-3804F, thread dispatch and inter-thread communication (TD/IC) logic 3803A-3803F, a 3D (e.g., texture) sampler 3805A-3805F, a media sampler 3806A-3806F, a shader processor 3807A-3807F, and shared local memory (SLM) 3808A-3808F. EU arrays 3802A-3802F, 3804A-3804F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3803A-3803F performs local thread dispatch and thread control operations for execution units within a sub-core and facilitate communication between threads executing on execution units of a sub-core. In at least one embodiment, 3D sampler 3805A-3805F can read texture or other 3D graphics related data into memory. In at least one embodiment, 3D sampler can read texture data differently based on a configured sample state and texture format associated with a given texture. In at least one embodiment, media sampler 3806A-3806F can perform similar read operations based on a type and format associated with media data. In at least one embodiment, each graphics sub-core 3801A-3801F can alternately include a unified 3D and media sampler. In at least one embodiment, threads executing on execution units within each of sub-cores 3801A-3801F can make use of shared local memory 3808A-3808F within each sub-core, to enable threads executing within a thread group to execute using a common pool of on-chip memory.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, portions or all of inference and/or training logic 1515 may be incorporated into graphics processor 3810. For example, in at least one embodiment, training and/or inferencing techniques described herein may use one or more of ALUs embodied in 3D pipeline 3810, graphics microcontroller 3838, geometry & fixed function pipeline 3814 and 3836, or other logic in FIG. 35. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3800 to perform one or more machine learning algorithms, neural network architectures, use cases, or training techniques described herein.

In at least one embodiment, graphics processor 3800 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, graphics processor 3800 utilizes computing resources (e.g., CPUs, ASICs, GPUs, FPGAs) to implement inferencing and/or training logic 1515 to perform inferencing and/or training operations associated with one or more embodiments. Graphics processor 3800 may be utilized to implement one or more embodiments described elsewhere in this disclosure, such as those described in connection with FIGS. 1-37 and 39-43.

Figure 39A:
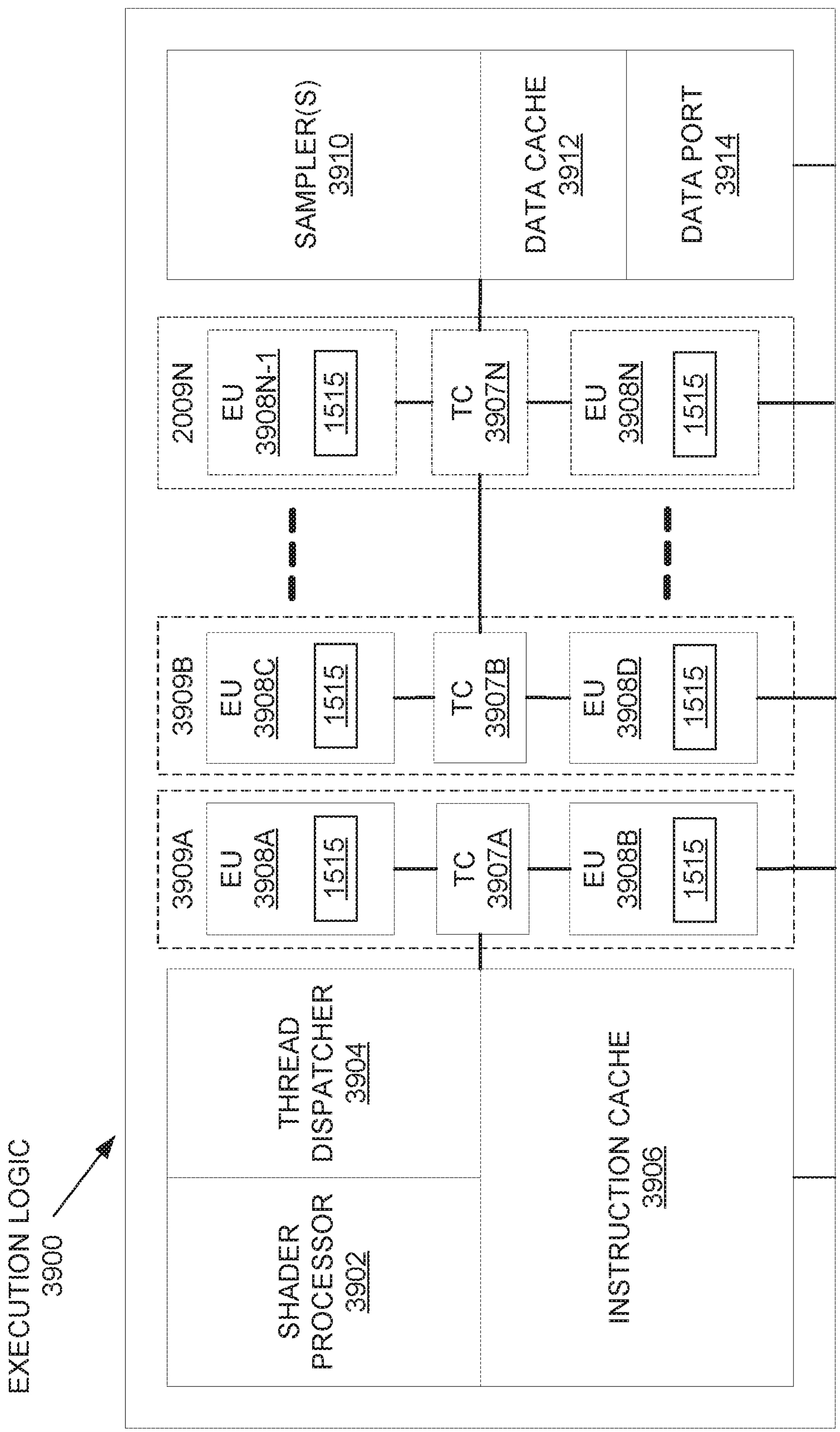
FIGS. 39A-39B illustrate thread execution logic 3900 including an array of processing elements of a graphics processor core according to at least one embodiment
Figure 39B:
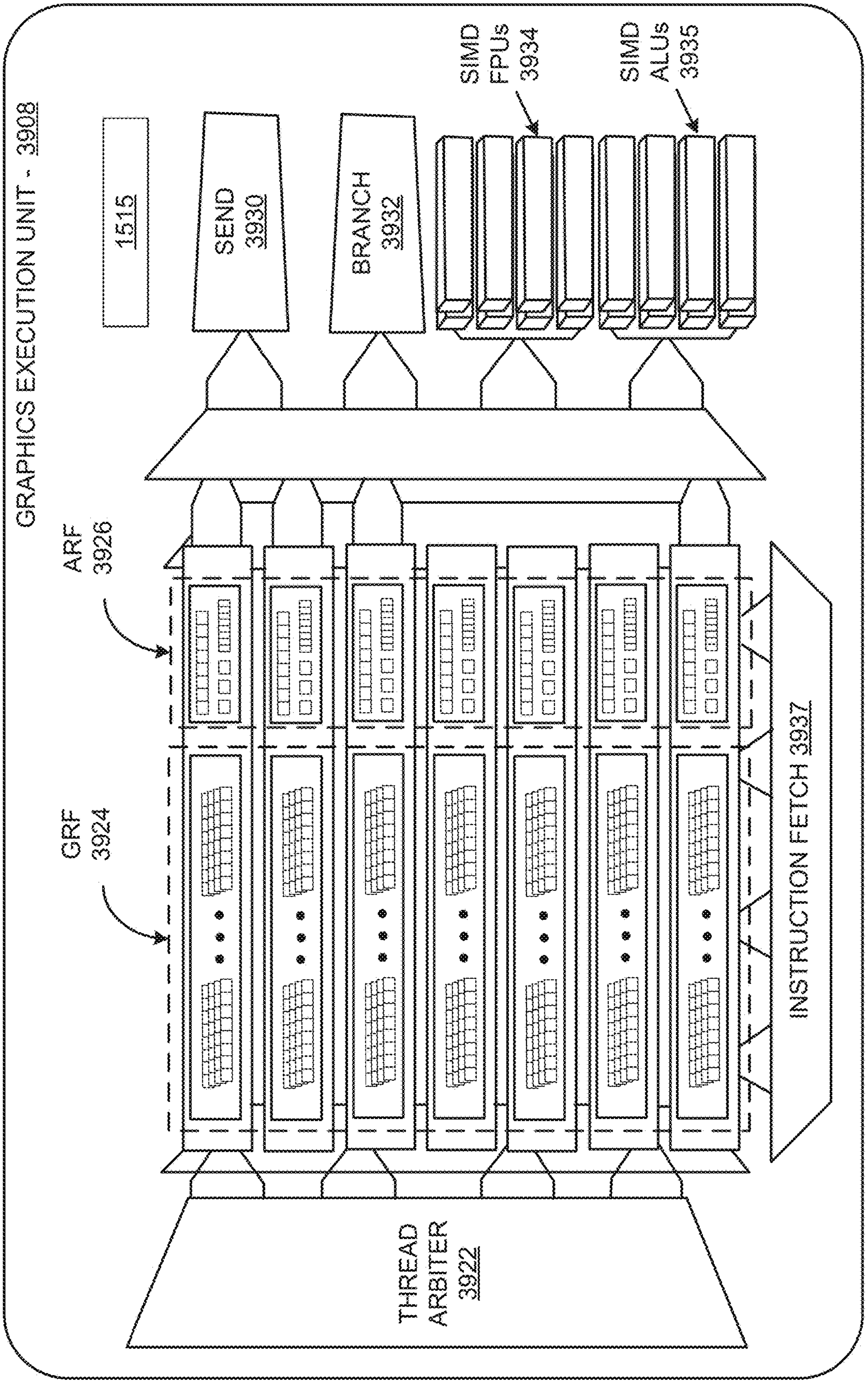

FIGS. 39A-39B illustrate thread execution logic 3900 including an array of processing elements of a graphics processor core according to at least one embodiment. FIG. 39A illustrates at least one embodiment, in which thread execution logic 3900 is used. FIG. 39B illustrates exemplary internal details of an execution unit, according to at least one embodiment.

As illustrated in FIG. 39A, in at least one embodiment, thread execution logic 3900 includes a shader processor 3902, a thread dispatcher 3904, instruction cache 3906, a scalable execution unit array including a plurality of execution units 3908A-3908N, a sampler 3910, a data cache 3912, and a data port 3914. In at least one embodiment a scalable execution unit array can dynamically scale by enabling or disabling one or more execution units (e.g., any of execution unit 3908A, 3908B, 3908C, 3908D, through 3908N-1 and 3908N) based on computational requirements of a workload, for example. In at least one embodiment, scalable execution units are interconnected via an interconnect fabric that links to each of execution unit. In at least one embodiment, thread execution logic 3900 includes one or more connections to memory, such as system memory or cache memory, through one or more of instruction cache 3906, data port 3914, sampler 3910, and execution units 3908A-3908N. In at least one embodiment, each execution unit (e.g., 3908A) is a stand-alone programmable general-purpose computational unit that is capable of executing multiple simultaneous hardware threads while processing multiple data elements in parallel for each thread. In at least one embodiment, array of execution units 3908A-3908N is scalable to include any number individual execution units.

In at least one embodiment, execution units 3908A-3908N are primarily used to execute shader programs. In at least one embodiment, shader processor 3902 can process various shader programs and dispatch execution threads associated with shader programs via a thread dispatcher 3904. In at least one embodiment, thread dispatcher 3904 includes logic to arbitrate thread initiation requests from graphics and media pipelines and instantiate requested threads on one or more execution units in execution units 3908A-3908N. For example, in at least one embodiment, a geometry pipeline can dispatch vertex, tessellation, or geometry shaders to thread execution logic for processing. In at least one embodiment, thread dispatcher 3904 can also process runtime thread spawning requests from executing shader programs.

In at least one embodiment, execution units 3908A-3908N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3908A-3908N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3908A-3908N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3908A-3908N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3908A-3908N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3909A-3909N having thread control logic (3907A-3907N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3909A-3909N includes at least two execution units. For example, in at least one embodiment, fused execution unit 3909A includes a first EU 3908A, second EU 3908B, and thread control logic 3907A that is common to first EU 3908A and second EU 3908B. In at least one embodiment, thread control logic 3907A controls threads executed on fused graphics execution unit 3909A, allowing each EU within fused execution units 3909A-3909N to execute using a common instruction pointer register.

In at least one embodiment, one or more internal instruction caches (e.g., 3906) are included in thread execution logic 3900 to cache thread instructions for execution units. In at least one embodiment, one or more data caches (e.g., 3912) are included to cache thread data during thread execution. In at least one embodiment, a sampler 3910 is included to provide texture sampling for 3D operations and media sampling for media operations. In at least one embodiment, sampler 3910 includes specialized texture or media sampling functionality to process texture or media data during sampling process before providing sampled data to an execution unit.

During execution, in at least one embodiment, graphics and media pipelines send thread initiation requests to thread execution logic 3900 via thread spawning and dispatch logic. In at least one embodiment, once a group of geometric objects has been processed and rasterized into pixel data, pixel processor logic (e.g., pixel shader logic, fragment shader logic, etc.) within shader processor 3902 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3902 then executes an application programming interface (API)-supplied pixel or fragment shader program. In at least one embodiment, to execute a shader program, shader processor 3902 dispatches threads to an execution unit (e.g., 3908A) via thread dispatcher 3904. In at least one embodiment, shader processor 3902 uses texture sampling logic in sampler 3910 to access texture data in texture maps stored in memory. In at least one embodiment, arithmetic operations on texture data and input geometry data compute pixel color data for each geometric fragment, or discards one or more pixels from further processing.

In at least one embodiment, data port 3914 provides a memory access mechanism for thread execution logic 3900 to output processed data to memory for further processing on a graphics processor output pipeline. In at least one embodiment, data port 3914 includes or couples to one or more cache memories (e.g., data cache 3912) to cache data for memory access via a data port.

As illustrated in FIG. 39B, in at least one embodiment, a graphics execution unit 3908 can include an instruction fetch unit 3937, a general register file array (GRF) 3924, an architectural register file array (ARF) 3926, a thread arbiter 3922, a send unit 3930, a branch unit 3932, a set of SIMD floating point units (FPUs) 3934, and In at least one embodiment a set of dedicated integer SIMD ALUs 3935. In at least one embodiment, GRF 3924 and ARF 3926 includes a set of general register files and architecture register files associated with each simultaneous hardware thread that may be active in graphics execution unit 3908. In at least one embodiment, per thread architectural state is maintained in ARF 3926, while data used during thread execution is stored in GRF 3924. In at least one embodiment, execution state of each thread, including instruction pointers for each thread, can be held in thread-specific registers in ARF 3926.

In at least one embodiment, graphics execution unit 3908 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3908 can co-issue multiple instructions, which may each be different instructions. In at least one embodiment, thread arbiter 3922 of graphics execution unit thread 3908 can dispatch instructions to one of send unit 3930, branch unit 3942, or SIMD FPU(s) 3934 for execution. In at least one embodiment, each execution thread can access 128 general-purpose registers within GRF 3924, where each register can store 32 bytes, accessible as a SIMD 8-element vector of 32-bit data elements. In at least one embodiment, each execution unit thread has access to 4 Kbytes within GRF 3924, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 3924 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3930. In at least one embodiment, branch instructions are dispatched to a dedicated branch unit 3932 to facilitate SIMD divergence and eventual convergence.

In at least one embodiment graphics execution unit 3908 includes one or more SIMD floating point units (FPU(s)) 3934 to perform floating-point operations. In at least one embodiment, FPU(s) 3934 also support integer computation. In at least one embodiment FPU(s) 3934 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 3935 are also present, and may be specifically optimized to perform operations associated with machine learning computations.

In at least one embodiment, arrays of multiple instances of graphics execution unit 3908 can be instantiated in a graphics sub-core grouping (e.g., a sub-slice). In at least one embodiment execution unit 3908 can execute instructions across a plurality of execution channels. In at least one embodiment, each thread executed on graphics execution unit 3908 is executed on a different channel.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, portions or all of inference and/or training logic 1515 may be incorporated into execution logic 3900. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of execution logic 3900 to perform one or more machine learning algorithms, neural network architectures, use cases, or training techniques described herein.

In at least one embodiment, execution logic 3900 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, execution logic 3900 utilizes computing resources (e.g., CPUs, ASICs, GPUs, FPGAs) to implement inferencing and/or training logic 1515 to perform inferencing and/or training operations associated with one or more embodiments. Execution logic 3900 may be utilized to implement one or more embodiments described elsewhere in this disclosure, such as those described in connection with FIGS. 1-38 and 40-43.

Figure 40:
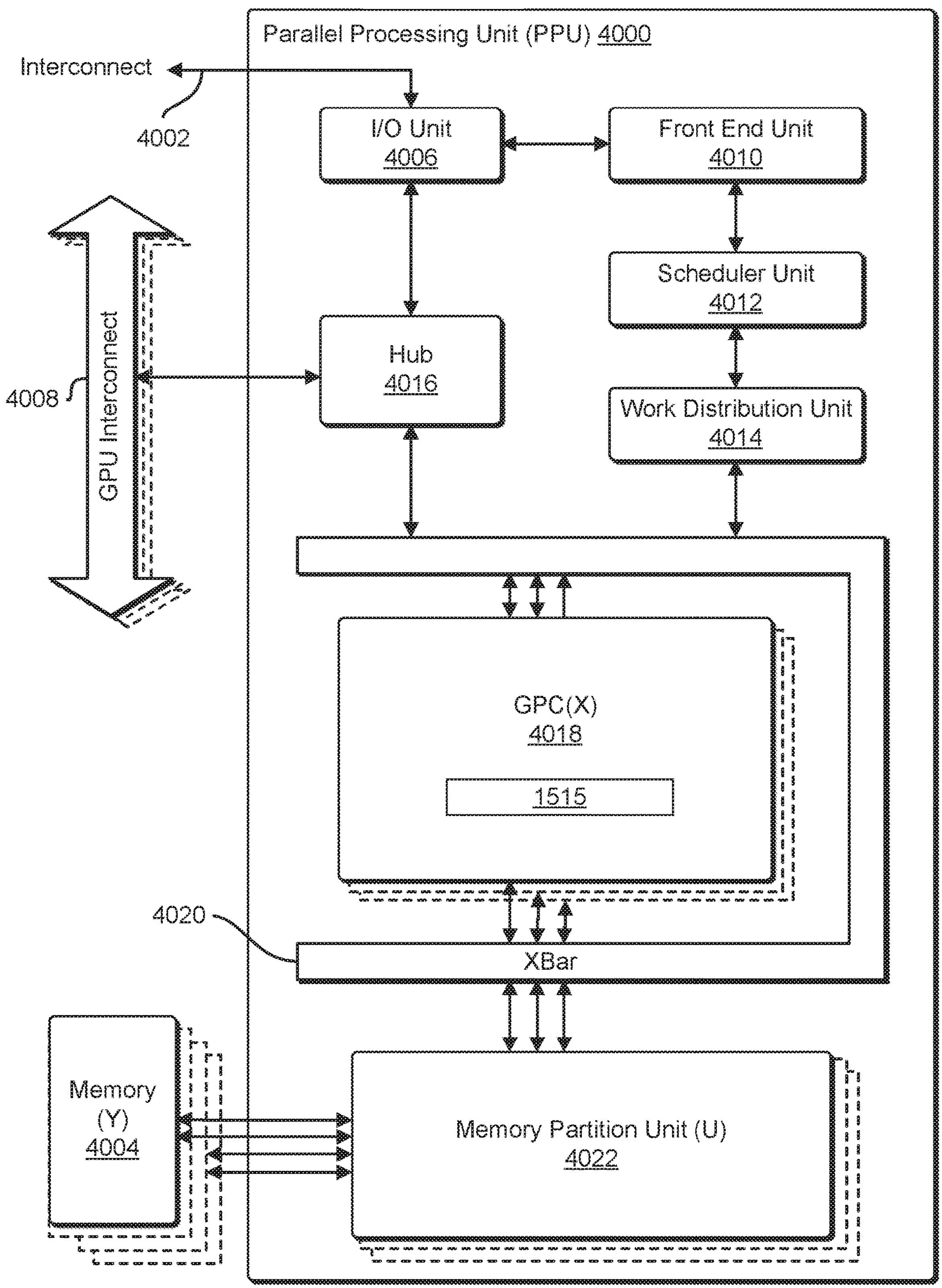
FIG. 40 illustrates a parallel processing unit ("PPU"), according to at least one embodiment.

FIG. 40 illustrates a parallel processing unit ("PPU") 4000, according to at least one embodiment. In at least one embodiment, PPU 4000 is configured with machine-readable code that, if executed by PPU 4000, causes PPU 4000 to perform some or all of processes and techniques described throughout this disclosure. In at least one embodiment, PPU

4000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4000. In at least one embodiment, PPU 4000 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4000 is utilized to perform computations such as linear algebra operations and machine-learning operations. FIG. 40 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4000 are configured to accelerate High Performance Computing ("HPC"), data center, and machine learning applications. In at least one embodiment, PPU 4000 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4000 includes, without limitation, an Input/Output ("I/O") unit 4006, a front-end unit 4010, a scheduler unit 4012, a work distribution unit 4014, a hub 4016, a crossbar ("Xbar") 4020, one or more general processing clusters ("GPCs") 4018, and one or more partition units ("memory partition units") 4022. In at least one embodiment, PPU 4000 is connected to a host processor or other PPUs 4000 via one or more high-speed GPU interconnects ("GPU interconnects") 4008. In at least one embodiment, PPU 4000 is connected to a host processor or other peripheral devices via an interconnect 4002. In at least one embodiment, PPU 4000 is connected to a local memory comprising one or more memory devices ("memory") 4004. In at least one embodiment, memory devices 4004 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4008 may refer to a wire-based multi-lane communications link that is used by systems to scale and include one or more PPUs 4000 combined with one or more central processing units ("CPUs"), supports cache coherence between PPUs 4000 and CPUs, and CPU mastering. In at least one embodiment, data and/or commands are transmitted by high-speed GPU interconnect 4008 through hub 4016 to/from other units of PPU 4000 such as one or more copy engines, video encoders, video decoders, power management units, and other components which may not be explicitly illustrated in FIG. 40.

In at least one embodiment, I/O unit 4006 is configured to transmit and receive communications (e.g., commands, data) from a host processor (not illustrated in FIG. 40) over system bus 4002. In at least one embodiment, I/O unit 4006 communicates with host processor directly via system bus 4002 or through one or more intermediate devices such as a memory bridge. In at least one embodiment, I/O unit 4006 may communicate with one or more other processors, such as one or more of PPUs 4000 via system bus 4002. In at least one embodiment, I/O unit 4006 implements a Peripheral Component Interconnect Express ("PCIe") interface for communications over a PCIe bus. In at least one embodiment, I/O unit 4006 implements interfaces for communicating with external devices.

In at least one embodiment, I/O unit 4006 decodes packets received via system bus 4002. In at least one embodiment, at least some packets represent commands configured to cause PPU 4000 to perform various operations. In at least one embodiment, I/O unit 4006 transmits decoded commands to various other units of PPU 4000 as specified by commands. In at least one embodiment, commands are transmitted to front-end unit 4010 and/or transmitted to hub 4016 or other units of PPU 4000 such as one or more copy engines, a video encoder, a video decoder, a power management unit, etc. (not explicitly illustrated in FIG. 40). In at least one embodiment, I/O unit 4006 is configured to route communications between and among various logical units of PPU 4000.

In at least one embodiment, a program executed by host processor encodes a command stream in a buffer that provides workloads to PPU 4000 for processing. In at least one embodiment, a workload comprises instructions and data to be processed by those instructions. In at least one embodiment, buffer is a region in a memory that is accessible (e.g., read/write) by both host processor and PPU 4000—a host interface unit may be configured to access buffer in a system memory connected to system bus 4002 via memory requests transmitted over system bus 4002 by I/O unit 4006. In at least one embodiment, host processor writes command stream to buffer and then transmits a pointer to start of command stream to PPU 4000 such that front-end unit 4010 receives pointers to one or more command streams and manages one or more command streams, reading commands from command streams and forwarding commands to various units of PPU 4000.

In at least one embodiment, front-end unit 4010 is coupled to scheduler unit 4012 that configures various GPCs 4018 to process tasks defined by one or more command streams. In at least one embodiment, scheduler unit 4012 is configured to track state information related to various tasks managed by scheduler unit 4012 where state information may indicate which of GPCs 4018 a task is assigned to, whether task is active or inactive, a priority level associated with task, and so forth. In at least one embodiment, scheduler unit 4012 manages execution of a plurality of tasks on one or more of GPCs 4018.

In at least one embodiment, scheduler unit 4012 is coupled to work distribution unit 4014 that is configured to dispatch tasks for execution on GPCs 4018. In at least one embodiment, work distribution unit 4014 tracks a number of scheduled tasks received from scheduler unit 4012 and work distribution unit 4014 manages a pending task pool and an active task pool for each of GPCs 4018. In at least one embodiment, pending task pool comprises a number of slots (e.g., 32 slots) that contain tasks assigned to be processed by a particular GPC 4018; active task pool may comprise a number of slots (e.g., 4 slots) for tasks that are actively being processed by GPCs 4018 such that as one of GPCs 4018 completes execution of a task, that task is evicted from active task pool for GPC 4018 and one of other tasks from pending task pool is selected and scheduled for execution on GPC 4018. In at least one embodiment, if an active task is idle on GPC 4018, such as while waiting for a data dependency to be resolved, then active task is evicted from GPC 4018 and returned to pending task pool while another task in pending task pool is selected and scheduled for execution on GPC 4018.

In at least one embodiment, work distribution unit 4014 communicates with one or more GPCs 4018 via XBar 4020. In at least one embodiment, XBar 4020 is an interconnect network that couples many of units of PPU 4000 to other units of PPU 4000 and can be configured to couple work distribution unit 4014 to a particular GPC 4018. In at least one embodiment, one or more other units of PPU 4000 may also be connected to XBar 4020 via hub 4016.

In at least one embodiment, tasks are managed by scheduler unit 4012 and dispatched to one of GPCs 4018 by work distribution unit 4014. GPC 4018 is configured to process task and generate results. In at least one embodiment, results may be consumed by other tasks within GPC 4018, routed to a different GPC 4018 via XBar 4020, or stored in memory 4004. In at least one embodiment, results can be written to memory 4004 via partition units 4022, which implement a memory interface for reading and writing data to/from memory 4004. In at least one embodiment, results can be transmitted to another PPU 4004 or CPU via high-speed GPU interconnect 4008. In at least one embodiment, PPU 4000 includes, without limitation, a number U of partition units 4022 that is equal to number of separate and distinct memory devices 4004 coupled to PPU 4000. In at least one embodiment, partition unit 4022 will be described in more detail herein in conjunction with FIG. 42.

In at least one embodiment, a host processor executes a driver kernel that implements an application programming interface ("API") that enables one or more applications executing on host processor to schedule operations for execution on PPU 4000. In at least one embodiment, multiple compute applications are simultaneously executed by PPU 4000 and PPU 4000 provides isolation, quality of service ("QoS"), and independent address spaces for multiple compute applications. In at least one embodiment, an application generates instructions (e.g., in form of API calls) that cause driver kernel to generate one or more tasks for execution by PPU 4000 and driver kernel outputs tasks to one or more streams being processed by PPU 4000. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 42.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to PPU 4000. In at least one embodiment, deep learning application processor 4000 is used to infer or predict information based on a trained machine learning model (e.g., neural network) that has been trained by another processor or system or by PPU 4000. In at least one embodiment, PPU 4000 may be used to perform one or more neural network use cases described herein.

In at least one embodiment, PPU 4000 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, PPU 4000 utilizes computing resources (e.g., CPUs, ASICs, GPUs, FPGAs) to implement inferencing and/or training logic 1515 to perform inferencing and/or training operations associated with one or more embodiments. PPU 4000 may be utilized to implement one or more embodiments described elsewhere in this disclosure, such as those described in connection with FIGS. 1-39 and 41-43.

Figure 41:
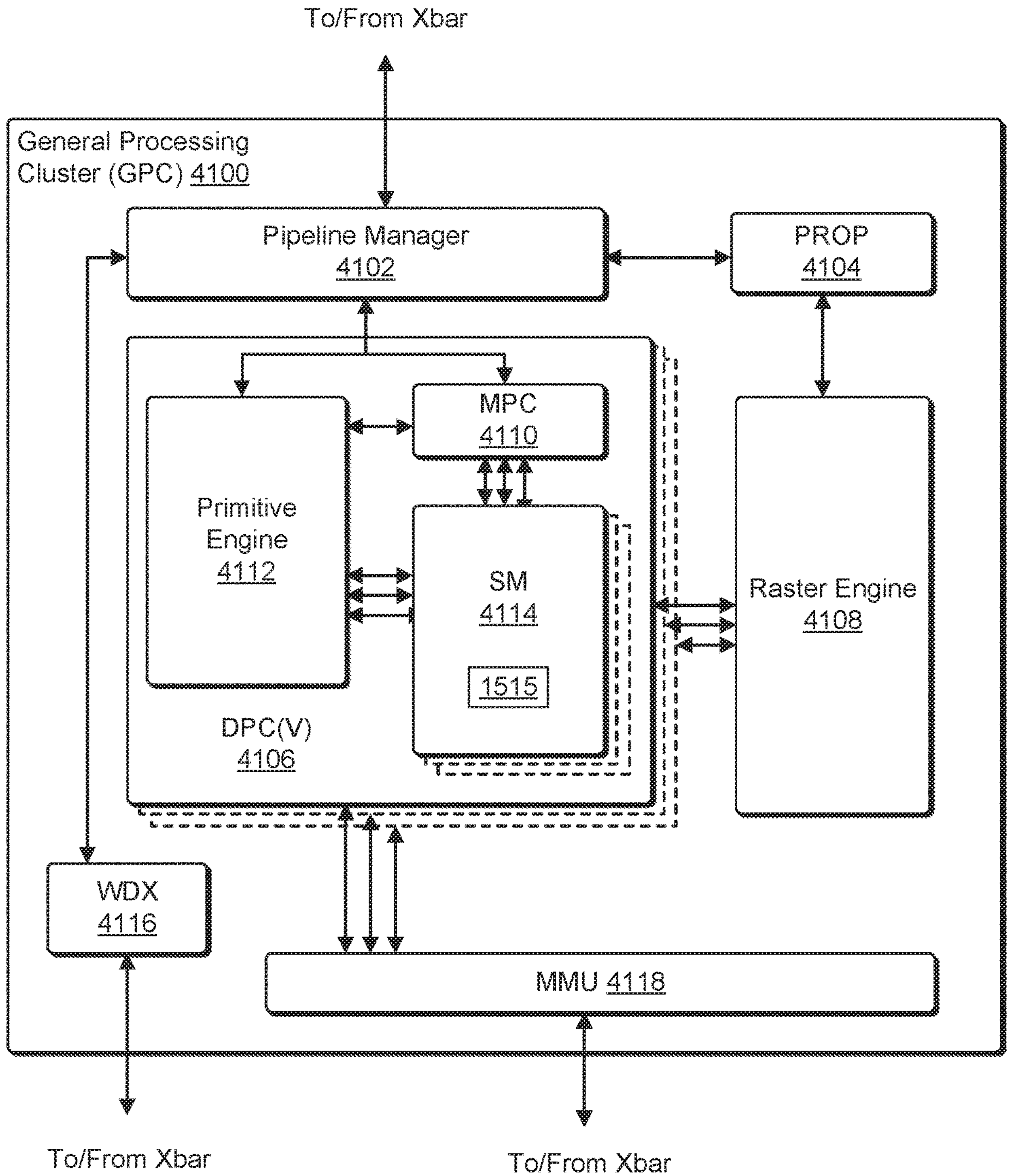
FIG. 41 illustrates a general processing cluster ("GPC"), according to at least one embodiment.

FIG. 41 illustrates a general processing cluster ("GPC") 4100, according to at least one embodiment. In at least one embodiment, GPC 4100 is GPC 4018 of FIG. 40. In at least one embodiment, each GPC 4100 includes, without limitation, a number of hardware units for processing tasks and each GPC 4100 includes, without limitation, a pipeline manager 4102, a pre-raster operations unit ("PROP") 4104, a raster engine 4108, a work distribution crossbar ("WDX") 4116, a memory management unit ("MMU") 4118, one or more Data Processing Clusters ("DPCs") 4106, and any suitable combination of parts.

In at least one embodiment, operation of GPC 4100 is controlled by pipeline manager 4102. In at least one embodiment, pipeline manager 4102 manages configuration of one or more DPCs 4106 for processing tasks allocated to GPC 4100. In at least one embodiment, pipeline manager 4102 configures at least one of one or more DPCs 4106 to implement at least a portion of a graphics rendering pipeline. In at least one embodiment, DPC 4106 is configured to execute a vertex shader program on a programmable streaming multi-processor ("SM") 4114. In at least one embodiment, pipeline manager 4102 is configured to route packets received from a work distribution unit to appropriate logical units within GPC 4100, in at least one embodiment, and some packets may be routed to fixed function hardware units in PROP 4104 and/or raster engine 4108 while other packets may be routed to DPCs 4106 for processing by a primitive engine 4112 or SM 4114. In at least one embodiment, pipeline manager 4102 configures at least one of DPCs 4106 to implement a neural network model and/or a computing pipeline.

In at least one embodiment, PROP unit 4104 is configured, in at least one embodiment, to route data generated by raster engine 4108 and DPCs 4106 to a Raster Operations ("ROP") unit in partition unit 4022, described in more detail above in conjunction with FIG. 40. In at least one embodiment, PROP unit 4104 is configured to perform optimizations for color blending, organize pixel data, perform address translations, and more. In at least one embodiment, raster engine 4108 includes, without limitation, a number of fixed function hardware units configured to perform various raster operations, in at least one embodiment, and raster engine 4108 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4108 comprises fragments to be processed by any suitable entity such as by a fragment shader implemented within DPC 4106.

In at least one embodiment, each DPC 4106 included in GPC 4100 comprise, without limitation, an M-Pipe Controller ("MPC") 4110; primitive engine 4112; one or more SMs 4114; and any suitable combination thereof. In at least one embodiment, MPC 4110 controls operation of DPC 4106, routing packets received from pipeline manager 4102 to appropriate units in DPC 4106. In at least one embodiment, packets associated with a vertex are routed to primitive engine 4112, which is configured to fetch vertex attributes associated with vertex from memory; in contrast, packets associated with a shader program may be transmitted to SM 4114.

In at least one embodiment, SM 4114 comprises, without limitation, a programmable streaming processor that is configured to process tasks represented by a number of threads. In at least one embodiment, SM 4114 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4114 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4114 are described in more detail herein.

In at least one embodiment, MMU 4118 provides an interface between GPC 4100 and memory partition unit (e.g., partition unit 4022 of FIG. 40) and MMU 4118 provides translation of virtual addresses into physical addresses, memory protection, and arbitration of memory requests. In at least one embodiment, MMU 4118 provides one or more translation lookaside buffers ("TLBs") for performing translation of virtual addresses into physical addresses in memory.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to GPC 4100. In at least one embodiment, GPC 4100 is used to infer or predict information based on a trained machine learning model (e.g., neural network) that has been trained by another processor or system or by GPC 4100. In at least one embodiment, GPC 4100 may be used to perform one or more neural network use cases described herein.

In at least one embodiment, GPC 4100 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, GPC 4100 utilizes computing resources (e.g., CPUs, ASICs, GPUs, FPGAs) to implement inferencing and/or training logic 1515 to perform inferencing and/or training operations associated with one or more embodiments. GPC 4100 may be utilized to implement one or more embodiments described elsewhere in this disclosure, such as those described in connection with FIGS. 1-40 and 42-43.

Figure 42:
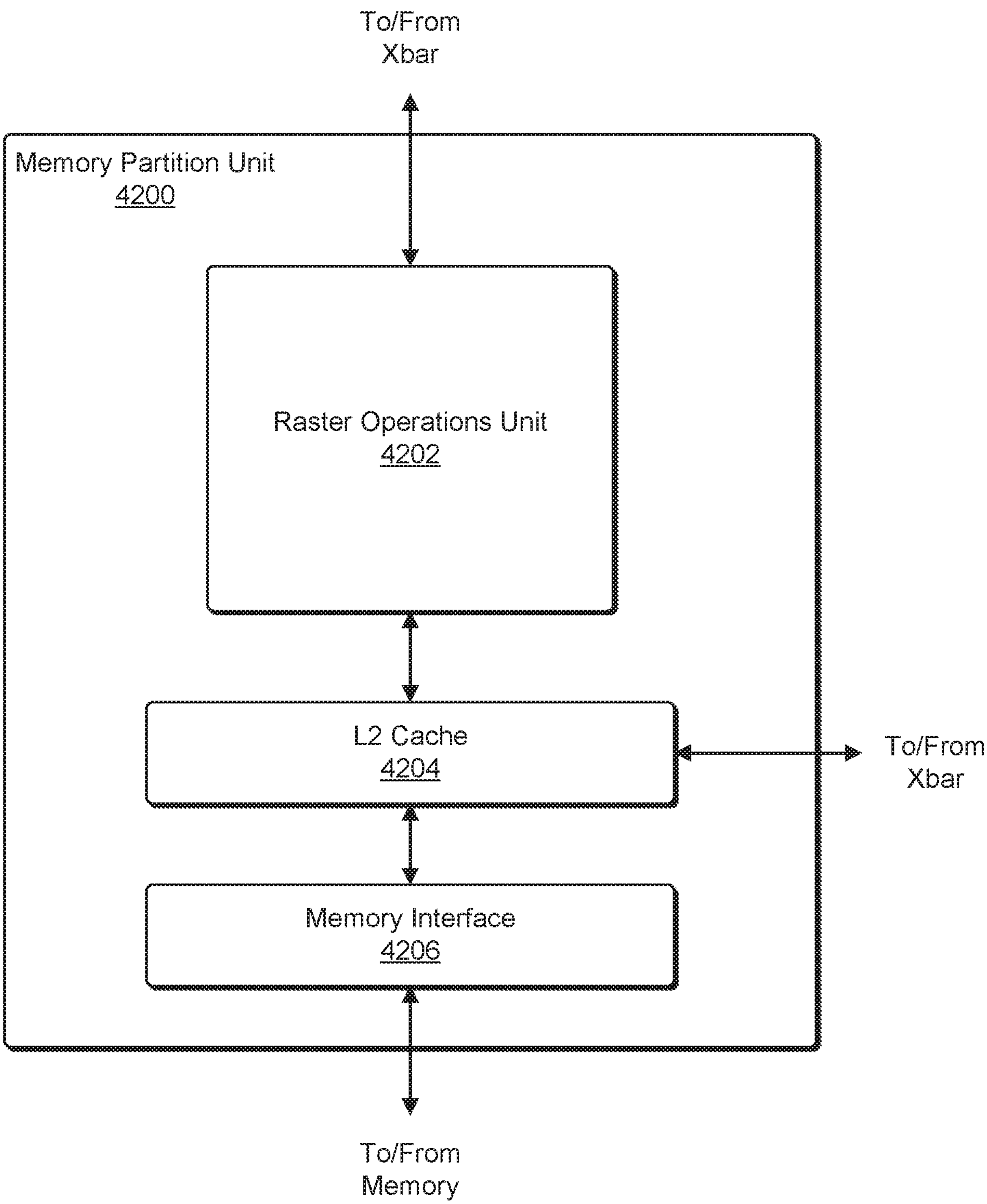
FIG. 42 illustrates a memory partition unit of a parallel processing unit ("PPU"), according to at least one embodiment.

FIG. 42 illustrates a memory partition unit 4200 of a parallel processing unit ("PPU"), in accordance with at least one embodiment. In at least one embodiment, memory partition unit 4200 includes, without limitation, a Raster Operations ("ROP") unit 4202; a level two ("L2") cache 4204; a memory interface 4206; and any suitable combination thereof memory interface 4206 is coupled to memory. memory interface 4206 may implement 32, 64, 128, 1024-bit data buses, or like, for high-speed data transfer. In at least one embodiment, PPU incorporates U memory interfaces 4206, one memory interface 4206 per pair of partition units 4200, where each pair of partition units 4200 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4206 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 4200 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 4008 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4200 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4004 of FIG. 40 or other system memory is fetched by memory partition unit 4200 and stored in L2 cache 4204, which is located on-chip and is shared between various GPCs, in accordance with at least one embodiment. Each memory partition unit 4200, in at least one embodiment, includes, without limitation, at least a portion of L2 cache associated with a corresponding memory device. In at least one embodiment, lower level caches are implemented in various units within GPCs. In at least one embodiment, each of SMs 4114 may implement a level one ("L1") cache wherein L1 cache is private memory that is dedicated to a particular SM 4114 and data from L2 cache 4204 is fetched and stored in each of L1 caches for processing in functional units of SMs 4114. In at least one embodiment, L2 cache 4204 is coupled to memory interface 4206 and XBar 4020.

ROP unit 4202 performs graphics raster operations related to pixel color, such as color compression, pixel blending, and more, in at least one embodiment. ROP unit 4202, in at least one embodiment, implements depth testing in conjunction with raster engine 4108, receiving a depth for a sample location associated with a pixel fragment from culling engine of raster engine 4108. In at least one embodiment, depth is tested against a corresponding depth in a depth buffer for a sample location associated with fragment. In at least one embodiment, if fragment passes depth test for sample location, then ROP unit 4202 updates depth buffer and transmits a result of depth test to raster engine 4108. It will be appreciated that number of partition units 4200 may be different than number of GPCs and, therefore, each ROP unit 4202 can, in at least one embodiment, be coupled to each of GPCs. In at least one embodiment, ROP unit 4202 tracks packets received from different GPCs and determines which that a result generated by ROP unit 4202 is routed to through XBar 4020.

Figure 43:
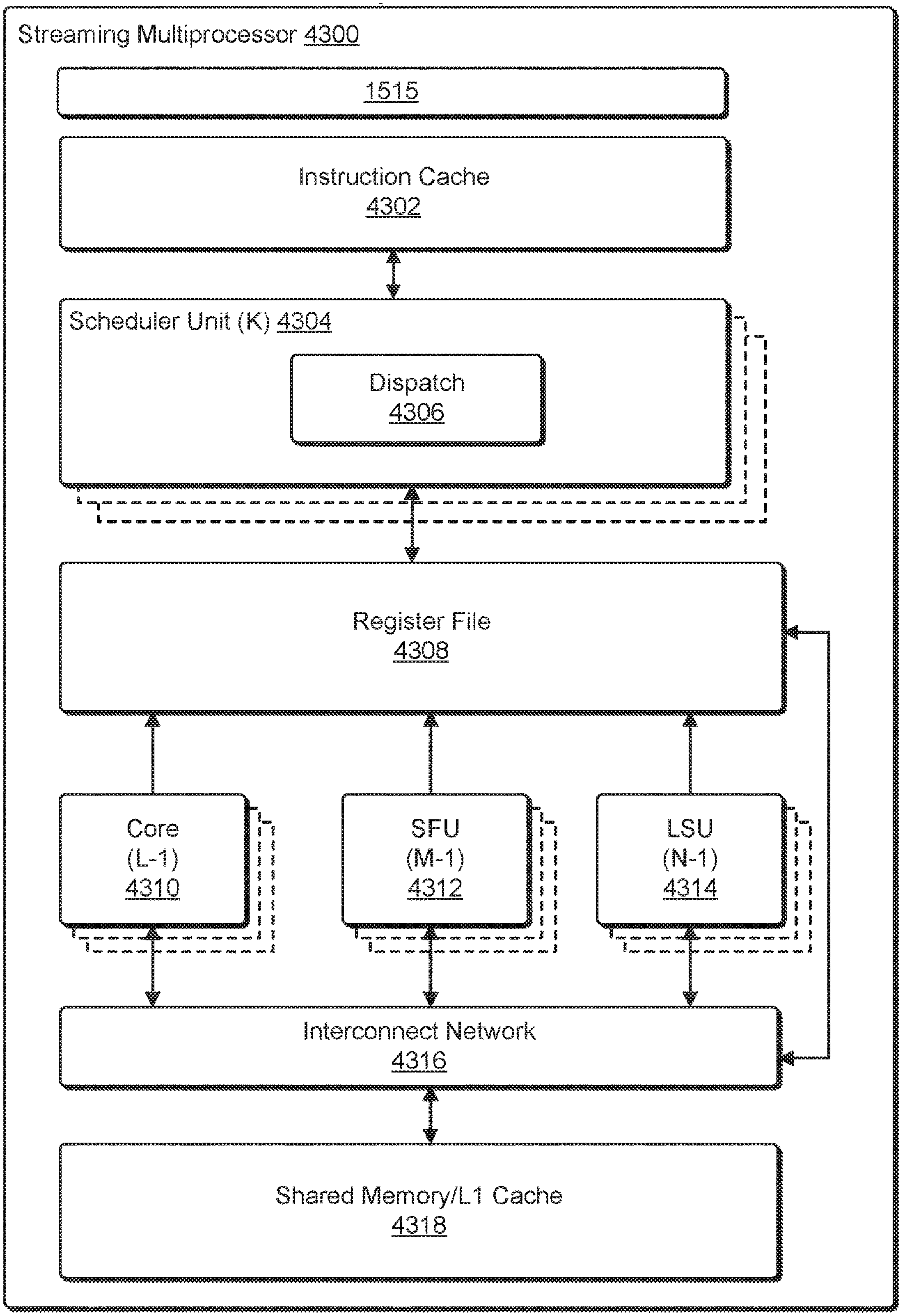
FIG. 43 illustrates a streaming multi-processor, according to at least one embodiment.
Figure 44A:
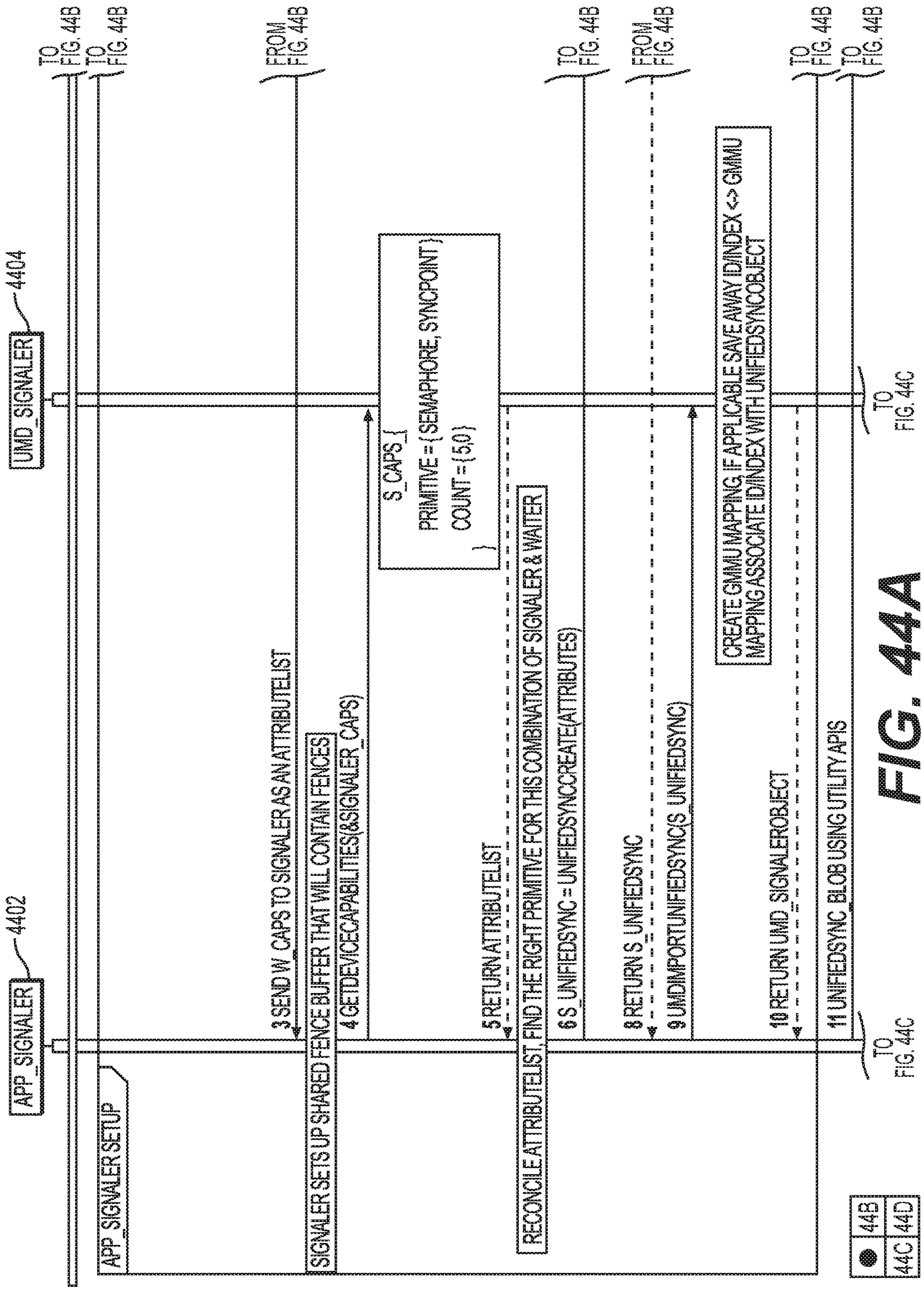
FIGS. 44A-44D illustrate a diagram of unified synchronization, CUDA UMD as writer and reader, according to at least one embodiment.
Figure 44B:
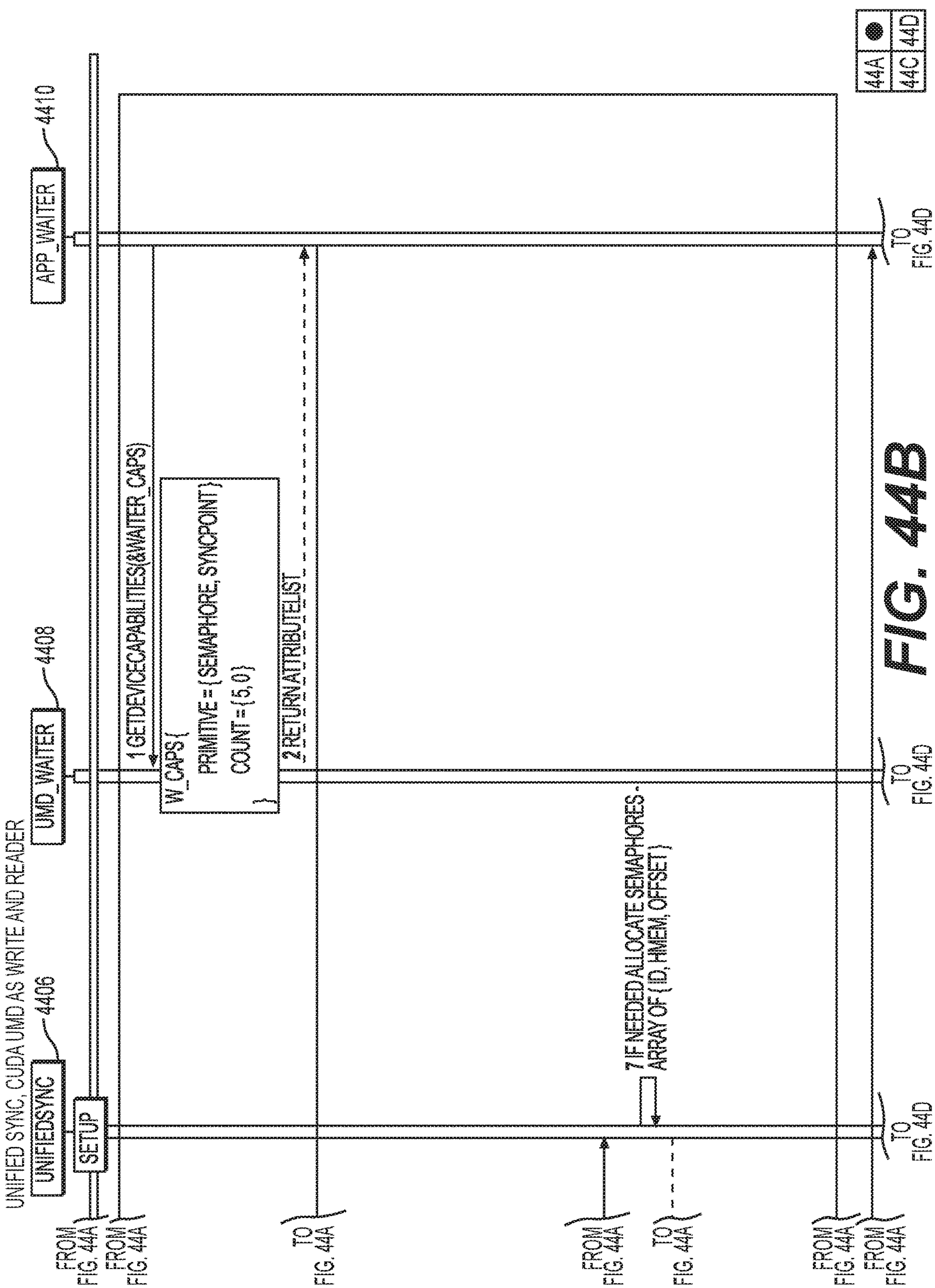
Figure 44C:
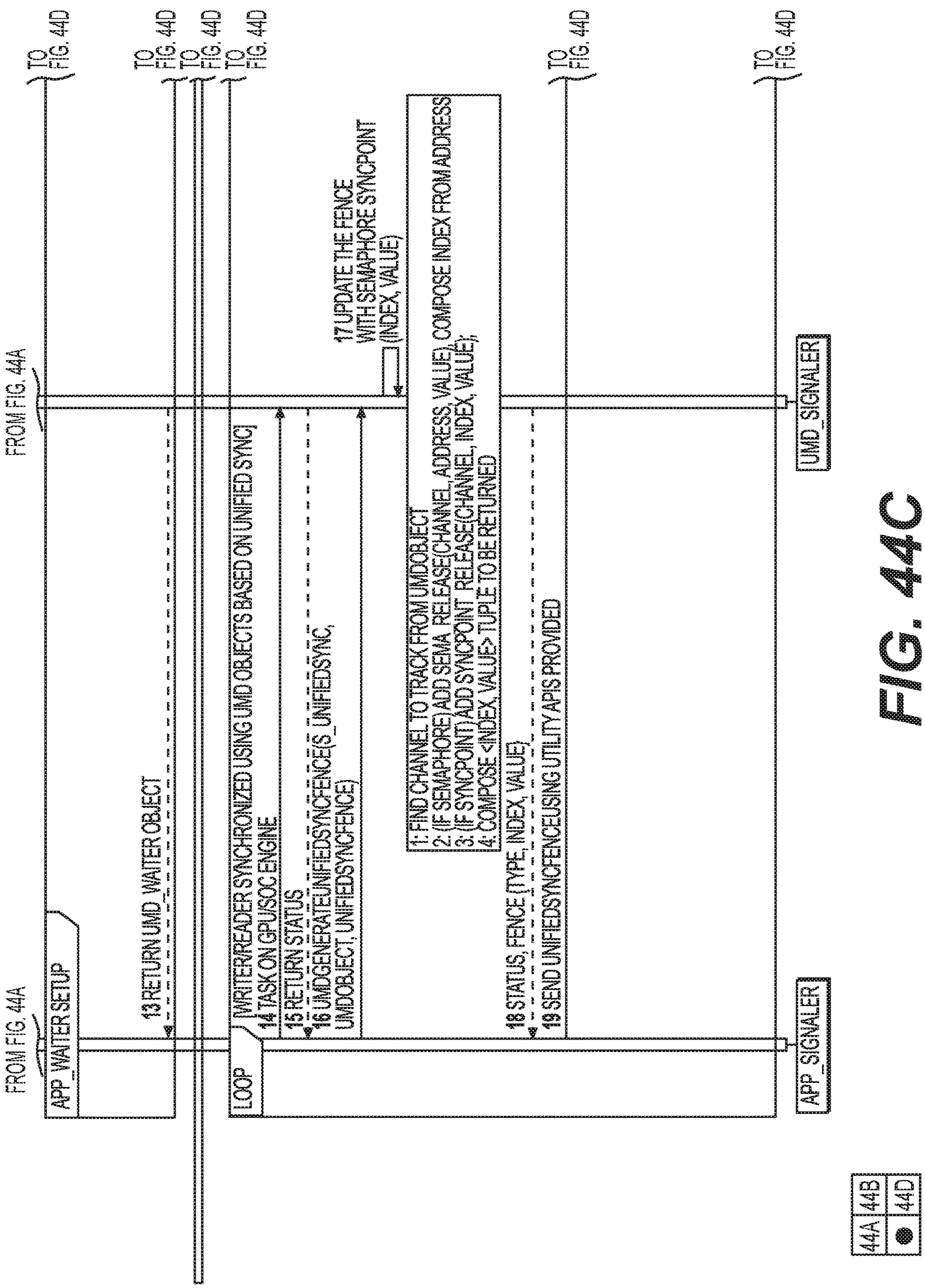
Figure 44D:
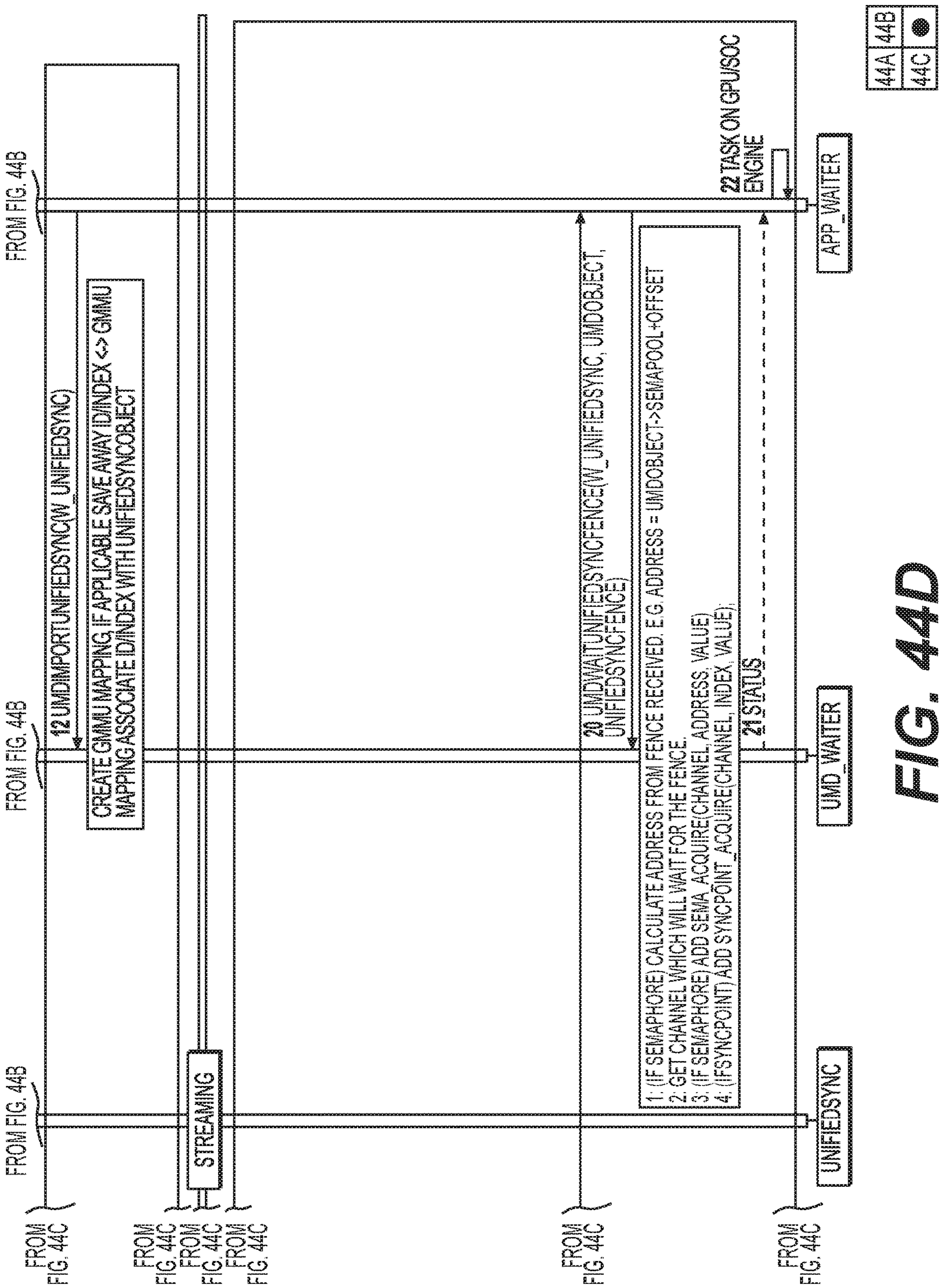
Figure 45A:
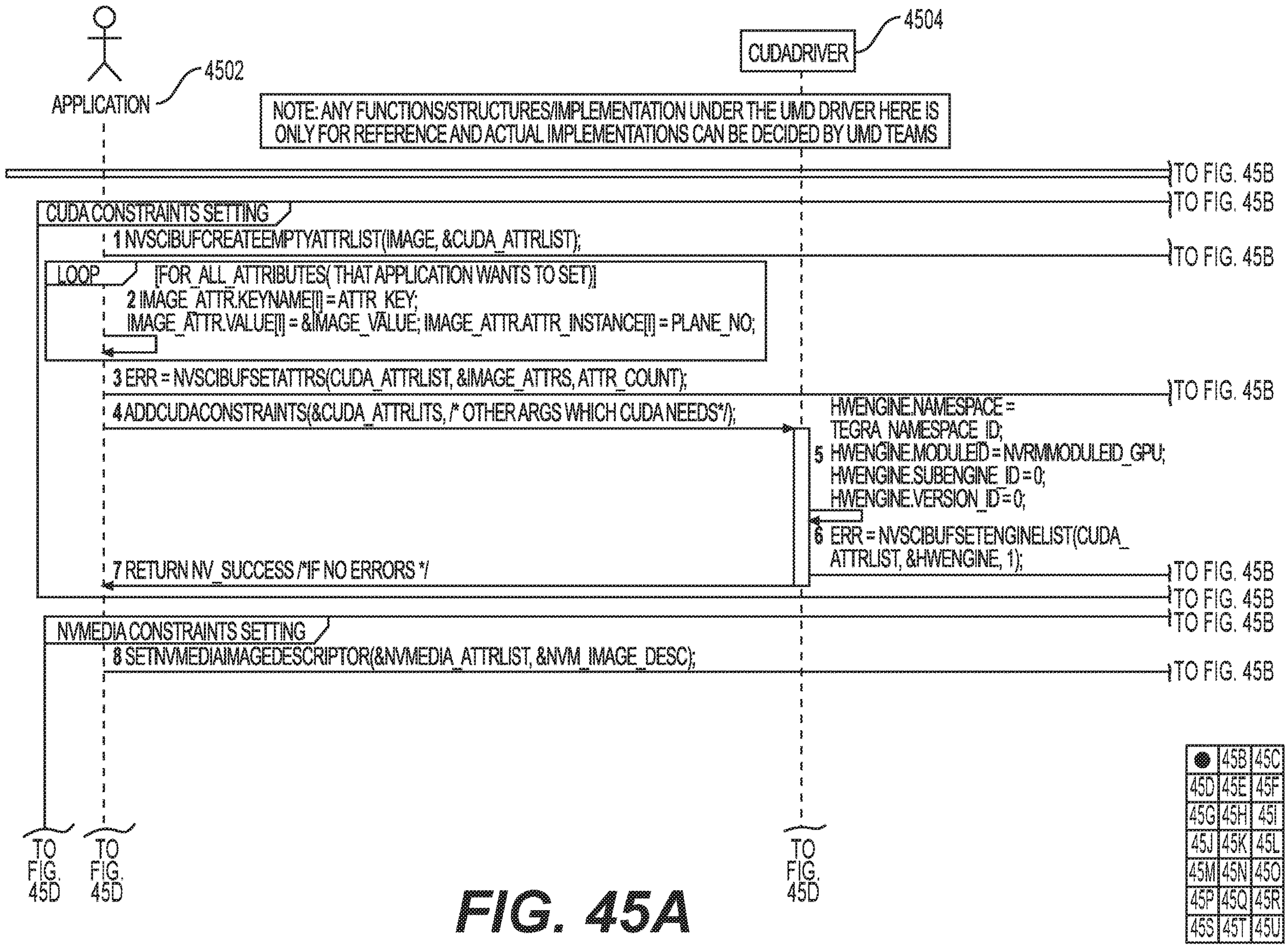
FIGS. 45A-45U illustrate a diagram of an intra or inter thread use case, according to at least one embodiment.
Figure 45B:
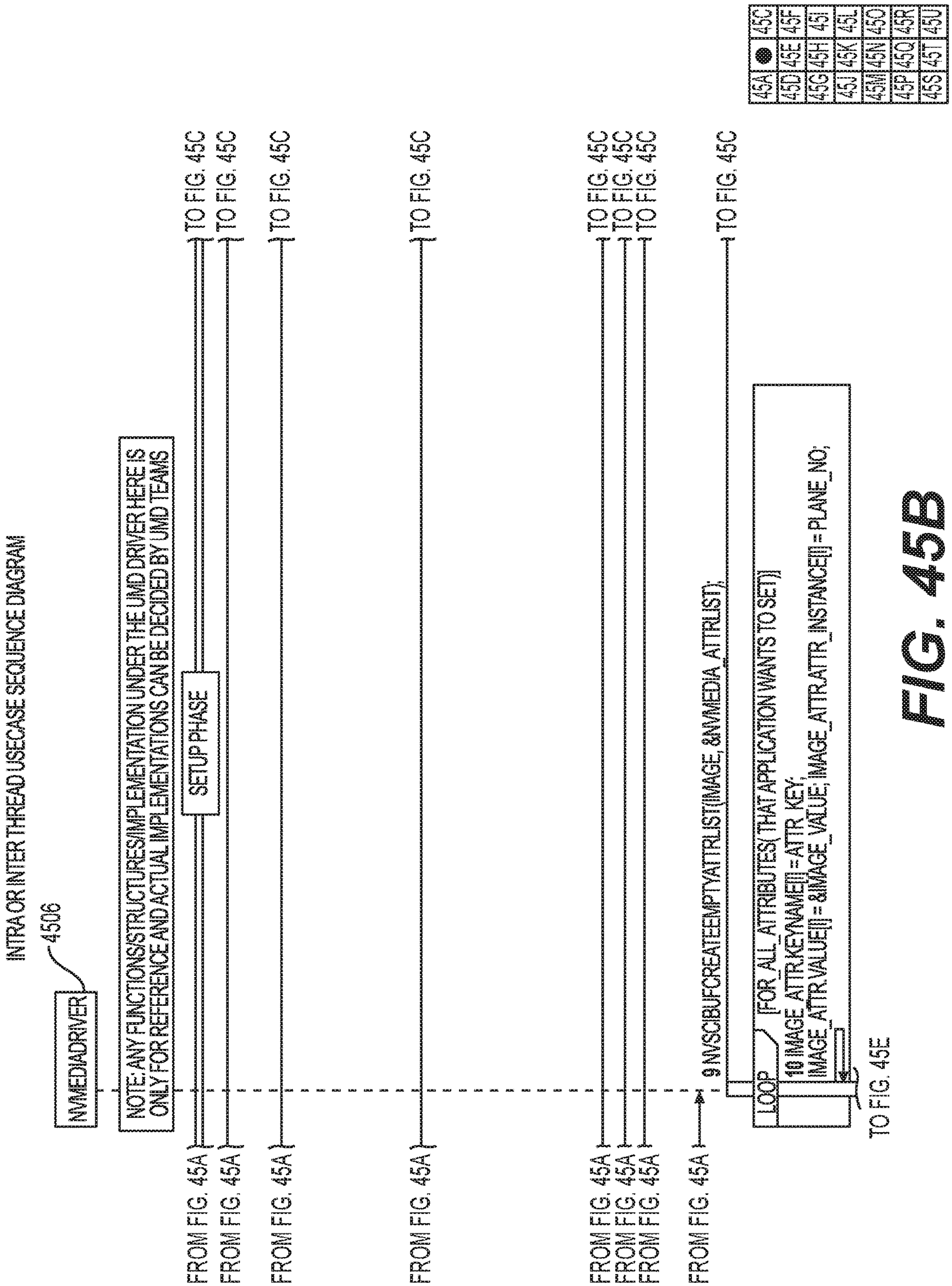
Figure 45C:
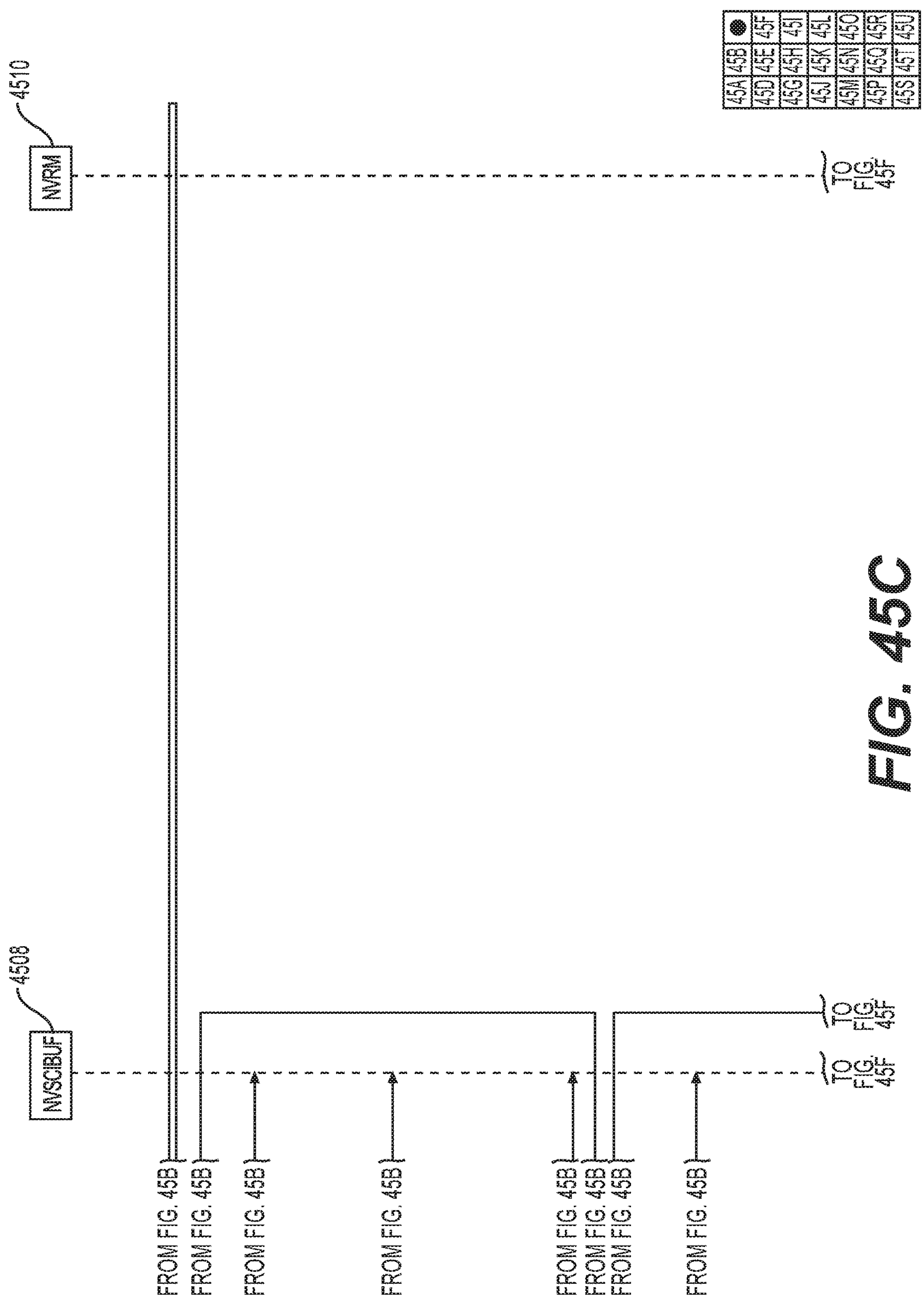
Figure 45D:
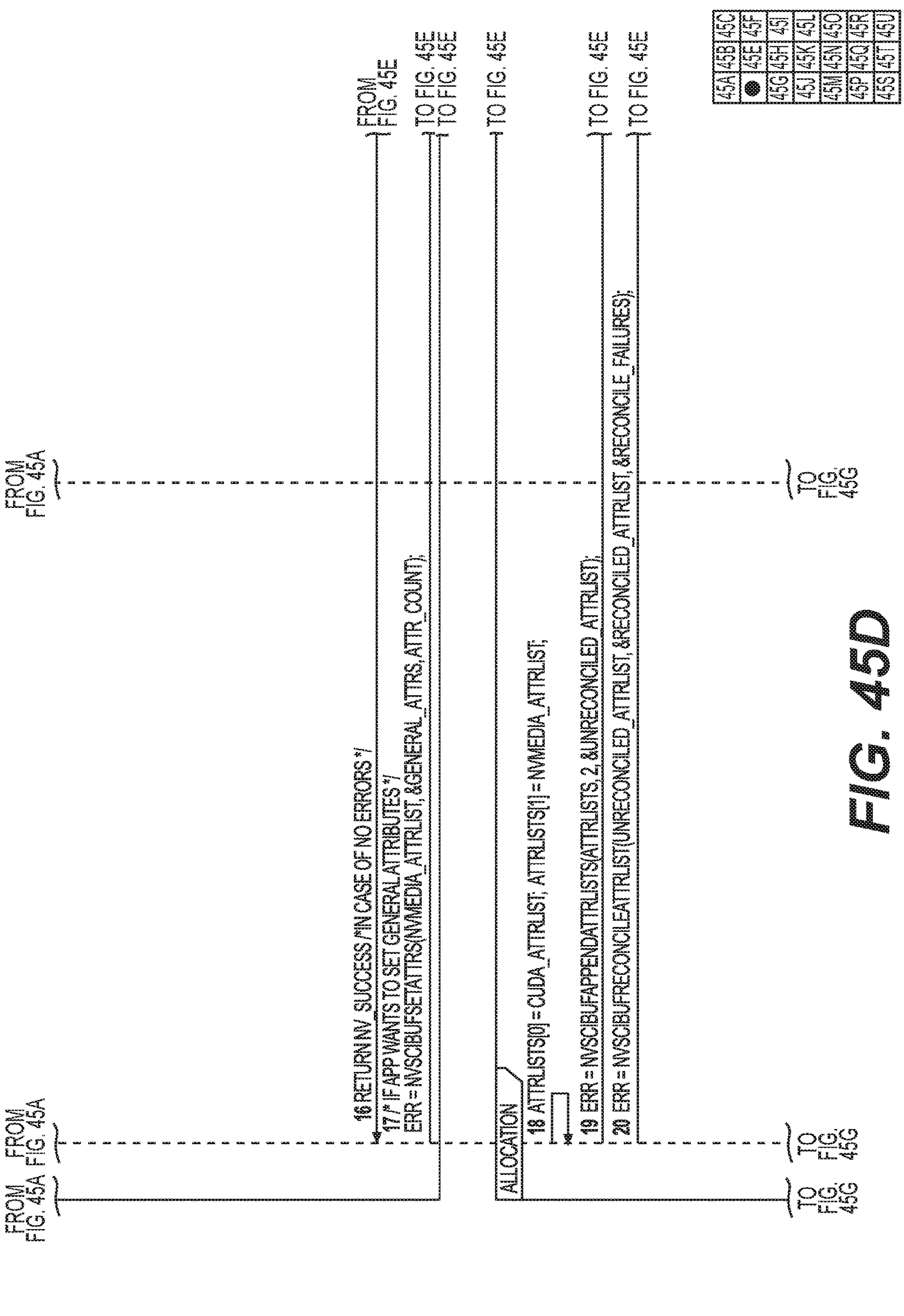
Figure 45E:
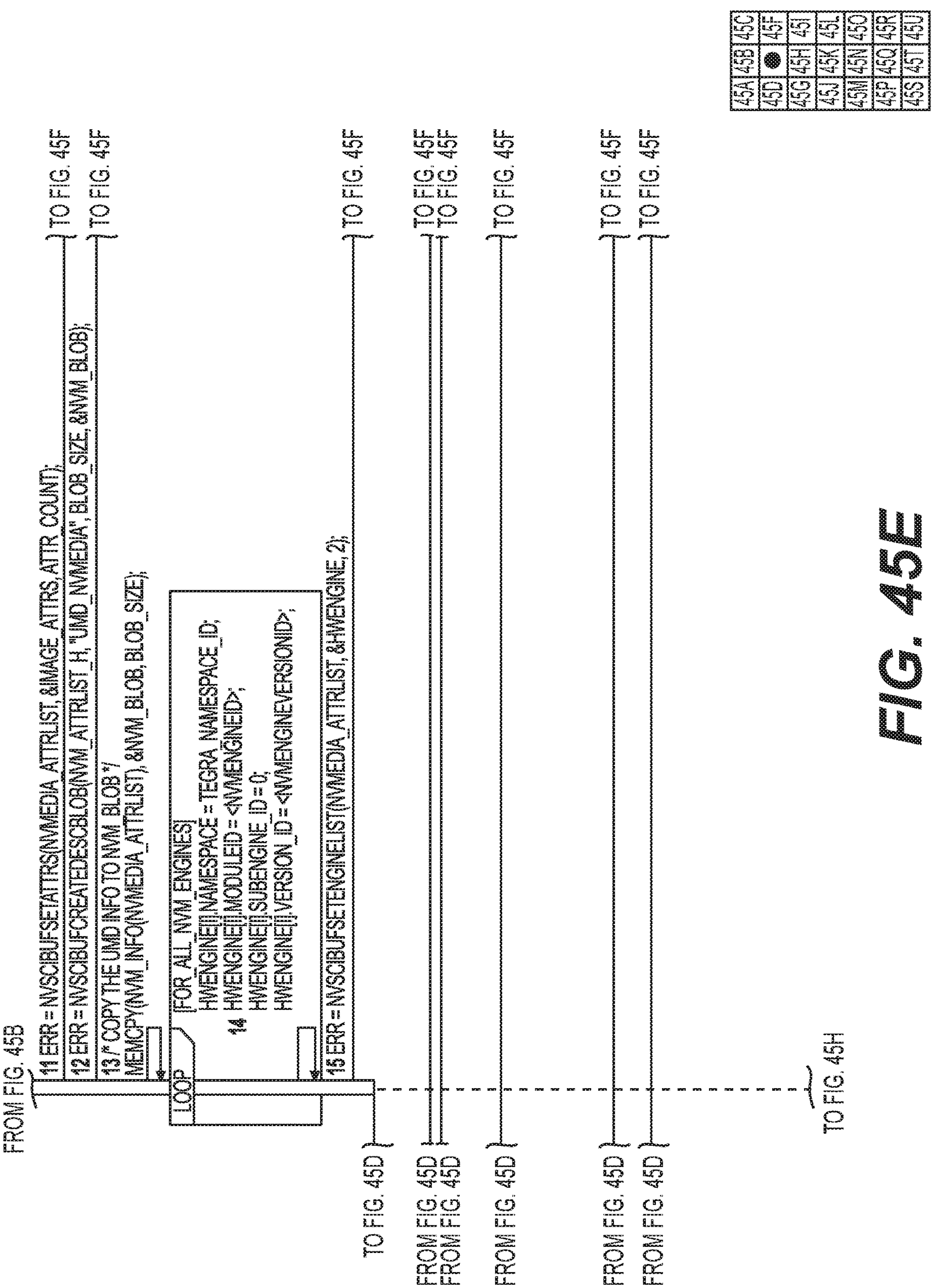
Figure 45F:
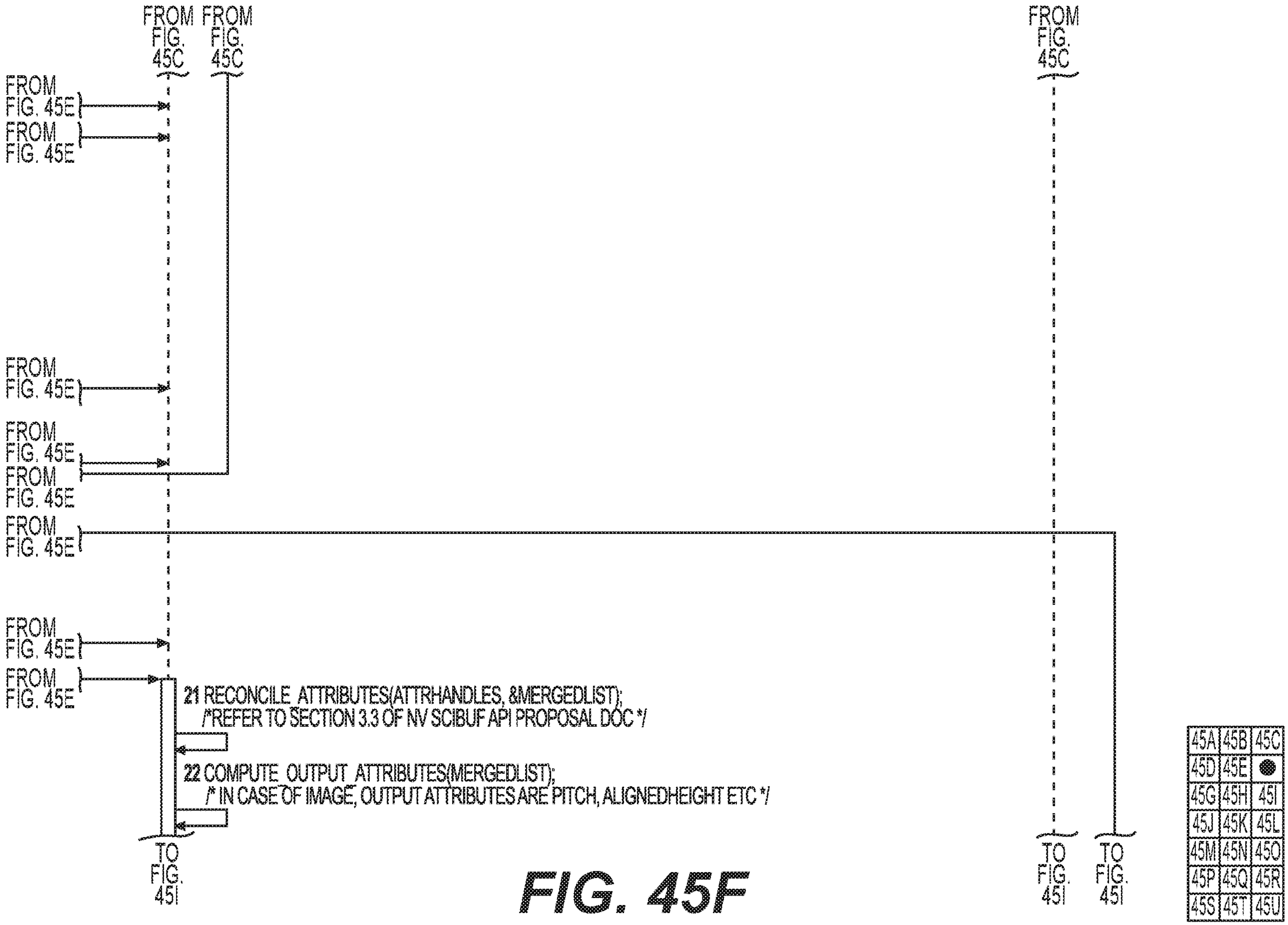
Figure 45G:
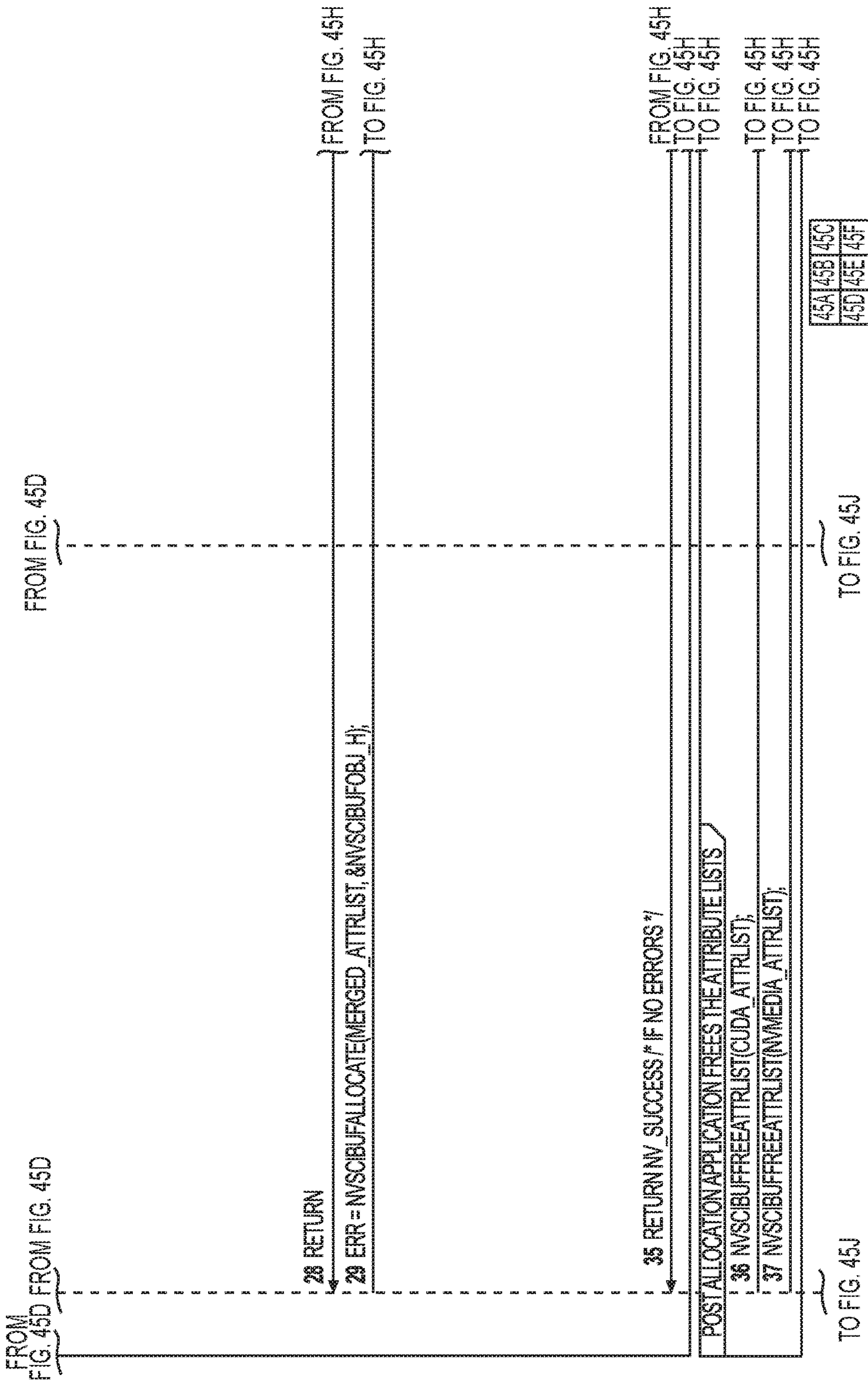
Figure 45G:
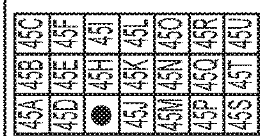
Figure 45H:
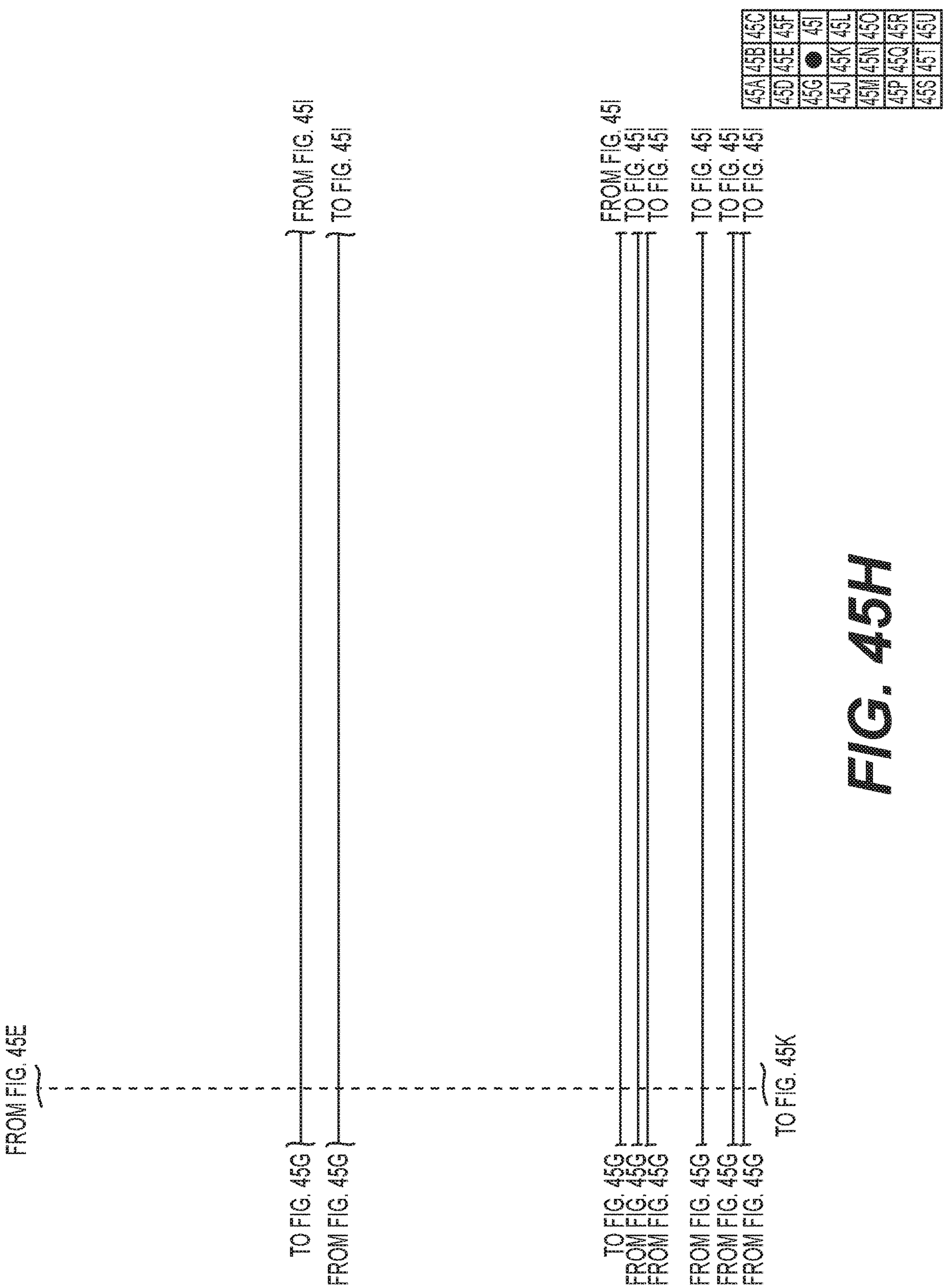
Figure 45I:
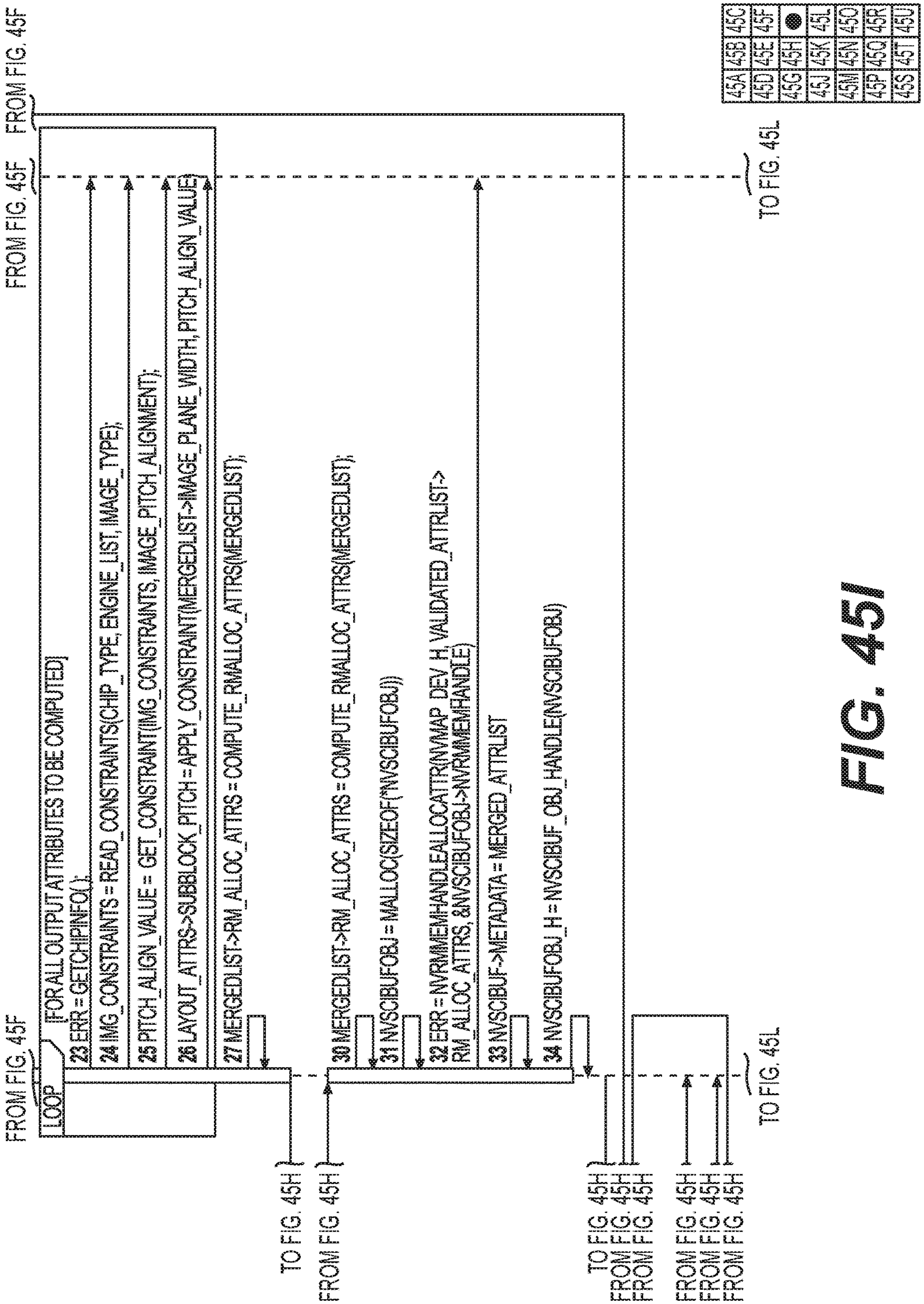
Figure 45J:
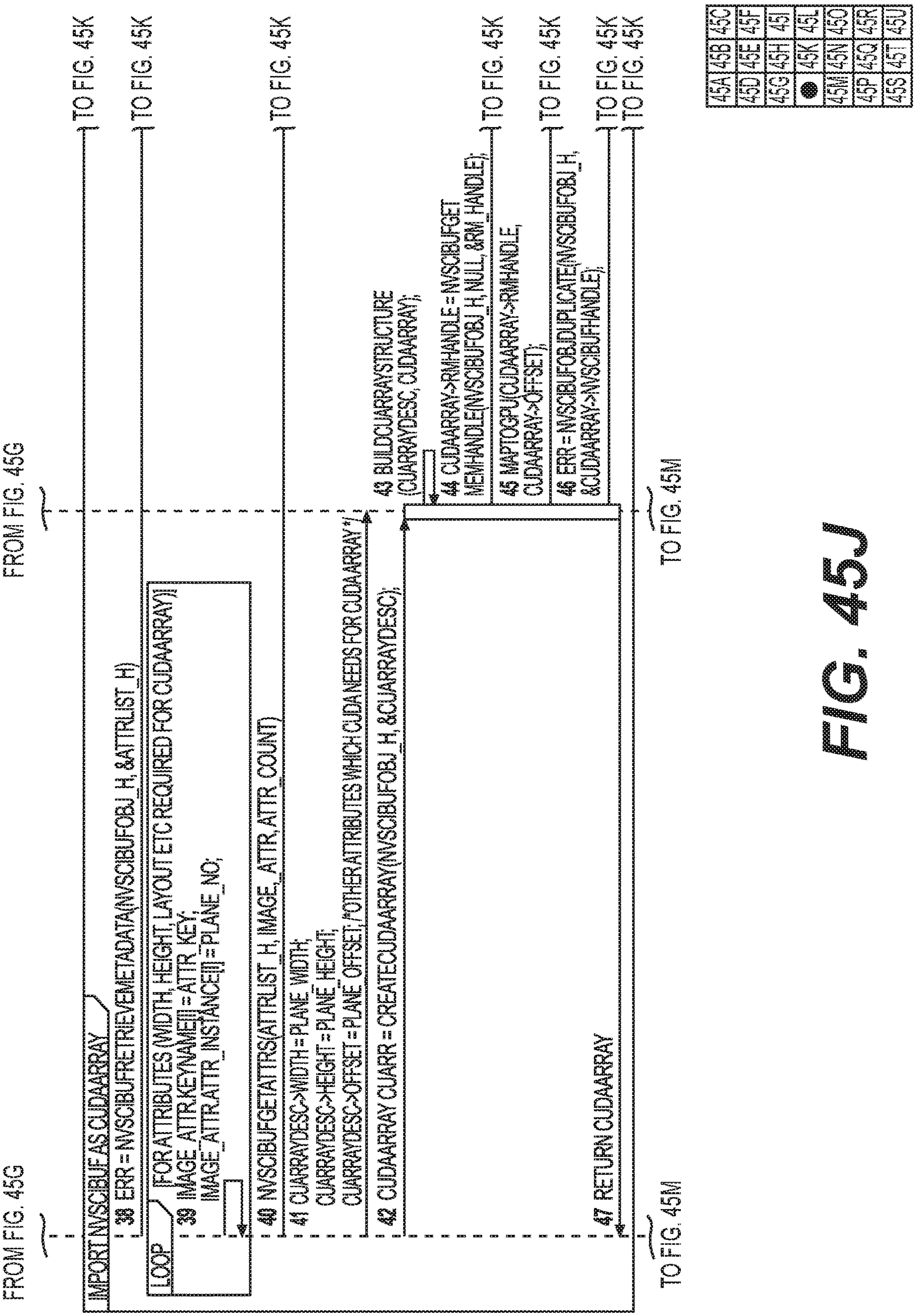
Figure 45K:
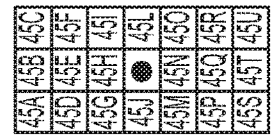
Figure 45K:
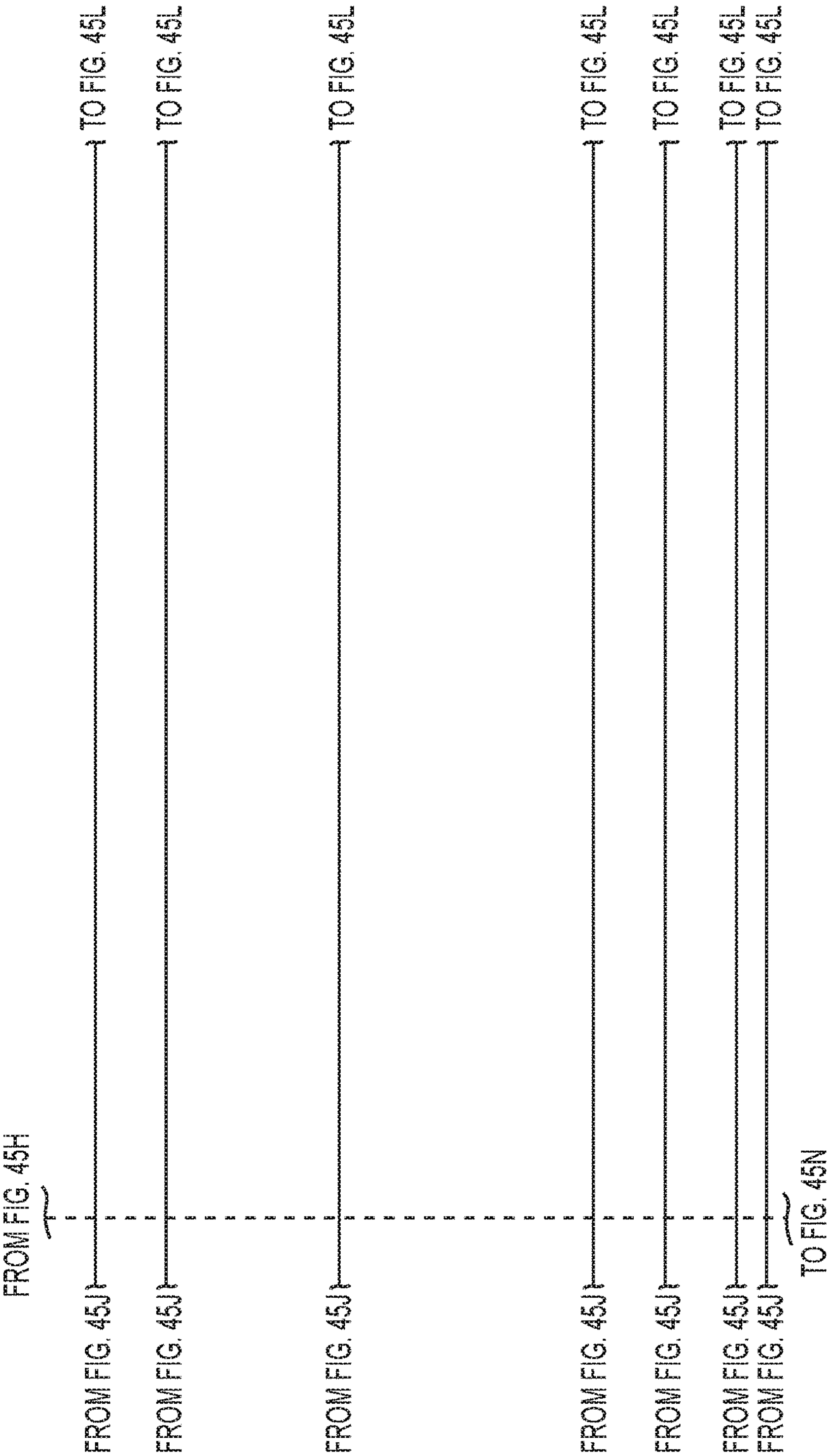
Figure 45L:
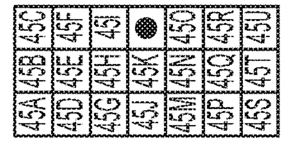
Figure 45L:
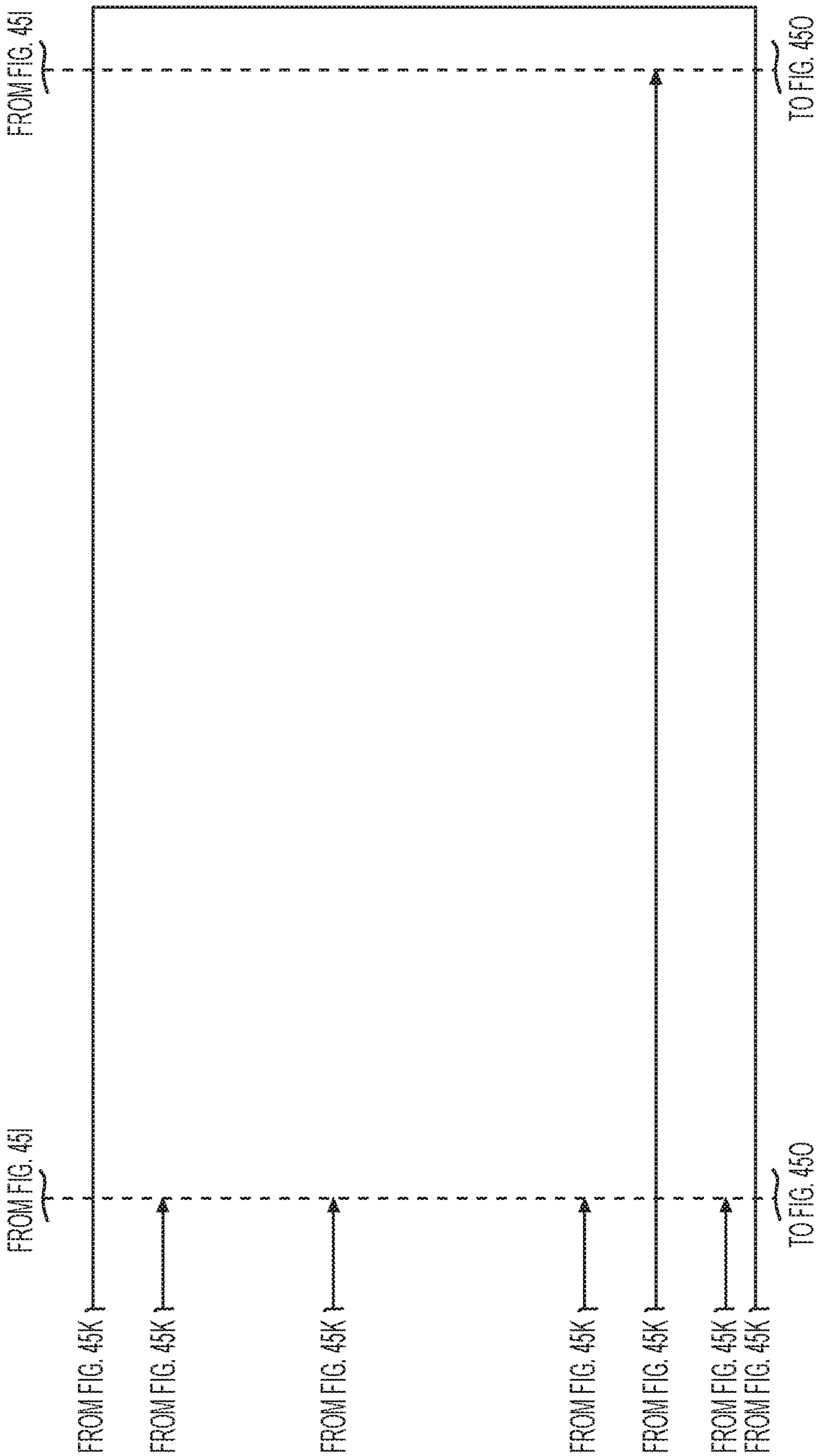
Figure 45M:
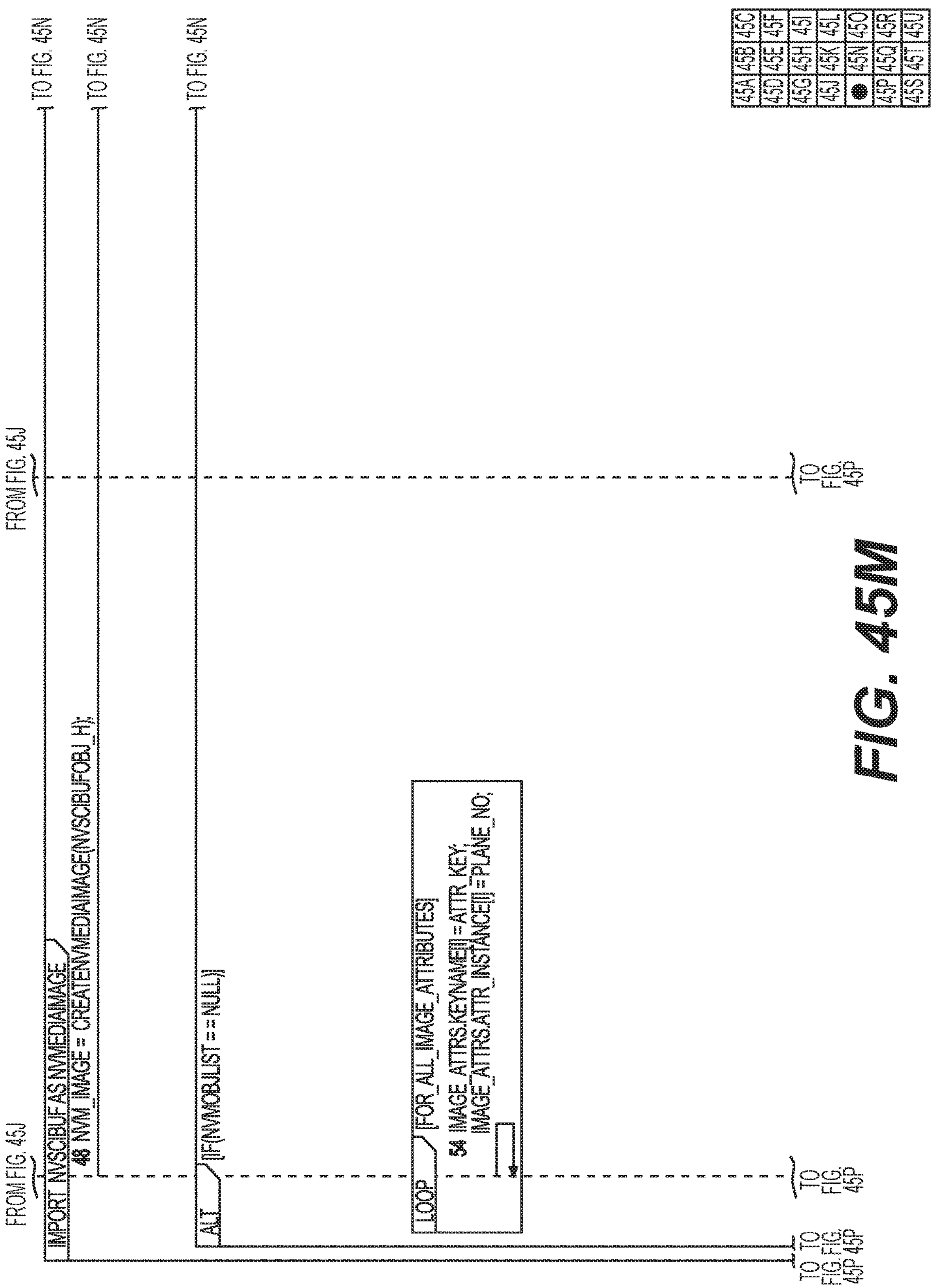
Figure 45N:
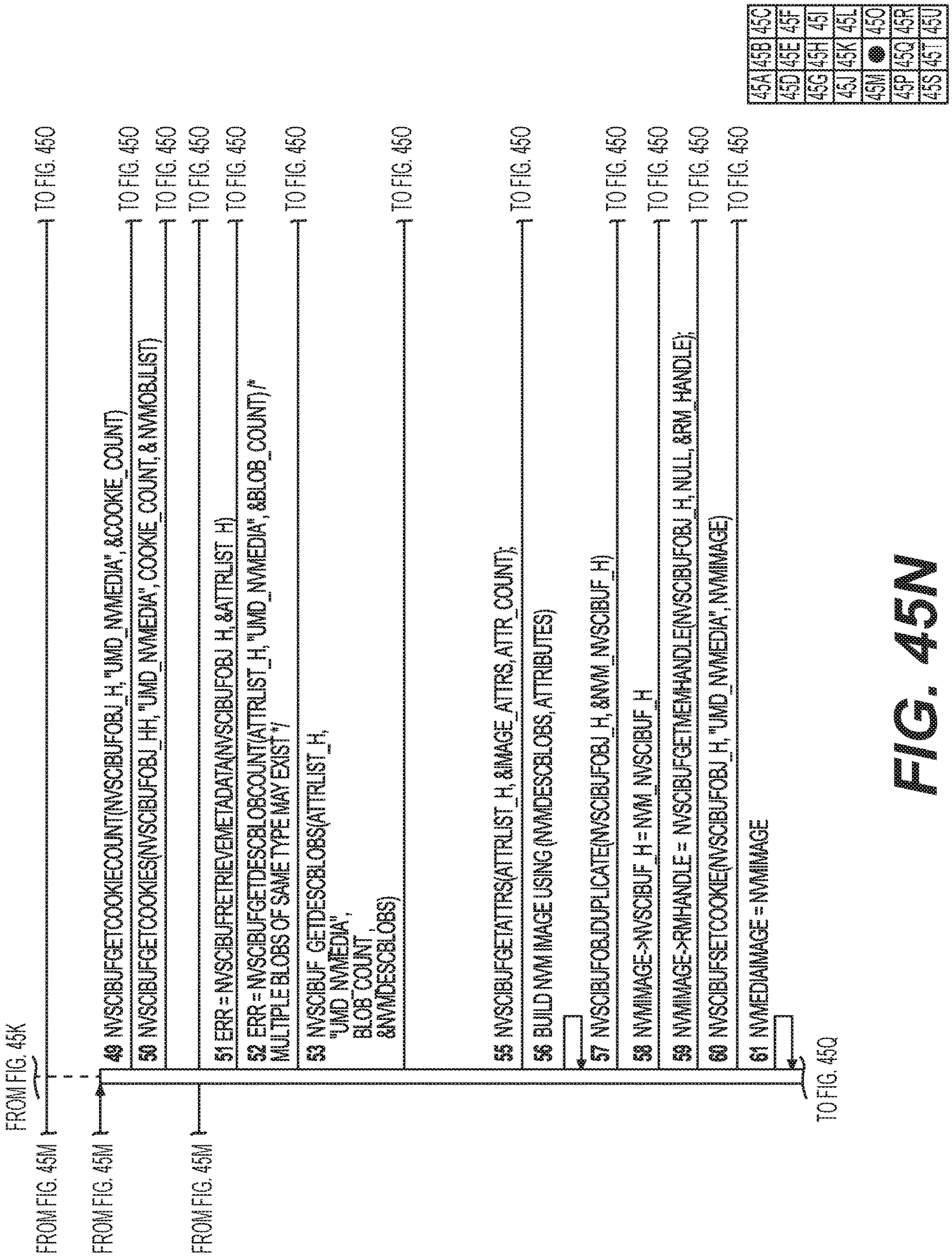
Figure 45O:
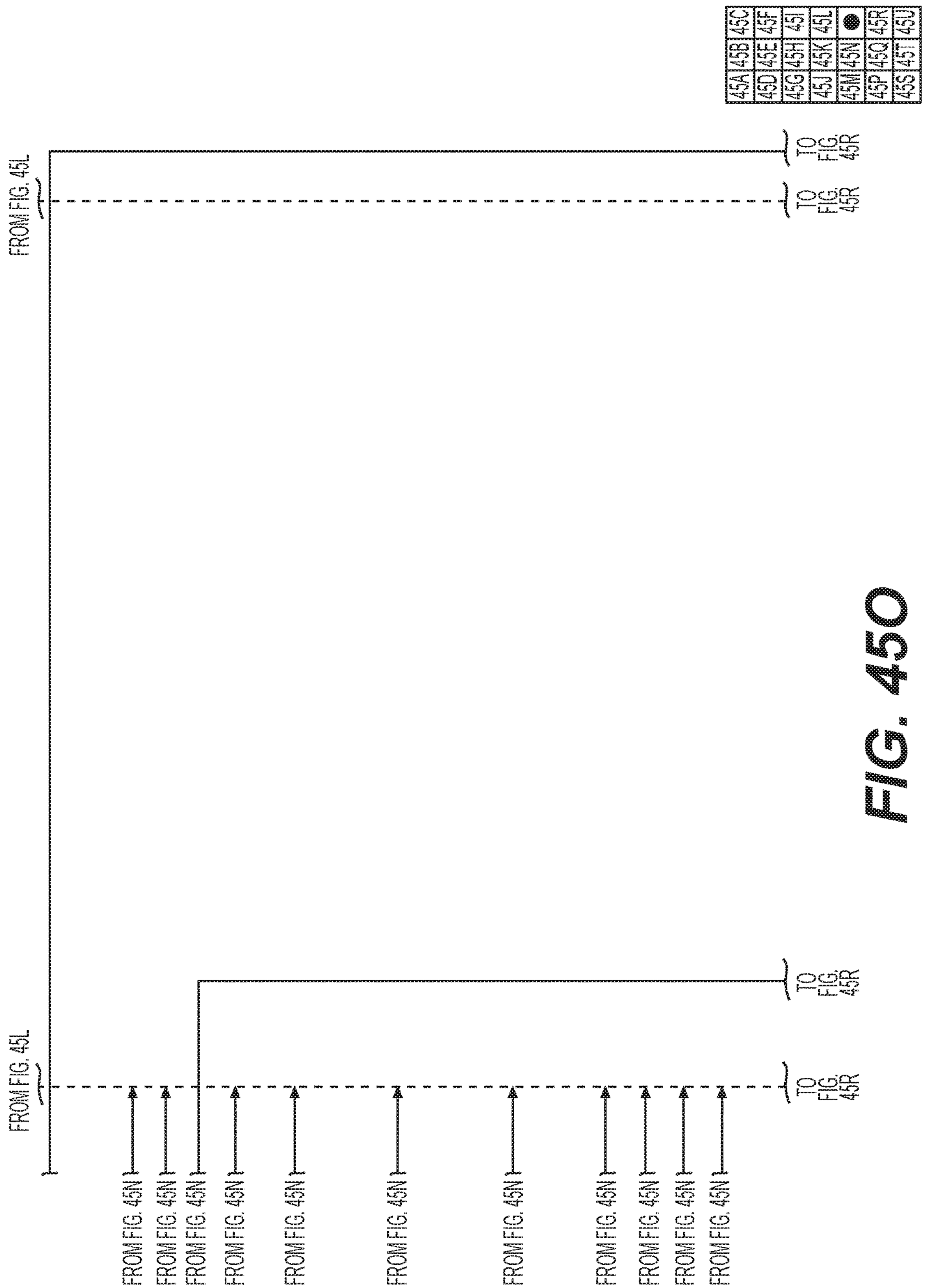
Figure 45P:
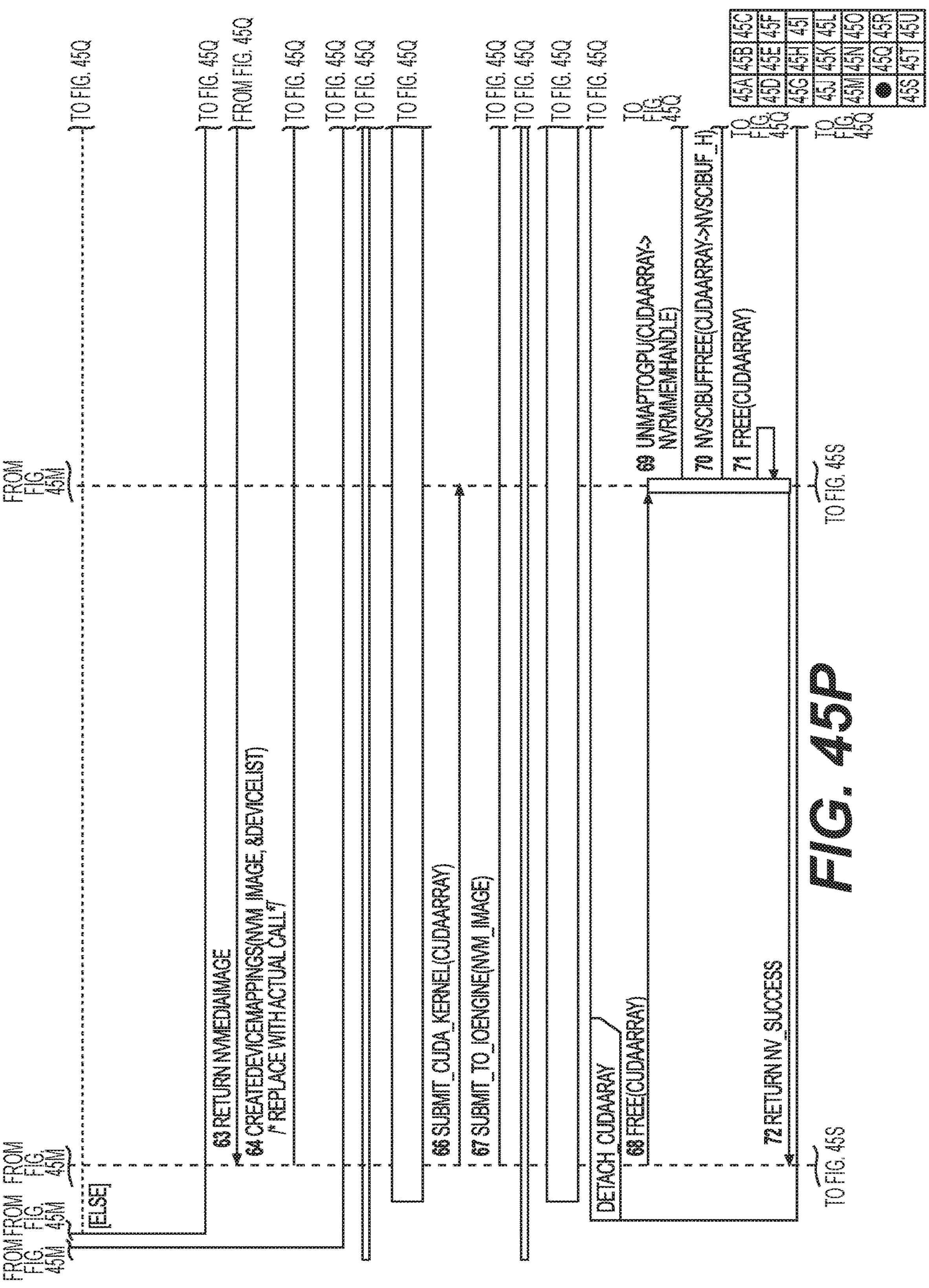
Figure 45R:
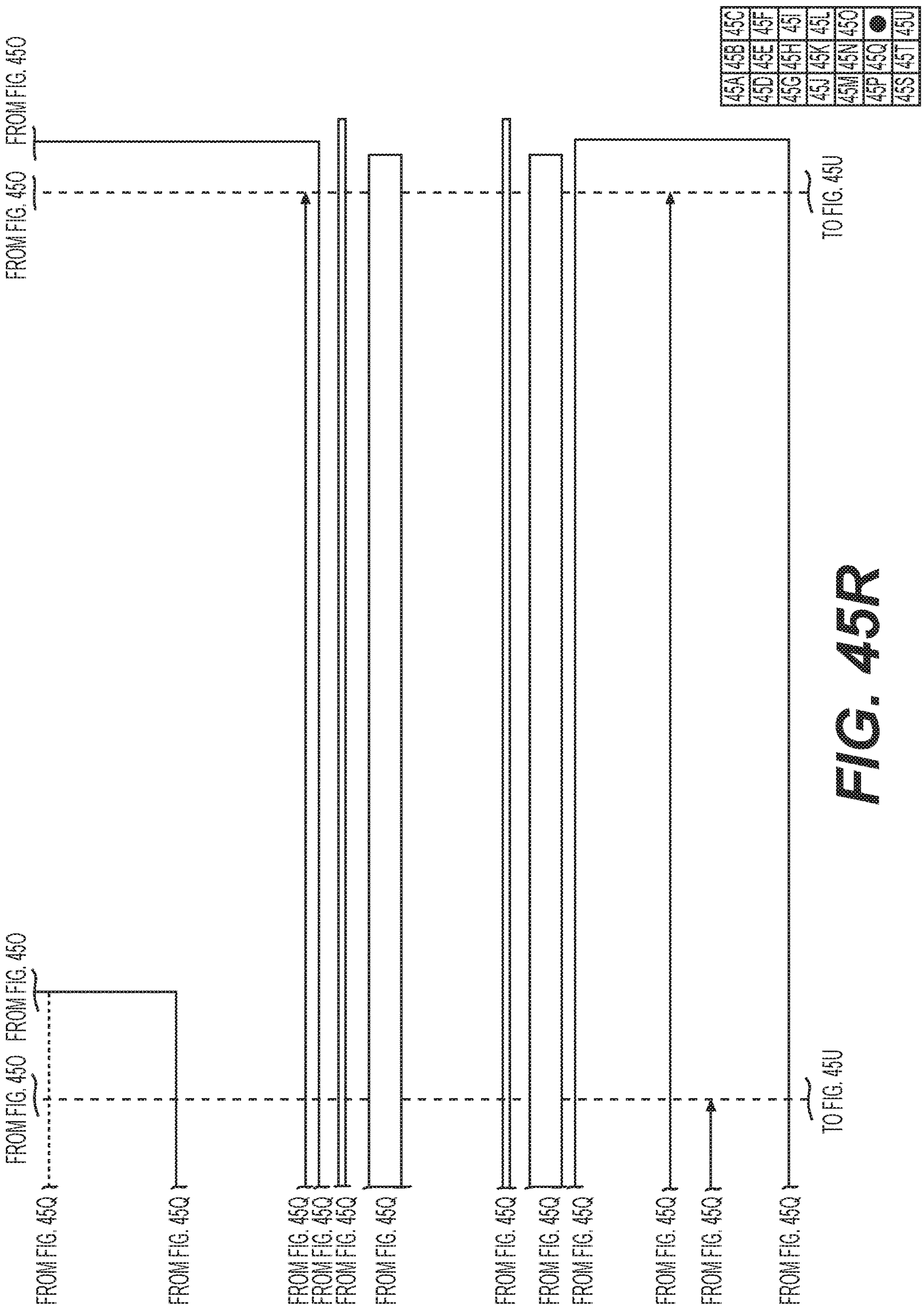
Figure 45S:
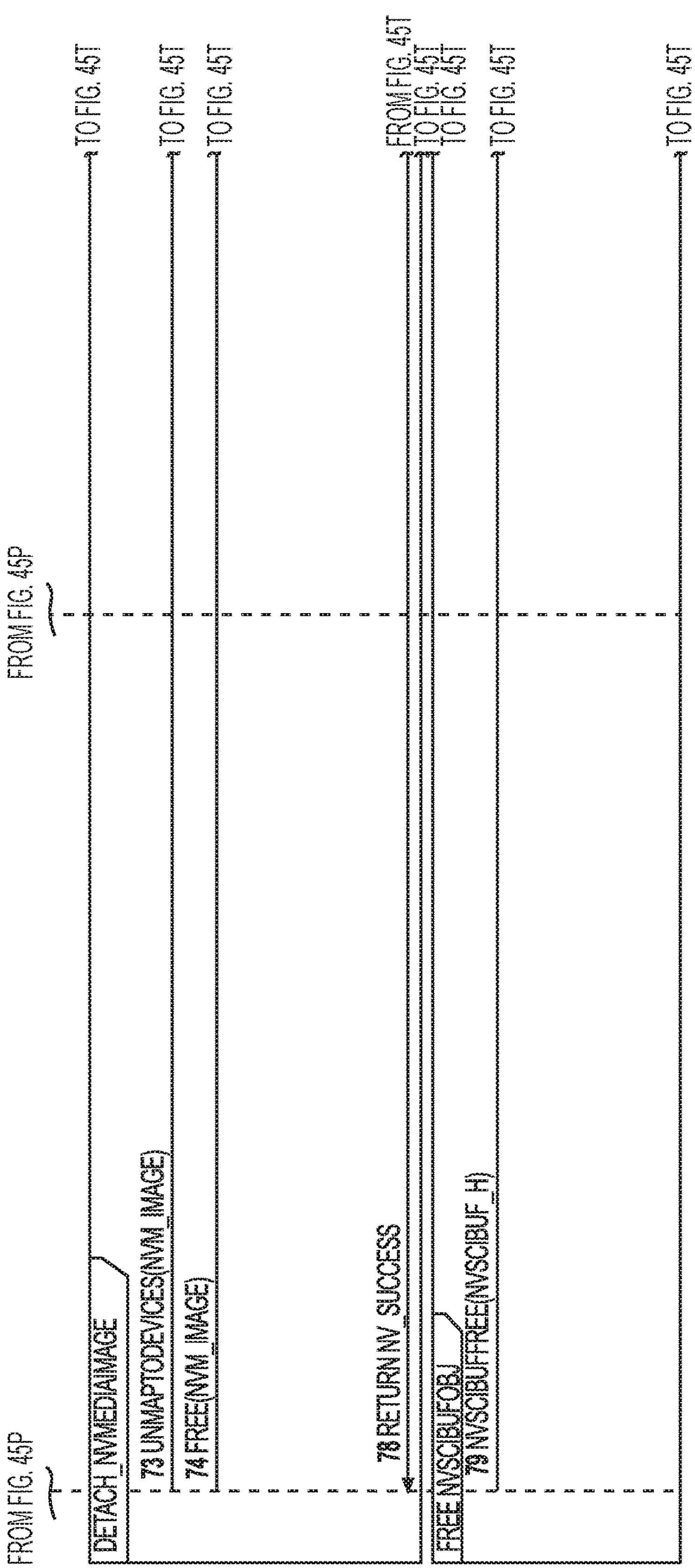
Figure 45S:
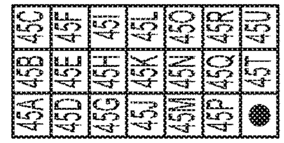
Figure 45T:
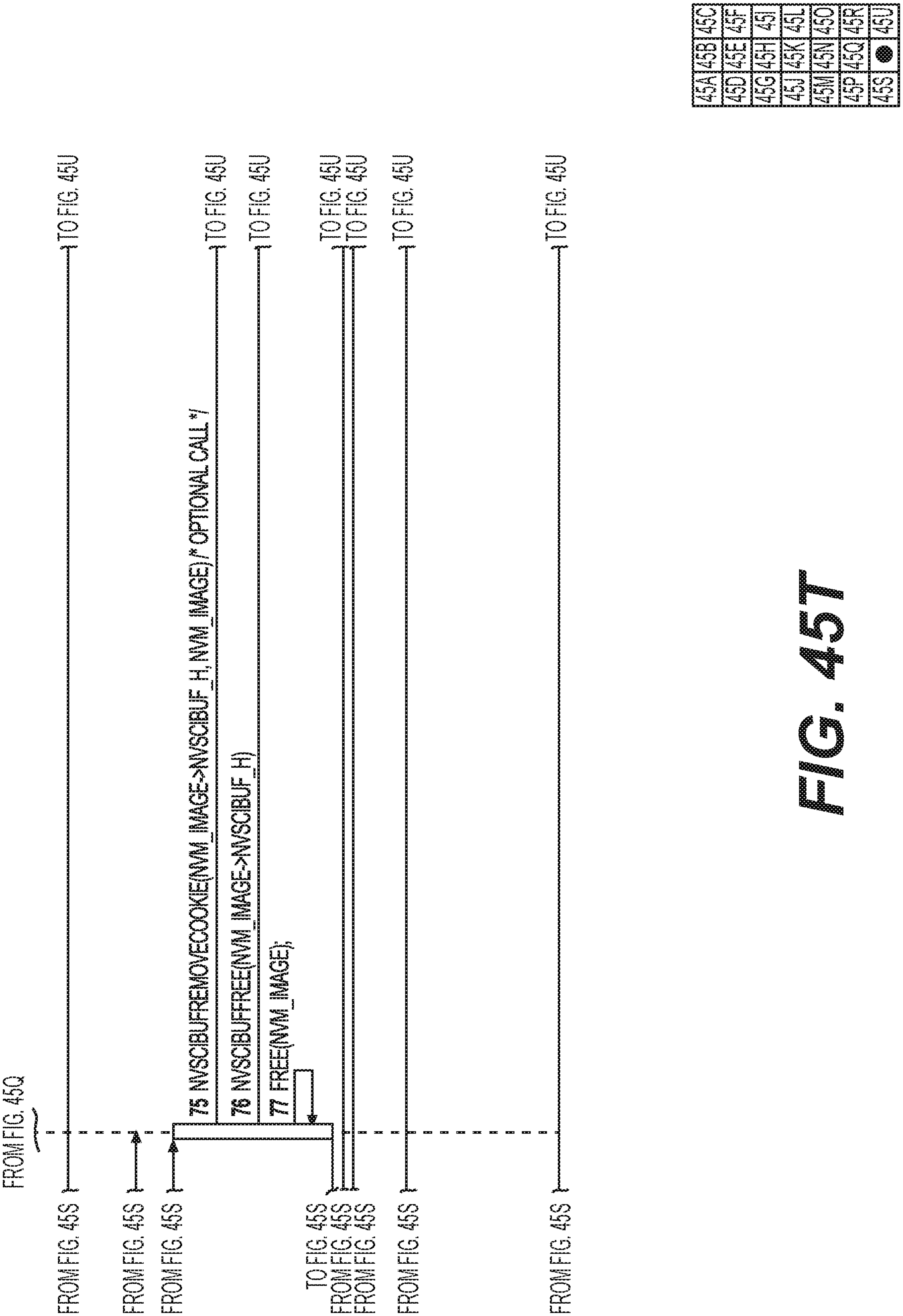
Figure 45U:
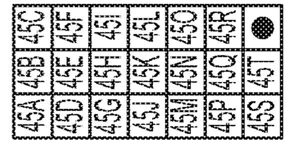
Figure 45U:
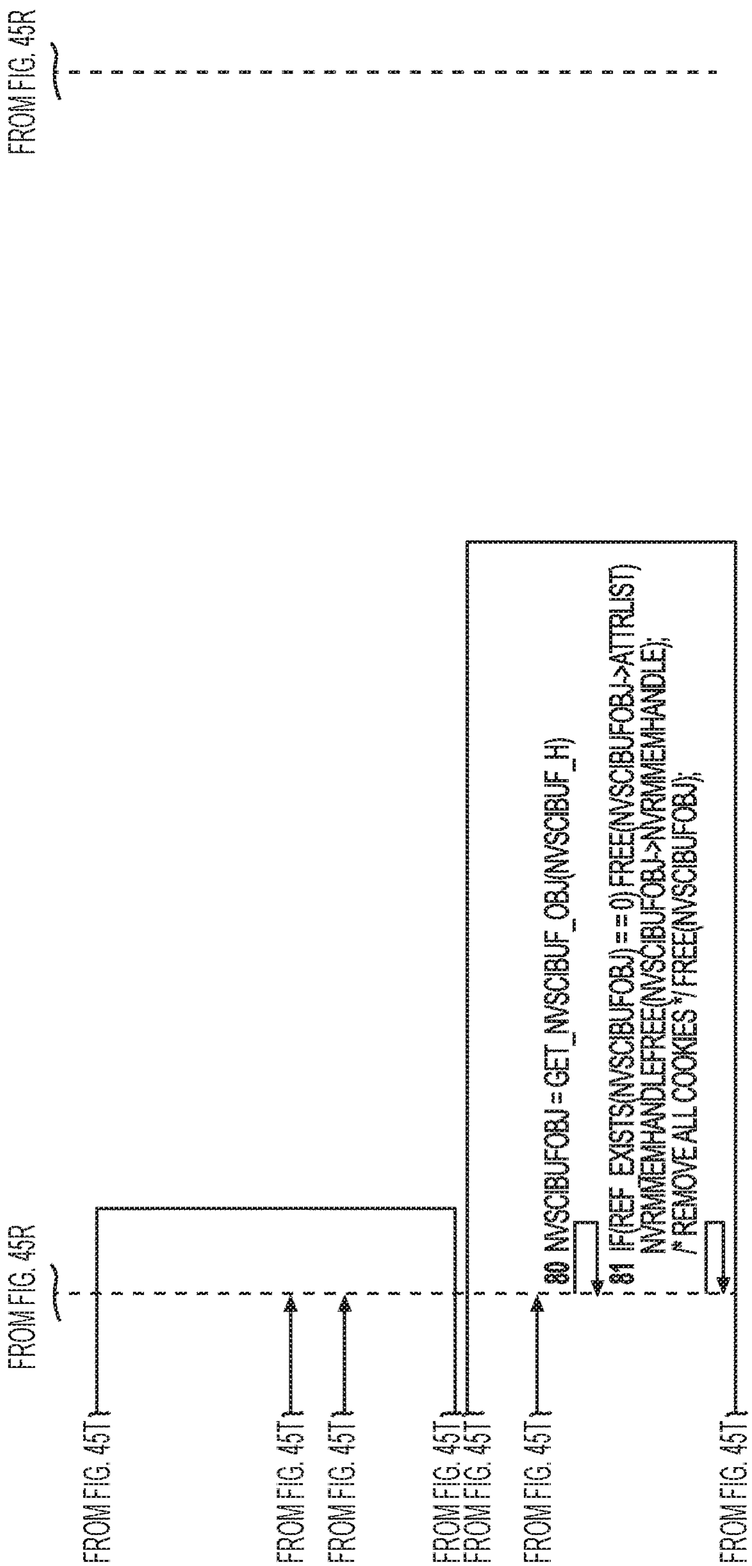

FIG. 43 illustrates a streaming multi-processor ("SM") 4300, according to at least one embodiment. In at least one embodiment, SM 4300 is SM of FIG. 41. In at least one embodiment, SM 4300 includes, without limitation, an instruction cache 4302; one or more scheduler units 4304; a register file 4308; one or more processing cores ("cores") 4310; one or more special function units ("SFUs") 4312; one or more load/store units ("LSUs") 4314; an interconnect network 4316; a shared memory/level one ("L1") cache 4318; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4300. In at least one embodiment, scheduler unit 4304 receives tasks from work distribution unit and manages instruction scheduling for one or more thread blocks assigned to SM 4300. In at least one embodiment, scheduler unit 4304 schedules thread blocks for execution as warps of parallel threads, wherein each thread block is allocated at least one warp. In at least one embodiment, each warp executes threads. In at least one embodiment, scheduler unit 4304 manages a plurality of different thread blocks, allocating warps to different thread blocks and then dispatching instructions from plurality of different cooperative groups to various functional units (e.g., processing cores 4310, SFUs 4312, and LSUs 4314) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4306 is configured to transmit instructions to one or more of functional units and scheduler unit 4304 includes, without limitation, two dispatch units 4306 that enable two different instructions from same warp to be dispatched during each clock cycle. In at least one embodiment, each scheduler unit 4304 includes a single dispatch unit 4306 or additional dispatch units 4306.

In at least one embodiment, each SM 4300, in at least one embodiment, includes, without limitation, register file 4308 that provides a set of registers for functional units of SM 4300. In at least one embodiment, register file 4308 is divided between each of functional units such that each functional unit is allocated a dedicated portion of register file 4308. In at least one embodiment, register file 4308 is divided between different warps being executed by SM 4300 and register file 4308 provides temporary storage for operands connected to data paths of functional units. In at least one embodiment, each SM 4300 comprises, without limitation, a plurality of L processing cores 4310. In at least one embodiment, SM 4300 includes, without limitation, a large number (e.g., 128 or more) of distinct processing cores 4310. In at least one embodiment, each processing core 4310, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as parallel computing platform and application programming interface model 9 C++ API, exposes specialized matrix load, matrix multiply and accumulate, and matrix store operations to efficiently use tensor cores from a parallel computing platform and application programming interface model-C++ program. In at least one embodiment, at parallel computing platform and application programming interface model level, warp-level interface assumes 16×16 size matrices spanning all 32 threads of warp.

In at least one embodiment, each SM 4300 comprises, without limitation, M SFUs 4312 that perform special functions (e.g., attribute evaluation, reciprocal square root, and like). In at least one embodiment, SFUs 4312 include, without limitation, a tree traversal unit configured to traverse a hierarchical tree data structure. In at least one embodiment, SFUs 4312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4300. In at least one embodiment, texture maps are stored in shared memory/L1 cache 4318. In at least one embodiment, texture units implement texture operations such as filtering operations using mip-maps (e.g., texture maps of varying levels of detail), in accordance with at least one embodiment. In at least one embodiment, each SM 4300 includes, without limitation, two texture units.

Each SM 4300 comprises, without limitation, N LSUs 4314 that implement load and store operations between shared memory/L1 cache 4318 and register file 4308, in at least one embodiment. Each SM 4300 includes, without limitation, interconnect network 4316 that connects each of functional units to register file 4308 and LSU 4314 to register file 4308 and shared memory/L1 cache 4318 in at least one embodiment. In at least one embodiment, interconnect network 4316 is a crossbar that can be configured to connect any of functional units to any of registers in register file 4308 and connect LSUs 4314 to register file 4308 and memory locations in shared memory/L1 cache 4318.

In at least one embodiment, shared memory/L1 cache 4318 is an array of on-chip memory that allows for data storage and communication between SM 4300 and primitive engine and between threads in SM 4300, in at least one embodiment. In at least one embodiment, shared memory/L1 cache 4318 comprises, without limitation, 128 KB of storage capacity and is in path from SM 4300 to partition unit. In at least one embodiment, shared memory/L1 cache 4318, in at least one embodiment, is used to cache reads and writes. In at least one embodiment, one or more of shared memory/L1 cache 4318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4318 enables shared memory/L1 cache 4318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4300 to execute program and perform calculations, shared memory/L1 cache 4318 to communicate between threads, and LSU 4314 to read and write global memory through shared memory/L1 cache 4318 and memory partition unit. In at least one embodiment, when configured for general purpose parallel computation, SM 4300 writes commands that scheduler unit 4304 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. graphics card may be configured to interface with a PCIe slot on a motherboard of a desktop computer. In at least one embodiment, PPU may be an integrated graphics processing unit ("iGPU") included in chipset of motherboard.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to SM 4300. In at least one embodiment, SM 4300 is used to infer or predict information based on a trained machine learning model (e.g., neural network) that has been trained by another processor or system or by SM 4300. In at least one embodiment, SM 4300 may be used to perform one or more neural network use cases described herein.

In at least one embodiment, SM 4300 or a component thereof executes computer-readable instructions to allocate memory to at least two heterogeneous processing cores in response to performing one or more instructions associated with one or more application programming interfaces (APIs) based, at least in part, on one or more attributes associated with the at least two heterogeneous processing cores. In at least one embodiment, SM 4300 utilizes computing resources (e.g., CPUs, ASICs, GPUs, FPGAs) to implement inferencing and/or training logic 1515 to perform inferencing and/or training operations associated with one or more embodiments. SM 4300 may be utilized to implement one or more embodiments described elsewhere in this disclosure, such as those described in connection with FIGS. 1-42.

FIG. 44 illustrates a diagram of unified synchronization, CUDA UMD as writer and reader, according to at least one embodiment. In at least one embodiment, FIG. 44 is implemented in connection with (e.g., in place of, in addition to, as an alternative to) FIGS. 10-11. In at least one embodiment, an app waiter (e.g., CUDA) calls GetDeviceCapabilities (&w_caps) to obtain a set of device capabilities supported by a UMD waiter. A UMD waiter may determine a set of supported capabilities which can be used to determine a set of constraints on how a cross-UMD sync object is created. In at least one embodiment, UMD waiter specifies what types of synchronization primitives are supported, such as semaphores and syncpoints. In at least one embodiment, UMD waiter sets w_caps to {primitive={semaphore, syncpoint}count={5, 0}} and provides such information to app waiter in any suitable manner. In at least one embodiment, an AttributeList is returned by UMD waiter to app waiter. In at least one embodiment, app waiter sends w_caps to app signaler as AttributeList. In at least one embodiment, signaler sets up a shared fence buffer that is to include fences. In at least one embodiment, app signaler calls GetDeviceCapabilities (&s_caps) to obtain a set of signaler capabilities. In at least one embodiment, UMD signaler fulfills calls to GetDeviceCapabilities( ). In at least one embodiment, UMD sets s_caps to indicate a set of supported primitives. In at least one embodiment, s_caps indicates parameters of supported primitives, for example, max count of a semaphore. In at least one embodiment, UMD signaler sets s_caps {primitive={semaphore, syncpoint}count={5, 0}} and returns s_caps as an AttributeList to app signaler. In at least one embodiment, app signaler reconciles AttributeList, finds a suitable primitive for provided combination of signaler and waiter. In at least one embodiment, app signaler calls s_UnifiedSync=UnifiedSyncCreate (attributes) using UnifiedSync which is fulfilled by UnifiedSync. In at least one embodiment, UnifiedSync allocates semaphores if needed (e.g., array of {id, hMem, offset}) and returns s_UnifiedSync to app signaler. In at least one embodiment, app signaler provides UMDImportUnifiedSync (s_UnifiedSync) to UMD signaler. In at least one embodiment, UMD signaler creates a mapping (e.g., GPU MMU mapping), if applicable save away id/index <-> GMMU mapping and associate id/index with UnifiedSyncObject. In at least one embodiment, UMD signaler returns UMD_Signaler object to App signaler. In at least one embodiment, app signaler setup is performed using techniques described above. In at least one embodiment, app signaler sends UnifiedSync blob using utility APIs to App waiter.

In at least one embodiment, app signaler sends UnifiedSync blob using utility APIs to App waiter. In at least one embodiment, app waiter calls UMDImportUnifiedSync (w_UnifiedSync). In at least one embodiment, UMD waiter creates a mapping (e.g., GMMU mapping) if applicable save away id/index <-> GMMU mapping and associate id/index with UnifiedSyncObject. In at least one embodiment, UMD signaler returns UMD_Waiter object to app signaler. In at least one embodiment, techniques directed towards app waiter setup are described above.

In at least one embodiment, techniques below describe writer/reader synchronized using UMD objects based on UnifiedSync. In at least one embodiment, steps described below can be run in a loop. In at least one embodiment, app signaler, after obtaining UMD_Waiter object, performs tasks on a GPU/SOC engine using UMD signaler. In at least one embodiment, UMD signaler may return status codes indicating success or failure of requested tasks. In at least one embodiment, app signaler calls UMDGenerateUnifiedSyncFence (s_UnifiedSync, UMDObject, UnifiedSyncFence) to generate fences. In at least one embodiment, UMD signaler update fence with semaphore SyncPoint (Index, Value). In at least one embodiment, UMD signaler: finds channel to track from UMDObject; if it is a semaphore, add sema_release (channel, address, value), compose index from address; if it is a syncpoint, add syncpoint release (channel, index, value); and compose <index, value> tuple to return. In at least one embodiment, UMD signaler returns status, fence, a tuple (e.g., {type, index, value}) to app signaler. In at least one embodiment, app signaler sends UnifiedSyncFence using utility APIs provided to app waiter. In at least one embodiment, app waiter calls UMDWaitUnifiedSyncFence (w_UnifiedSync, UMDObject, UnifiedSyncFence). In at least one embodiment, UMD waiter will: if object is semaphore, calculate address for fence received (e.g., address=UMDObject->semaPool+offset); get channel which will wait for fence; if semaphore, add sema_acquire (channel, address, value); if syncpoint, add syncpoint acquire (channel, index, value). In at least one embodiment, UMD waiter returns a status to app waiter. In at least one embodiment, app waiter performs one or more tasks on GPU/SOC engine.

FIG. 45 illustrates a diagram of an intra or inter thread use case, according to at least one embodiment. In at least one embodiment, FIG. 45 illustrates an application 4502; CUDA driver 4504; NvMedia driver 4506; NvSciBuf 4508; and NvRM 4510. In at least one embodiment, application 4502 is a software application that use NvSciBuf (or any other suitable buffer described herein) as part of intra or inter thread operation. In at least one embodiment, memory is shared between at least a CUDA driver 4504 and NvMedia driver 4506.

In at least one embodiment, CUDA constraint settings are implemented in accordance with techniques described in greater detail in this disclosure. In at least one embodiment, application calls an API to create an entry attribute list. In at least one embodiment, application 4502 calls NvSciBuf 4508 using a NvSciBufCreateEmptyAttrlist API and indicates a type (e.g., image) for memory and a reference to a variable for storing an empty attribute list. In at least one embodiment, application 4502 calls NvSciBufCreateEmptyAttrlist (IMAGE, & cuda_attrlist) to create an empty attribute list. In at least one embodiment, application 4502 loops through for all attributes that application 4502 wants to set and sets attribute information. In at least one embodiment, attributes include keys and values. In at least one embodiment, an img_attr variable stores keynames and values for a list of attributes. In at least one embodiment, application 4502 calls a NvSciBufSetAttrs( ) which sets cuda_attrlist based on image_attrs, which may include also an attr_count that stores how many attributes are in image_attr. In at least one embodiment, application 4502 calls CUDA driver 4504 using an addCUDAConstraints( ) API that includes at least cuda_attrlist and any other args which CUDA needs. In at least one embodiment, CUDA driver 4504 sets hardware engine information such as a namespace, module identifier, subengine id, version id, and any suitable combination thereof. In at least one embodiment, hardware engine information is stored by CUDA driver 4504 in a hwengine variable or data structure. In at least one embodiment, CUDA driver 4504 calls NvSciBuf 4508 using a NvSciBufSetEngineList( ) API that includes cuda_attrlist, hwengine, and an array count (e.g., for one engine, count=1). In at least one embodiment, CUDA driver 4504 returns success to application 4502 if no errors.

In at least one embodiment, NvMedia constraint settings are described in greater detail here. In at least one embodiment, application 4502 calls NvMedia driver 4506 using a SetNvMediaImageDescriptor( ) API. In at least one embodiment, NvMedia driver 4506 calls NvSciBuf using a NvSciBufCreateEmptyAttrlist( ) API to create an empty attribute list identified as nvmedia_attrlist. In at least one embodiment, NvSciBufCreateEmptyAttrlist( ) allows NvMedia driver 4506 to specify an object type such as an image or tensor. In at least one embodiment, NvMedia driver 4506 iterates through a loop for all attributes that application 4502 wants to set. In at least one embodiment, image_attr encodes attribute keys and values for all attributes that application 4502 wants to set. In at least one embodiment, NvMedia driver 4506 calls NvSciBuf using a NvSciBufSetAttrs( ) API that sets attributes of nvmedia_attrlist using image_attrs. In at least one embodiment, NvMedia driver 4506 calls NvSciBuf using a NvSciBufCreateDescBlob( ) API which creates a description blob. In at least one embodiment, description blob is nvm_blob. In at least one embodiment, UMD info is copied to nvm_blob. In at least one embodiment, for all nvm_engines, NvMedia driver 4506 sets hardware engine information such as namespace, module identifier, subengine identifier, version identifier, and any suitable combination thereof. In at least one embodiment, NvMedia driver 4506 sets an engine list using nvmedia_attrlist and hwengine, including a hardware engine count based on number of nvm engines. In at least one embodiment, NvMedia driver 4506 returns success to application 4502 if no errors. In at least one embodiment, application 4502 calls NvSciBuf using a NvSciBufSetAttrs( ) API to set general attributes.

In at least one embodiment, after constraints are set, an allocation process is performed. In at least one embodiment, attrlists is an array of attribute lists. In at least one embodiment, attrlists references an attribute list from CUDA driver 4504 and NvMedia driver 4506. In at least one embodiment, attrlists includes one entry that encodes cuda_attrlist and a second entry that encodes nvmedia_attrlist. In at least one embodiment, application 4502 calls NvSciBuf 4508 using a NvSciBufAppendAttrLists( ) API which includes attrlists and returns an unreconciled attribute list unreconciled_attrlist. In at least one embodiment, application 4502 calls NvSciBuf using a NvSciBufReconcileAttrList( ) API that takes an unreconciled attribute list to generate a reconciled attribute list. In at least one embodiment, NvSciBuf 4508 reconciles attributes using techniques described in connection with FIGS. 1-14. In at least one embodiment, one or more output attributes are computed based on a merged list from reconciled attributes. In at least one embodiment, for an image, output attributes may include pitch, aligned height, and more. In at least one embodiment, NvSciBuf loops through for all output attributes to be computed and, in each iteration, gets chip information, reads constraints (e.g., based on chip type, engine list, image type), gets constraints based on image constraints and image pitch alignment, and applies constraints based on merged list image plane width, pitch align value. In at least one embodiment, NvSciBuf computes memory allocation attributes from a merged list. In at least one embodiment, reconciled and/or merged attributes are turned to application 4502. In at least one embodiment, merged attribute is used to call NvSciBufAllocate( ) using NvSciBuf. In at least one embodiment, merged attributes are used to compute memory allocation attributes and memory allocation (e.g., malloc( )) APIs are called to obtain a NvSciBuf object. In at least one embodiment, memory handle allocation attribute is based on allocation attributes and stored in a memory handle of a NvSciBuf object. In at least one embodiment, NvSciBuf includes merged attribute list as metadata. In at least one embodiment, a NvSciBuf object handle is returned to application 4502. In at least one embodiment, a success code is returned if no errors (e.g., not enough memory to make allocation) are encountered.

In at least one embodiment, following a success memory allocation by NvSciBuf 4508, application 4502 frees memory allocated to UMD-specific attribute lists such as cuda_attrlist and nvmedia_attrlist as described in greater detail above.

In at least one embodiment, NvSciBuf memory can be imported by CUDA as a CUDA array. In at least one embodiment, application 4502 calls NvSciBuf using NvSciBufRetrieveMetadata( ) API by providing NvSciBuf object handle and receiving, in response, and attribute list handle attrlist_h. In at least one embodiment, application 4502 loops through for attributes (e.g., width, height, layout, etc., for CUDA array) and sets key value pairs in an image_attr array. In at least one embodiment, application 4502 calls NvSciBuf using a NvSciBufGetAttrs( ) API which gets attribute lists based on attrlist_h handle, image_attr, and attr_count (array size of image_attr). In at least one embodiment, application 4502 sets attributes CUDA needs for CUDA array in a cuarraydesc data structure. In at least one embodiment, cuarraydesc includes width, height, offset, etc. properties attributes which are set based on plane values. In at least one embodiment, application 4502 calls CUDA driver 4504 using CreateCUDAArray( ) API based on cuarraydesc and nvscibufobj_h to obtain a CUDAArray cuArr. In at least one embodiment, CUDA driver 4504 calls BuildCUArraySturcture( ) API based at least in part on cuarraydesc provided from application 4502. In at least one embodiment, BuildCUArrayStructure builds CUDAArray. In at least one embodiment, CUDA driver 4504 calls NvSciBuf using NvSciBufGetMemhandle API based on a provided nvscibufobj_h and returns a memhandle which is stored in CUDAArray->rmhandle. In at least one embodiment, CUDA driver 4504 calls MaptoGPU based at least in part on CUDAArray->rmhandle and CUDAArray->offset (e.g., set by application 4502). In at least one embodiment, CUDA driver 4504 calls NvSciBuf using NvSciBufObjDuplicate( ) to duplicate nvscibufobj_h handle to CUDAArray->nvscibufhandle. In at least one embodiment, CUDAArray is returned to application 4502.

In at least one embodiment NvSciBuf can be imported as a NvMediaImage. In at least one embodiment, application 4502 calls NvMedia driver 4506 using CreateNvMediaImage( ) API based at least in part on a NvSciBuf buffer handle, nvscibufobj_h. In at least one embodiment, NvMedia driver 4506 gets a cookie count. In at least one embodiment, NvMedia driver 4506 calls NvSciBuf using a NvSciBufGetCookeCount( ) API based at least in part on nvscibufobj_h. In at least one embodiment, NvMedia driver 4506 specifies in NvSciBufGetCookeCount( ) API a value that indicates it as a UMD and gets a cookie count in return. In at least one embodiment, NvMedia driver 4506 calls NvSciBuf 4508 using NvSciBufGetCookies( ) API based at least in part on nvscibufobj_h and cookie count to obtain a nvmobjlist. If nvmobjlist is non-empty, NvMedia driver 4506 calls NvSciBuf 4508 using NvSciBufRetrieveMetdata using nvscibufobj_h to obtain metadata, which may be returned as an attribute list handle, attrlist_h. In at least one embodiment, NvMedia driver 4506 calls NvSciBuf 4508 using NvSciBufGetDescBlobCount( ) API using attrlist_h and indicating UMD NVMEDIA to get a blob count. In at least one embodiment, multiple blobs of same type may exist. In at least one embodiment, NvMedia driver 4506 calls NvSciBuf GetDescBlobs( ) API based at least in part on attrlist_h, UMD NVMEDIA, and blob count to obtain NVMDescblobs. In at least one embodiment, NvMedia driver 4506 calls NvSciBuf 4508 using NvSciBufGetAttrs( ) based at least in part on attrlist_h and attribute count to obtain image_attrs. In at least one embodiment, NvMedia driver 4506 builds a NVMedia image using NVMDescblobs and attributes. In at least one embodiment, NvMedia driver 4506 calls NvSciBuf 4508 using NvSciBufObjDuplicate( ) API to duplicate nvscibufobj_h to produce a copy nvm_nvscibuf_h. In at least one embodiment, NvMImage->nvscibuf_h is set to nvm_nvscibuf_h. In at least one embodiment, NvMImage->rnhandle stores a memhandle that is obtained from NvSciBuf 4508 using NvSciBufGetMemhandle( ) API based at least in part on nvscibufobj_h. In at least one embodiment, NvMedia driver 4506 calls NvSciBuf 4508 using NvSciBufSetCookie( ) based at least in part on nvscibufobj_h, UMD NVMEDIA, NvMImage. In at least one embodiment, nvmediaimage is set based on NvMImage. In at least one embodiment, NvMedia driver 4506 returns nvmediaimage to application 4502. In at least one embodiment, application 4502 calls NvMedia driver 4506 using CreateDeviceMappings( ) based on nvm_image. In at least one embodiment, NvMedia driver 4506 calls NvRM 4510 using DoDevicePinnings( ) API based at least in part on nvmimage.

In at least one embodiment, as part of a runtime, application 4502 submits a CUDA kernel CUDAArray to CUDA driver 4504. In at least one embodiment, application 4502 submits a nvm_image to IO engine. Sequences of run times are merely illustrative and non-limiting.

In at least one embodiment, teardown sequence can occur in any suitable order. In at least one embodiment, a CUDA array CUDAArray is detached by application 4502 calling CUDA driver 4504 using a free( ) API on CUDAArray. In at least one embodiment, CUDA driver 4504 unmaps to GPU CUDAArray->NvRmMemHandle, which is submitted to NvRM. IN at least one embodiment, CUDA driver 4504 calls NvSciBuf 4508 using NvSciBufFree on CUDAArray->nvscibuf_h) which is processed by NvSciBuf 4508. In at least one embodiment, CUDA driver 4504 calls free( ) on CUDAArray after unmapping nvRmMemHandle and calling NvSciBufFree on nvscibuf_h. In at least one embodiment, CUDA driver 4504 returns a success or error code to application 4502.

In at least one embodiment, a NvMedia image is detached. In at least one embodiment, application 4502 calls NvMedia driver 4506 using UnmaptoDevices( ) based at least in part on nvm_image. In at least one embodiment, application 4502 calls NvMedia driver 4506 using free( ) API on nvm_image. In at least one embodiment, NvMedia driver 4506 calls NvSciBuf 4508 using NvSciBufRemoveCookie( ) API based on nvm_image and nvm_image->nvscibuf_h. In at least one embodiment, NvMedia driver 4506 calls NvSciBuf 4508 calls NvSciBufFree( ) based at least in part on nvm_image->nvscibuf_h. In at least one embodiment, NvMedia driver 4506 calls free( ) on nvm_image. In at least one embodiment, NvMedia driver 4506 returns a success or error code to application 4502.

In at least one embodiment, application 4502 calls NvSciBuf 4508 to free NvSciBufObj based at least in part on nvscibuf_h. In at least one embodiment, NvSciBuf 4508 obtains a handle and gets NvSciBufObj from corresponding handle nvscibuf_h. If no references to NvSciBufObj exist (e.g., refcount is equal to 0), NvSciBuf 4508 may call free( ) on NvSciBufObj->attrlist and NvRmMemhandleFree( ) on NvSciBufObj->NvRmMemHandle. In at least one embodiment, once all memory objects within NvSciBufObj are freed, NvSciBuf 4508 calls free( ) on NvSciBufObj.

At least one embodiment of the disclosure can be described in view of the following clauses:

Clause 1. A processor, comprising: one or more circuits to allocate memory to at least two heterogeneous processing cores in response to performing one or more instructions associated with one or more application programming interfaces (APIs) based, at least in part, on one or more attributes associated with the at least two heterogeneous processing cores.

Clause 2. The processor of clause 1, wherein the at least two heterogeneous processing cores comprises a central processing unit (CPU) and a graphics processing unit (GPU).

Clause 3. The processor of any of clauses 1-2, wherein the one or more attributes indicates whether to use system memory or video memory.

Clause 4. The processor of any of clauses 1-3, wherein the video memory is accessible by a discrete graphics processing unit (dGPU).

Clause 5. The processor of any of clauses 1-4, the one or more circuits to allocate the memory to the at least two heterogeneous processing cores are to process the one or more attributes to determine a set of constraints on how the memory is allocated.

Clause 6. The processor of any of clauses 1-5, wherein the memory is allocated in a manner that to be interpreted as a first data object by a first heterogeneous processing core of the at least two heterogeneous processing cores and to be interpreted as a second data object by a second heterogeneous processing core of the at least two heterogeneous processing cores.

Clause 7. The processor of any of clauses 1-6, wherein the one or more circuits are to further:

obtain different one or more attributes associated with how the at least two heterogeneous processing cores support coordinating access to the memory;

determine a manner in which to initialize a synchronization object to coordinate access to the memory based at least in part on the different one or more attributes; and provide the at least two heterogeneous processing cores access to the synchronization object.

Clause 8. The processor of any of clauses 1-7, wherein the synchronization object is a semaphore.

Clause 9. A system, comprising one or more memories to store instructions that, as a result of execution by one or more processors, cause the system to: allocate memory to at least two heterogeneous processing cores in response to performing one or more instructions associated with one or more application programming interfaces (APIs) based, at least in part, on one or more attributes associated with the at least two heterogeneous processing cores.

Clause 10. The system of clause 9, wherein the at least two heterogeneous processing cores comprises at least a portion of the one or more processors.

Clause 11. The system of any of clauses 9-10, wherein the instructions to cause the system to allocate the memory to the at least two heterogeneous processing cores are instructions that, as a result of execution by the one or more processors, cause the system to process the one or more attributes to determine a manner in which to allocate the memory.

Clause 12. The system of any of clauses 9-11, wherein the manner in which to allocate the memory satisfies constraints imposed by attributes provided by the at least two heterogeneous processing cores.

Clause 13. The system of any of clauses 9-12, wherein the memory maps to a parallel computing platform and application programming interface model object.

Clause 14. The system of any of clauses 9-13, wherein the instructions to allocate the memory are instructions that, as a result of execution by the one or more processors, cause the system to provide access to the memory via a handle that is to be interpreted by the at least two heterogeneous processing cores.

Clause 15. The system of any of clauses 9-14, wherein the handle is interpreted as a first data object by a first heterogeneous processing core of the at least two heterogeneous processing cores and interpreted as a second data object by a second heterogeneous processing core of the at least two heterogeneous processing cores.

Clause 16. The system of any of clauses 9-15, wherein the one or more memories are to store instructions that, as a result of execution by the one or more processors, cause the system to:

obtain different one or more attributes associated with how the at least two heterogeneous processing cores support coordinating access to the memory;

determine a manner in which to initialize a signal to coordinate access to the memory based at least in part on the different one or more attributes; and provide the at least two heterogeneous processing cores access to the signal.

Clause 17. The system of any of clauses 9-16, wherein the different one or more attributes encodes types of synchronization primitives supported by the at least two heterogeneous processing cores.

Clause 18. A method, comprising: allocating memory to at least two heterogeneous processing cores in response to performing one or more instructions associated with the API based, at least in part, on one or more attributes associated with the at least two heterogeneous processing cores.

Clause 19. The method of clause 18, wherein the at least two heterogeneous processing cores comprises a first central processing unit (CPU) and second CPU of different instruction set architectures.

Clause 20. The method of any of clauses 18-19, wherein the first CPU supports an ARM instruction set architecture.

Clause 21. The method of any of clauses 18-20, wherein the second CPU supports an x86 instruction set architecture.

Clause 22. The method of any of clauses 18-21, wherein allocating the memory to the at least two heterogeneous processing cores comprises:

determining, based at least in part on the one or more attributes, a set of allocation semantics associated with the at least two heterogeneous processing cores; and determining a manner in which to allocate the memory that satisfies one or more constraints imposed by the set of allocation semantics.

Clause 23. The method of any of clauses 18-22, wherein the memory is interpreted as a tensor by a first core of the at least two heterogeneous processing cores and is interpreted as a texture by a second core of the at least two heterogeneous processing cores.

Clause 24. The method of any of clauses 18-23, wherein the one or more attributes correspond to the at least two heterogeneous processing cores.

Clause 25. The method of any of clauses 18-24, wherein the memory is exposed, by the API, as a handle to be interpreted by the at least two heterogeneous processing cores.

Clause 26. The method of any of clauses 18-25, further comprising: obtaining different one or more attributes associated with how the at least two heterogeneous processing cores support coordinating access to the memory;

determining a manner in which to initialize a signal to coordinate access to the memory based at least in part on the different one or more attributes; and providing the at least two heterogeneous processing cores access to the signal.

Clause 27. The method of any of clauses 18-26, wherein providing the at least two heterogeneous processing cores access to the signal comprises providing a handle to the signal with signaling and waiting semantics to be interpreted by the at least two heterogeneous processing cores.

Clause 28. A machine-readable medium having stored thereon an application programming interface (API), which if performed by one or more processors, cause the one or more processors to at least: allocate memory to at least two heterogeneous processing cores in response to performing one or more instructions associated with the API based, at least in part, on one or more attributes associated with the at least two heterogeneous processing cores.

Clause 29. The machine-readable medium of clause 28, wherein the at least two heterogeneous processing cores comprises an accelerator.

Clause 30. The machine-readable medium of any of clauses 28-29, wherein the accelerator is a programmable vision accelerator (PVA).

Clause 31. The machine-readable medium of any of clauses 28-30, wherein the machine-readable medium comprises instructions which, if performed by the one or more processors, cause the one or more processors to store data to the memory as a first type of data object and read the data from the memory as a second type of data object.

Clause 32. The machine-readable medium of any of clauses 28-31, wherein the first type of data object is an image and the second type of data object is a tensor.

Clause 33. The machine-readable medium of any of clauses 28-32, wherein the API to allocate the memory, if performed by the one or more processors, causes the one or more processors to provide a first handle to the memory and a second handle to the one or more attributes.

Clause 34. A processor, comprising: one or more circuits to create a signal to be used to coordinate at least two heterogeneous processing cores in response to performing one or more instructions associated with one or more application programming interfaces (APIs) based, at least in part, on one or more attributes associated with the at least two heterogeneous processing cores.

Clause 35. The processor of clause 34, wherein the signal is to be used to coordinate execution of computer-readable instructions between the at least two heterogeneous processing cores.

Clause 36. The processor of any of clauses 34-35, wherein the signal is to be used to coordinate access to memory between the at least two heterogeneous processing cores.

Clause 37. The processor of any of clauses 34-36, wherein the signal is to be interpreted as a first synchronization primitive by a first heterogeneous processing core of the at least two heterogeneous processing cores and to be interpreted as a second synchronization primitive by a second heterogeneous processing core of the at least two heterogeneous processing cores.

Clause 38. The processor of any of clauses 34-37, wherein the first synchronization primitive is a semaphore and the second synchronization primitive is a fence.

Clause 39. The processor of any of clauses 34-38, wherein the at least two heterogeneous processing cores comprises a central processing unit and a graphics processing unit.

Clause 40. The processor of any of clauses 34-39, wherein the one or more circuits are to further:

allocate memory to be shared between the at least two heterogeneous processing cores support coordinating access to the memory; and coordinate access to the memory using the signal.

Clause 41. The processor of any of clauses 34-40, wherein the one or more circuits are to coordinate access to the memory using the signal by at least causing a first heterogeneous processing cores to wait on a second heterogeneous processing cores.

Clause 42. A system, comprising one or more memories to store instructions that, as a result of execution by one or more processors, cause the system to: create a signal to be used to coordinate at least two heterogeneous processing cores in response to performing one or more instructions associated with one or more application programming interfaces (APIs) based, at least in part, on one or more attributes associated with the at least two heterogeneous processing cores.

Clause 43. The system of clause 42, wherein the signal is to be used to synchronize execution of the at least two heterogeneous processing cores.

Clause 44. The system of any of clauses 42-43, wherein the signal is to be used to synchronize data access between the at least two heterogeneous processing cores.

Clause 45. The system of any of clauses 42-44, wherein the instructions to cause the system to create a signal to be used to coordinate at least two heterogeneous processing cores are instructions that, as a result of execution by the one or more processors, cause the system to process the one or more attributes to determine a manner in which to create the signal.

Clause 46. The system of any of clauses 42-45, wherein the manner in which to create the signal satisfies constraints imposed by attributes of the at least two heterogeneous processing cores through the one or more APIs.

Clause 47. The system of any of clauses 42-46, wherein the instructions to create the signal are instructions that, as a result of execution by the one or more processors, cause the system to provide access to the signal via a handle that is to be interpreted by the at least two heterogeneous processing cores.

Clause 48. The system of any of clauses 42-47, wherein the handle is interpreted as a first synchronization object by a first heterogeneous processing core of the at least two heterogeneous processing cores and interpreted as a second synchronization object by a second heterogeneous processing core of the at least two heterogeneous processing cores.

Clause 49. The system of any of clauses 42-48, wherein the one or more memories are to store instructions that, as a result of execution by the one or more processors, cause the system to:

obtain different one or more attributes associated the at least two heterogeneous processing cores;

determine a set of constrains on memory allocation based at least in part on the different one or more attributes; and allocate memory to be shared by the at least two heterogeneous processing cores, according to the set of constraints.

Clause 50. The system of any of clauses 42-49, wherein the memory is to be interpreted as a first data object by a first heterogeneous processing core of the at least two heterogeneous processing cores and to be interpreted as a second object by a second heterogeneous processing core of the at least two heterogeneous processing cores.

Clause 51. A method, comprising: creating a signal to be used to coordinate at least two heterogeneous processing cores in response to performing one or more instructions associated with one or more application programming interfaces (APIs) based, at least in part, on one or more attributes associated with the at least two heterogeneous processing cores.

Clause 52. The method of clause 51, wherein the signal is to be used to coordinate scheduling of executable code between the at least two heterogeneous processing cores.

Clause 53. The method of any of clauses 51-52, wherein the signal is to be used to coordinate access to memory between the at least two heterogeneous processing cores.

Clause 54. The method of any of clauses 51-53, wherein the signal is implemented to be interpreted as a first synchronization primitive by a first heterogeneous processing core of the at least two heterogeneous processing cores and to be interpreted as a second synchronization primitive by a second heterogeneous processing core of the at least two heterogeneous processing cores.

Clause 55. The method of any of clauses 51-54, wherein the first synchronization primitive is a semaphore and the second synchronization primitive is a syncpoint.

Clause 56. The method of any of clauses 51-55, wherein the at least two heterogeneous processing cores comprises a central processing unit and a graphics processing unit.

Clause 57. The method of any of clauses 51-56, wherein the one or more circuits are to further:

allocate memory to be shared between the at least two heterogeneous processing cores support coordinating access to the memory; and coordinate access to the memory using the signal.

Clause 58. The method of any of clauses 51-57, wherein the one or more circuits are to coordinate access to the memory using the signal by at least causing a first heterogeneous processing cores to wait on a second heterogeneous processing cores.

Clause 59. A machine-readable medium having stored thereon one or more application programming interfaces (APIs), which if performed by one or more processors, cause the one or more processors to at least: create a signal to be used to coordinate at least two heterogeneous processing cores in response to performing one or more instructions associated with the one or more APIs based, at least in part, on one or more attributes associated with the at least two heterogeneous processing cores.

Clause 60. The machine-readable medium of clause 59, wherein the signal is to be used to coordinate execution of computer-readable instructions between the at least two heterogeneous processing cores.

Clause 61. The machine-readable medium of any of clauses 59-60, wherein the signal is to be used by a first heterogeneous processing cores of the at least two heterogeneous processing cores to block access to memory accessible to a second heterogeneous processing cores of the at least two heterogeneous processing cores.

Clause 62. The machine-readable medium of any of clauses 59-61, wherein the signal is to be interpreted as a first synchronization primitive by a first heterogeneous processing core of the at least two heterogeneous processing cores and to be interpreted as a second synchronization primitive by a second heterogeneous processing core of the at least two heterogeneous processing cores.

Clause 63. The machine-readable medium of any of clauses 59-62, wherein the signal is to be used by a first heterogeneous processing core to signal a second first heterogeneous processing core waiting on the signal.

Clause 64. The machine-readable medium of any of clauses 59-63, wherein the one or more circuits are to further:

allocate memory to be shared between the at least two heterogeneous processing cores support coordinating access to the memory; and coordinate access to the memory using the signal.

Clause 65. The machine-readable medium of any of clauses 59-64, wherein memory is to store one or more images and the signal is to coordinate access to the memory between a camera and a graphics processing unit.

In at least one embodiment, a signal is implemented as any suitable synchronization primitive or synchronization mechanism. In at least one embodiment, a signal is used to coordinate access to data (e.g., memory) and/or execution of code between two or more heterogeneous processing cores. In at least one embodiment, non-limiting examples of a signal includes: semaphores; syncpoints; fences; shared and exclusive locks; events; mutexes; spinlocks; critical sections; and more.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2104 and/or secondary storage. Computer programs, if executed by one or more processors, enable system 2100 to perform various functions in accordance with at least one embodiment. memory 2104, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2102; parallel processing system 2112; an integrated circuit capable of at least a portion of capabilities of both CPU 2102; parallel processing system 2112; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2100 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, a mobile phone device, a television, workstation, game consoles, embedded system, and/or any other type of logic.

In at least one embodiment, parallel processing system 2112 includes, without limitation, a plurality of parallel processing units ("PPUs") 2114 and associated memories 2116. In at least one embodiment, PPUs 2114 are connected to a host processor or other peripheral devices via an interconnect 2118 and a switch 2120 or multiplexer. In at least one embodiment, parallel processing system 2112 distributes computational tasks across PPUs 2114 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2114, although such shared memory may incur performance penalties relative to use of local memory and registers resident to a PPU 2114. In at least one embodiment, operation of PPUs 2114 is synchronized through use of a command such as _syncthreads( ) wherein all threads in a block (e.g., executed across multiple PPUs 2114) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising: one or more circuits to perform one or more application programming interfaces (APIs) to cause different types of memory to be allocated to at least two heterogeneous processing cores based, at least in part, on one or more different attributes associated with the at least two heterogeneous processing cores.

2. The processor of claim 1, wherein the at least two heterogeneous processing cores comprise a central processing unit and a graphics processing unit.

3. The processor of claim 1, wherein the one or more different attributes indicates whether to use system memory or video memory.

4. The processor of claim 3, wherein the video memory is accessible by a discrete graphics processing unit.

5. The processor of claim 1, wherein the one or more circuits to allocate the memory to the at least two heterogeneous processing cores are to process the one or more different attributes to determine a set of constraints on how the different types of memory are to be allocated.

6. The processor of claim 5, wherein the different types of memory are to be allocated in a manner that to be interpreted as a first data object by a first heterogeneous processing core of the at least two heterogeneous processing cores and to be interpreted as a second data object by a second heterogeneous processing core of the at least two heterogeneous processing cores.

7. The processor of claim 1, wherein the one or more circuits are to further:

obtain the one or more different attributes associated with how the at least two heterogeneous processing cores support coordinating access to the different types of memory;

determine a manner in which to initialize a synchronization object to coordinate access to the different types of memory based at least in part on the one or more different attributes; and provide the at least two heterogeneous processing cores access to the synchronization object.

8. The processor of claim 7, wherein the synchronization object is a semaphore.

9. A system, comprising one or more memories to store instructions that, as a result of execution by one or more processors, cause the system to: perform one or more application programming interfaces (APIs) to cause different types of memory to be allocated to at least two heterogeneous processing cores based, at least in part, on one or more different attributes associated with the at least two heterogeneous processing cores.

10. The system of claim 9, wherein the at least two heterogeneous processing cores comprise at least a portion of the one or more processors.

11. The system of claim 9, wherein the instructions to cause the system to allocate the different types of memory to the at least two heterogeneous processing cores are instructions that, as a result of execution by the one or more processors, cause the system to process the one or more different attributes to determine a manner in which to allocate the different types of memory.

12. The system of claim 11, wherein the manner in which to allocate the different types of memory satisfies constraints imposed by the one or more different attributes of the at least two heterogeneous processing cores through the API.

13. The system of claim 9, wherein the different types of memory map to a parallel computing platform and application programming interface model object.

14. The system of claim 9, wherein the instructions to allocate the different types of memory are instructions that, as a result of execution by the one or more processors, cause the system to provide access to the different types of memory via a handle that is to be interpreted by the at least two heterogeneous processing cores.

15. The system of claim 14, wherein the handle is interpreted as a first data object by a first heterogeneous processing core of the at least two heterogeneous processing cores and interpreted as a second data object by a second heterogeneous processing core of the at least two heterogeneous processing cores.

16. The system of claim 9, wherein the one or more memories are to store instructions that, as a result of execution by the one or more processors, cause the system to:

obtain the one or more different attributes associated with how the at least two heterogeneous processing cores support coordinating access to the different types of memory;

determine a manner in which to initialize a signal to coordinate access to the different types of memory based at least in part on the one or more different attributes; and provide the at least two heterogeneous processing cores access to the signal.

17. The system of claim 16, wherein the one or more different attributes encodes types of synchronization primitives supported by the at least two heterogeneous processing cores.

18. A method, comprising: performing one or more application programming interfaces (APIs) to cause different types of memory to be allocated to at least two heterogeneous processing cores based, at least in part, on one or more different attributes associated with the at least two heterogeneous processing cores.

19. The method of claim 18, wherein the at least two heterogeneous processing cores comprise a first central processing unit (CPU) and second CPU of different instruction set architectures.

20. The method of claim 19, wherein the first CPU supports an ARM instruction set architecture.

21. The method of claim 20, wherein the second CPU supports an x86 instruction set architecture.

22. The method of claim 18, wherein allocating the memory to the at least two heterogeneous processing cores comprises:

determining, based at least in part on the one or more different attributes, a set of allocation semantics associated with the at least two heterogeneous processing cores; and determining a manner in which to allocate the different types of memory that satisfy one or more constraints imposed by the set of allocation semantics.

23. The method of claim 22, wherein the memory is interpreted as a tensor by a first core of the at least two heterogeneous processing cores and is interpreted as a texture by a second core of the at least two heterogeneous processing cores.

24. The method of claim 18, wherein the one or more different attributes correspond to the at least two heterogeneous processing cores.

25. The method of claim 18, wherein the different types of memory are exposed, by the API, as a handle to be interpreted by the at least two heterogeneous processing cores.

26. The method of claim 18, further comprising:

obtaining the one or more different attributes associated with how the at least two heterogeneous processing cores support coordinating access to the different types of memory;

determining a manner in which to initialize a signal to coordinate access to the different types of memory based at least in part on the one or more different attributes; and providing the at least two heterogeneous processing cores access to the signal.

27. The method of claim 26, wherein providing the at least two heterogeneous processing cores access to the signal comprises providing a handle to the signal with signaling and waiting semantics to be interpreted by the at least two heterogeneous processing cores.

28. A non-transitory machine-readable medium having stored thereon an application programming interface (API), which if performed by one or more processors, cause the one or more processors to at least: allocate different types of memory to at least two heterogeneous processing cores based, at least in part, on one or more different attributes associated with the at least two heterogeneous processing cores.

29. The non-transitory machine-readable medium of claim 28, wherein the at least two heterogeneous processing cores comprise an accelerator.

30. The non-transitory machine-readable medium of claim 29, wherein the accelerator is a programmable vision accelerator.

31. The non-transitory machine-readable medium of claim 28, wherein the machine-readable medium comprises instructions which, if performed by the one or more processors, cause the one or more processors to store data to the different types of memory as a first type of data object and read the data from the different types of memory as a second type of data object.

32. The non-transitory machine-readable medium of claim 31, wherein the first type of data object is an image and the second type of data object is a tensor.

33. The non-transitory machine-readable medium of claim 28, wherein the API, if performed by the one or more processors, causes the one or more processors to provide a first handle to the different types of memory and a second handle to the one or more different attributes.

34. A processor, comprising: one or more circuits to perform one or more application programming interfaces (APIs) to create a signal to be used to coordinate allocating different types of memory to at least two heterogeneous processing cores based, at least in part, on one or more different attributes associated with the at least two heterogeneous processing cores.

35. The processor of claim 34, wherein the signal is to be used to coordinate execution of computer-readable instructions between the at least two heterogeneous processing cores.

36. The processor of claim 34, wherein the signal is to be used to coordinate access to the different types of memory between the at least two heterogeneous processing cores.

37. The processor of claim 34, wherein the signal is to be interpreted as a first synchronization primitive by a first heterogeneous processing core of the at least two heterogeneous processing cores and to be interpreted as a second synchronization primitive by a second heterogeneous processing core of the at least two heterogeneous processing cores.

38. The processor of claim 37, wherein the first synchronization primitive is a semaphore and the second synchronization primitive is a fence.

39. The processor of claim 34, wherein the at least two heterogeneous processing cores comprise a central processing unit and a graphics processing unit.

40. The processor of claim 34, wherein the one or more circuits are to further:

allocate memory to be shared between the at least two heterogeneous processing cores support coordinating access to the memory; and coordinate access to the memory using the signal.

41. The processor of claim 40, wherein the one or more circuits are to coordinate access to the memory using the signal by at least causing a first heterogeneous processing cores to wait on a second heterogeneous processing cores.

42. A system, comprising one or more memories to store instructions that, as a result of execution by one or more processors, cause the system to: perform one or more application programming interfaces (APIs) to create a signal to be used to coordinate allocating different types of memory to at least two heterogeneous processing cores based, at least in part, on one or more different attributes associated with the at least two heterogeneous processing cores.

43. The system of claim 42, wherein the signal is to be used to synchronize execution of the at least two heterogeneous processing cores.

44. The system of claim 42, wherein the signal is to be used to synchronize data access between the at least two heterogeneous processing cores.

45. The system of claim 42, wherein the instructions to cause the system to create a signal to be used to coordinate at least two heterogeneous processing cores are instructions that, as a result of execution by the one or more processors, cause the system to process the one or more different attributes to determine a manner in which to create the signal.

46. The system of claim 45, wherein the manner in which to create the signal satisfies constraints imposed by attributes of the at least two heterogeneous processing cores through the API.

47. The system of claim 42, wherein the instructions to create the signal are instructions that, as a result of execution by the one or more processors, cause the system to provide access to the signal via a handle that is to be interpreted by the at least two heterogeneous processing cores.

48. The system of claim 47, wherein the handle is interpreted as a first synchronization object by a first heterogeneous processing core of the at least two heterogeneous processing cores and interpreted as a second synchronization object by a second heterogeneous processing core of the at least two heterogeneous processing cores.

49. The system of claim 42, wherein the one or more memories are to store instructions that, as a result of execution by the one or more processors, cause the system to:

obtain the one or more different attributes associated with the at least two heterogeneous processing cores;

determine a set of constraints on memory allocation based at least in part on the one or more different attributes; and allocate memory to be shared by the at least two heterogeneous processing cores, according to the set of constraints.

50. The system of claim 49, wherein the memory is to be interpreted as a first data object by a first heterogeneous processing core of the at least two heterogeneous processing cores and to be interpreted as a second object by a second heterogeneous processing core of the at least two heterogeneous processing cores.

51. A method, comprising: performing one or more application programming interfaces (APIs) to create a signal to be used to coordinate allocating different types of memory to at least two heterogeneous processing cores based, at least in part, on one or more different attributes associated with the at least two heterogeneous processing cores.

52. The method of claim 51, wherein the signal is to be used to coordinate scheduling of executable code between the at least two heterogeneous processing cores.

53. The method of claim 51, wherein the signal is to be used to coordinate access to the different types of memory between the at least two heterogeneous processing cores.

54. The method of claim 51, wherein the signal is implemented to be interpreted as a first synchronization primitive by a first heterogeneous processing core of the at least two heterogeneous processing cores and to be interpreted as a second synchronization primitive by a second heterogeneous processing core of the at least two heterogeneous processing cores.

55. The method of claim 54, wherein the first synchronization primitive is a semaphore and the second synchronization primitive is a syncpoint.

56. The method of claim 51, wherein the at least two heterogeneous processing cores comprise a central processing unit and a graphics processing unit.

57. The method of claim 51, wherein one or more circuits are to further:

allocate memory to be shared between the at least two heterogeneous processing cores support coordinating access to the memory; and coordinate access to the memory using the signal.

58. The method of claim 57, wherein the one or more circuits are to coordinate access to the memory using the signal by at least causing a first heterogeneous processing cores to wait on a second heterogeneous processing cores.

59. A non-transitory machine-readable medium having stored thereon one or more application programming interfaces (APIs), which if performed by one or more processors, cause the one or more processors to at least: create a signal to be used to coordinate allocating different types of memory to at least two heterogeneous processing cores based, at least in part, on one or more different attributes associated with the at least two heterogeneous processing cores.

60. The non-transitory machine-readable medium of claim 59, wherein the signal is to be used to coordinate execution of computer-readable instructions between the at least two heterogeneous processing cores.

61. The non-transitory machine-readable medium of claim 59, wherein the signal is to be used by a first heterogeneous processing cores of the at least two heterogeneous processing cores to block access to memory accessible to a second heterogeneous processing cores of the at least two heterogeneous processing cores.

62. The non-transitory machine-readable medium of claim 59, wherein the signal is to be interpreted as a first synchronization primitive by a first heterogeneous processing core of the at least two heterogeneous processing cores and to be interpreted as a second synchronization primitive by a second heterogeneous processing core of the at least two heterogeneous processing cores.

63. The non-transitory machine-readable medium of claim 59, wherein the signal is to be used by a first heterogeneous processing core to signal a second first heterogeneous processing core waiting on the signal.

64. The non-transitory machine-readable medium of claim 59, wherein the one or more processors are to further:

allocate memory to be shared between the at least two heterogeneous processing cores support coordinating access to the memory; and coordinate access to the memory using the signal.

65. The non-transitory machine-readable medium of claim 64, wherein memory is to store one or more images and the signal is to coordinate access to the memory between a camera and a graphics processing unit.

* * * * *